United States Patent [19]

Seki et al.

[11] Patent Number: 5,101,283
[45] Date of Patent: Mar. 31, 1992

[54] HALFTONE IMAGE GENERATING APPARATUS

[75] Inventors: Masao Seki; Kazuyasu Sasuga; Yukiharu Inoue; Shinjiro Toyoda, all of Ebina, Japan

[73] Assignee: Fuji Xerox Co., Ltd., Tokyo, Japan

[21] Appl. No.: 430,235

[22] Filed: Oct. 30, 1989

[30] Foreign Application Priority Data

Oct. 31, 1988 [JP] Japan ................... 63-277147

[51] Int. Cl.⁵ ............................ H04M 1/40
[52] U.S. Cl. ................... 358/456; 358/298; 358/457
[58] Field of Search ............ 358/456, 457, 298

[56] References Cited

U.S. PATENT DOCUMENTS 4,717,964  1/1988  Abe et al. ................ 358/456

FOREIGN PATENT DOCUMENTS 58-85434   5/1983  Japan.
61-214662  9/1986  Japan.
62-149270  7/1987  Japan.

Primary Examiner—Edward L. Coles, Sr.
Attorney, Agent, or Firm—Finnegan, Henderson, Farabow, Garrett, and Dunner

[57] ABSTRACT

A halftone image generating apparatus for use in a halftone image generating system for generating threshold value data corresponding to positions in a main scanning direction and a subsidiary scanning direction, comprising a threshold value data generating circuit for generating the threshold value data in a matrix pattern having a variable number of lines and rows, and for converting input picture image data having chromatic gradations into binary value data by comparing the input picture image data to the threshold value data, and a circuit for forming a scanning mesh dot image corresponding to the input picture image data.

24 Claims, 75 Drawing Sheets (REDUCTION)     (ENLARGEMENT)

| 21 | 22 | 23 | 24 | 25 | 26 |
| 20 | 7  | 8  | 9  | 10 | 27 |
| 19 | 6  | 1  | 2  | 11 | 28 |
| 18 | 5  | 4  | 3  | 12 | 29 |
| 17 | 16 | 15 | 14 | 13 | 30 |
| 36 | 35 | 34 | 33 | 32 | 31 |

HALFTONE IMAGE GENERATING APPARATUS

BACKGROUND OF THE INVENTION

1. Field of the Invention

The present invention relates to a color picture image forming apparatus, such as a digital color copying machine, printer or facsimile machine, which generates mesh dot halftone images by comparing image data to a matrix pattern of threshold values having a screen angle with the picture image signals.

2. Description of the Related Art

Image forming equipment, such as laser printers and ink jet printers, which can only express image density in two chromatic grades, i.e., black and white, or in a small number of grades, have employed halftone image generating processes such as the density pattern process or the dither process for the recording of halftone images.

As illustrated in FIG. 55(a), the density pattern process comprises the steps of subdividing a picture element G, which has been read from an original picture, into n×m minute picture elements g (there are 5×5 minute picture elements in the example of FIG. 55), allocating a threshold value corresponding to each minute picture element g to form a matrix of binary values, sequentially comparing the average image density of picture element G with each threshold value of the binary matrix, forming a mesh dot image MG by shading the minute picture elements g having a threshold value larger than the overall image density white, and by shading the minute picture elements g having a threshold value smaller than the overall image density black, and recording the resulting mesh dot image MG as a halftone image.

As illustrated in FIG. 55(b), the dither process comprises the steps of dividing an original picture element G into n×m density elements, allocating a threshold value to each n×m minute picture element g of picture element G, in the same manner as described in the density pattern process, sequentially comparing the density of each minute picture element g with the corresponding density element of the original picture element G, forming a mesh dot image MG by shading each minute picture element g having a threshold value larger than the corresponding density element of the original picture element G white, and by shading each minute picture element g having a threshold value smaller than the corresponding density element of the original picture element G black, and recording the mesh dot image MG as a halftone image.

In these cases, the number of threshold values comprising a 5×5 element threshold value matrix pattern corresponds to a total of only 25 halftone grades.

These processes have also been applied to the recording of halftone images in multi-color printing. For example, color image forming machines such as digital color copying machines, printers and facsimiles that are provided with developing units with toners comprising three colors, Y (Yellow), M (Magenta), and C (Cyan), or four colors, Y, M, C, and K (Black), reproduce color images by converting signals corresponding to the density of Y, M, C, and K of the image into binary data, comparing this data with corresponding threshold values comprising a threshold value matrix pattern, and transferring the overlapping mesh dot images (i.e. dot matrices). However, the number of chromatic grades and the degree of resolution of such color image forming machines are inversely related. Therefore, an attempt to enlarge the matrix size in order to increase the number of chromatic grades will result in a deterioration of the resolution. Likewise, in order to increase the resolution, it is necessary to decrease the number of chromatic grades. Therefore, in order to achieve a large number of chromatic grades with high resolution, it is necessary to divide each single picture element comprising the matrix into sub-elements. Known methods for achieving this subdivision in laser printers include brilliance modulation and pulse width modulation. Brilliance modulation involves controlling the amount of light emitted by the laser beam while pulse modulation involves controlling the duration of time for which the laser beam remains turned on. Both of these methods form minute picture elements by the division of picture elements into smaller multiple-value parts in the scanning direction of the laser.

However, minute picture elements obtained by a subdivided dot picture element are often less stable than single-dot picture elements which are not subdivided. Therefore, it is desired to reproduce the dots by a process of fostering their growth with as much concentration as possible, as presented, for example, in Japanese Patent Application Unexamined Publication No. 214662-1986, or, more specifically, by a process of attaining the growth of dots by their straight linkage in the manner of a myriad line screen. In order to achieve image reproduction by this concentrated dot process, it is necessary to either (1) increase the resolution of the output of the records to a very high level or (2), as shown in FIGS. 56(a) through 56(c), develop a myriad line screen that simulates the arrangement of threshold values within the threshold value matrix utilized in the dither process. The process of FIGS. 56(a) through 56(c) comprises the steps of dividing one picture element into five minute picture elements, arranging them in the scanning direction of the laser, as illustrated in FIG. 56(a), and forming a threshold value matrix corresponding to the five minute picture elements.

Generally, when multi-color dot matrix halftone images are reproduced, a moire forms between the screens used for printing the different colors while printing the individually colored mesh dot images. In order to prevent the occurrence of a moire, the screens for printing the individual colors are set at different angles from one another. It is therefore necessary to change the contents of the threshold value matrices to reflect the different screen angles. The process by which the contents of the threshold matrix may be changed includes the method of preparing the basic threshold value matrix for each individual color and subsequently generating therefrom a threshold pattern corresponding to a selected screen angle, as described in Japanese Patent Application Unexamined Publication No. 85434-1983. However, a normal mesh dot pattern cannot be generated unless the basic threshold value matrix is in excess of a particular size.

To solve the foregoing problem, a threshold value matrix generating system in which the output dots are always grown from the center of the matrix, regardless of the size of threshold value matrix, has been proposed in Japanese Patent Application Unexamined Publication No. 149270-1987.

This threshold value matrix generating system is designed to generate a threshold value corresponding to a screen angle by specifying the line and row address of the basic threshold value block with respect to the screen angle, in reflection of the noted feature that the all the threshold value matrices for the image for one page as arranged with the prescribed angle set for the screen can be divided into basic threshold value blocks in a certain size. For example, the screen angle for the yellow output will be 18.5 degrees, the screen angle for the magenta output will be 45 degrees, the screen angle for the cyan output will be 71.5 degrees, and the screen angle for the black output will be 0 degree.

FIG. 57 presents an example arrangement of the threshold matrices where the screen angle is set at 18.5 degrees. In the figure, the block with hatching applied thereto represents the threshold matrix of FIG. 58(a). The basic threshold value block shown in FIG. 58(b) comprises two rows and twenty columns and is repeated a plurality of times in the main scanning direction as shown in FIG. 57. While the basic threshold value block is shifted by the prescribed amount in the main scanning direction, it is also repeated a plurality of times in the subsidiary scanning direction as shown in FIG. 59 such that the data initially read out of the basic threshold block is different for every two lines. FIG. 59 shows how the basic threshold value block of the threshold value arrangement shown in FIG. 57 is repeated wherein the number of lines K is 2, the number of rows L is 20, and the number of shifts S is 6. Moreover, the number of shifts from the initial basic threshold value block is 10 comprising S, 2S, 3S, 4S-L . . . , 9S-2L, and 0. With regard to the other colors having different screen angles, similar shift arrangements are used.

FIG. 60(a) and 60(b) show the threshold value matrix and the threshold value basic block, respectively, when the screen angle is 45 degrees. In this case, there are two kinds of shifts, O and S. FIGS. 61(a) and 61(b) show the threshold value matrix and the basic threshold value block, respectively, when the screen angle is 71.5 degrees. In this case, there are ten kinds of shifts each being identical to the shifts found when the screen angle is 18.5 degrees. Finally, FIG. 62 shows the case where the screen angle is 0 degrees, and wherein the threshold value matrix and the basic threshold value block are identical.

FIG. 63 is a schematic block diagram of the threshold value matrix generating system proposed earlier wherein the memory device 821 accommodates the threshold value data for the basic threshold value block. It provides the basic pattern and the size of the basic threshold value block in the main scanning direction and in the subsidiary scanning direction, depending on the screen angle, as mentioned earlier. Because the reading position for the memory device 821 must be changed in accordance with the main scanning position, the subsidiary scanning position, and the output colors, the system is designed such that it is possible to set, with the initial value setting device 824, the initial value of the main scanning counter device 822, in order to specify the address in the line direction of the memory device 821, and the initial value for the subsidiary scanning counter device 823, in order to specify the address of the memory device 821 in the row direction.

When performing the concentrated dot-type reproduction method, problems arise when trying to increase the degree of output resolution. For instance, in order to increase output resolution, the polygon mirror which performs the scanning of the laser and the control of the video frequencies for controlling the on/off operations of the laser unit during the recording process, must be revolved at very high speeds, making the system difficult to control and impractical.

Moreover, during the process of developing a pseudo-myriad line screen with respect to the arrangement of threshold values in the threshold value matrix by the dither process, the threshold values are arranged in a state of dispersion such that the dots on the highlight side as shown in FIG. 56(b), i.e., the picture elements with small numerical values, are scattered. This can either result in an inferior reproduction of the original image or the development of a cyclic structure in the subsidiary scanning direction of the laser giving rise to a moire and a texture wherein a portion of the screen is disrupted in the direction of the subsidiary scanning, as shown in FIG. 56(c). The final result is an increase in noise making it impossible to obtain a high quality picture element. In order to avoid such problems, it is conceivable to arrange a threshold value to be connected to the subsidiary scanning direction. However, in this case, it is impossible to obtain a favorable result because of the considerable deterioration of the image reproduction due to the fact that it is not possible to set up a large number of chromatic grades.

Moreover, provided that the size of the basic threshold value block is K lines and L rows and that the number of bits necessary for representing the K lines is expressed by "k", the number of bits necessary for representing the L rows is expressed by "l", and the number of bits necessary for representing the matrix changeover signal SL is expressed by "m", the accesses necessary for the memory device 821 will comprise a total of $l+k+m=n$ bits.

For example, assuming that $L=20$ and $K=2$, then "$l=5$ and $k=1$, which means that a total of six bits, five bits in the main scanning direction and one bit in the subsidiary scanning direction, will be necessary. On the other hand, if the basic threshold value block comprises six lines and six rows, then $l=3$ and $k=3$, which means that a total of six bits, three bits in the main scanning direction and three bits in the subsidiary scanning direction, will be necessary. Although in both examples, the total number of bits comprising the addresses for reading out the basic threshold value block is six, the number of bits comprising the main scanning direction and the subsidiary scanning direction are different. Therefore, it is necessary to provide independent address circuits for each example resulting in an overly complicated circuit. Furthermore, because only part of the memory area is used, there are problems of inferior memory-utilization rate and access time delays.

SUMMARY OF THE INVENTION

Accordingly, it is an object of the present invention to provide a solution to the foregoing problems associated with the conventional halftone image generating apparatus.

A second object of the present invention is to provide a halftone image generating apparatus wherein it is possible to preset the size of the threshold value matrix of the screen generator.

A third object of the present invention, is to provide a means for the efficient generation of addresses even if there is a change in the size of the threshold value matrix in the main scanning direction or the subsidiary scanning direction.

A fourth object of the present invention is to improve the systems memory utilization efficiency such that it is possible for the system to select a plurality of matrices each having different maximum values in the main scanning direction and the subsidiary scanning direction while having memory devices with the same capacity.

A fifth object of the present invention is to improve the resolution of the reproduced image by eliminating noise and incompatible features which are likely to occur in the transition area from a character image to a halftone image.

A sixth object of the present invention is to achieve improvements in chromatic grade reproduction.

To achieve the foregoing object, the halftone image generating system of the present invention, as shown in FIG. 1, comprises a memory device 1, for storing the threshold value data for the matrix pattern, an address generating means 2 for generating the addresses for the data to be read out of the memory device 1, and a comparator means 3, for comparing the input image data 4 with the selected threshold value data for generating output data which is then converted into binary value data thereby generating mesh dot images by scanning the output image data. The halftone image generating system of the present invention further comprises a set of features which enable it to generate threshold value data in matrix patterns having a variable number of lines and rows.

More specifically, the address generating means 2 stores information corresponding to start addresses in the memory device 5 and is constructed such that a plurality of start addresses are repeated in a prescribed sequence each time a matrix unit has completed a scan in the subsidiary scanning direction. These start addresses are used in the initial matrix, each at the beginning of a line. In addition, the start address generating means comprises a register 6 for storing the size of the matrix in the subsidiary scanning direction and the number of frames necessary for the start address to complete a round, a subsidiary scanning direction counter 7, and a frame counter 8. The address data is loaded from the register 6 to the subsidiary scanning direction counter 7 and the frame counter 8 and the start address which corresponds to the value stored in the frame counter 8 is loaded onto the main scanning direction counter 9 only during the initial position of a line.

With the above features, it is possible to voluntarily set the size of the data in the main scanning direction and in the subsidiary scanning direction as well as the shift length. Hence, when incorporated into a color image forming system, the present invention makes it possible to voluntarily set different screen angles for each individual toner color thus eliminating the formation of moires between the different screens. Furthermore, the present invention allows the simple realization of a myriad line screen by generating threshold value data in a line and having no shift.

By arranging the threshold value for the matrix pattern in a two-dimensional cycle, it is possible to create a concentrated dot type matrix comprising a growth nucleus positioned at the center of the dot, a partial dot type matrix comprising a plurality of growth nuclei scattered therein, and a dispersed type matrix having no growth nucleus. By setting up a plurality of these matrixes and by permitting a selection thereof, it is possible to improve the resolution, precision, and chromatic gradation characteristics in a manner suitable for the reproduction of images, such as characters and lines, and halftone images, such as photographs.

Moreover, an error diffusion processing means 10 may be connected between the output of the comparator means 3 and the input image data 4 in order to improve the chromatic gradation characteristics. This improvement results from an error diffusion process performed by the feedback of the quantized error between the threshold value data and the input image data 4 back to the input image data 4 wherein the converted density value is derived from the output image data.

BRIEF DESCRIPTION OF THE DRAWINGS

The manner by which the above objects and other objects, features and advantages of the present invention are attained will be fully apparent from the following detailed description when it is considered in view of the drawings, wherein:

FIGS. 12a-12e illustrate the creation of a job mode;

DETAILED DESCRIPTION OF THE INVENTION

Figure 1:
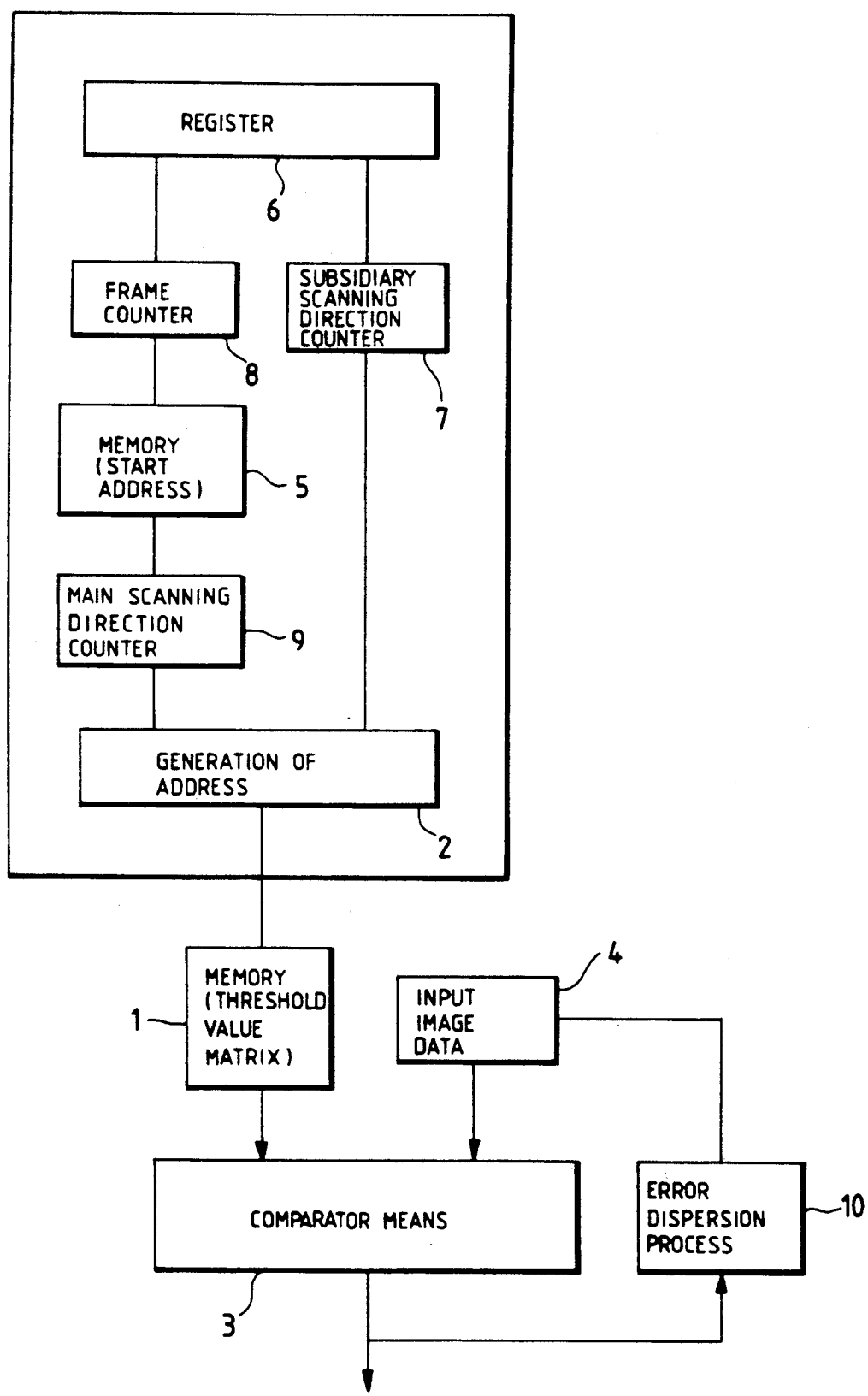
FIG. 1 is a flow chart illustrating one embodiment of the halftone image generating system according to the present invention.

Reference will now be made in detail to the method of the present invention as illustrated in the accompanying drawings, in which like reference characters designate like or corresponding parts throughout the several drawings.

In the description to follow, a color copying machine will be used as an example of the image forming apparatus. It should be understood, however, that the present invention is not limited to a color copying machine, but may be applied to other types of image forming devices, such as printers and facsimile devices.

The embodiment described in this specification is divided into the following sections and subsections. Sections I and II describe an overall system of a color copying machine incorporating the present invention. Section III describes in detail the embodiments of the present invention which are realized in the color copying machine.

(I) INTRODUCTION
  (I) - 1 System Configuration
  (I) - 2 Functions and Features
  (I) - 3 Electrical Control System
(II) SYSTEM DETAILS
  (II) - 1 General
  (II) - 2 Image Input Terminal (IIT)
  (II) - 3 Image Output Terminal (IOT)
  (II) - 4 User Interface (U/I)
  (II) - 5 Film Image Reader
(III) IMAGE PROCESSING SYSTEM (IPS)
  (III) - 1 IPS Modules
  (III) - 2 IPS Hardware
  (III) - 3 Halftone Image Generating Circuit
  (III) - 4 Screen Generator
  (III) - 5 Error Dispersion Process Circuit

(I) INTRODUCTION (I-1) System Configuration

Figure 2:
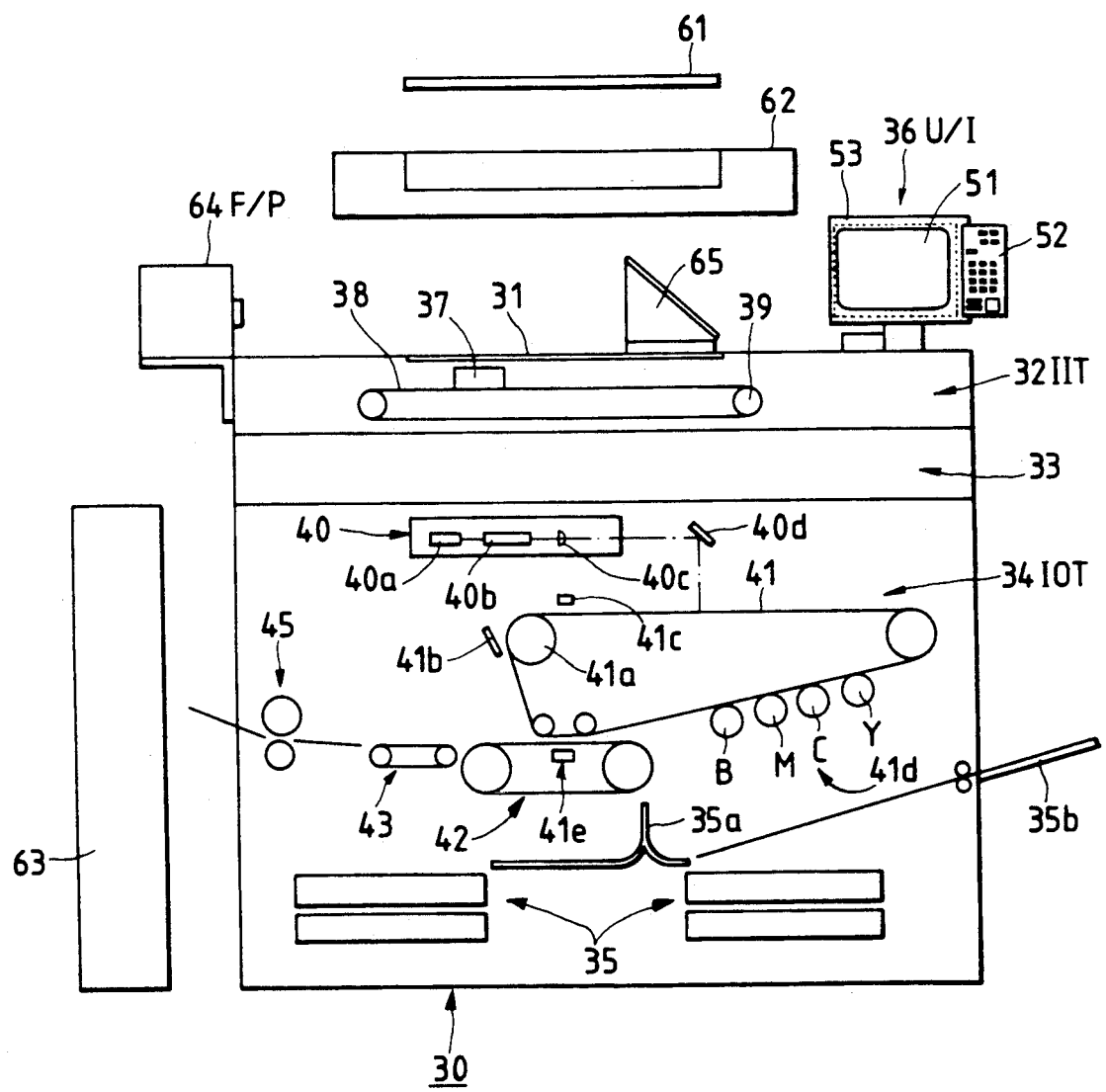
FIG. 2 is a block diagram illustrating one example of the overall construction of a color copying machine to which the present invention has been applied.

FIG. 2 shows a configuration of a color copying machine as a specific embodiment of the present invention.

In the color copying machine incorporating the present invention, a base machine 30 is made up of a platen glass 31, image input terminal (IIT) 32, electric control housing 33, image output terminal (IOT) 34, tray 35, and user interface (U/I) 36. The base machine 30 optionally includes an edit pad 61, auto document feeder (ADF) 62, sorter 63, and film projector (F/P) 64.

Electrical hardware is required for controlling the IIT, IOT, U/I, etc. The electrical hardware is divided into a plurality of circuit sections with different signal/-data processing functions, such as IIT, IPS for processing the output image signals of the IIT, U/I, and F/P. These circuit sections are assembled into circuit boards, respectively. Together with a SYS board for controlling the above circuit boards, and an MCB (machine control board) for controlling the IOT, ADF, sorter, etc., these circuit boards are housed in the electrical control housing 33.

The IIT 32 is made up of an imaging unit 37, and the combination of a wire 38 and a drive pulley 39, which is for driving the imaging unit 37. The imaging unit 37 reads a color image on an original in terms of image signals of the primary colors, blue (B), green (G), and red (R), by using a CCD sensor and color filters, and converts them into digital image signals, and sends the separated color image signals to an image processing system (IPS).

In the IPS, the B, G, and R signals from the IIT 32 are converted into toner primary colors yellow (Y), cyan (C), magenta (M), and black (K). The Y, C, M, and K signals are subjected to various processings for improving the reproducibility of color, gradation, definition, and the like. Further, the gradation toner signal of each process color is converted into an on/off or two-level toner signal, and the two-level signals are transferred to the IOT 34.

In the IOT 34 containing a scanner 40 and a photosensitive belt 41, a laser output unit 40a converts the image signals from the IPS into light signals. The light signals travel an optical path including a polygon mirror 40b, F/8 lens 40c, and reflecting mirror 40d, and reach the photosensitive belt 41, and forms a latent image corresponding to the original image on the surface of the belt. The photosensitive belt 41 is driven by a drive pulley 41a. A cleaner 41b, charger 41c, developing units 41d for the primary colors Y, M, C, and K, and a transfer unit 41e are disposed around the belt 41. A tow roll transfer loop 42 is disposed close to the transfer unit 41e, as shown. The tow roll transfer loop 42 picks up a sheet of paper as it is transported along a paper transfer path 35a from a tray 35, and in cooperation with the transfer unit, transfers color toners to the paper. In the case of the full color copy of the 4 pass color type, the tow roll loop is turned four times, and the color toners are transferred on the paper in the order of Y, M, C, and K. The paper bearing the transferred color toner image is transported through a vacuum transfer belt 43 to a fixing or fusing unit 45, and then is ejected outside the base machine. If necessary, a single sheet inserter (SSI) 35b may feed a sheet of paper to the paper transfer path 35a.

The U/I 36 is used by a user when selecting a desired function and sets up the conditions to exercise the function. The U/I 36 is provided with a color display 51, and a hard control panel 52 located by the display. In combination with an infrared-ray touch board 53, it enables the user to directly designate necessary functions by soft buttons on the display screen.

The option units available for the base machine follows. The first optional unit is an edit pad 61 as a coordinates input device, which is placed on the platen glass 31. The edit pad enables a user to variously edit images with the aid of a pen or by a memory card. Further, the ADF 62 and the sorter 63 may optionally be used.

A mirror unit (M/U) 65 may further be installed. In this instance, it is placed on the platen glass 31. In association with this, the F/P 64 is installed. A color image of a color film, for example, that is projected by the F/P 64, is read by the imaging unit 37 of the IIT 32. With the combination of the M/U 65 and F/P 64, the images of a color film can be copied directly from the color film. The object to be imaged may contain negative and positive films, and slides. Additionally, an auto focusing device and a correction-filter auto exchanging device are installed to the copying machine under discussion.

(I-2) Functions and Features (A) Functions

The color copying machine according to the present invention has various types of functions meeting user's needs, and is operable in a complete automated manner, throughout the copying process. A display unit, for example, a CRT, that is used in the user interface, visually presents selection of various functions, of the conditions to exercise the selected functions, and other necessary menus. Because of the function of the user interface, both highly skilled persons and beginners-alike will find it easy to access and use the copying machine.

One of the major functions of the color copying machine consists of control panel select operations of items that are out of operation flows, such as start, stop, all clear, ten keys, interrupt, information, and languages, and selective operations of the respective functions by touching soft buttons in a basic display. Touching a pathway tab of a pathway as a function select area allows an operator to select any of various types of edit functions, such as marker edit, business edit, and creative edit. With such functions, any operator can operate the color copying machine to make both monochromatic and full color copies in as simple and easy a way as operating a conventional copying machine.

The copying machine of the present invention features the full color or 4-pass color copying function, and is also operable in the 3-pass color or black copy mode, if necessary.

In respect to paper feed, an automatic paper size select and a paper size designation are possible.

Reduction/enlargement is possible in a broad range from 50% to 400% with steps of 1%. Additionally, horizontal and vertical magnification of an image may be independently and automatically selected.

Optimum copy density can be automatically set for a mono color original, and when a color original is copied, an auto color balance mode may be used, in which a user may designate a subtractive color.

A memory card storing job programs is used for accessing the job programs. A maximum of eight jobs can be stored in the memory card. The memory card has a memory capacity of 32 K bytes. Jobs other than that of the film projector mode can be programed. Additional functions relate to copy output, copy sharpness, copy contrast, copy position, film projector, page programming, and margin selection. In the case of the copying machine or copier coupled to an optional sorter, when an uncollated mode is selected, the copy output function operates and hence a maximum adjusting function operates to set up a number of copies that the bin of the sorter can accommodate.

Copy sharpness to effect the edge emphasis, a manual sharpness adjustment mode of seven steps and a photo sharpness adjustment mode of photo, character, print, and photo/character are optionally provided. Copy position is for selecting a position on a sheet of paper where an image is to be copied. An auto centering function to set the center of a copied image at the center of the sheet is optionally used. The default is the auto centering.

The film projector enables images of various types of films to be copied. Any of the following modes can be selected: projections of 35 mm negative and positive films, 35 mm negative film platen placement, 6 cm×6 cm slide platen placement, and 4 in× 4 in slide platen placement. In the film projector mode, paper of A4 size is automatically selected unless another paper size is designated. The film projector pop-up has a color balancer. When the color balancer is set to "Reddish", the projected image is tinged with red. When it is set to "bluish", the image is tinged with blue. Particular auto and manual density controls are used.

The page programming function comes in four varieties: a covering function to attach a front/back cover or a front cover to the copies; an insert function to insert a white sheet or a color sheet into a stack of copies; a color mode in which a color mode is set up for every page; and a paper size select function in which a desired paper tray, together with the color mode, is selected every page. The margin function is for setting the margin of the copy in steps of 1 mm in the range of 0 to 30 mm. The margin can be set for only one side for one original.

Marker edit edits the image within an area enclosed by a marker. This function is directed to the editing of documents and treats the documents as black and white documents. In a black mode, a designated area on the document is painted the color of the palette on the CRT, while all areas other than the designated area are painted black. In a reddish black mode, an image on the document is painted red, while the remainder is painted reddish black. The marker edit has the functions of trim, mask, color mesh, and black-to-color. The specific area may be designated by depicting a closed loop on the document, or by using the ten keyboard or the edit pad. This is also applied to the area designation in the editing functions to be given later.

The trim function allows the image within a marked area to be copied in mono color, but prevents the image outside the marked area from being copied, viz., to erase the image outside the marked area.

The mask function cause the image within a marked area to be used and allows the image outside the marked area to be reproduced in mono color.

When the color mesh mode is exercised, a designated color mesh pattern is placed on a marked area and an image is copied in mono color. The color of the color mesh may be selected from among eight (8) standard colors (predetermined colors) and eight (8) registered colors (registered by a user, and up to eight different colors can be selected from 16,700,000 colors and simultaneously be registered). A mesh pattern can be selected from among four patterns.

In the black-to-color mode, the image within the marked area can be copied with a color selected from the 8 standard colors and the 8 registered colors.

Business edit is mainly applied for business documents and quickly edits high quality originals. In this mode, the originals are treated as full color originals. The area or point designation is required for all the functions. A plurality of different functions can be simultaneously set for a single original. In a black/mono color mode, the image outside the specified area is black or mono color, while the black image within the specified area is changed to the palette color on the CRT display. In a reddish black mode, the image outside the specified area is colored in reddish black, while the image within that area is colored in red. The business edit, like the marker edit, is exercised in a variety of modes, such as trim, mask, color mesh, black-to-color, and further logotype, line, paint 1, correction, and function clear.

The logotype mode is used to insert a logotype such as a symbol mark at a specified point on an image. Two types of logotypes may be vertically or horizontally inserted. In this case, one logotype is allowed to be used for one original. The logo patterns are prepared in accordance with the client's request and stored into a ROM.

The line mode is provided to depict lines in two-dot expression vertically and horizontally with respect to the x-distance. The color of the line may be selected from the 8 standard colors and the 8 registered colors. An unlimited number of lines can be designated, and up to seven colors can be used simultaneously.

In the paint 1 mode, one point within an area defined by a closed loop is designated, and that area is entirely painted with one color selected from among the 8 standard colors and the 8 registered colors. When a plurality of loops are used, the painting is carried out for each area.

The mesh can be selected from four patterns for each area. The number of loops that can be designated is unlimited. Up to seven-color mesh patterns can be used.

The correction function confirms, corrects, changes, and erases the matters concerning an area as specified, and executes these functions by using three operation modes, an area/point change mode, area/point correction, and area/point cancel mode. The area/point change mode confirms and changes the set functions for each area. The area/point correction mode changes the area size, and changes the point position in steps of 1 mm. The area/point cancel mode erases the specified area.

The creative edit is exercised by using many functions including an image composition, copy-on-copy, color composition, partial display change, multi-page enlargement, paint 1, color mesh, color change, negative/positive inversion, repeat, paint 2, density control, color balance, copy contrast, copy sharpness, color mode, trim, mask, mirror image, margin, line, shift, logotype, split scan, correction, function clear, and add function. In the creative edit mode, the original is treated as a color original. A plurality of functions can be set for one document. Different functions may be used for one area. The area may be specified in a rectangular by two-point designation and in a point by a one-point designation.

In the image composition mode, a base original is color copied through the 4-cycle color copying operation. The resultant copied paper is left on the transfer belt. Then, a trimmed original is superposed, copied through the 4-cycle copying operation, and outputted.

In the copy-on-copy mode, a first original is copied through the 4-cycle color copying operation. The resultant copied paper is left on the transfer belt. Then, a second original is superposed on the copied paper through the 4-cycle copying operation. Finally, the paper is outputted.

In the color composition mode, a first original is copied using magenta toner, and the copied paper is left on the transfer belt. A second original is superposed on the first copied paper, using cyan, and the copied paper is fixedly placed there. Finally, a third original is superposed on the second copied paper, using yellow. In a 4-color composition mode, a fourth original is superposed on the third copied paper using black.

In the partial display shift, after a color copy is obtained through the 4-cycle color copying operation, the color copied paper is left on the transfer belt. Subsequently, another copy is superposed on the first paper through the 4-cycle copying operation. Finally, the paper thus copied is outputted.

Of those color modes, the full color mode is based on the 4-cycle copying operation. The 3-pass color mode is based on the 3-cycle copying operation in other modes than the editing mode. The black mode is based on the 1-cycle copying operation in other modes than the editing mode. The plus-one mode is based on the 1-to 3-cycle copying operations.

The tool pathway mode is exercised by using many functions including an audiotron, machine setup, default selection, color registration, film type registration, color correction, preset, film projector scan area correction, audio tone, timer set, billing meter, diagnosis mode, max. adjustment, and a memory card formatting. In this pathway mode, a password is needed for making settings and changes. Accordingly, only key operators and customer engineers are permitted to make the settings/changes in this mode. Use of the diagnosis mode is permitted for customer engineers alone.

Color registration is used for registering colors in the register color button in the color palette. The CCD sensor reads the color to be registered from the color original. Color correction is used for fine correction of the colors registered in the registered color button.

The film type registration is for registering a register film type used in a film projector mode. When it is not registered, a register button cannot be selected on the film projector mode display.

The preset mode is for presetting reduction/enlargement values, 7 steps of copy density, 7 steps of copy sharpness, and 7 steps of copy contrast.

Film projector scan area correction is for adjusting a scan area in the film projector mode. Audio tone is for adjusting the volume of a select sound, for example. Timer is for setting a timer releasable to key operators.

Additional functions are provided for a trouble diagnosis system. A first function is used when the subsystem is placed in a clashing state. In such a situation, this function operates and redrives the subsystem to recover it from the clashing state. A second function is used when the subsystem is still in the clashing state even if the clash recovery is applied two times. In such a situation, this function operates to set up a fault mode in the subsystem. A third function operates when jamming occurs in the copying machine. In this case, the third function operates to stop the machine operation.

It is evident that the color copying machine of the present invention is operable with the basic copying function and a combination of additional functions, and the combination of the basic copying function/additional functions and marker edit, business edit, creative edit, and the like.

A copying system including the color copying machine with the above functions offers advantageous and convenient features as described hereinafter.

(B) Features a. High quality full color

A high quality, clear and distinctive full color image of a color document is attained, with improvements of black image reproduction, light color reproduction, generation copy quality, OHP image quality, thin line reproduction, image quality reproduction of film copies, and copied image sustaining.

b. Cost reduction

The cost of image forming materials and expendables such as a photosensitive drum, developing unit and toner is reduced. Service cost including UMR and parts cost is reduced. The color copying machine is operable as a mono color copying machine. The copying speed for mono color copies is increased about three times that of the conventional copying machine, and is 30 copies/A4. In this respect, the running cost is reduced.

c. Improved reproducibility

Input/output devices such as an ADF and a sorter are optionally available, and hence a large number of documents can be copied. A magnification may be set in a broad range of 50% to 400%. The maximum size of document that can be copied is A3. Three stages of paper trays are used, the upper tray accommodates B5 to B4 size, the medium tray accommodates B5 to B4, and the lower tray accommodating B5 to A3 and SSIB5 to A3. The copy speed for the full color (4-pass color) copy is 4.5 CPM for A4, 4.8 CPM for B4, and 2.4 CPM for A3. The copy speed for the mono color copy is 19.2 CPM for A4, 19.2 CPM for B4, and 9.6 CPM for A3. The warmup time is within 8 minutes. FCOT is 28 seconds or less for the 4-color full color copy, and 7 seconds or less for the mono color copy. A continuous copy speed is 7.5 copies/A4 for the full color copy and 30 copies/A4 for the mono color copy.

d Improved operability

Two types of operation buttons are used, hard buttons on the hard control panel and soft buttons on the soft panel of the CRT display screen. Use of these buttons provides an easy operation for beginners and simple operation for experts, and further enables operators to directly select desired functions. As for the layout of controls including these buttons, the controls are concentrated at one location for ease of operation. Effective use of colors correctly sends necessary information to operators.

A high fidelity copy can be obtained by using the operations on the hard control panel and the basic display. The hard button is used for the operations out of an operation flow, such as start, stop, all clear, and interrupt. The operations on the soft panel of the basic display are used for paper size select, reduction/enlargement, copy density, picture quality adjustment, color mode, color balance adjustment, and the like. The soft panel operations are easily accepted by users accustomed to mono color copying machine. To access the various edit functions, a passway is opened by merely touching a pathway tab in a pathway area on the soft panel, and an operator may readily access the edit modes. Storage of copy modes and conditions for exercising them in a memory card realizes an automation of relation manual operations.

e. Variety of functions

A variety of editing functions can be used by touching a pathway tab in the pathway area on the soft panel to open the pathway. In the marker edit, mono color documents can be edited by using a tool of a marker. In the business edit, mainly business documents can be prepared quickly and in high quality. In the creative edit, various editing functions are available. In the full color, black and mono color copy modes, many choices are used to meet the needs of various expert operators, such as designers, copy service businesses, and professional key operators. The area specified when the editing functions are used is displayed in the form of bit map area, providing a visual confirmation of the specified area.

f. Power saving

A high performance, full color copying machine (4-pass color) is realized by the present invention which is operable at 1.5 kVA. A control system realizing the 1.5 kVA specification in the respective operation modes is used, and a power distribution to the circuit systems for different functions is also used. An energy transmission system table for confirming energy transmission systems is prepared. The management and verification of power consumption are carried out by using the energy transmission system table.

(C) Use Distinction

The color copy machine of the present invention is operable as a full color copying machine and a mono color copying machine. The copying machine with a variety of useful functions is used not only as a mere copying machine, but also as a machine to aid creative work. Accordingly, the copying machine satisfies the requirements of professional operators and artists as well. Some examples of the use of the color copying machine will be given.

Posters, calendars, cards or invitations cards, and New Year's cards with photographs that have been made at a printing machine, may be formed at much lower cost than by the printing machine, if the number of each of these items is not large. If the editing functions are well used, original calendars, for example, may be made. Further, the calendars may be prepared for each division of a company.

As seen from recent marketing, the coloring of industrial products, e.g., electric appliances, and interiors greatly influences marketing success. The color copying machine of the present invention can be used for color selection at the manufacturing stage of products. Accordingly, a plurality of persons, including designers and persons relating to the manufacturing and selling of the products, can satisfactorily study and discuss the designs for producing products attractive to the market, by creating the colored design copies. In the apparel business, the present color copying machine is very useful in that the complete designs with the selected colors can be sent to the garment makers. Accordingly, the order is exactly understood and the manufacturing may be smoothly and effectively carried out.

The ability to produce both color copies and mono color copies of an original is convenient for students who are learning the chromatics in colleges and universities. When studying graphic design, they can copy the design in both the color and mono color copies, and comparatively study the design. Further, it can be seen how gray level and saturation affect the visual sensation.

(I-3) Electrical Control System

This section will discuss hardware architecture, software, and state division in an electrical control system of the color copying machine according to the present invention.

(A) Hardware Architecture and Software

A color CRT as an U/I, although it is used as the U/I in the color copying machine of the present invention, needs a larger amount of the data for color display than a monochromatic CRT. Attempt to build a more friendly UI by creating a layout of a display screen and display change also results in an increased amount of necessary data.

Use of a CPU with a large memory requires a large board. The large board creates additional problems. It is difficult to house it in the base machine. The large board makes it difficult to alter the design of the copying machine. Further, the large board increases the cost to manufacture.

Figure 3:
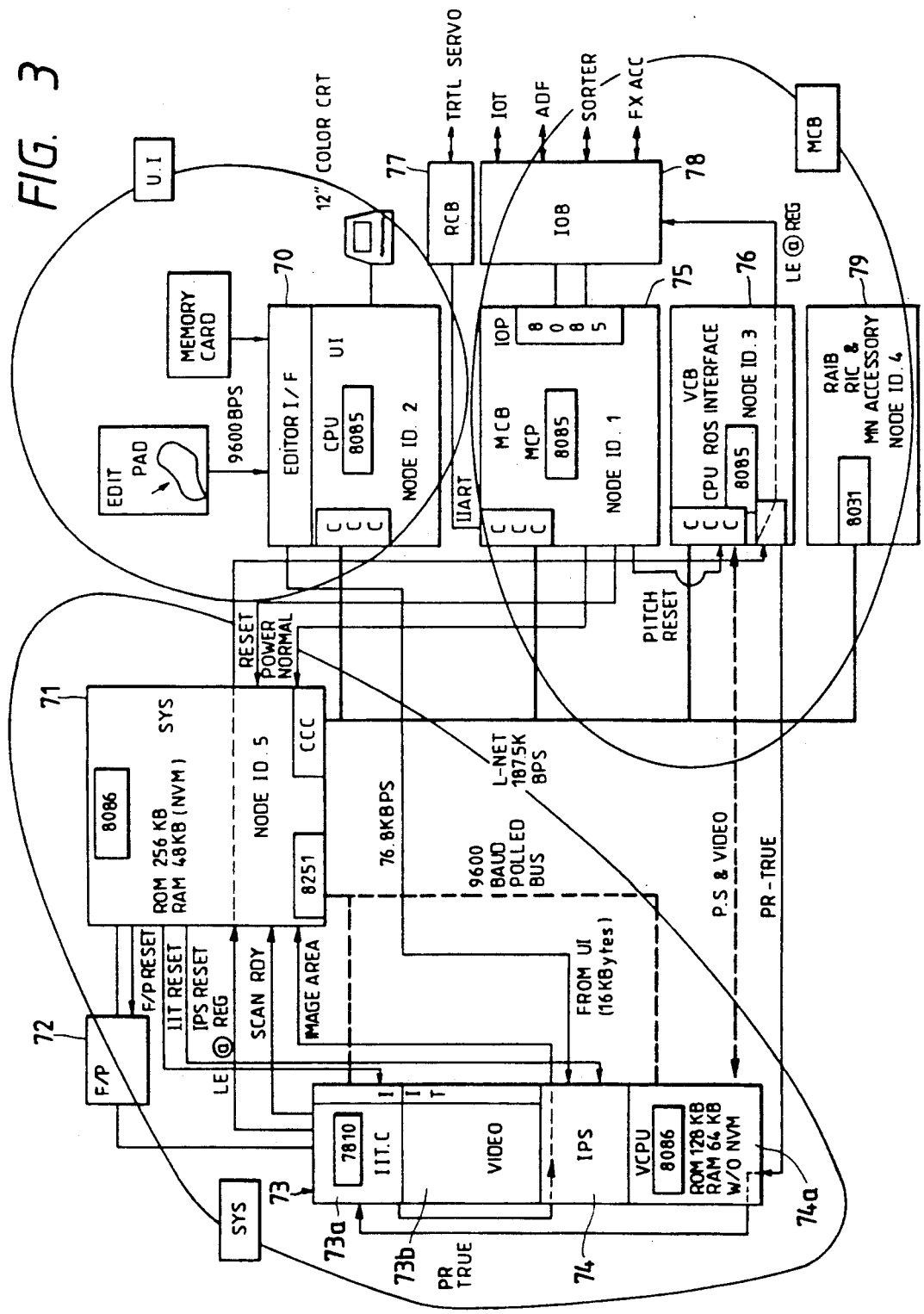
FIG. 3 illustrates a hardware architecture.

To cope with the increase of data amount, the instant color copying machine is arranged such that the data processing function (CPU) is decentralized. The hardware of the electrical system, as shown in FIG. 3, is composed of a UI system, SYS system and MCB system. The UI system contains a UI remote 70. In the SYS system, an F/P remote 72 controls the F/P, an IIT remote 73 reads an image of an original, and an IPS remote 74 for executing various image processings are contained and independently execute their own data processings. The IIT remote 73 includes an IIT controller 73a for controlling the imaging unit, and a VIDEO circuit 73b for digitizing the read image signals and sending the digitized image signals to the IPS remote 73b. The IIT remote 73 and the IPS remote 74, is controlled by a VCCPU 74a. An SYS (system) remote 71 is provided as a control unit to control the remotes as mentioned and to be given later.

The SYS remote 71 requires a large memory capacity, because a program to control the display changes of the UI, and others must be stored. The 8086 16-bit microprocessor is used for the SYS remote 71. If required, the 68000 microprocessor may be used.

The MCB system is composed of a VCB (video control board) remote 76, RCB remote 77, IOB remote 78, and an MCB (master control board) remote 75. The VCB remote 76, serving as a raster output scan (ROS) interface, receives from the IPS remote 74 a video signal to form a latent image on the photosensitive drum by a laser beam, and sends the video signal to the IOT. The RCB remote 77 is for the servo system of the transfer belt (turtle). The IOB remote 78 serves as an I/O port for the IOT, ADF, sorter, and accessory. The MCB remote 75 synthetically manages the decentralized accessory remote 79.

Each remote in the drawing of FIG. 3 is constructed with a single board. In the figure, a bold continuous line indicates a high speed communication network LNET of 187.5 kos; a bold broken line, a master slave type serial communication network of 9600 bps; and thin continuous lines, hot lines as transmission lines for control signals. A line 76.8 kbps indicates a dedicated line for transmitting graphic data depicted on the edit pad, copy mode data entered from the memory card, and graphic data in the edit area from the UI remote 70 to the IPS remote 74. CCC (communication control chip) indicates an IC for supporting a protocol of the high speed communication line LNET.

As described above, the hardware architecture is composed of the UI system, SYS system, and MCB system. The processings shared by those systems will be described with reference to software architecture of FIG. 4. Arrowheads indicate the directions of data transmission performed through the LNET high speed communication network and the master/slave type serial communication network and the directions of control signals flowing through the hot lines.

Figure 4:
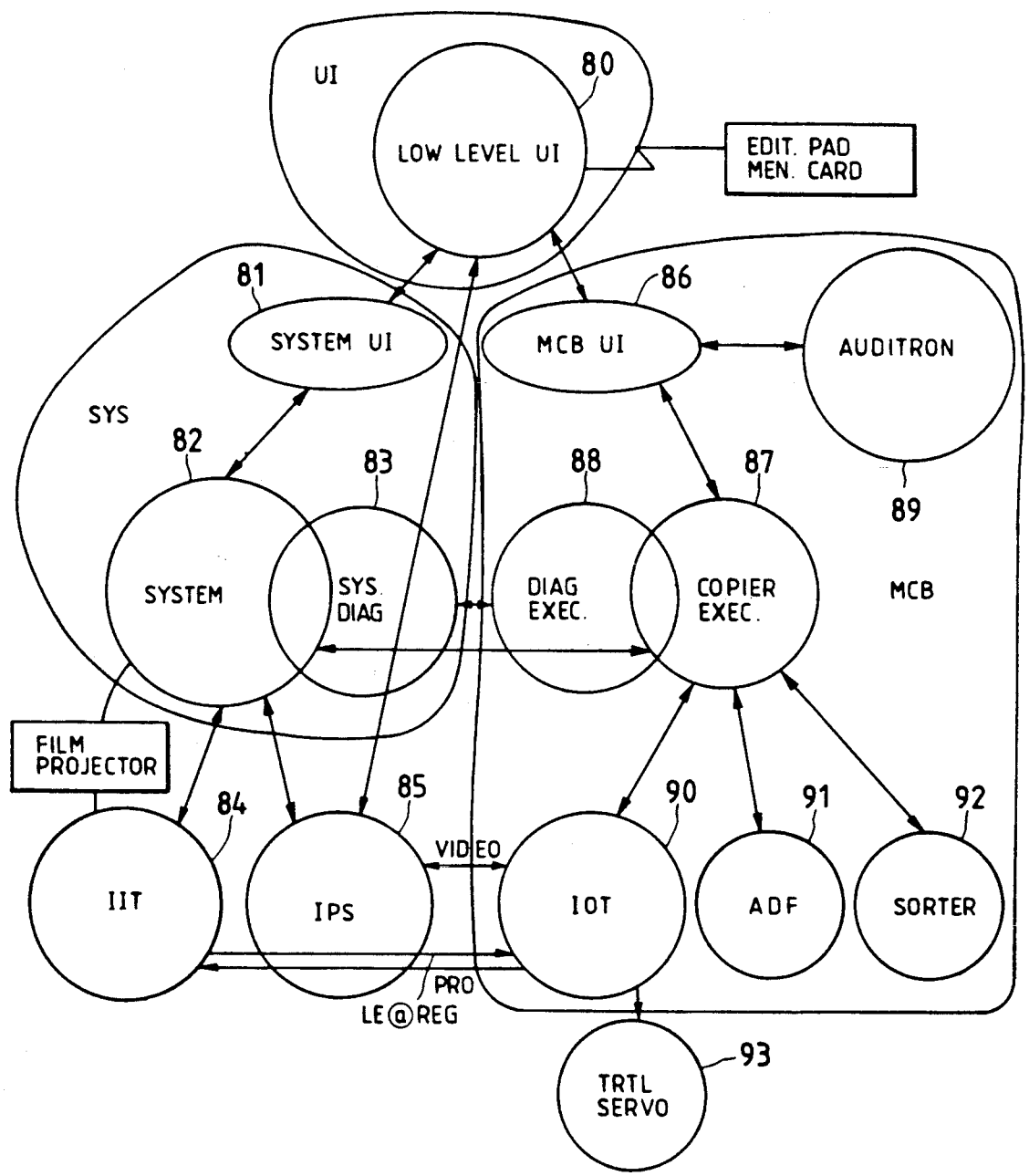
FIG. 4 illustrates a software architecture.

As seen in FIG. 4, the UI remote 70 is made up of an LLUI (low level UI) module 80 and a module for processing the data of the edit pad and the memory card. The LLUI module 80, which is similar to a called CRT controller, is a software module for displaying an image on a color CRT screen. The displaying of images on the display screen is controlled by an SYSUI module 81 and an MCBUIT module 86. This fact clearly indicates that the UI remote may be made common with another apparatus or device. The reason for this is that how to lay out the display screen and how to change the display depend on the type of the apparatus, but the CRT controller is used in combination with the CRT.

The SYS remote 71 is made up of three modules, SYSUI module 81, SYSTEM module 82, and SYS.-DIAG module 83.

The SYSUI module 81 is a software module for controlling the display change. The SYSTEM module 82 contains software for recognizing what coordinates are selected on the software panel and what display presents the software panel containing the selected coordinates, viz., what job is selected, software for finally checking the job as to whether or not a contradiction exists in the copy exercising conditions, and software for controlling the transfer of various types of data, such as F/F select, job recovery, and machine state, with other modules.

The SYS.DIAG module 83 operates in a customer simulation mode in which the copying operation is performed in a diagnostic state for self-test purposes. In the customer simulation mode, the color copying machine under discussion operates as it operates in a normal copying operation mode. Accordingly, the DIAG module 83 is substantially the same as the SYS.DIAG module 82. However, it is used in a special state, or the diagnostic state. For this reason, the DIAG module is depicted separately from the SYSTEM module 82, but they partially overlap.

An IIT module 84 for controlling a stepping motor used in the imaging unit is stored in the IIT remote 73. An IPS module 85 for executing various processing is stored in the IPS remote 74. These modules are controlled by the SYSTEM module 82.

The MCB remote 75 stores software modules, such as an MCBUI module 86 as software for controlling the display change when the color copying machine or color copier is in a fault state such as by diagnostic, auditron, and jamming, an IOT module 90 for executing the processing necessary for the copying operation, such as photosensitive belt control, developing unit control, and fuser control, ADF module 91 for controlling the ADF, and SORTER module 92, and a copier executive module 87 for managing the software modules, dia. executive module 88 for executing a variety of diagnostic routines, and an auditron module 89 for processing charge calculation by accessing an electronic counter with a password.

Figure 5A:
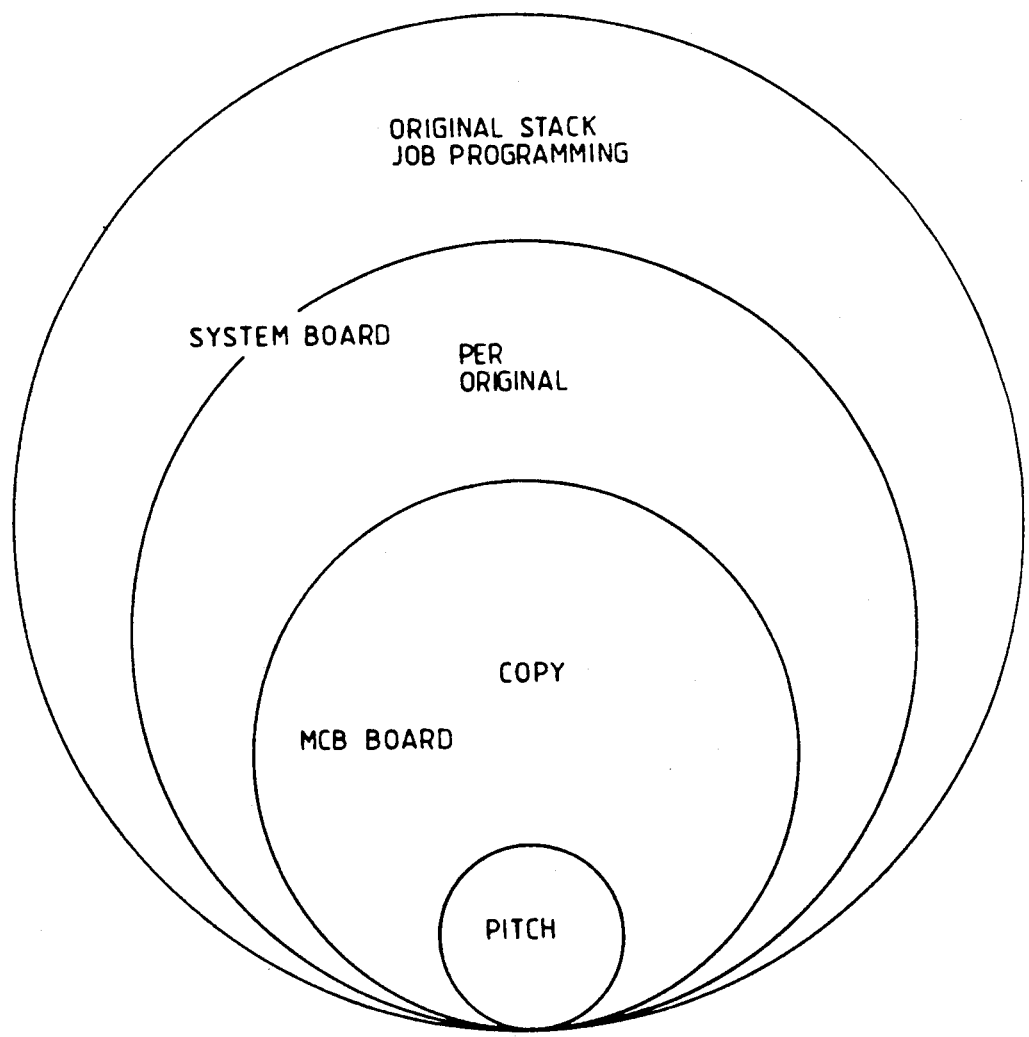
FIGS. 5a-5e illustrates copy layers.

The RCB remote 77 stores a turtle servo module 93 controlling the operation of the turtle. The module 93 is under control of the IOT module 90, in order to control the transfer process of the Xerography cycle. In FIG. 4, the copier executive module 87 and the dia. executive module 88 are depicted partially overlapping with each other to indicate shared processing. The shared processing will be described while tracing a sequence flow copying operation. The copying operation, except the difference of colors, consists of repetitive similar operations, and hence it may be divided into some layers, as shown in FIG. 5(a).

An operation unit, called pitch, is repeated to make a sheet of color copy. The operation for copying a mono color copy may consist of processings describing how to operate the developing unit, transfer unit, and the like, and how to detect jamming. The repetitive applications of a sequence of the pitch processings to three colors Y, M and C makes a three-pass color copy. When it is applied to four colors Y, M, C and K, a four-pass color copy is made. This sequence of copying operations forms a copy layer. In the copy layer, the toners of three colors are transferred to the paper, the transferred color toner image is fused, and the copy paper or the paper bearing the fused color image is delivered outside the base machine. The processing up to this point is managed by the copier executive module 87.

The IIT module 84 and the IPS module 85 in the SYS system are also used for pitch processing. To this end, the IOT module 90 communicates with the IIT module 84 by using two types of signals, a PR-TRUE signal and a LE-REG signal. More specifically, a PR (pitch reset) signal providing a reference timing for the control of the IOT is recursively generated by the MCB every time the photosensitive belt rotates by $\frac{1}{2}$ or $\frac{1}{3}$ of a turn. To attain an effective use and increase a copy speed, the motion pitch of the photosensitive belt is divided in accordance with the size of paper. For example, for A3 paper it is driven at the rate of 2 pitches, and for A4 paper it is driven at the rate of 3 pitches. The period of the PR signal generated every pitch is long, 3 sec. for the 2-pitch rate, and is short, 2 sec. for the 3-pitch rate.

The PR signal generated by the MCB is distributed to the necessary portions within the IOT, such as a VB remote for handling mainly the VIDEO signal, by way of the hot lines.

The VCB, containing gate circuitry, selects only the pitch signal to allow imaging within the IOT, viz., allow the photosensitive belt to be exposed to an image light, and sends it to the IPS remote. This signal is a PR-TRUE signal. The data to generate the PR-TRUE signal on the basis of the PR signal that is received through the hot line from the MCB, is applied from the MCB through the LNET.

During the period that the image cannot be projected on the photosensitive belt, an idle pitch of 1 pitch is involved in the photosensitive belt. No PR-TRUE signal is outputted for such an idle pitch. No PR-TRUE signal is generated during the period from the instant that the transfer unit has eliminated the transferred copy paper until the next paper reaches the transfer unit. In the case of a long paper (A3 size), for example, if it is eliminated from the transfer unit immediately after the toner image is transferred onto the paper, the leading end of the paper hits the entrance of the fuser. At this time, the paper is shocked and with the shock, the transferred toner image is possibly damaged. To avoid this problem, following completion of the image transfer on large paper, the paper is rotated by one turn at a constant speed while being held by a grip bar, and is then transferred to the next stage. It is for this reason that the skip of 1 pitch is required for the photosensitive belt motion.

No PR-TRUE signal is generated also during a period from the copy start by a start key until a cycle-up sequence is completed, because during this period, the reading of an original image is not yet carried out and hence the photosensitive belt cannot be exposed to an image light.

The PR-TRUE signal outputted from the VCB remote is received by the IPS remote, and is also applied to the IIT remote. In the IIT remote, it is used as a trigger signal for scan start of the IIT.

The pitch processing in the IIT remote and the IPS remote may be synchronized with the operation of the IOT. At this time, a video signal to modulate a laser beam that is used for forming a latent image on the photosensitive drum is transferred between the IPS remote and the VCB remote 76. The video signal received by the VCB remote 76, which is a parallel signal, is converted into a serial signal. Then, the serial signal is directly applied, as a VIDEO modulation signal, to the laser output section 40a through the ROS interface.

The above sequence of pitch operations is repeated four times, to form a 4-pass color copy, and one cycle of copying operations is completed.

Figure 5B:
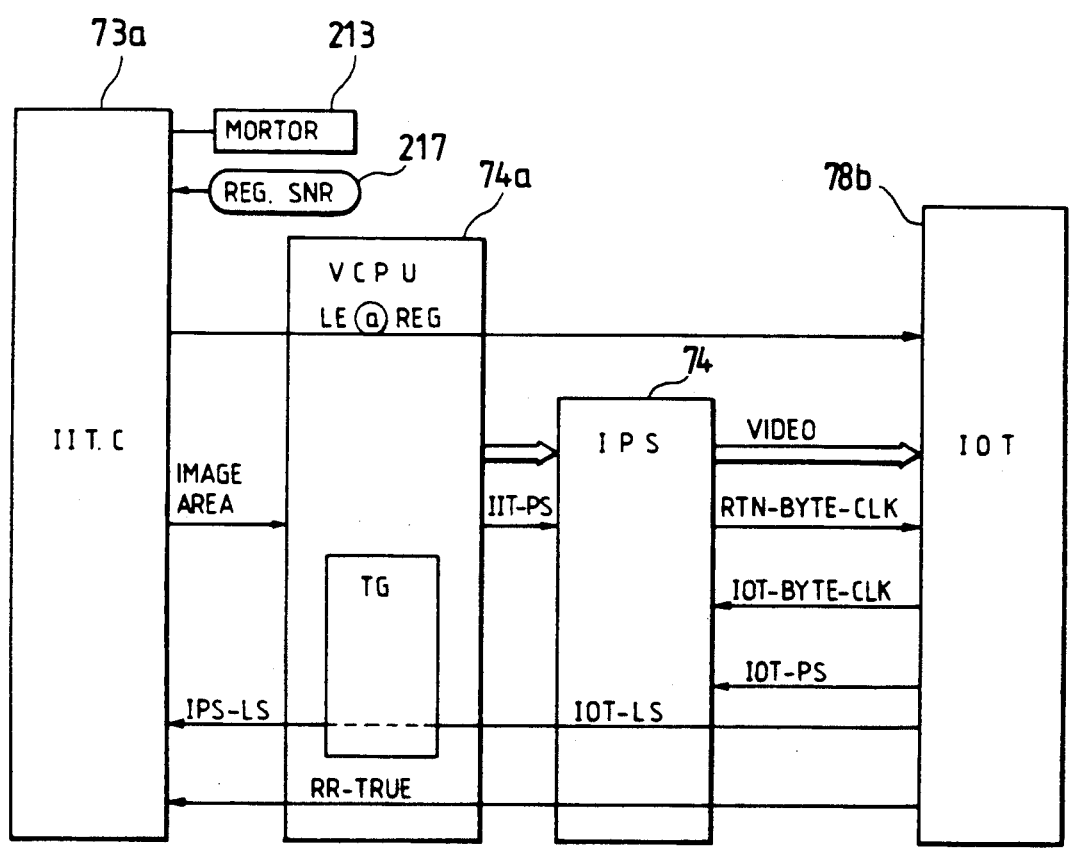

The signal transmissions and timings in a copying process between the outputting of image signals read by the IIT to the IOT and the image transfer on a sheet of paper at the transfer point will be described with reference to FIGS. 5(b) to 5(c).

When receiving a start job command from the SYS remote 71, the operation of the IOT 78b enters a cycle-up sequence, such as drive of a main motor and power on of a high voltage power supply, as shown in FIGS. 5(b) to 5(e). The IOT 78b produces a PR (pitch reset) signal, in order to form a latent image of a length corresponding to a paper length on the photosensitive belt. For example, a 3-pitch PR signal is generated for the A4 size, and a 2-pitch PR signal, for the A3 size. Upon completion of the cycle-up sequence in the IOT 78b, a PR-TRUE signal is applied to the IIT controller 73a in synchronism with the PR signal, in connection with only the pitch requiring the imaging.

From the IOT 78b, an IOT-LS (line sink) signal outputted every one-line rotation of the ROS (raster output scan) is sent to a timing generator (TG) in the VCPU74a. An IPS-LS, whose phase is advanced by a delay corresponding to a total of pipe lines of the IPS with respect to the IOT-LS signal, is transferred to the IIT controller 73a.

When receiving the PR-TRUE signal, the IIT controller 73a enables a counter, and counts the IOT-LS signal by the counter. When a count by the counter reaches a predetermined value, a stepping motor 213 for driving the imaging unit 37 is started up, and the imaging unit starts to scan an original. The counter further continues its counting, and after T2 sec., an LE-REG signal is outputted at the start position of reading the original, and is sent to the IOT 78b.

In respect to the read start position, a position of a reginsor 217 (near the reg. position, more exactly located at a position separated by about 10 mm from the reg. position toward the scan side) is detected, and a true reg. position is calculated using the detected position of the reginsor 217. At the same time, a normal stop position (home position) can also be calculated.

The reg. positions of the copying machines differ from one another due to a mechanical dispersion. To cope with this, the corrected values are stored in an NVM (nonvolatile memory). When the true reg. position and the home position are calculated, the stored values are used for their correction to obtain a correct original start position. The corrected value may be altered by electrically reprogramming at the factory or by a serviceman. The reason why the position of the reginsor 217 is separated by about 10 mm from the true reg. position toward the scan side is adjustment and the software. A minus value can be always used for the correction.

The IIT controller 73a outputs an IMAGE-AREA signal in synchronism with the signal LE-REG. A length of the IMAGE AREA signal is equal to the scan length that is defined by a start command transferred from the SYSTEM module 82 to the IIT module 84. More specifically, when a document size is detected for the copying operation, the scan length is equal to the document length. When a magnification is designated for the copying operation, the scan length is determined by a divisor of a copy paper length and a magnification (100% is set at 1). The IMAGE-AREA signal is applied to the VCPU 74a. The VCPU 74a outputs it as an IIT-PS (page sink) for transmission to the IPS 74. The IIT-PS signal indicates time to execute an image processing.

When the LE-REG signal is outputted, data of one line of the line sensor is read in synchronism with the IOT-LS signal. The data as read is transferred to the VIDEO circuit (FIG. 3) where it is subjected to various correction processings and A/D conversion. The output data signal of the VIDEO circuit is then transferred to the IPS 74. The IPS 74 transfers the video data of one line to the IOT 78b in synchronism with the IOT-LS signal. At this time, a signal RTN-BYTE-CLK, together with the data, is returned to the IOT, and the data and clock are also delayed to secure a reliable synchronism.

When the signal LE-REG is inputted to the IOT78b, the video data is transferred to the ROS in synchronism with the IOT-LS signal, so that a latent image is formed on the photosensitive belt. When receiving the signal LE-REG, the IOT 78b starts to count by the signal IOT-CLK with reference to the timing of the signal LE-REG. The servo motor of the transfer unit is controlled so that the leading edge of a paper is positioned at the transfer point defined by a predetermined count. As seen from FIG. 5(d), the PR-TRUE signal generated by the rotation of the photosensitive belt is not inherently synchronized with the IOT-LS signal outputted by the rotation of the ROS. Therefore, when the signal PR-TRUE is received, the count starts at the next IOT-LS, the imaging unit 37 is driven at a count "m," and the signal LE-REG is outputted at a count "n", the signal LE-REG is delayed by time T1 behind the signal PR-REG. A maximum of this delay is one line sink. In the case of the full color copy, the delay is accumulated and the accumulation results in a color displacement.

Figure 5C:
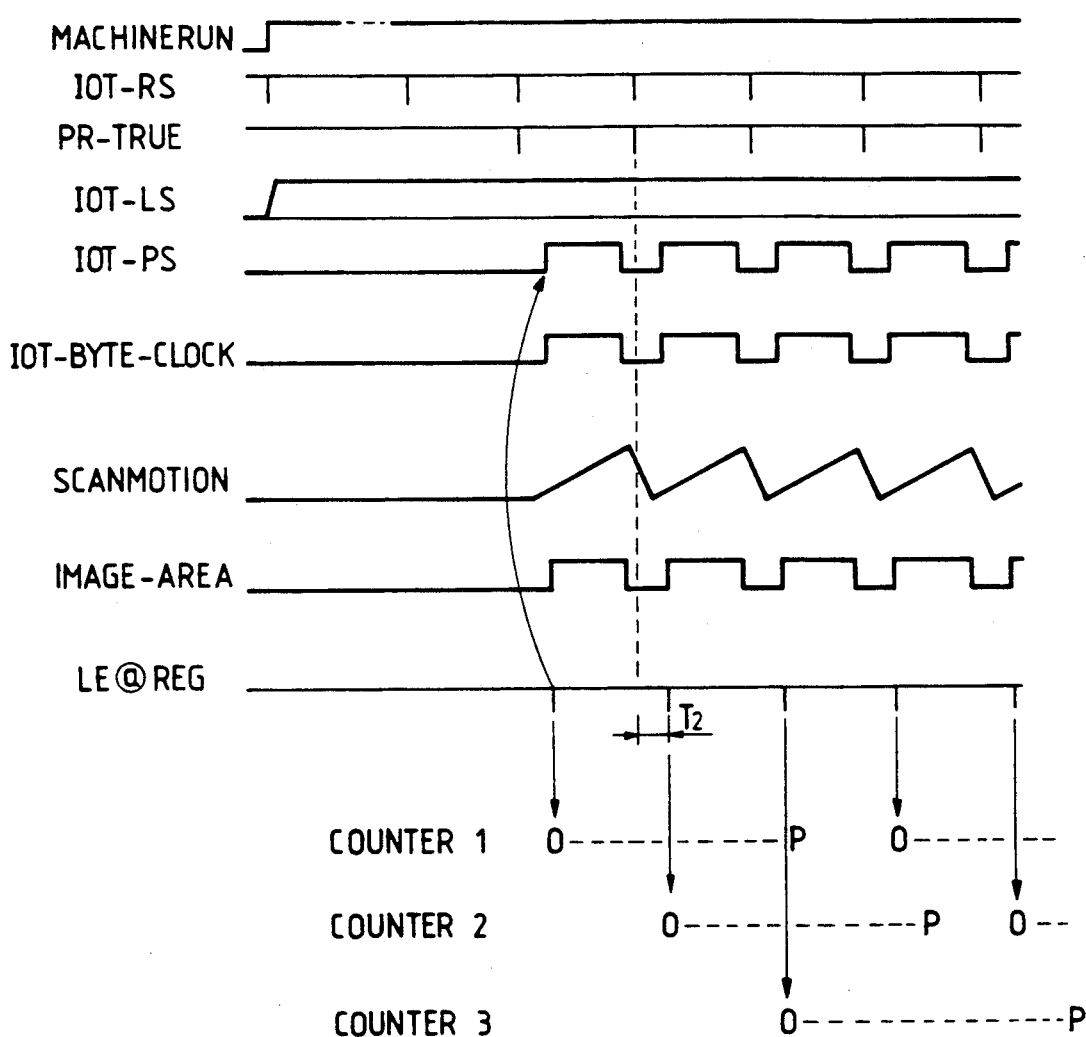
Figure 5D:
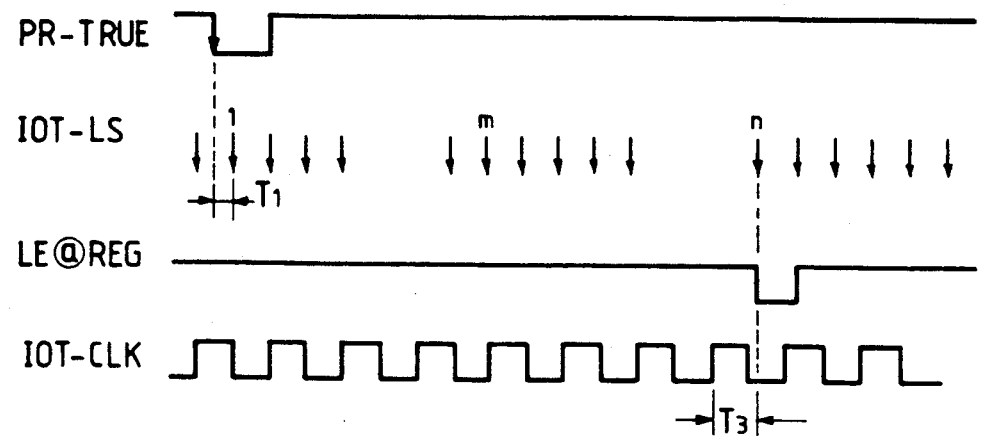
Figure 5E:
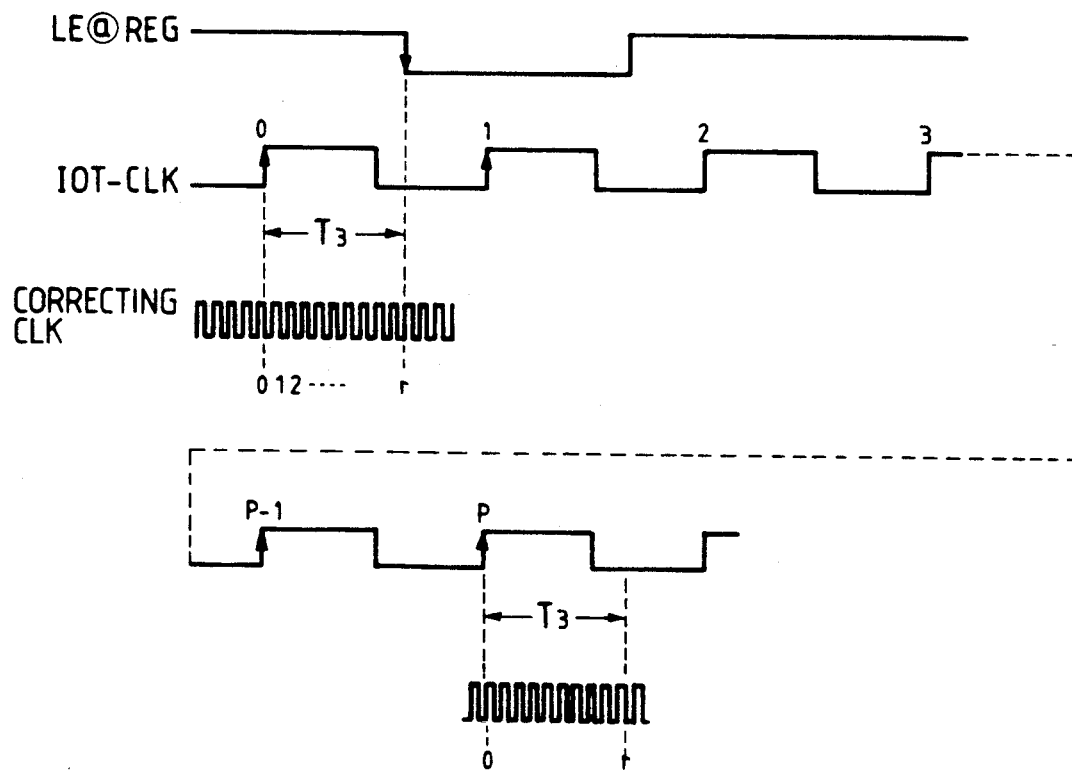

As a measure for the above, as shown in FIG. 5(c), when the first signal LE-REG occurs, the counter 1 starts to count, and when the second and third signals LE-REG occur, the counters 2 and 3 start to count. When the counters reach the count "p" corresponding to the transfer point, the counters are cleared. For the fourth count and the subsequent ones, the counters start to count in a similar way. As shown in FIG. 5(e), when the signal LE-REG occurs, time T3 lasting from the pulse of the IOT-CLK immediately before the signal LE-REG is counted in accordance with a correction clock. A latent image formed on the photosensitive drum approaches to the transfer point and a count by the counter based on the signal IOT-CLK reaches the count "p". At the instant that the count "p" is reached, the counting based on the correction clock starts. The sum of the correction clock and a count "r" corresponding to the time T3 indicates a correct transfer point. This is introduced into the control of the counter that is exclusively used for controlling a transfer point (timing) of the transfer unit. In this way, the servo motor of the transfer unit is controlled so that the leading end of the paper is exactly synchronized with the signal LE-REG.

Following the processings described above that are categorized into the copy layer, another processing step to set the number of jobs as copy units executed for an original, viz., to set the number of copies, is executed. This is executed per original (see FIG. 5(a)). An additional layer following the per original is a job programming layer to change parameters in jobs. More exactly, the job programming layer checks as to whether or not the ADF is used, a color of a part of an original is changed, and the one-side magnification function is operated. These layers of the per original and the job programming are managed by the SYS module 83 in the SYS system. Accordingly, the SYSTEM module 82 checks and confirms the jobs transferred from the LLUI module 80, generates necessary data, and informs the IIT module 84 and the IPS module 85 of the job through the 9600 bps serial communication network, and also informs the MCB system through the LNET.

As seen from the foregoing description, the controls that can be independently processed and can be made common with another apparatus or device are decentralized into the UI system, SYS system, and the MCB system. The modules for managing the copying machine are determined in accordance with the layers of the copying processes. This approach brings about many advantageous features. The design work of the electrical control system the copying machine may be classified and itemized. The developing techniques, such as software, can be standardized. The time limit of delivery and the cost to manufacture can be exactly predicted. When some specifications are changed, it is only needed to replace the related modules with other new ones.

(B) State Division

In the previous subsection, the shared controls of the UI system, SYS system and MCB system were described. In this subsection, the controls by these systems control in the respective stages of the machine operation will be described by tracing a flow of the machine operation.

Figure 6:
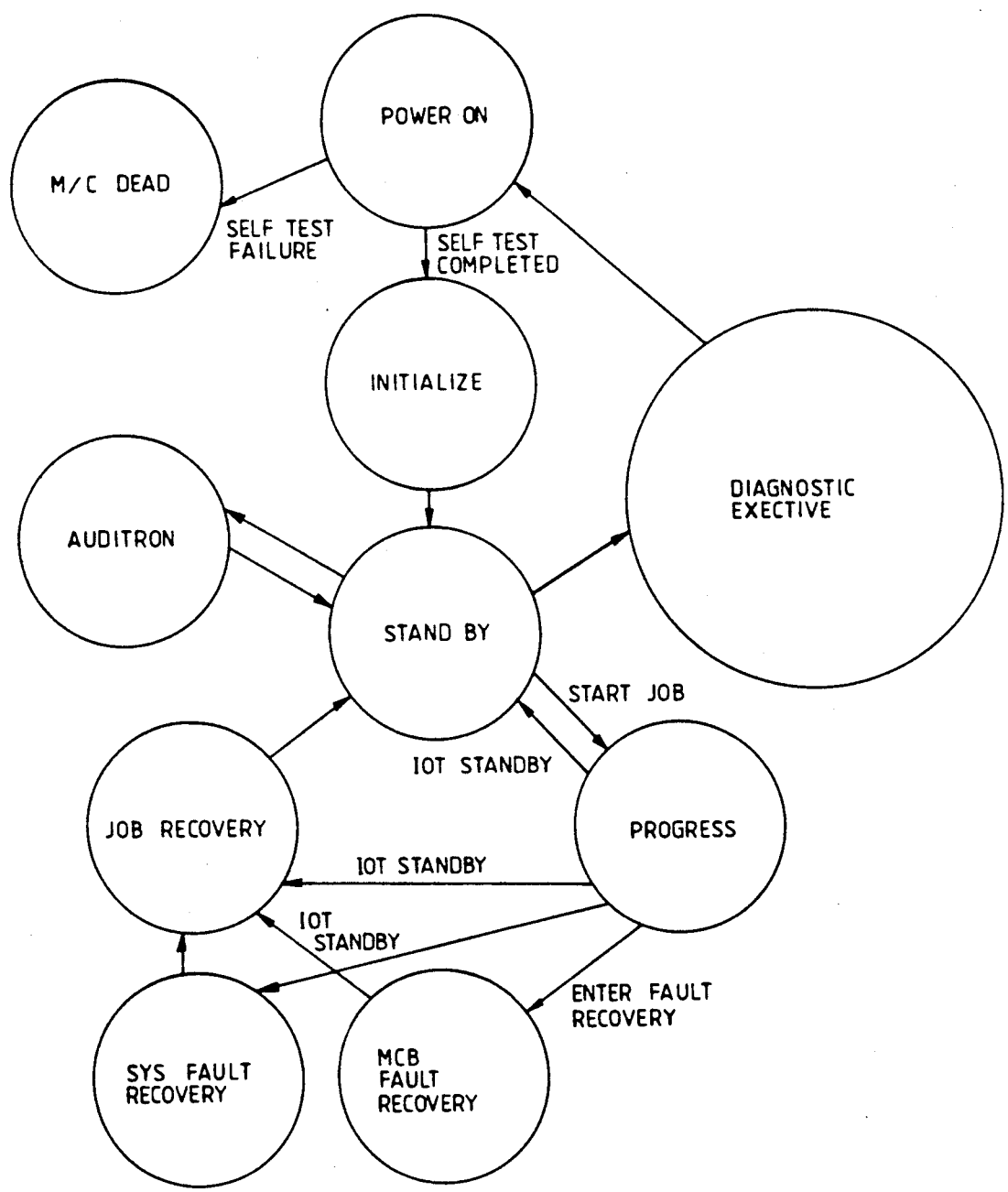
FIG. 6 illustrates state divisions.

In the present color copying machine, a flow of machine operations including power-on, copying, end of copying, and machine state copying operation, are divided into a plurality of states. These states are assigned jobs, respectively. Control cannot proceed to the next state until the job in a state is completed. This ensures efficient and precise control progression. The above manner to control the machine operation is called a state division. In this instance, the machine operation is divided into states, as shown in FIG. 6.

The state division is featured in that in some operation modes, the SYS remote 71 possesses a control right to control all of the states and a UI master right to use the UI in a state, and in some control modes, the MCB remote possesses them. With the decentralization of control, the LLUI module 80 of the UI remote 70 is controlled not only by the SYSUI module but also by the MCBUI module 86. The processings are shared such that the pitch and copy processings are under control of the copier executive module 87 in the MCB system, and the per original processings and the job programming processings are controlled by the SYS module 82. Accordingly, in some states the SYS module 82 has the control right and the UI master right in some states, and in some states the copier executive module 87 has them. In FIG. 6, in states indicated by circles filled with vertical thin lines, the UI master right is possessed by the copier executive module 87 in the MCB system. In states indicated by circles painted black the UI master right is possessed by the SYS module 82.

Figure 7:
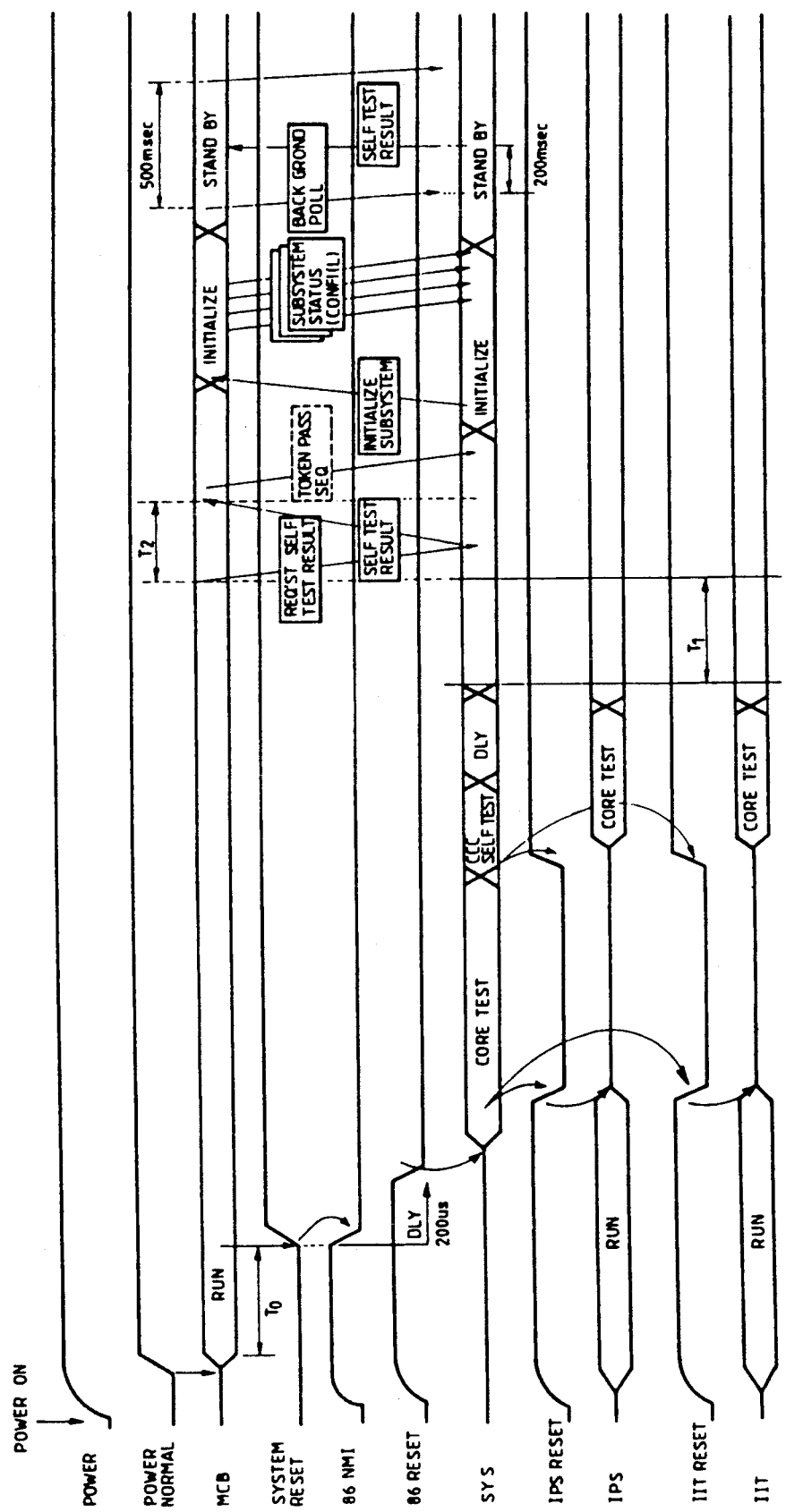
FIG. 7 illustrates the operation sequences from the power on state to the stand-by state.

Of the states shown in FIG. 6, the machine operation from the power-on state to the standby state will be described with reference to FIG. 7. A power switch is turned on, and the machine is in a power-on state. An IPS reset signal and an IIT reset signal that are supplied from the SYS remote 71 to the IIT remote 74 and the IPS remote 74 (FIG. 3) become H (high) in logic state. Upon receipt of these signals, the IPS remote 74 and the IIT remote 73 are released from the reset status and start to operate. The settle-down of the power voltage is detected and a power normal signal rises. The MCB remote 75 starts to operate and to establish the control right and the UI master right. At the same time, it tests the high speed communication network LNET. The power normal signal is transferred from the MCB remote 75 to the SYS remote 71, by way of the hot line.

When time T0 elapses from the operation start of the MCB remote 75, a system reset signal supplied from the MCB remote 75 through the hot line to the SYS remote 71 goes high. Then, the SYS remote 71 is released from the reset status and starts to operate. The operation start of the SYS remote 71 is delayed by time T0 plus 200 usec by two signals, 86NMI and 86 reset, that are internal signals of the SYS remote 71. The time period of 200 usec is provided for storing the present state of the copying machine into a nonvolatile memory when the copying machine stops or runs away due to clash, i.e., temporary trouble, power interrupt, software runaway, and software bug.

When the SYS remote 71 starts to operate, a core test is conducted for a period of approximately 3.8 sec. The test checks the contents of the ROM and RAM, and the hardware. At this time, if undesired data is mistakenly entered, the machine will possibly run away. To avoid this, the SYS remote 71, on its decision, renders low (L) the IPS reset signal and the II'P reset signal, at the time of the start of the core test. By the L signals, the IPS remote 74 and the IIT remote 73 are reset and come to a standstill.

Upon completion of the core test, the SYS remote 71 conducts a CCC self test during a period of 10 to 3100 msec, and at the same time renders high the IPS reset signal and the IIT reset signal to cause the IPS remote 74 and the IIT remote 73 to operate again, and to cause them to conduct the core tests. In the CCC self test, the SYS remote 71 sends predetermined data to the LNET, receives the return data, and checks as to whether or not the transmitted data is coincident with the received data. The times of the self tests of the CCCs are staggered to prevent the different self tests from being conducted concurrently.

The LNET employs a contention system. In this system, the nodes such as the SYS remote 71 and the MCB remote 75 transmit data when they desire. If different data collide, the same data is retransmitted after predetermined time lapses. The reason why the contention system is used is that when the SYS remote 71 is conducting the CCC self test, if another node uses the LNET, data collision occurs and the CCC self test cannot occur. Accordingly, before the SYS remote 71 starts the CCC self test, the LNET test by the MCB remote is completed.

When the CCC self test ends, the SYS remote waits till the core tests by the IPS remote 74 and the IIT remote 73 are completed. It conducts a communication test of the SYSTEM node during a period T1. This communication test is for testing the serial communication network of 9600 bps. In the test, predetermined data is transferred in a predetermined sequence. Upon completion of the communication test, during a period T2 the LNET communication test is conducted between the SYS remote 71 and the MCB remote 75. In the communication test, the MCB remote 75 requests the SYS remote 71 to return the results of the self test. In response to the request, the SYS remote 71 returns the results of the tests thus far conducted, as self test results, to the MCB remote 75.

When receiving the self test result, the MCB remote 75 issues a token pass toward the SYS remote 71. The token pass is used to transfer the UI master right. For example, when the token pass is transferred to the SYS remote 71, the UI master right is transferred from the MSB remote 75 to the SYS remote 71. The operations up to this point belong to a power-on sequence. In this sequence, the UI remote 70 displays a message of "Please wait a minute," for example, and executes various tests, such as a core test of the remote 70 itself and communication test.

In the self test sequence, when the return of the self test result is requested, but no return is made, or the returned self test result contains an error, the MCB remote 75 makes the copying machine inoperable, exercises the UI control right to control the UI remote 70, and visually presents a fault state of the machine.

An initialize state to set up the respective remotes follows the power-on state. In the initialize state, the SYS remote 71 possesses the control right to control all of the states and the UI master right. The SYS remote 71 initializes the SYS system, and issues a command INITIALIZE SUBSYSTEM to the MCB remote 75 and initializes the MCB system. The result of the initialization is returned as subsystem status from the MCB remote 75. Through the initializing state, in the IOT, the fuse is heated, and the elevator of the tray is set at a predetermined position. The operations up to this point constitute the initialize state.

Upon completion of the initialize state, the respective remotes enter a stand-by state in which the they are ready for a copying operation. In this state, the SYS remote 71 possesses the UI master right. Accordingly, it exercises the UI master right to display the F/F on the UI display screen, and is ready for accepting the conditions for executing the copying operations. At this time, the MOCB remote 75 monitors the IOT. In the stand-by state, to check for a fault in the copier, the MCB remote 75 issues a background poll to the SYS remote 71 every 500 msec. In response to this, the SYS remote 71 returns the self test result to the MCB remote 75 within 200 msec. When no return of the self test result is made, or the returned self test result contains an error, the MCB remote 75 informs the UI remote 70 of occurrence of a fault state, and causes it to display a fault state of the machine.

When the auditron is used in the stand-by state, the copier enters an auditron state. In this state, the MCB remote 75 exercises the auditron control, and at the same time controls the UI remote 70 to cause it to present an auditron display. When the F/F is set up and the start key is operated in the stand-by state, the copier enters a progress state. The progress state is further divided into six substates: set-up, cycle-up, skip pitch, normal cycledown, and cycledown shutdown. These substates will be described with reference to FIG. 8.

Figure 8:
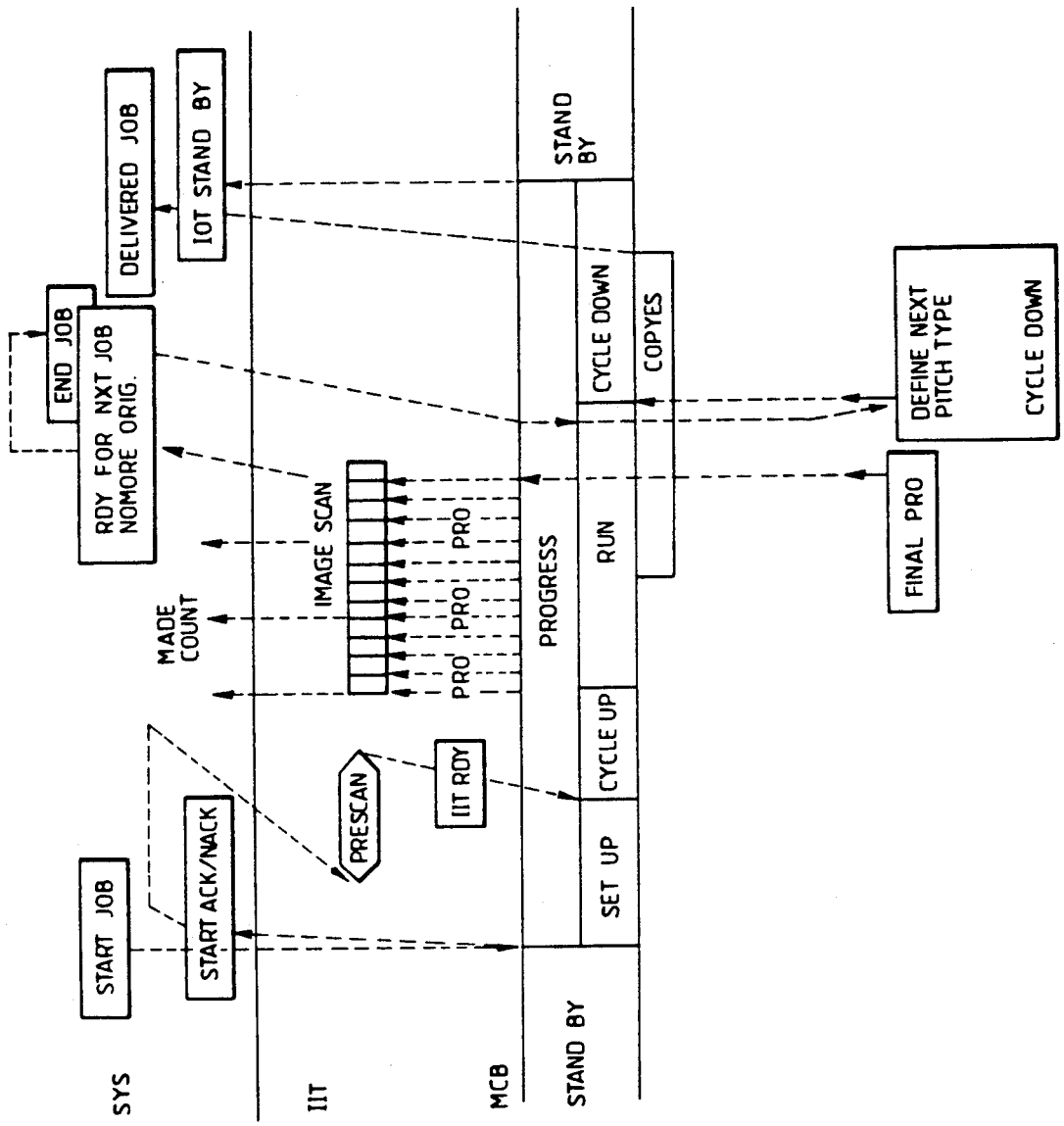
FIG. 8 illustrates the progress state sequence.

A timing chart illustrated in FIG. 8 was plotted under conditions that the copier is set in a platen mode, full color mode, and the number of copies is set at three.

When detecting the depression of the start key, the SYS remote 71 sends the contents of a job to the IIT remote 73 and the IPS remote 74, through the serial communication network. The SYS remote 71 also issues a command "start job," and sends the job contents and the start job command to the copier executive module 87 in the MCB remote 75. As a result, the copier enters the set-up substate, and the respective remotes prepare for executing the designated job. In the IOT module 90, a main motor is driven, and parameters for the photosensitive belt are set to correct values. The SYS remote 71 confirms that an ACK (acknowledge) signal as a response of the MCB remote 75 to the start job reaches, and causes the IIT remote 73 to prescan. In this instance, four types of prescans are used; a prescan to detect the size of an original, a prescan to detect a color in a specified portion on the document, a prescan to detect a closed loop for an outline drawing for coloring, and a prescan for reading a marker in the marker edit mode. A maximum of three prescans is repeated in accordance with the selected F/F. At this time, the UI displays a message "Please wait a minute," for example.

When the prescan operation ends, a command "IIT ready" is issued to the copier executive module 87. From this point, the copier, or the copying machine, enters the cycle-up substate. In the cycle-up state, the copier waits for the respective remote to start up and settle down. The MCB remote 75 starts up the IOT and the transfer unit. The SYS remote initializes the IPS remote 74. At this time, the UI displays the progress state being exercised and the contents of the selected job.

Upon completion of the cycle-up substate, the run substate is executed and the copying operation starts. When the first PR0 signed is produced from the IOT module 90 of the MCB remote 75, the IIT performs a first time scan, and the IOT performs the development of a first color. Here, the processing of one pitch is completed. Then, when the second PR0 signed is produced, the processing of the second pitch is completed. The above processing sequence is repeated four times to complete the processing of 4 pitches. Then, the IOT fuses the toner image and delivers the paper with the fused image outside the base machine. At this point, the first copy is completed. The above processing sequence is repeated to produce three copies as is preset.

The processing of the pitch layer and the copy layer are under control of the MCB remote 75. The setting of the number of copies in the per original as the upper layer of the above two layers is carried out by the SYS remote 71. Accordingly, in order that the SYS remote 71 can recognize what number of copies is currently made, when the first PR0 signed for each copy is produced, the MCB remote 75 produces copies made count signal for transfer to the SYS remote 71. When the final PR0 signed is produced, the MCB remote 75 requests the SYS remote 71 to send the next job by issuing a command "RDY FOR NXT JOB" to the SYS remote 71. At this time, if the start job is issued, the job can be continued. When a user does not set the next job, the job ends. In this case, the SYS remote 71 issues a command "END JOB" to the MCB remote 75. When the MCB remote 75 receives the "END JOB" and confirms that the job ends, the copier enters the normal cycledown substate. In this state, the MCB remote 75 stops the operation of the IOT.

During the course of cycle down, when the copy papers have been delivered out of the base machine and the MCB remote 75 confirms the delivery of the copy papers, the remote 75 informs the SYS remote 71 by issuing a command "DELIVERED JOB". Also, when the normal cycle down ends and the machine comes to a stop, the MCB remote 75 informs the SYS remote 71 by issuing a command "IOT STAND BY." At this point, the progress state ends and control returns to the standby state.

The substates of the skip pitch and the cycledown shutdown that have not yet been described will be referred to below. In the skip pitch, the SYS remote 71 initializes the SYS system for the next job, and the MCB remote 75 is ready for the next copy. In the cycle down shutdown state that is used when a fault occurs, the SYS remote 71 and the MCB remote 75 both execute fault processing.

As seen from the foregoing description, in the progress state, the MCB remote 75 controls the pitch processing and copy processing, and the SYS remote 71 controls the per original and the job programming. Accordingly, the control right is possessed by the MCB remote 75 or the SYS remote 71 in accordance with the shared processing that is currently performed. The UI master right, however, is exclusively possessed by the SYS remote 71. The reason for this is that the UI must display the number of copies as is set and the selected edit processings. These jobs belong to the per original layer and the job programming layer, and hence under control of the SYS remote 71.

When a fault occurs in the progress state, control goes to a fault recovery state. The word "fault" means an abnormal state of the copier including no paper, jamming, abnormal and damaged parts, and the like. The fault comes in two categories, a first fault that a user can remove by resetting the F/F, and a second fault that requires some action by a serviceman, such as parts replacement. As described above, basically, the fault display function is shared by the MCBUI module 86, but the F/F is controlled by the SYS module 82. The machine recovery from the first fault that can be cured by the resetting of the F/F is shared by the SYS module 82. The machine recovery work from other faults is shared by the copier executive module 87.

The SYS system and the MCB system are used for detecting faults. Faults occurring in the IIT, IPS, and F/P are detected by the SYS remote 71, because these are controlled by the remote 71. Faults occurring in the IOT, ADF, and sorter are detected by the MCB remote 75, because these are controlled by the remote 75. Accordingly, the faults possibly occurring in the copying machine may be categorized into four types of faults to be given below.

a. Fault Detected and Cured by SYS Node

This type of fault occurs when the start key is depressed before the F/P is set. The fault state of the machine can be removed by resetting the F/P.

b. Fault Detected by SYS node, but Cured by SYS node

This type of fault includes trouble of the reginsor, abnormal speed of the imaging unit, overrun of the imaging unit, abnormal PR0 signal, abnormal CCC, trouble in the serial communication network, check error of the ROM or RAM, and the like. When any of the above fault states occurs, the UI displays the contents of the fault and a message "Call a serviceman."

c. Fault Detected by MCB Node and Cured by SYS Node

When the sorter is actually set, if the F/F sets the sorter, the MCB node detects a fault. Such a fault state in the copying machine can be removed by resetting the F/F by a user. The same thing is true for the ADF. A fault is detected when an inadequate amount of toner is left, no tray is set, and no paper is present. These faults can be removed by merely supplying toner and setting a tray. When papers are used up in a tray, selection of another tray can cause recovery from the machine from the fault state. When toner of a certain color is used up, designation of toner of another color can cause a recovery from the fault machine. Thus, since the F/F selection can cause the recovery from the fault state, the recovery work is shared by the SYS node.

d. Fault Detected and Cured by MCB node

When the developing unit is abnormal, the toner supply is abnormal, the motor clutch is abnormal, or the fuser is abnormal, the MCB node detects such a fault and the UI displays a fault location and a message "Call a servicemen." When jamming occurs, the UI displays the jam location and the way to clear jamming. In this way, the machine recovery work is put into the hands of users.

As described above, in the fault recovery state, the control right and the UI master right are possessed by the SYS node or the MOCB node depending on the fault location and the recovery method used.

After fault recovery, when the MCB node issues an IOT stand-by command, control goes to the job recovery state and executes the remaining jobs. If the number of copies is set at 3, for example, and a jam occurs during the copying operation of the second copy, after the jam is cleared, the remaining two copies must be made. Accordingly, the SYS node and the MCB node execute their processes, to recover the job. Also, in the job recovery state, the control right is possessed by the SYS node or the MCB node depending on their sharing of process functions, but the UI master right is possessed by the SYS node. The reason for this is as follows. To exercise the job recovery state, a display for job recovery must be made, such as "Push a start key" and "Set the remaining document." Such display processing belongs to the per original layer or the job programming layer that are under control of the SYS node.

Also, when an IOT stand-by command is issued in the progress state, the job recovery state is exercised. When the job execution end is confirmed, control goes to the stand-by state, and waits for the next job. In the stand-by state, control is allowed to proceed to the diagnostic (referred simply to as a diag.) state by a predetermined key operation.

Figure 9:
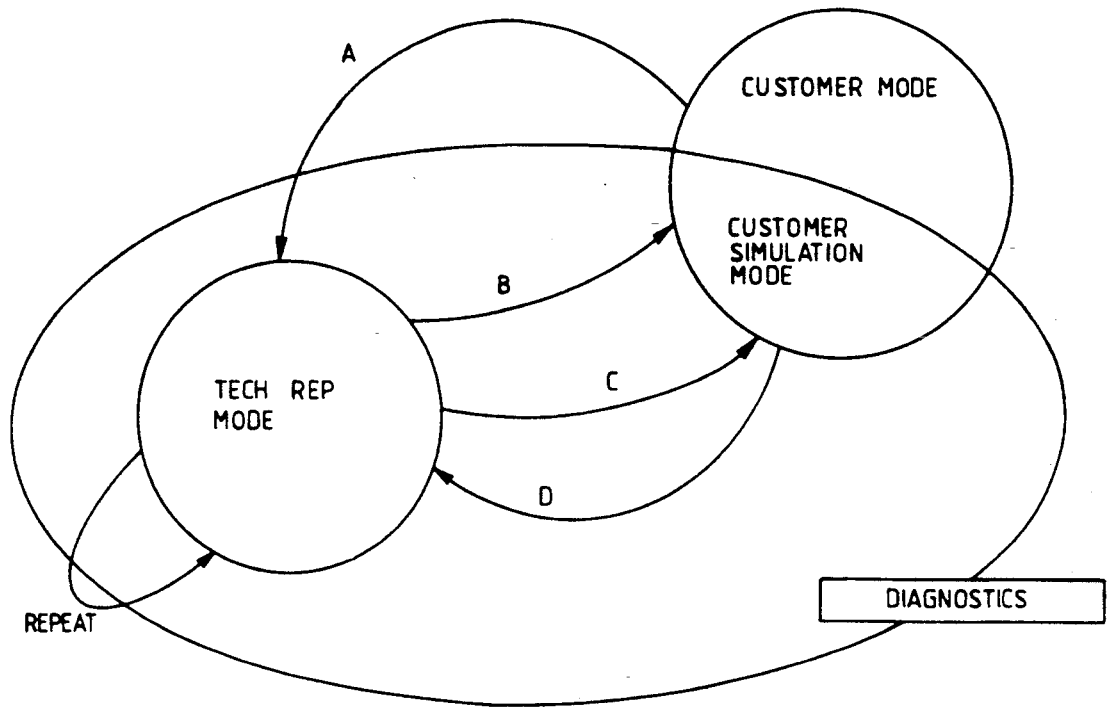
FIG. 9 explains the diagnostic process.

The diag. state consists of self test processing such as for input/output check of parts, setting of various parameters, setting of various modes, and initializing the NVM (nonvolatile memory). The schematic illustration of the diag. state is given in FIG. 9. As seen from the figure, two modes are used, a TECH REP mode and a customer simulation.

The TECH REP mode is used for the machine diagnosis by a serviceman, such as input and output checks. The customer simulation node simulate copying operations by customers in the diag. state. If control proceeds from the stand-by state of the customer mode to the TECH REP mode by way of a route A, various checks and parameter settings in the TECH REP mode are made and control returns to the customer mode (by way of a route B), a mere operation of a predetermined key allows control to go to the power-on state (FIG. 6) and to return to the stand-by state through the sequence of FIG. 7. Because the copying machine of the present invention makes color copies and is provided with various edit functions, after various parameters are set in the TECH REP mode, checks must be made to determine whether or not desired colors are produced and whether the edit functions are normal or not by actually making copies. It is the customer simulation mode that executes the above checks. The customer simulation mode is different from the customer mode in that no billing is made and the UI displays the diag. state being exercised.

The shift of control from the TECH REP mode to the customer simulation mode (via a route C) and the reverse shift of control from the customer simulation mode to the TECH REP mode (via a route D) may be made by pregiven operations. The TECH REP mode progresses under control of the diag. executive module 88 (FIG. 4). In this case, the MCB node has both the control right and the MCB master right. In the customer simulation mode, the actual copying operation is performed under control of the diag. module 83 (FIG. 4). In this case, the SYS node has both the control right and the US master right.

(II) SYSTEM DETAILS

(II-1) System Configuration

Figure 10:
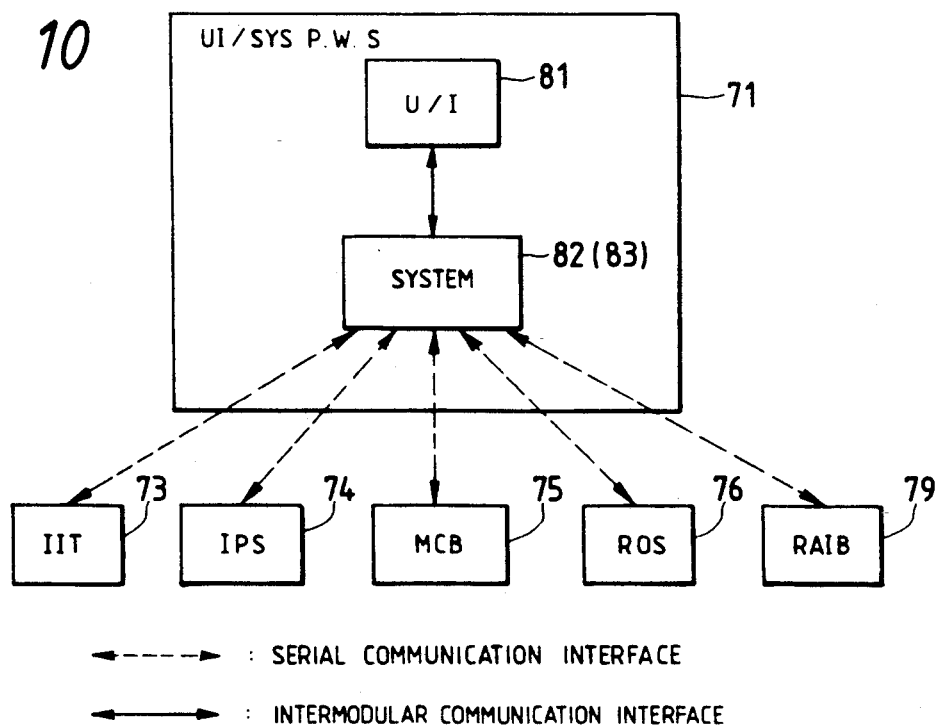
FIG. 10 illustrates the relationship between the system and remote units.

FIG. 10 shows relationships between the system and other remotes. As described, the SYS remote 71 uses the SYSUI module 81 and the SYSTEM module 82. Data is transferred between these modules 81 and 82 through a module interface. A serial communication interface intervenes between the SYSTEM module 82, and the IIT 73 and IPS 74. An LNET communication network couples the SYSTEM module 82 with the MCB 75, ROS 76 and RAIB 79.

Figure 11:
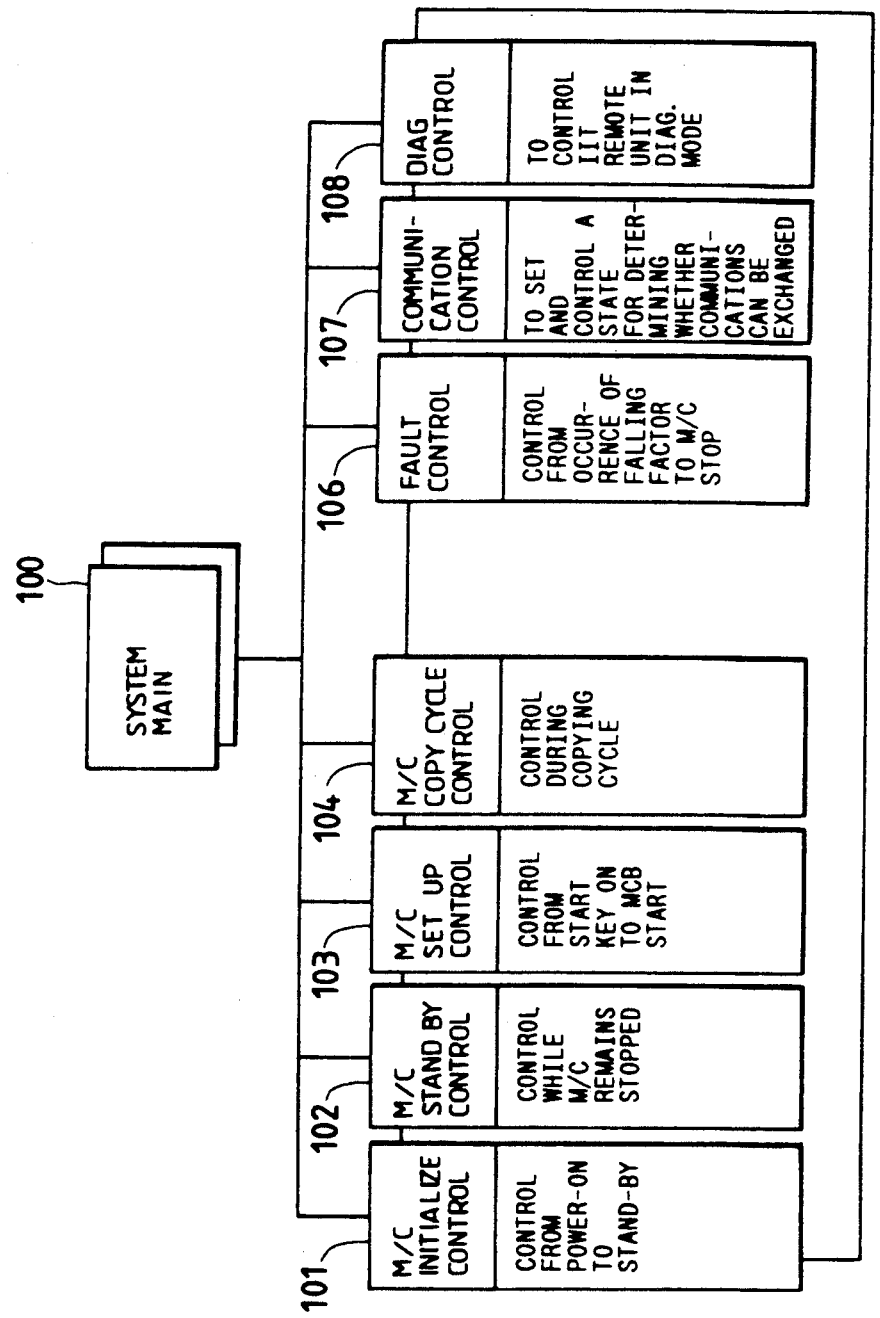
FIG. 11 illustrates the construction of the modules in the system.

A module configuration of the system will be described with reference to FIG. 11. In the color copying machine of the present invention, the modules such as IIT, IPS and IOT function like passive parts, and the modules in the system for controlling the above modules function like active parts. The copying machine employs a decentralized CPU system. The per original layer and the job programming layer are shared by the system. The system has the control right to control the initialize state, stand-by state, set-up state, and cycle state, and the UI master right for using the UI in the above states. A system main 100 fetches the data received from the SYSUI, MCB, and the like into the internal buffer, clears the data in the internal buffer, calls the respective lower order modules in the system main 100 and transfers the job to them to execute updating processings.

An M/C initialize control module 101 controls an initialize sequence from the power-on to the setting up of the stand-by mode. This is driven when the power-on state for executing various types of tests after power-on by the MCB.

An M/C set-up control module 103 controls a set-up sequence from the pushing of the start key until the MCB executing the copy layer is driven. Specifically, the module 103 forms job modes using FEATURE (directions given to the M/C in order to reply to the request by a user) that is specified by the SYSUI, and determines a set-up sequence in accordance with the job modes.

Figure 12A:
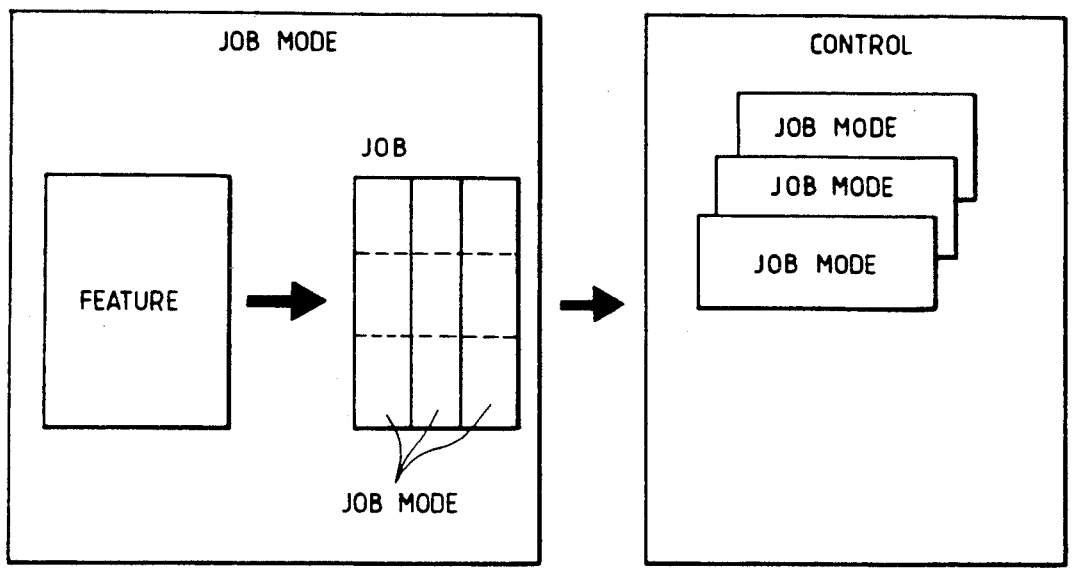
Figure 12B:
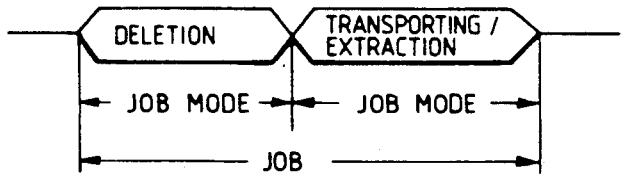
Figure 12C:
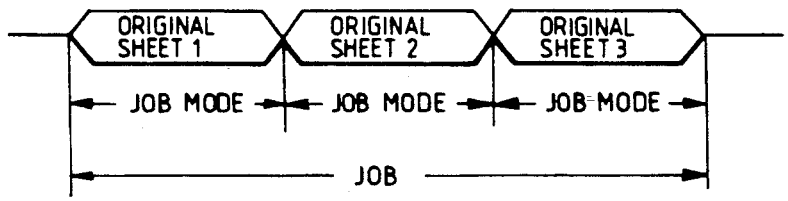

As shown in FIG. 12(a), for forming the job modes, a mode as indicated by the F/F is analyzed and divided into job modes. Here, the job means the M/C operation from the start until the copies are all delivered as requested and operation stops. The job mode is the unit of the smallest job into which the job is allowed to be divided. The job is a collection of the job modes. For example, in the case of an inlay composition, the job modes are a delete and a movement/extraction. These modes constitute a job. In the case of three ADF originals, job modes are feed processings of originals 1, 2 and 3. These job modes are collected into a job.

In an auto mode, a document scan is done. In a coloring-outline-drawing mode, a prescan is done. In a marker edit mode, a prescan is done. In a color detection mode, a sample scan is done (a maximum of three prescans is allowed). A copy mode required for the copy cycle is assigned to the IIT, IPS and MCB. At the end of the set-up sequence, the MCB is driven.

An M/C stand-by control module 102 controls a sequence during the M/C stand-by state. More exactly, it controls reception of the start key and color registration, and enters the diag. mode.

An M/C copy cycle control module 104 controls a copy sequence from the start of the MCB to the stop. Specifically, it provides information of a paper feed count, recognizes the end of a job and requests the start of the IIT. Further, it recognizes the stop of the MCB and requests the stop of the IPS. Additionally, the module 104 sends a through command that is generated during the M/C stop or the M/C operation, to a destination remote.

A fault control module 106 monitors stop parameters from the IIT and IPS. When a stop parameter is generated, the module 106 requests the stop of the MCB. More specifically, the module 106 recognizes a fail command from the IIT or IPS, and stops it. After a stop request is generated by the MCB, the fault control module determines the recovery when the M/C is stopped, and makes the recovery in response to a jamming command from the MCB, for example.

A diag. control module 108 controls in the input check mode and the output check mode that are contained in the diag. mode.

Figure 13:
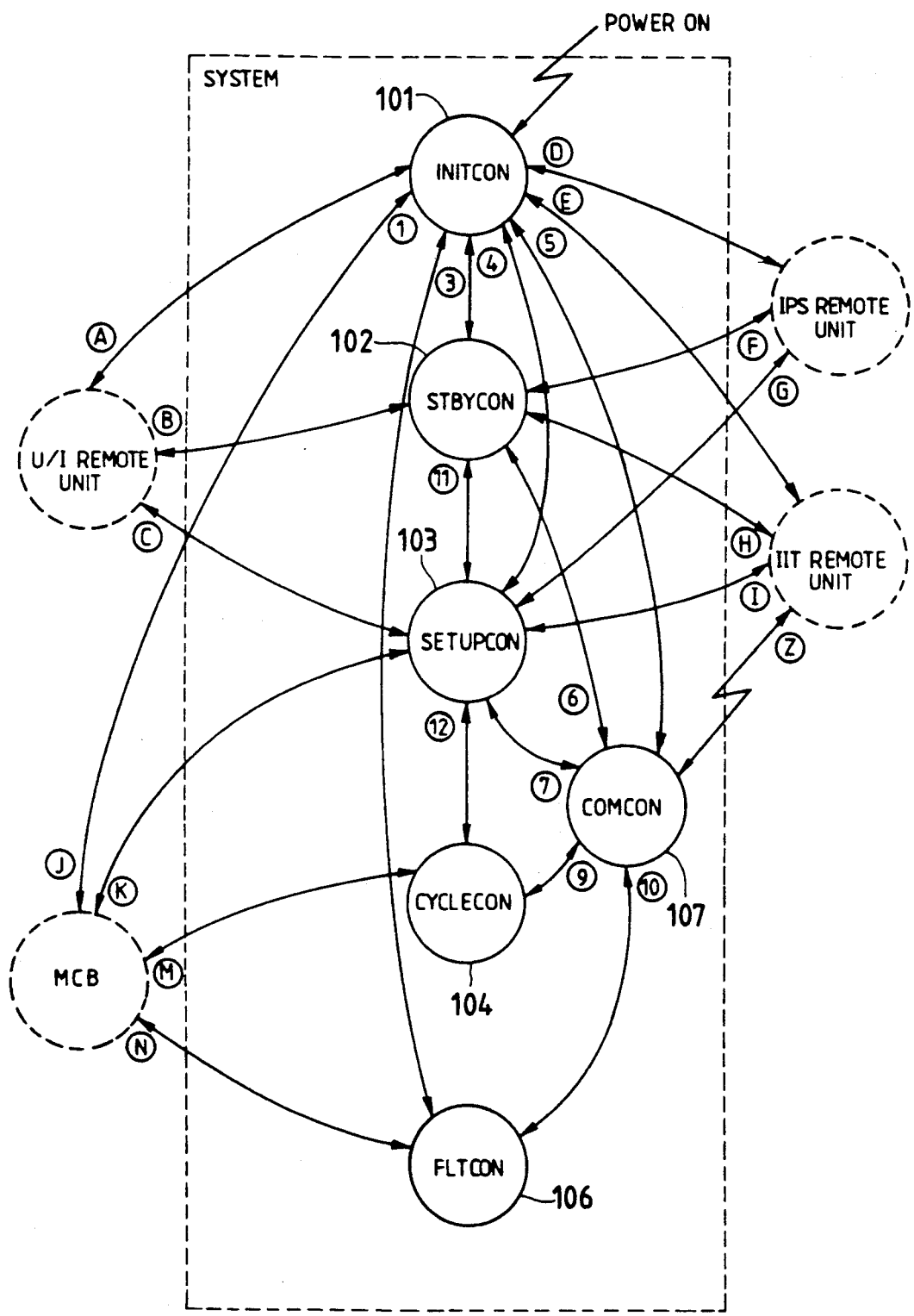
FIG. 13 illustrates the data flow between the system and each of the individual remote units as well as the data flow among the modules within the FIG. 14 illustrates document scanning mechanism.

Data transfer among the modules or between the modules and other subsystems will now be described. FIG. 13 illustrates data flows between the system and the remotes, and data flows among the modules in the system. In the figure, A to N indicate serial communications, Z a hot line, and (1) to (12) data flow among the modules.

In the communication between the SYSUI remote and the initialize control module 101, the SYSUI sends a token command indicative of transfer of the control right for the CRT, to the SYSTEM node. The initialize control module sends a config. command to it.

In the communication between the SYSUI remote and the stand-by control module 102, the SYSUI remote sends to the stand-by control module a mode change command, start copy command, job cancel command, color registration request command, and tray command. The stand-by control module 102 sends to the SYSUI remote an M/C status command, tray status command, toner status command, toner collection bottle command, color registration ans. command, and token command.

In the communication between the SYSUI remote and the set-up control module 103, the set-up control module 103 sends an M/C status command (progress) and APMS status command. The SYSUI remote sends a stop request command and an interrupt command.

In the communication between the IPS remote and the initialize control module 101, the IPS remote sends an initialize command to the control module 101. The control module 101 sends an NVM parameter command to the IPS remote.

In the communication between the IIT remote and the initialize control module 101, the IIT remote sends an IIT ready command to the module 101. The module 101 sends an NVM parameter command and an initialize command to the IIT remote.

In the communication between the IPS remote and the stand-by control module 102, the commands sent by the IPS remote to the control module 102 are an initialize free hand area command, answer command, remove area answer command, and color data command. The commands sent by the module 102 to the IPS remote are a color detect point command, initialize free hand area command, and a remove area command.

In the communication between the IPS remote and the set-up control module 103, the commands sent by the IPS remote to the control module 103 are an IPS ready command and a document information command. The commands sent by the set-up control module 103 to the IPS module are a scan information command, basic copy mode command, edit mode command, and an M/C stop command.

In the communication between the IIT remote and the stand-by control module 102, the IIT remote sends an IIT ready command indicative of the prescan end to the control module 102. The control module 102 sends to the IIT remote a sample scan start command and an initialize command.

In the communication between the IIT remote and the set-up control module 103, the IIT sends an IIT ready command and an initialize end command to the control module 103. The control module 103 sends a document scan start command, sample scan command, and copy scan start command to the IIT remote.

In the communication between the MBC remote and the stand-by control module 102, the stand-by control module 102 sends an initialize subsystem command and a stand-by selection command to the MBC remote. The MBC remote sends a subsystem status command to the stand-by control module.

In the communication between the MBC remote and the set-up control module 103, the module 103 sends a start job command, IIT ready command, stop job command, and declare system fault command to the MBC remote. The MBC remote sends an IOT stand-by command and a declare MCB fault command to the module.

In the communication between the MBC remote and the cycle control module 104, the module 104 sends a stop job command to the MBC remote. The MBC remote sends a made command, ready for next job command, job delivered command, and IOT stand-by command to the control module.

In the communication between the MBC remote and the fault control module 106, the control module 106 sends a declare system fault command and a system down end command to the MBC remote. The MBC remote sends a declare MCB fault command and a system shutdown command to the control module 106.

In the communication between the IIT remote and the communication control module 107, the IIT remote sends a scan ready signal and an image area signal to the control module 107.

The interfaces among the respective modules will be described below. The system main 100 sends reception remote numbers and reception data to the respective modules (101 to 107). Upon receipt of them, each module transfers data to and from its remote. On the other hand, the respective modules sends nothing to the system main 100.

The initialize control module 101, when completing the initialize processing, sends a system state (stand-by) to the fault control module 106 and the stand-by control module 102. The communication control module 107 sends communication yes/no data to the initialize control module 101, stand-by control module 102, set-up control module 103, copy cycle control module 104, copy cycle control module 104, and fault control module 106.

The stand-by control module 102 sends a system state (progress) to the set-up control module 103, when the start key is depressed.

The set-up control section 103, when the set-up is completed, sends a system state (cycle) to copy cycle control module 104.

(II-2) Image Input Terminal (IIT)

(A) Document Scanning Mechanism

Figure 14:
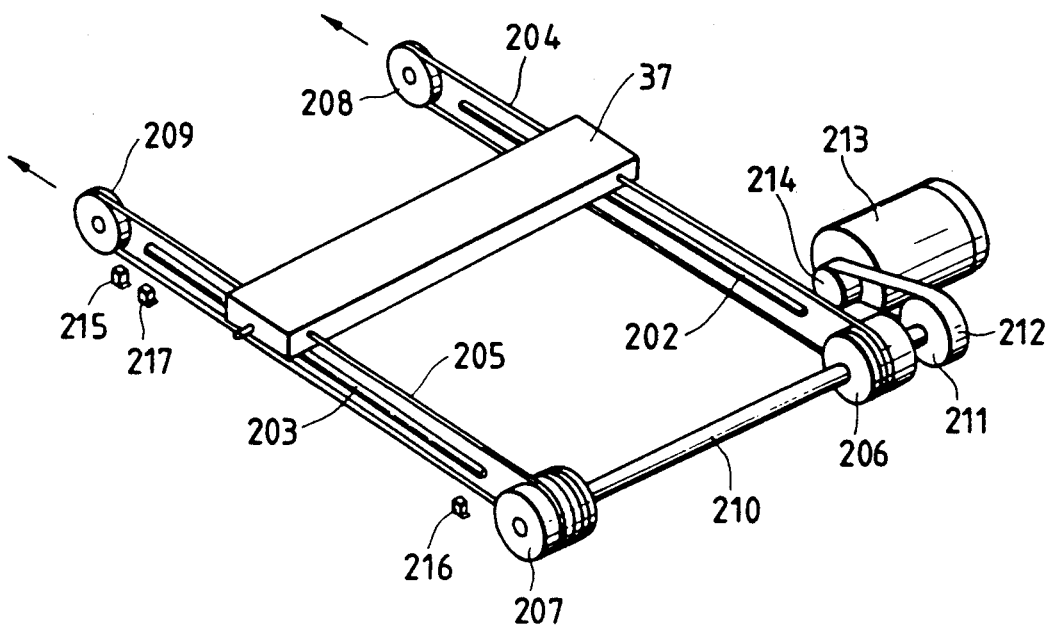

FIG. 14 showing a document scanning mechanism used in the color copying machine according to the present invention. The imaging unit 37 is removably placed on a pair of slide shafts 202 and 203, and is fixed at both ends to wires 204 and 205. These wires 204 and 205 are wound around drive pulleys 206 and 207 and tension pulleys 208 and 209, respectively. The tension pulleys 208 and 209 are pulled in the direction of the arrows. The paired drive pulleys 206 and 207, and a reduction pulley 211 are mounted to a drive shaft 210, as shown. Limit switches 215 and 216 are sensors for sensing both ends of the imaging unit 37 when it is moved. A registration sensor 217 senses a document read start position.

To make a color copy, the IIT must repeat the scan four times. It is a significant matter how to reduce an out-of-synchronization state of the scan and a displacement from the document read start position. To reduce the out-of-synchronization and the displacement, it is needed to minimize fluctuation of the stop position of the imaging unit 37, fluctuation of the time taken for the imaging unit to travel from the home position to the registration position, and fluctuation of the scan speed. To this end, a stepping motor 213 is used. The stepping motor 213 suffers from a higher vibration and is more noisy, when compared with the servo motor. Many countermeasures have been taken to realize high picture quality and high speed.

(B) Control System for the Stepping Motor

The stepping motor 213 is arranged such that a motor winding is wired in a pentagon fashion, its connection points are connected through pairs of transistors to the positive and the negative terminals of a power supply, and the motor is driven in a bipolar mode using ten transistors. The motor current is fed back to smooth a current variation and hence to hold back vibrations and noise.

Figure 15A:
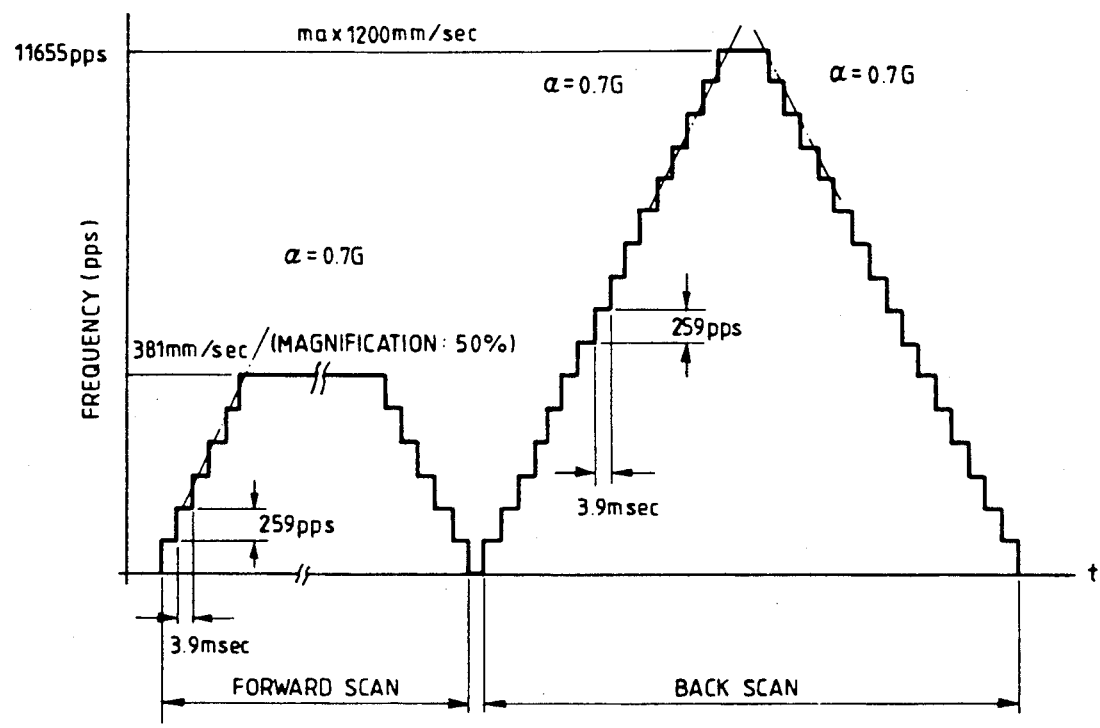
FIGS. 15a-15e explain stepping motor control system.

FIG. 15(a) shows a scan cycle of the imaging unit 37 driven by the stepping motor 213. More specifically, the figure also shows a relationship between the speed of the imaging unit 37, viz., the frequency of a signal applied to the stepping motor and time, when the imaging unit executes a forward scan and a back scan at the 50% magnification, or the maximum speed. In an acceleration mode, as shown in FIG. 15(b), the frequency is increased up to approximately 11 to 12 kHz in steps of 259 Hz.

Figure 15B:
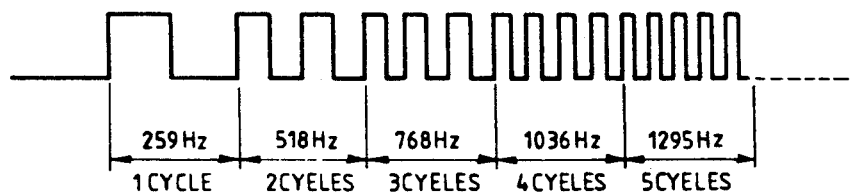

A trapezoidal speed variation profile of is formed by increasing the signal frequency at the rate of 259 pps/3.9 ms (FIG. 15(b)). A rest period is provided between the forward scan and the back scan. During this rest period, vibration in the IIT mechanism system settles down, and the synchronization of the imaging unit operation with image outputting in the IOT is secured. An acceleration of 0.7 G, which is higher than that of the conventional copier, reduces a scan cycle time.

Figure 15C:
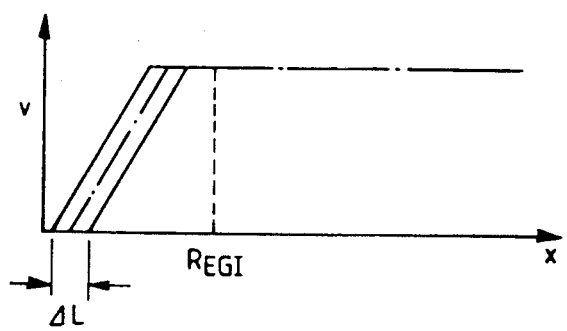
Figure 15D:
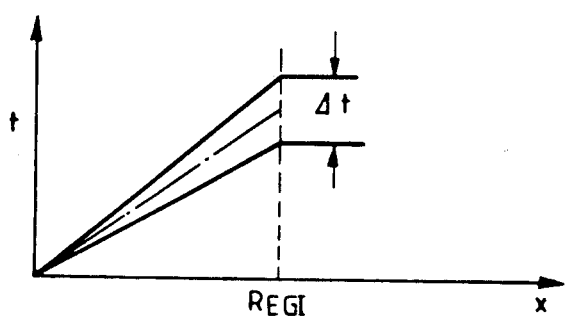
Figure 15E:
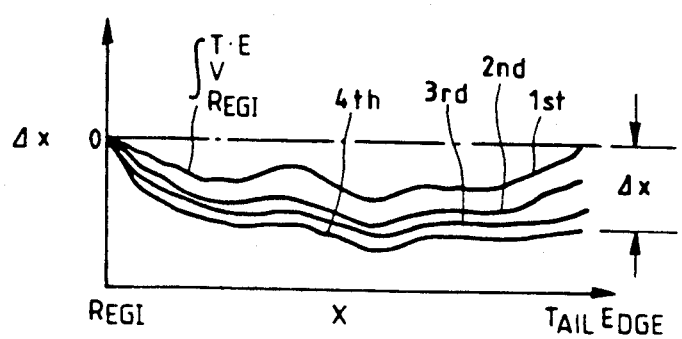

As already mentioned, in the color document reading, it matters how to reduce the displacement from the home position during the four scans, consequently how to reduce a color displacement or an image distortion. FIGS. 15(c) to 15(e) explain the causes of the color displacement. FIG. 15(c) shows a fact that the imaging unit after scanning returns and comes to a standstill at a position different from the home position. Accordingly, in the next scan, the time taken for the imaging unit to reach the registration position is different from that in the previous scan, resulting in a color displacement.

In the case of FIG. 15(d), with a transient vibration of the stepping motor (speed fluctuation until the motor speed settles down at a steady speed) during the 4-scan period, the time taken for the imaging unit to reach the registration position becomes different from a predetermined time, and consequently causes color displacement. FIG. 15(e) shows different variations of the constant speed scan characteristic of the imaging unit between the registration position and the tail edge when the imaging unit is moved for scanning four times. As seen, the speed of the imaging unit of the first scan varies more than that of the imaging unit of the second to fourth scans. For this reason, the instant color copier is designed so that the toner color Y for which displacement is indistinctive is developed for the first scan. Other causes for color displacement include aging of the timing belt 212 and wires 204 and 205, and mechanical factors such as viscosity drag existing between the slide pad and the slide rails 202 and 203.

(C) IIT Control System

The IIT remote has many functions, such as sequence control for various copy operations, service support, self check, and fail safe. The sequence control of the IIT generally consists of a scan, sample scan, and initialize controls. Various commands and parameters for controlling the IIT come from the SYS remote 71 through the serial communication network.

Figure 16A:
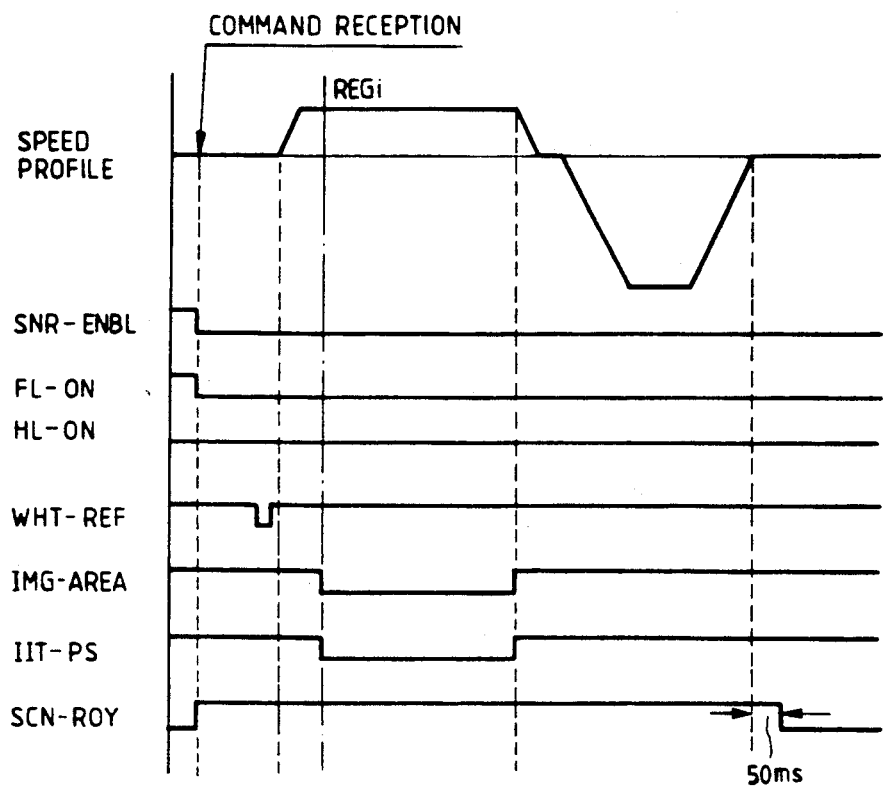
FIGS. 16a-16c illustrate a timing chart for the IIT control system.

FIG. 16(a) shows a timing chart of a normal scan operation. The scan length data is determined depending on paper length and magnification, and is exactly 0 to 432 mm (with the steps of 1 mm). The scan speed depends on the magnification (50% to 400%). The prescan length data (distance between the stop position and the registration position) also depends on the magnification (50% to 400%). When receiving a scan command, the IIT remote produces an FL-ON signal to light on a fluorescent lamp. The same turns on a motor driver by a SCN-RDY signal. After a preset time, it produces a shading correction pulse WHT-REF to cause the imaging unit to start the scanning operation. When the imaging unit passes the registration sensor, an image area signal IMG-AREA goes low and its low level state lasts during a period corresponding to the scan length. In synchronism with this, the IIT-PS signal is outputted to the IPS.

Figure 16B:
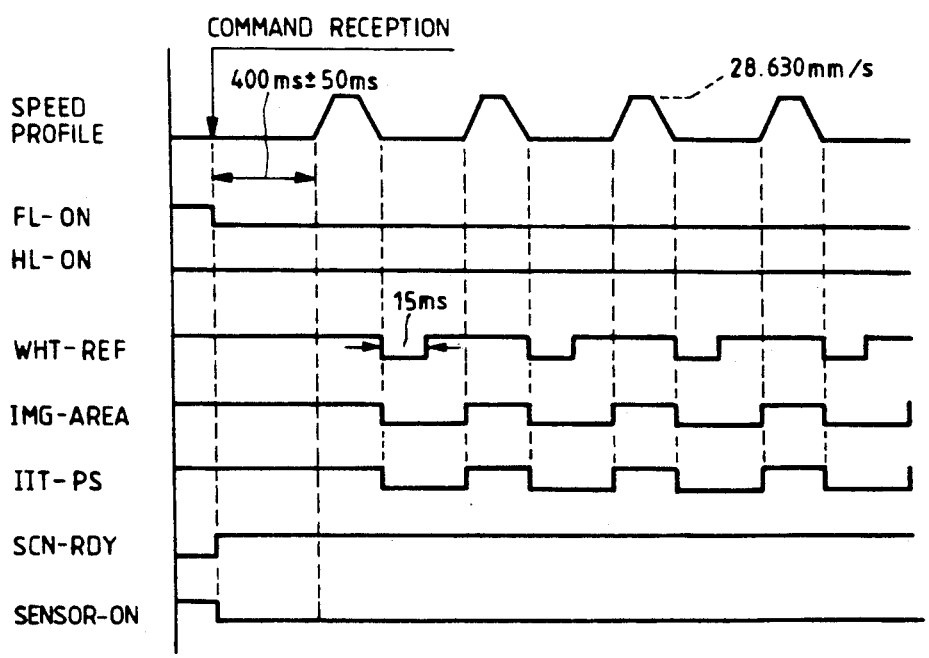
Figure 16C:
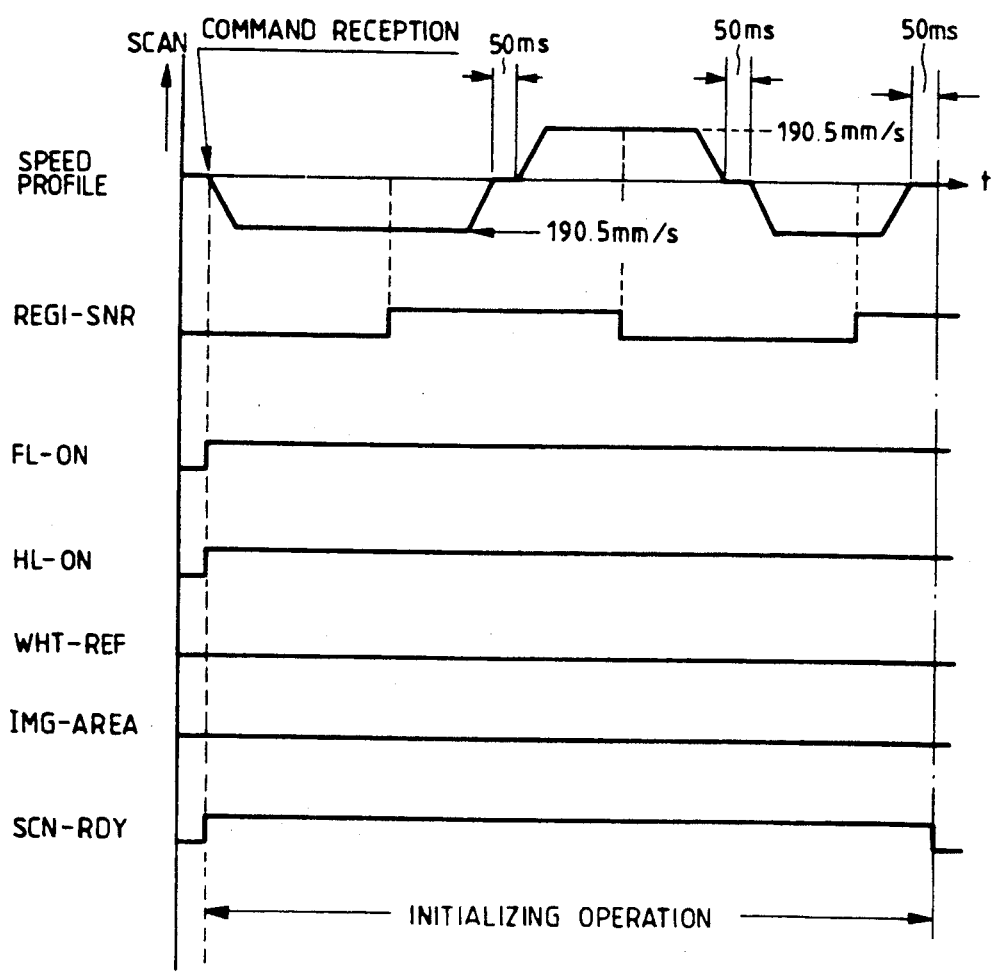

FIG. 16(b) shows a timing chart of the sample scan operation. The sample scan is used for color detection at the time of color change, color balance correction when the F/P is used, and shading correction. In the sample scan, the imaging unit is moved to a preset sample position and temporarily stops there, or repeats a fine motion several times and then stops, on the basis of the data of stop position from the registration position, moving speed, the number of fine motions, and step intervals.

(D) Imaging Unit

Figure 17:
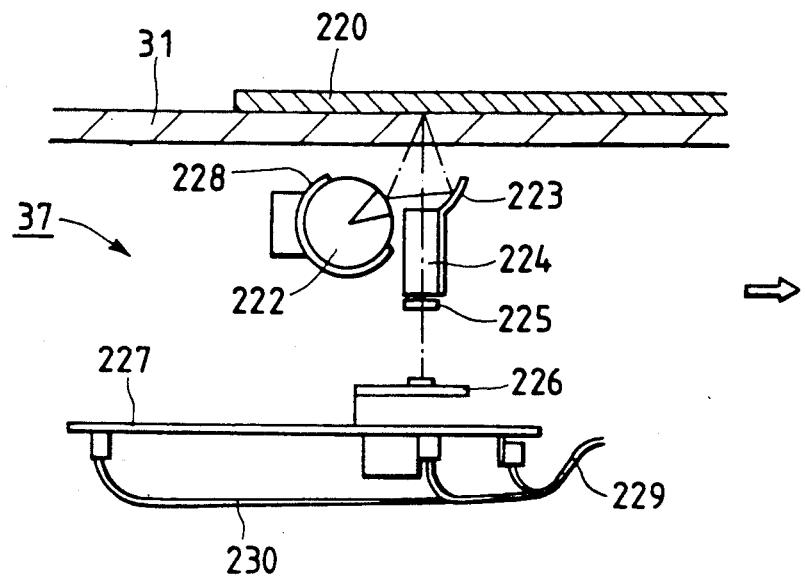
FIG. 17 illustrates a sectional view of the imaging unit.

FIG. 17 shows a sectional view of the imaging unit 37. An original 220 is set on the platen glass 31, with its image surface facing down. The imaging unit 37 moves under the platen glass in the direction of the arrow. Throughout the movement of the imaging unit, the image surface of the original placed on the platen glass is illuminated with the combination of the daylight fluorescent lamp 222 of 30 W and a reflecting mirror 223. The light reflected from the original 220 passes through a selfoc lens 224 and a cyan filter 225 and forms a normal equal-size image on the light receiving surface of a CCD sensor array 226. The selfoc lens 224 is a compound eye lens consisting of four rows of fiber lens. This lens is bright and has high resolution. This lens is advantageous in that power consumption of the light source is reduced and the imaging unit may be made compact. The imaging unit 37 is provided with a circuit board 227 containing a CCD line sensor drive circuit, CCD line sensor output buffer circuit, and the like. A lamp heater 228 is provided as a flexible cable 229 for the illumination power source 230.

Figure 18A:
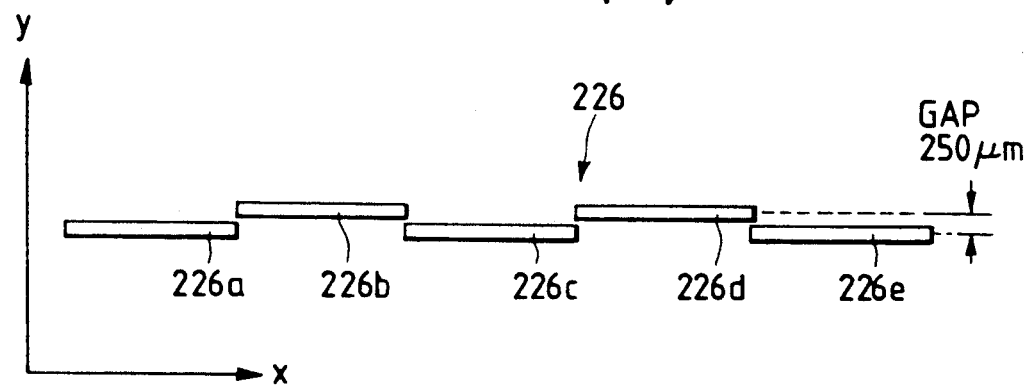
FIGS. 18a-18b illustrate an example arrangement of the CCD line sensors.
Figure 18B:
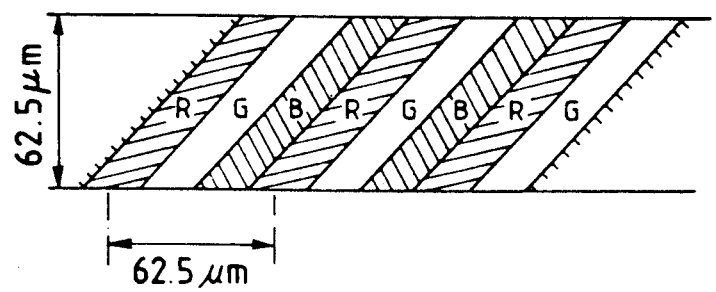

As shown in FIG. 18(a), five CCD line sensors 226a to 226e are laid out in zig-zag fashion in the main scan direction. The reason a zig-zag layout of CCD sensors is used is that when a single CCD line sensor is used, it is difficult to array a number of photo sensor elements without any drop of element and to obtain a uniform sensitivity. When a plurality of CCD line sensors are arrayed in a line, it is difficult to form pixels in the CCD line sensor up to both end portions and light insensitive portions are present in the CCD sensor.

As shown in FIG. 15(b), in the sensor portion of the CCD line sensor array 226, trios of color filters R, G, and B comprise pixels repeatedly laid out in this order, and the adjacent three bits form one pixel at the time of reading. When a read pixel density of each color is 16 dots/mm and the number of pixels of each chip is 2928, the length of one chip is: 2928/(16×3)=61 mm and hence the total length of five chips is 61×5=305 mm. Accordingly, a CCD line sensor of the equal size type capable of reading an original of A3 can be obtained. The respective pixels of R, G, and B are slanted by 45°, to reduce moire.

When a plurality of CCD line sensors 226a to 226e are disposed in a zig-zag fashion as in the above case, the adjacent CCD line sensors scan different portions on the original surface. When the original is scanned by moving the CCD line sensors in the vertical scan direction Y orthogonal to the main scan direction X, there is a time lag between the signals derived from the CCD line sensors 226b and 226d of the first row that precedingly scan the original and the signals derived from the CCD line sensors 226a, 226c and 226e of the second row that succeedingly scan the original. The time lag corresponds to a difference between the positions where the CCD line sensors of the first and second rows are located.

To obtain a continuous signal of one line from the image signals dividedly read by the plurality of CCD line sensors, the signals from the first row CCD line sensors 226b and 226d that precedingly scan the original are stored, and the stored signals must be read out in synchronism with the outputting of the signals from the second row CCD line sensors 226a, 226c and 226e that scan the original succeeding to the first CCD row line sensors. In this case, if the position difference is 250 um and the resolution is 16 dots/mm, a delay of 4 lines is needed.

In the image reader, the reduction/enlargement is carried out in such a manner that increase and decrease processing, and other processing by the IPS are used for reduction/enlargement in the main scan direction, and the increase or decrease of the moving speed of the imaging unit 37 is used for the reduction/enlargement in the vertical scan direction. Accordingly, the resolution in the vertical scan direction is changed by changing the moving speed of the imaging unit 37, while the reading speed (the number of read lines per unit time) of the image reader is fixed. If the resolution is 16 dots/mm at 100% magnification, the magnification percentage, speed, resolution and the number of zig-zag correction lines are as shown in the following table.

| Magnification (%) | Speed (times) | Resolution (dots/mm) | No. of zig-zag correction lines |
|---|---|---|---|
| 50 | 2 | 8 | 2 |
| 100 | 1 | 16 | 4 |
| 200 | ½ | 32 | 8 |
| 400 | ¼ | 64 | 16 |

As seen from the above table, as the magnification percentage increases, the resolution increases, and hence the number of necessary line memories for correcting a difference of 250 um in the zig-zag layout of the CCD line sensors is also increased.

(E) Video Signal Processing Circuit

Figure 19:
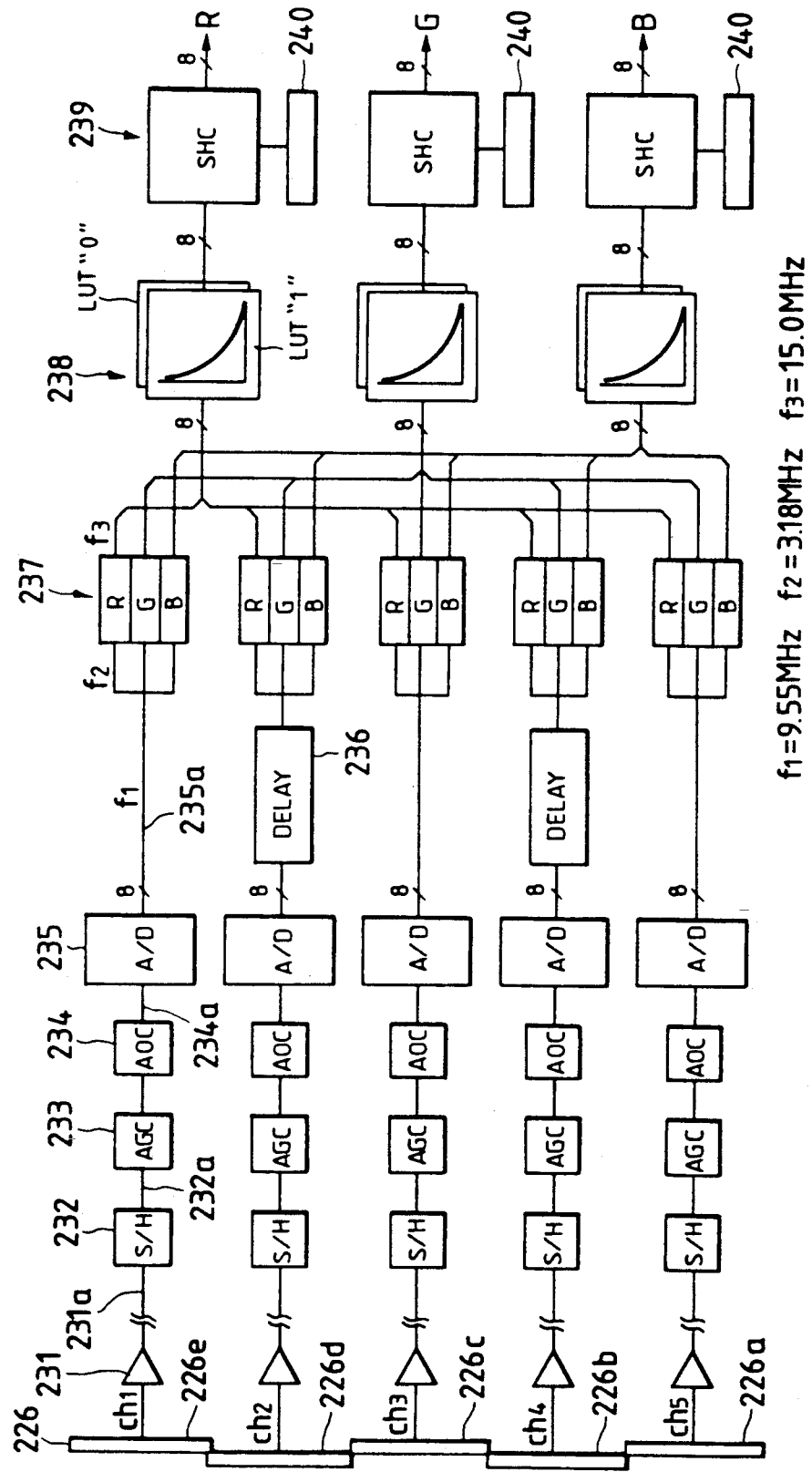
FIG. 19 illustrates one example of the video signal processing circuit construction.

The description to be given below with reference to FIG. 19 is an elaboration on a video signal processing circuit for reading a color original for each trio of colors R, G, and B in terms of reflectivity signals by using the CCD line sensor array 226 when the reflectivity signal is converted into a digital signal as a density signal.

An image of an original is read by using the CCD line sensor array 226 consisting of five CCD line sensors in the imaging unit 37. In the image reading, the CCD line sensor array divides the original image into five portions and reads these portions through five channels. Further, in reading the segmented image, the image light reflected from the image is separated into trios of colors R, G, and B. The color signals (in a channel typically used for ease of explanation) are amplified to a predetermined level by a amplifier 231. The amplified color signals are transmitted to the circuit of the base machine through a transmission cable connecting the imaging unit to the base machine (FIG. 20, 231a).

Figure 20:
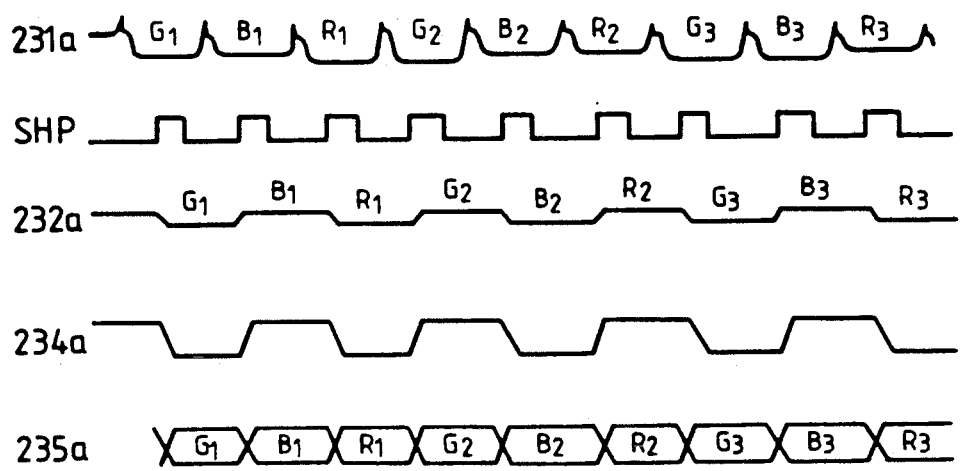
FIG. 20 illustrates a timing chart for the video signal processing circuit.

In the base machine, a sample/hold circuit SH232, by use of a sample hold pulse SHP, removes the noise of the color signals and shapes the signals (FIG. 20, 232a). The photoelectric converting characteristic of the CCD line sensor differs for each pixel and each chip. Accordingly, when an original with a uniform density is read by the CCD line sensor, the output signals of the line sensor are not uniform. If these signals are image processed, stripes and irregularities appear in an image formed by the thus image processed signals. Therefore, correction processing must be applied to the signals derived from the CCD line sensor array.

An automatic gain control (AGC) circuit 233 controls the gain for the sensor output signals. This control is called a white level adjustment. This circuit is used for reducing an error in the A/D conversion in a circuit for amplifying the output signals of each sensor and applying them through an AOC (automatic affect control circuit) 234 to an A/D converter 235. To this end, reference data is collected by each sensor, is digitized, and is stored into a shading RAM 240. The data of one line is compared with preset reference data in the SYS remote 71 (FIG. 3). A digital value providing a given gain is converted into an analog signal, and is applied to the AGC 233. In this way, its gain is changed in 256 steps.

The AOC circuit 234 controls a dark voltage outputted from each sensor. This control is called a black level adjustment. For the adjustment, the fluorescent light is off and the output voltage of each sensor is measured. These output voltages are digitized and stored into the shading RAM 240. The data of one line as read out is compared with a predetermined reference value by the SYS remote (FIG. 3). An offset value is converted into an analog signal, and applied to the AOC 234. In the AOC 234, the offset voltage is controlled in 256 steps. The AOC controls the original density as finally read so that its output density falls within a predetermined value.

The data thus digitized by the A/D converter 235 (FIG. 20, 235a) is outputted in the form of a stream of 8 bits of GBRGBR ... A delay circuit 236 is a memory of the FIFO type capable of storing the data of a plurality of lines. The delay circuit 236 stores the data signals derived from the preceding scan, 1st row CCD line sensors 226b and 226d, and outputs the data in synchronism with the outputting of the data signals from the succeeding scan, 2nd row CCD line sensors 226a, 226c and 226e.

A separate/compose circuit 237 separates the R, G, and B data for each CCD line sensor, and composes these items of data into serial data for each color, R, G, and B and for each line. A converter 238, e.g., a ROM, stores a logarithm converting table LUT"1"In the table, the received digital data is used as addresses to access the table stored in the ROM. The table converts the R, G, and B reflectivity data into density data.

A shading correction circuit 239 will be described. The shading stems from variances of the light distribution characteristics of the light source, reduced light amount at the end portion of the fluorescent light when it is used as a light source, sensitivity variances of pixels of the line sensor, smear on the reflecting mirror, and the like.

To correct for the shading, at the start of the shading correction, the light reflected from a white plate, that is to be used as reference density data for shading correction, is applied to the CCD line sensor. The output signal from the line sensor is subjected to A/D conversion and logarithm conversion in the signal processing circuit. The reference density data log ($R_i$) thus obtained is stored into the line memory 240. Then, the reference density data log ($R_i$) is subtracted from the image data log ($D_i$) read from the original through the scanning operation. That is, $$\log (D_i) - \log (R_i) = \log (D_i/R_i)$$

In this way, logarithmic values of the pixel data are obtained which are shading corrected. With the above approach wherein the shading correction follows the logarithm conversion, satisfactory logic operation can be realized by using an ordinary full adder IC, instead of intricate, large scale, hard logic dividers used in conventional converters.

II-3) Image Output Terminal (IOT)

(A) Outline

Figure 21:
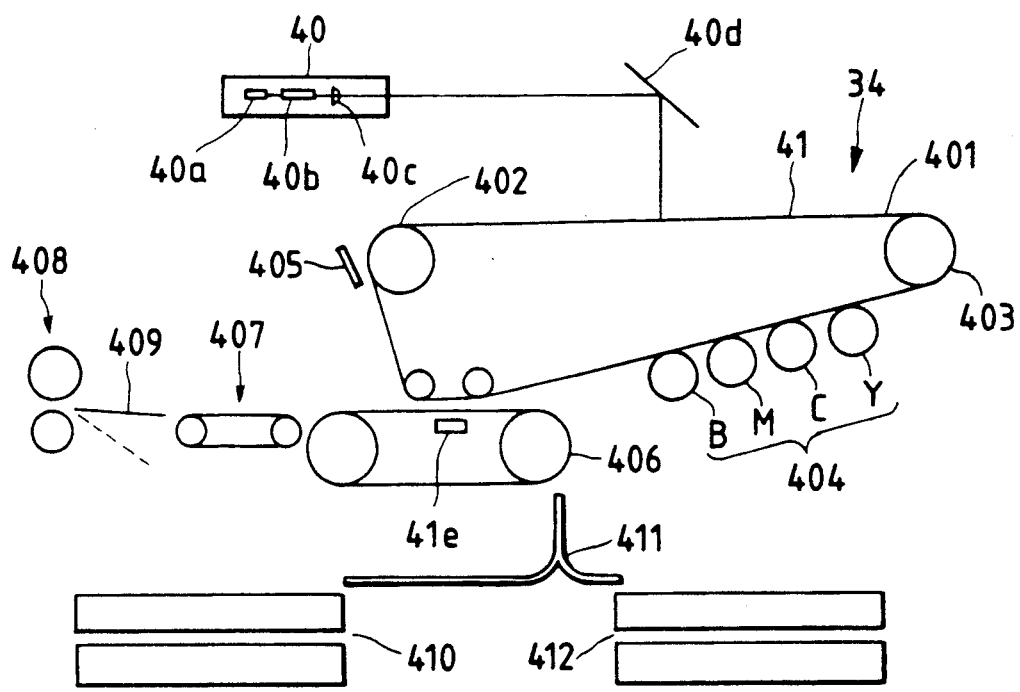
FIG. 21 illustrates the outline construction of the IOT.

An outline of the image output terminal (IOT) is shown in FIG. 21. The IOT uses a photo receptor belt as a photo sensitive member. The IOT is provided with a developing unit 34 comprising a group 404 of four developing devices for full color development, i.e., black (K), magenta (M), cyan (C) and yellow (Y), a tow roll transfer loop 406 for transferring paper to the transfer unit, a vacuum transfer 407 for transferring paper from the tow roll transfer loop 404 to a fuser 408, paper trays 410 and 412, and a paper transfer path 411. The three units of the photo receptor belt, developing unit 412, and paper transfer path 411 can be pulled out of the front side of the IOT.

The data light obtained by modulating a laser beam from a laser source 40 is guided by a mirror 40d onto the surface of the photo receptor belt 41 to form a latent image thereon. The latent image formed on the surface of the tow roll transfer loop or turtle 41 is developed into a toner image by the developing unit 404. The developing unit 404 consists of four developing devices of K, M, C, and Y which are disposed as shown. The layout of the developing devices allows a relationship between dark attenuation and the. characteristics of the respective toners, difference in the results of mixing of the respective color toners with the black toner, and the like. In the case of the full color copy, these developing devices are driven in the order of

Y→C→M→K.

Papers fed from the two-stage elevator tray 410 and another tray 412 are supplied through the transfer oath 411 to the transfer tow roll transfer loop 406. The loop 406 is disposed in the location of the transfer unit 34, and is made up of a pair of rolls rotatably coupled by a timing chain or a timing belt, and a gripper bar to be described later. The paper is gripped and transferred by using the gripper bar, and the toner image on the surface of the photo receptor belt is transferred onto the paper. In the case of full color, the paper is turned four times by the tow roll transfer belt, during the four turns, the toner images of Y, C, M, and K are successively transferred onto the paper in this order. After the image transfer, the paper is released from the gripper bar, and transferred to the vacuum transfer 407, and fed to the fuser 408. The toner image on the paper is fused by the fuser and delivered outside the base machine.

The vacuum transfer 407 absorbs the difference of the speeds of the transfer loop 406 and the fuser 408, and thereby synchronizes their operation. In this instance, the transfer speed (process speed) is 190 mm/sec. In the case of full color copy, the fusing speed is 90 mm/sec. Thus, the transfer speed is different from the fusing speed. To secure the fusing speed, the process speed is reduced. Since the 1.5kVA power must be secured, the power-cannot be distributed to the fuser.

To cope with this, when small size paper such as B5 and A4 is used, at the instant that the image transferred paper is released from the transfer loop 406 and rides on the vacuum transfer 407, the speed of the vacuum transfer 407 is decreased from 190 mm/sec to 90 mm/sec to make it equal to the fusing speed.

The instant copier is designed to be compact by making the distance between the transfer loop and the fuser as short as possible. The A3 paper is in excess of the distance of the transfer point and the fuser. If the speed of the vacuum transfer is decreased, there inevitably occurs a situation that the leading end of the paper reaches the fuser, but the trailing portion of the paper is under image transfer process. In such a situation, the paper is braked and consequently color displacement possibly occurs. To solve this problem, a baffle plate 409 is provided between the fuser and the vacuum transfer. When the A3 paper arrives, the baffle plate is turned down to curve the A3 paper along the plate, to effectively elongate the path between the fuser and the vacuum transfer. Accordingly, the vaccum transfer is operable at the same speed as the transfer speed of the turtle 406. With such an arrangement, after the image transfer is ended, the leading end of the paper reaches the fuser. In other words, the speed difference between the turtle and the fuser is absorbed and both are operable synchronously. The above approach for A3 paper is correspondingly applied to the OHP, because it has poor thermal conduction.

The instant copier is designed such that a black copy as well as a full color copy can made at high efficiency. In the case of the black copy, the toner layer is thin and hence it can be fused by less heat. Accordingly, the fusing speed is 190 mm/sec and is not reduced in the vacuum transfer. The same thing is applied to a single color copy because the single color copy has a single toner layer. After the transfer process is completed, the toner remaining on the surface of the photo receptor belt is wiped off by a cleaner 405.

(B) Transfer Loop

Figure 22A:
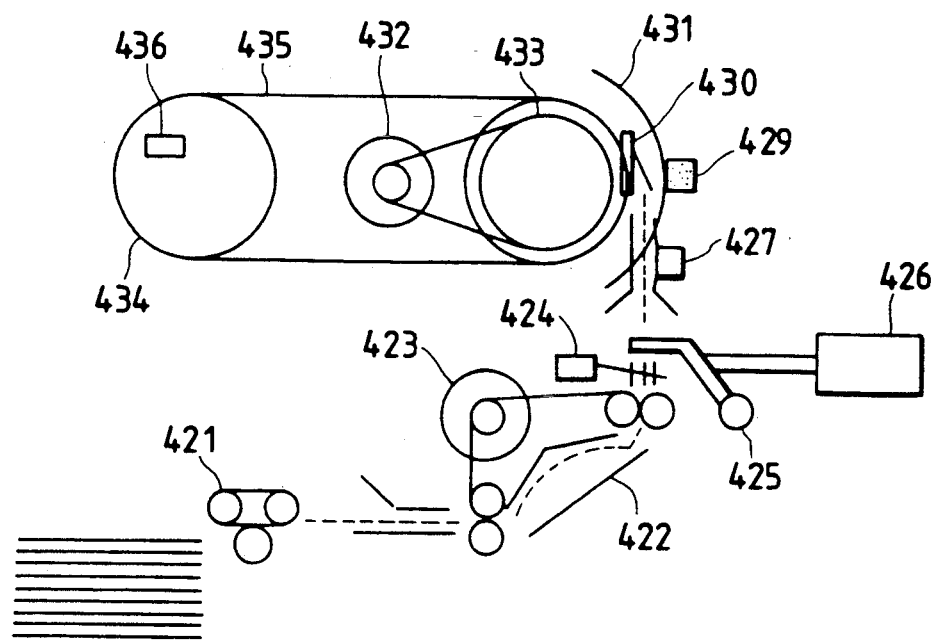
FIGS. 22a-22b illustrate an example of the image transfer unit construction.

The tow roll transfer loop 406 is configured as shown in FIG. 22(a).

The use of the tow roll transfer loop 406 means that no mechanical paper support member is used to eliminate color irregularity, and the transfer speed can be increased through speed control. Papers are picked up from a tray sheet-by-sheet by a feed head 421 and are transported through a buckle chamber 422 and a registration gate 425 that is controlled by a registration gate solenoid 426, to the transfer loop. Arrival of the paper at the registration gate is detected by a pre-registration gate sensor 424.

The transfer loop is driven counterclockwise by rotating a roller 433 by a servo motor 432 through a timing belt. No particular drive is applied to another roller 434. A timing chain or belt is wound around the paired rollers. A grip bar or gripper 430 is provided between the chains (in the direction orthogonal to the paper transfer direction). The gripper 430 is opened at the entrance of the transfer loop with the aid of a solenoid. The gripper 430 grips and pulls the paper for transfer at the entrance to the transfer loop. Conventionally, an aluminum or steel support covered with a mylar sheet or mesh supports the paper. When it is heated, the difference of thermal expansion with respect to the support makes the support surface irregular. The poor flatness on the support causes nonuniform transfer efficiency over the support surface, and consequently color irregularity. The use of the gripper 430 eliminates the need for the paper support, and hence the color irregularity.

The transfer loop is not provided with a support for the transferred paper, and the paper is released by centrifugal force. To hold the paper against the centrifugal force, the paired rollers are designed to draw a vacuum and attract the paper. Therefore, after passing the roller, the paper may flutter. At the transfer point, the paper is electrostatically attracted toward the photo receptor belt near a detach corotron and a transfer corotron, and the toner image on the photo receptor surface is transferred onto the paper. After the image transfer, at the exit of the transfer loop, the present position of the gripper 430 is detected by a gripper home sensor 436. At a proper timing, the gripper 430 is opened by a solenoid to release the paper and transfer it to the vacuum transfer 413.

In the case of the full color copy, the paper is turned around the transfer loop four times, for the color image transfer purposes. In the case of the three-pass color copy, it is turned three times.

Figure 22B:
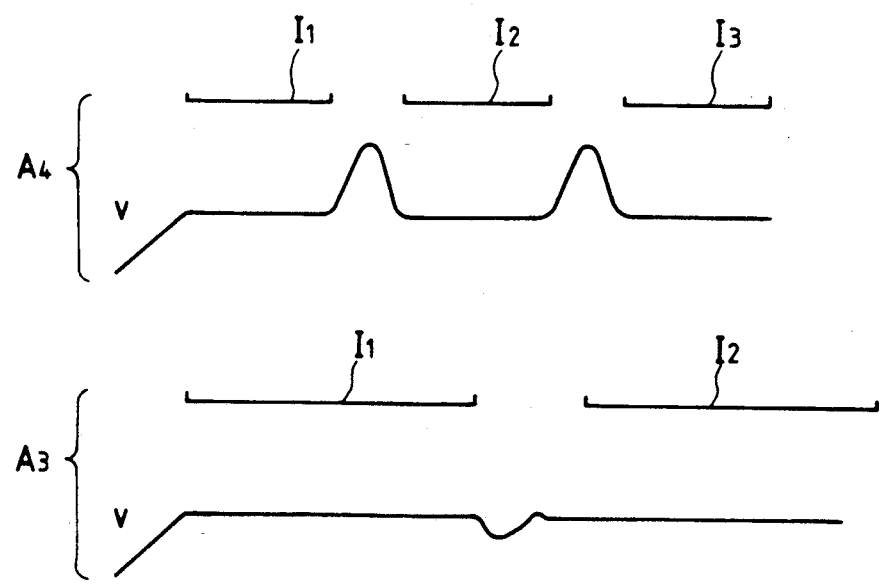

The timing control of the servo motor 432 will be described with reference to FIG. 22(b). The control of the transfer loop is such that, during image transfer, the servo motor 432 is driven at a constant speed, and after the transfer process ends, the leading edge transferred onto the paper is coincident with the transfer point of the next latent image. The length of the photo receptor belt 41 is equal to a length required for three latent images to be formed for A4 paper, and two latent images to be formed for A3 paper. The length of the belt 435 is slightly longer than the length of the A3 paper, more exactly approximately 4/3 times the length of the A3 paper.

To make a color copy of A4 size, when a latent image I1 of the first color is transferred to the paper, the servo motor 432 is driven at a constant speed. After the transfer ends, the servo motor is rapidly accelerated so that the lead edge transferred onto the paper coincides with the leading edge of a latent image I2 of the second color. To make a color copy of A3 size, after the transfer of the first color latent image I1 ends, the servo motor is decelerated and waits until the lead edge transferred onto the paper coincides with the leading edge of a latent image I2 of the second color.

(II-4) User Interface (U/I)

(A) Use of Color Display

Figure 23A:
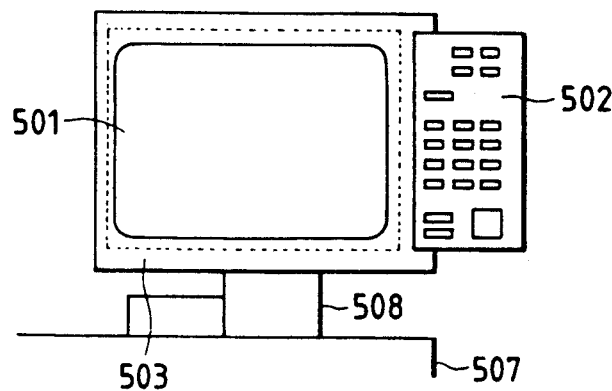
FIGS. 23a-23c illustrate an example of the UI installation.
Figure 23B:
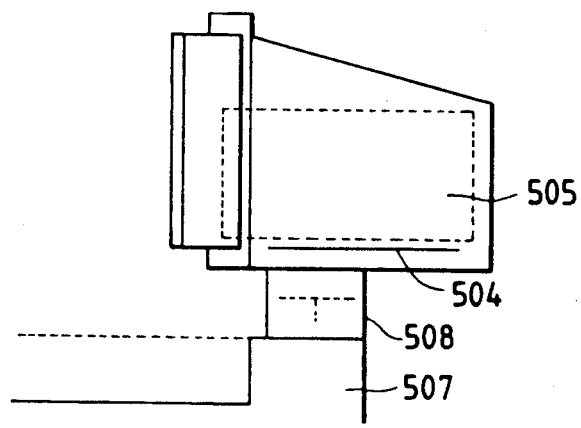
Figure 23C:
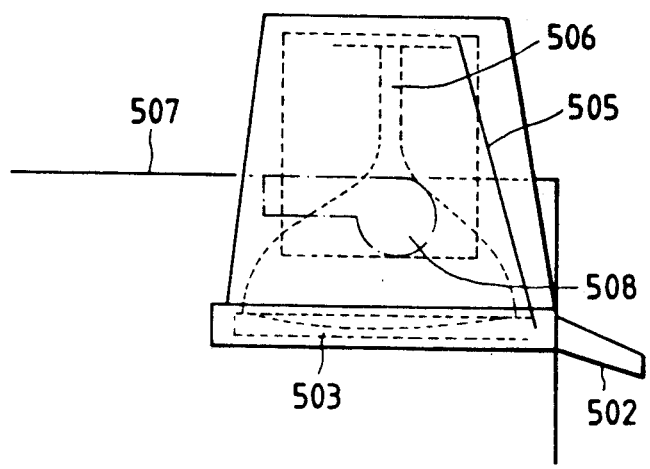
Figure 24A:
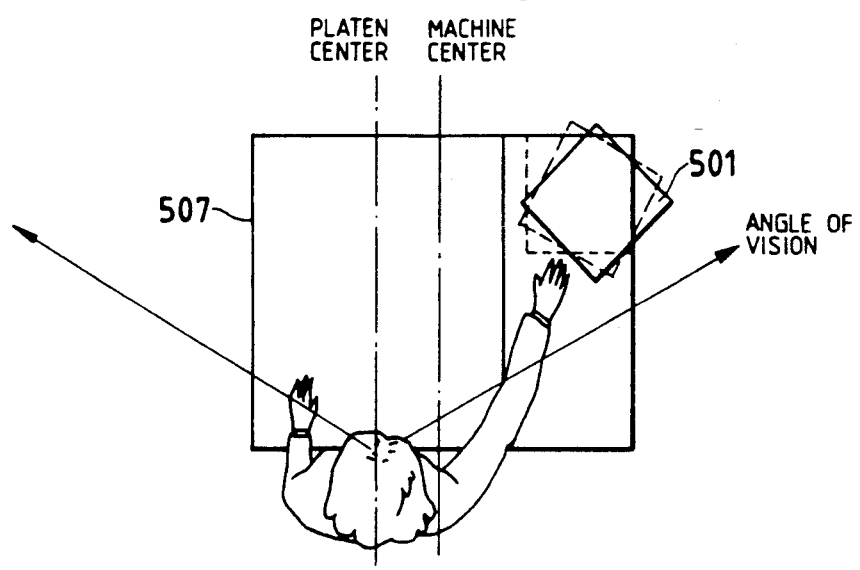
FIGS. 24a-24b illustrate some examples for the setting of the and height during installation of the UI.
Figure 24B:
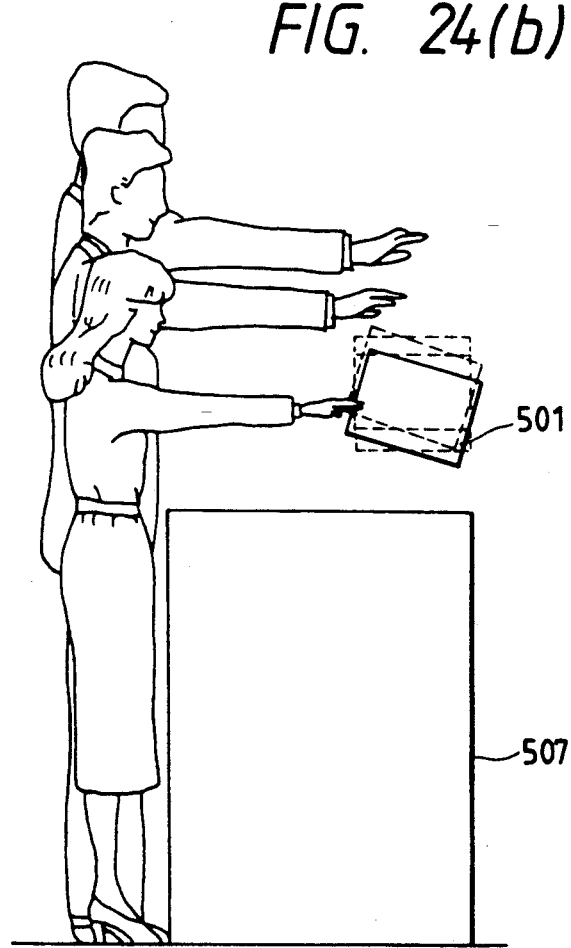

FIG. 23(a), 23(b), and 23(c) show how a user interface (UI) using a display device is mounted and FIGS. 24(a) and 24(b) illustrate the angle and height of the user interface mounted to the base machine.

The user interface is a man-machine interface. It must be operable in a simple manner, and distinctively and impressively present necessary information to an operator. The user interface according to the present invention is user friendly and intelligible to beginners, and simple to use for experienced operators. The main interface allows a user to directly select desired functions, and exactly and quickly provides necessary information to operators by using colors, icons, and buttons.

Operability constitutes an important factor in evaluating the user interface. To improve the operability of the user interface, the user interface is provided with a color display or monitor 501 and a hard control panel 502 placed by the monitor, as shown in FIG. 23(a). A creative color display provides legible menus to users. Further, an infrared ray touch board 503 is disposed on the periphery of the color display 501. Use of the touch board allows a user to directly access the machine by soft buttons to be displayed in the display screen of the display 501. Various types of operations are properly assigned to the hard buttons on the hard control panel 502 and the soft buttons in the screen of the display 501 to provide simple operations and effective use of menu displays. The color display 501 and the hard control panel 502 are provided on the rear side with a monitor control/power supply board 504, a video engine board 505, and a CRT driver board 506, and the like, as shown in FIGS. 23(b) and (c). As shown in FIG. 23(c), the hard control panel 502 is inclined toward the front of the display 501.

It is noted that the color display 501 the color display with the hard control panel 502 is placed atop a support arm 508 standing erect on the base machine 507, viz., not directly placed on the base machine. Since the stand type of the color display 501, not the console panel that is used in the conventional machine, is used, the display may be installed above the base machine 507. Particularly, when it is located at the right back corner, the copier may be designed without having to take the console panel space into account. A compact copier may, therefore, be designed.

The platen or the base machine is waist high, which is best for a user to set an original on the platen table. This height limits the design freedom in selecting the height of the base machine. The conventional console panel is mounted on the top of the base machine. The console is placed substantially at the height of the waist, and access to the console panel by the hands is easy. However, the display and operating sections for selecting the various functions and for setting the conditions to execute the functions are relatively remote from the operator's eyes.

In the case of the user interface of the present invention, the display and operating sections are placed above the platen and more level with the operator's eyes. Such a placement makes it easy to operate the machine and provides additional space to accommodate the control board and option devices including a memory card device, a key counter, and the like. Accordingly, when a memory card device is assembled into the copying machine no structural and outer appearance modifications are required for the base machine.

(B) Configuration

Figure 25:
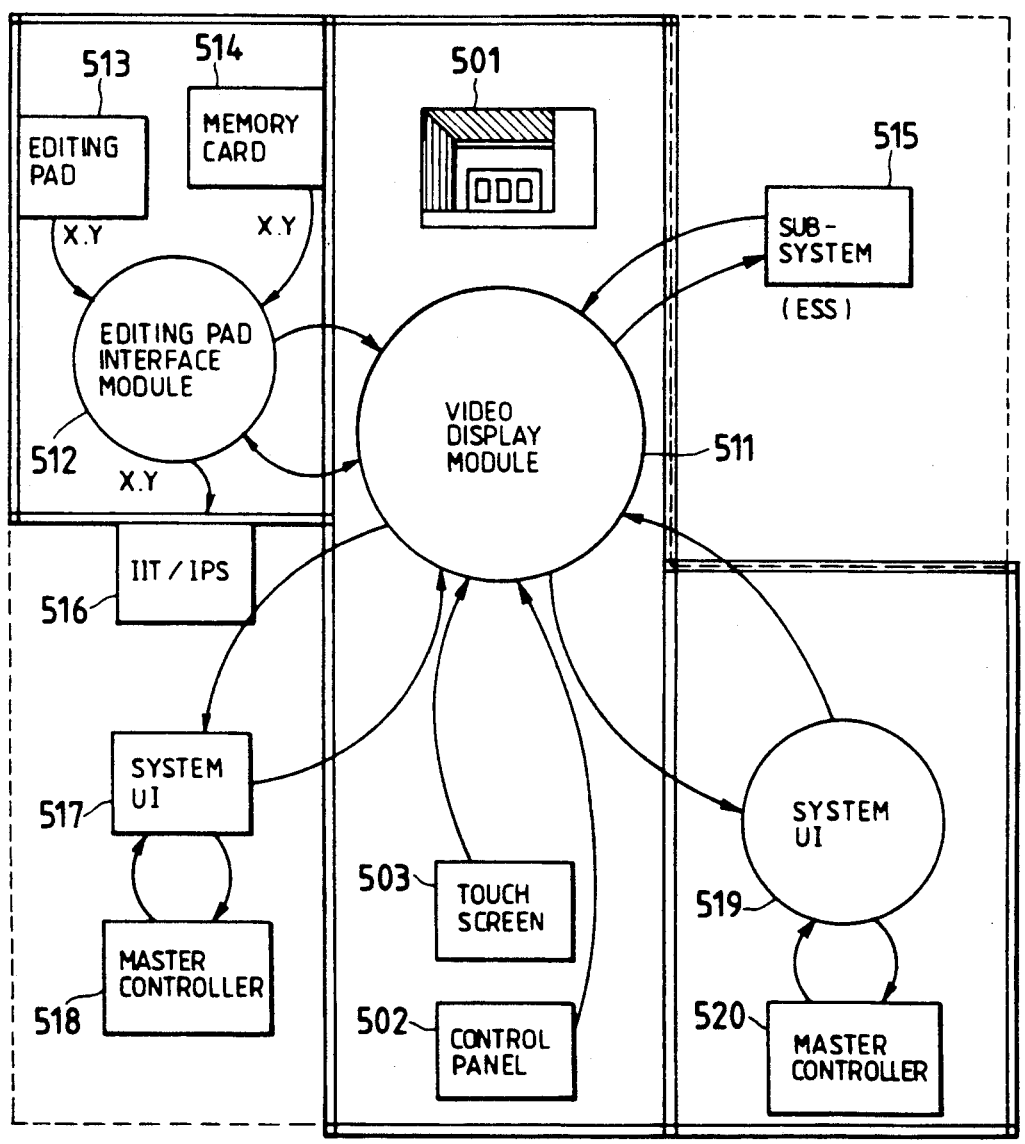
FIG. 25 illustrates the construction of the UI modules.
Figure 26:
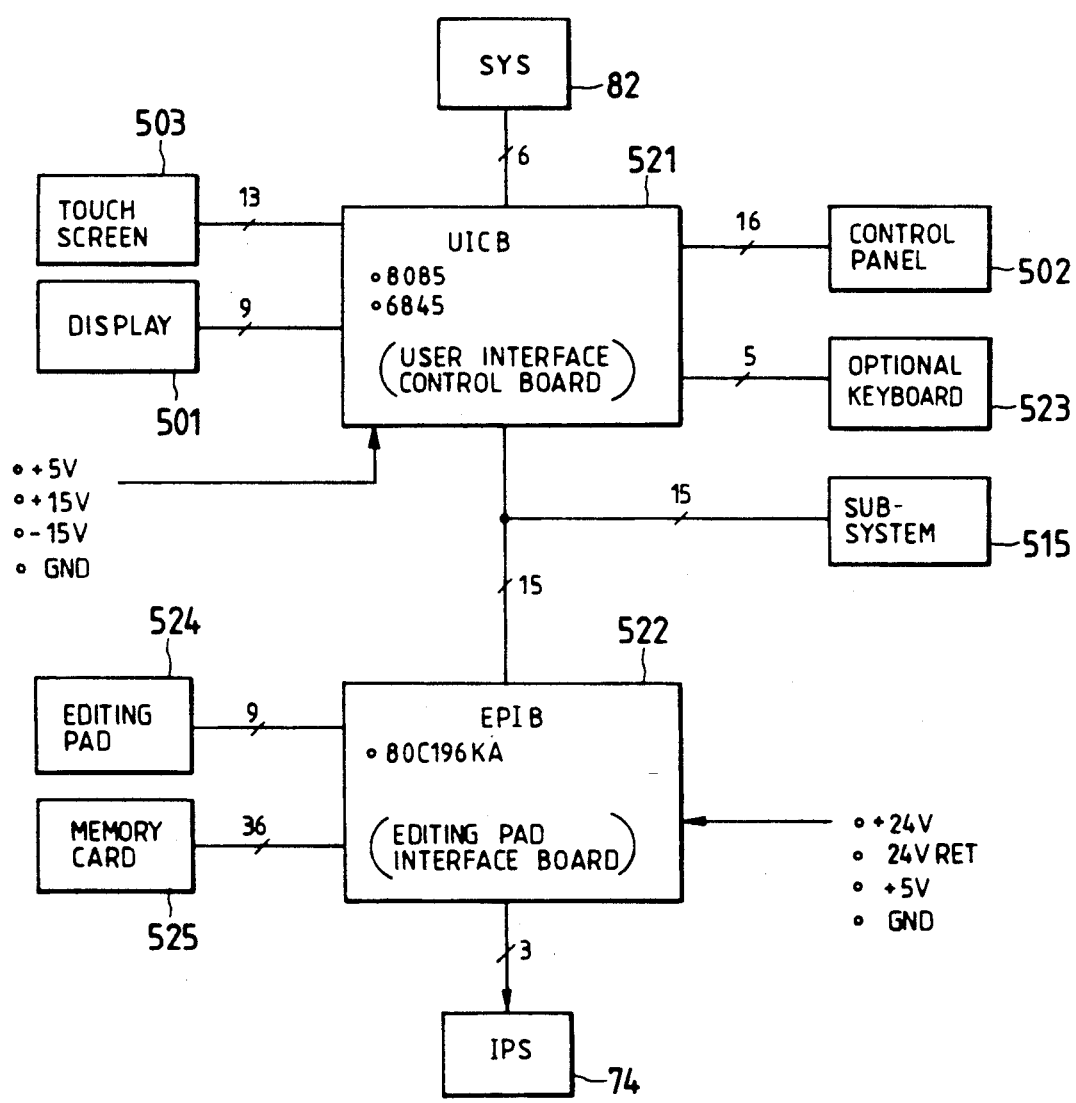
FIG. 26 illustrates the hardware construction of the UI.

FIG. 25 shows a module configuration of the user interface, and FIG. 26 shows a hardware configuration of the same.

As shown in FIG. 25, the user interface of the present invention is composed of a video display module 511 for controlling the display screen of the color display 501, and an edit pad interface module 512 for inputting and outputting an edit pad 513 and a memory card 514. System UIs 517 and 519 and a subsystem 515 for controlling the above modules, and a touch screen 503 and a control panel 502 are connected to the video display module 511. The edit pad interface module 512 enters X and Y coordinates data from the edit pad 513, and receives jobs and X and Y coordinates from the memory card 514, sends video map display data to the video display module 511, and transfers UI control signals to and from the video display module 511.

An area designation consists of a marker designation to designate a specific area on an original by a red or blue marker for effecting trimming and color change process, a 2 point designation by using coordinates data in a rectangular area, and a closed loop designation by tracing an edit pad. The marker designation has no data in particular. The 2 point designation is for designating a small amount of data. The closed loop designation needs a large amount of data for the area to be edited. The IPS is used for the editing data. The amount of the data is too large to transmit at high speed. For this reason, the transfer line connected to the IIT/IPS 516 and exclusively used for transmitting the X and Y coordinates data is provided separately from the ordinary data transmission line.

The video display module 511 enters vertical and horizontal input points (coordinate positions on the touch screen) on a touch screen 503, recognizes a button ID, and enters a button ID on the control panel 502. Further, the video display module 511 sends a button ID to the system UIs 517 and 519, and receives a display request from the system UIs 517 and 519. The subsystem (ESS) 515 is connected to a work station and a host CPU, for example, and serves as a print controller when the copying machine is used as a laser printer. In this case, the data of the touch screen 503, control panel 502, and keyboard (not shown) is transferred to the subsystem 515. The contents in the display screen are sent from the subsystem 515 to the video display module 511.

The system UIs 517 and 519 transfer the copy mode and machine state data to and from master controllers 518 and 520. In connection with the software architecture shown in FIG. 4, one of the system UIs 517 and 519 is the SYSUI module 81 in FIG. 4, and the other is the MCBUI module 86 of the MCB remote.

The hardware of the user interface according to the instant invention is made up of a couple of control boards, UICB 521 and EPIB522, as shown in FIG. 26. In connection with the above module configuration, the functions of the user interface are also categorized into two groups. The UICB 521 uses two CPUs, such as Intel 8085 and 6845 microprocessors or their equivalents in order to control the hardware of the UI, to drive the edit pads 513 and 514, and to process the received data of the touch screen 503 and to write the results on the CRT screen. The EPIB 522 uses a CPU of 16 bits such as 80C196KA made by Intel, and transfers the depicting data of the bit map area to the UICB in the DMA mode. The 16-bit CPU is used because a CPU of 8 bits is unsatisfactory to depict data in the bit map area. In this way, the many functions used are decentralized.

Figure 27:
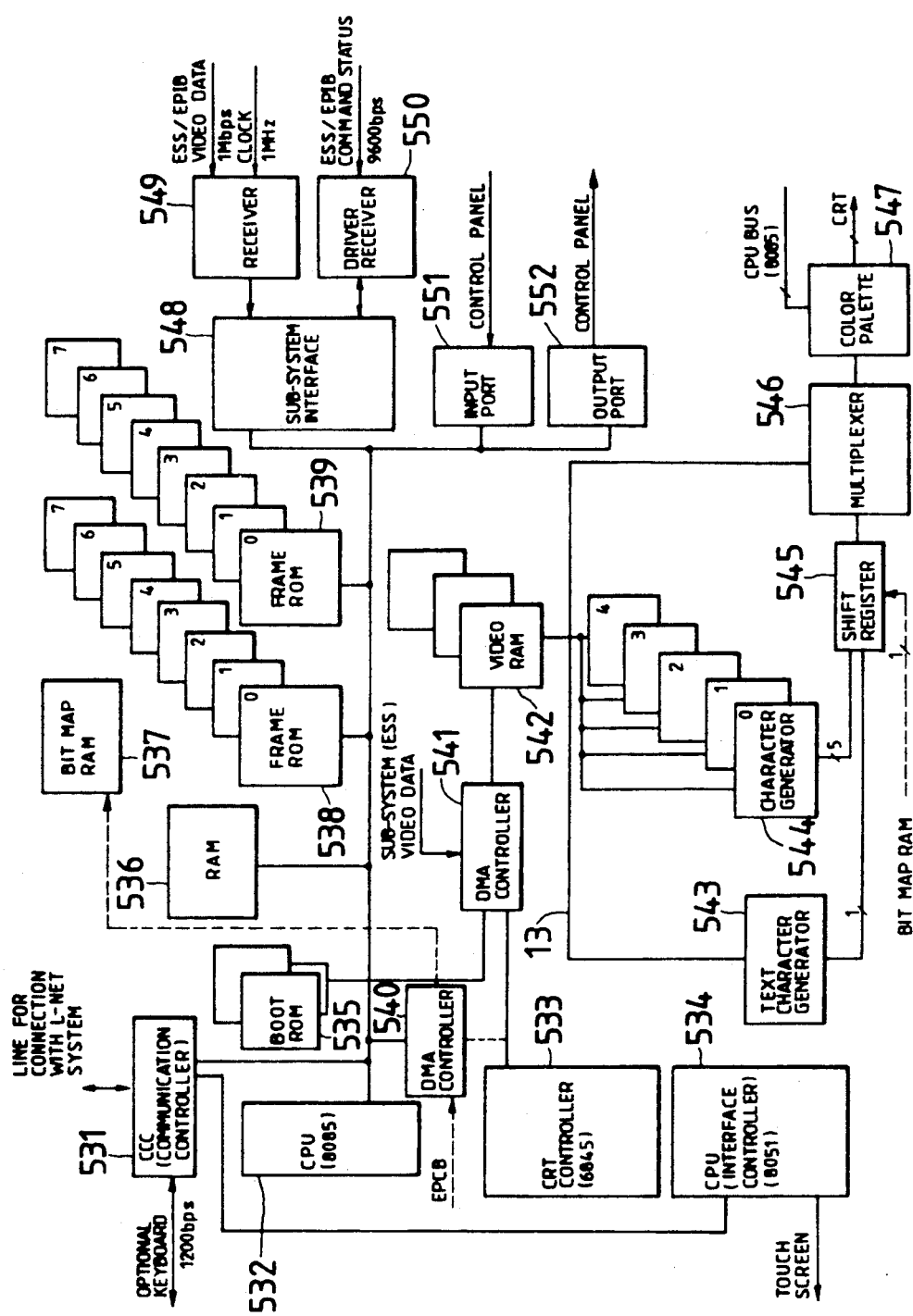
FIG. 27 illustrates the configuration of the UICB.

FIG. 27 shows a circuit arrangement of the UICB. The UICB uses a CPU 534 such as an Intel 8051 or its equivalent, in addition to the above CPUs CCC 531 is connected to the high speed communication line L-NET or a communication line of an optional keyboard, and it controls the communication by the CPU 534 and CCC 531. Further, the CPU 534 is also used for driving the touch screen. The signals of the touch screen (the coordinate position data) are fetched through the CCC531 into the CPU 532 from the CPU 534. In the CPU 532, the button ID is recognized and processed. The UICB is connected to the control panel through an input port 551 and an output port 552. Further, it receives video data at 1Mb/sec together with a 1 MHz clock signal from the EPIB 522 and the subsystem (ESS) through the subsystem interface 548, receiver 549, and driver 550, and is capable of transmitting and receiving commands and status data at 9600 bps.

The memories used are a boot ROM 535 storing a bootstrap program, frame ROMs 538 and 539, RAM 536, bit map RAM 537, and V-RAM 542. The frame ROMs 538 and 539 store the data with regard to the display screen whose data structure is not a bit map and, therefore, may be handled in the software, viz., not bit map. When a display request arrives through the L-NET, the CPU 532 generates depicting data in the RAM 536 that is used as a work area. The data generated is written into the V-RAM 542 by the DMA 541. The bit map data is transferred from the EPIB 522 to the bit map RAM 537, and written thereinto by the DMA 540. A character generator 544 is for a graphic tile, and a character generator, for a character tile. The V-RAM 542 is controlled by a tile code. The tile code consists of 24 bits (3 bytes). In the tile code, 13 bits are assigned to indicate the kinds of tiles; 2 bits to identify text, graphic or bit map; 1 bit for brink data; 5 bits for color data of the tiles; and 3 bits for data indicative of background or foreground. A CRT controller frames a display according to the tile code data that is stored in the V-RAM 542, and feeds the video data to the CRT screen by way of a shift register 545, multiplexer 546, and color palette 547. Depiction in the bit map area is changed by the shift register 545.

Figure 28:
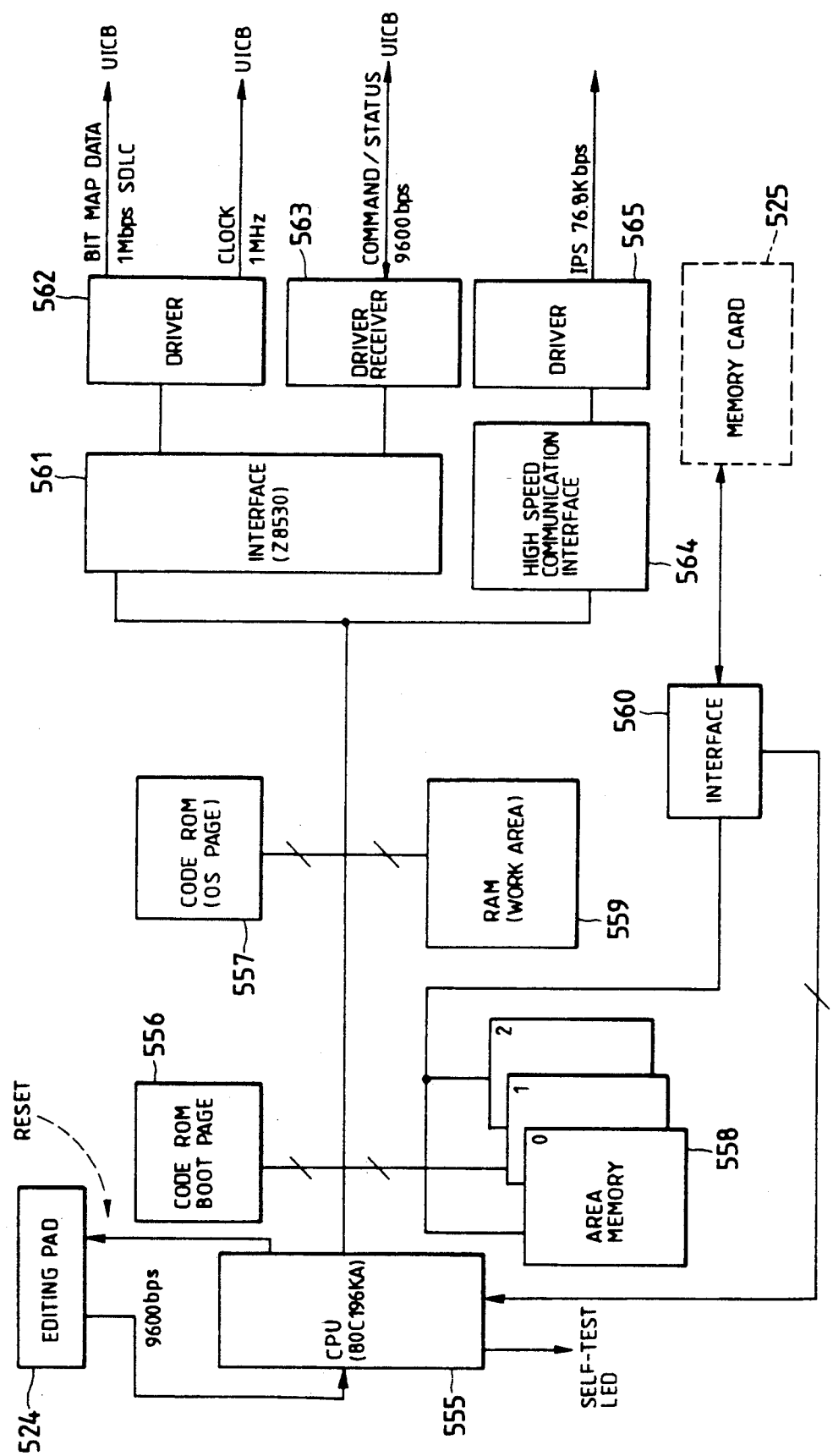
FIG. 28 illustrates the configuration of the EPIB.

FIG. 28 shows an arrangement of the EPIB. The EPIB is made up of a 16-bit CPU 555, such as on Intel 80C196KA or its equivalent, boot page code ROM 556, OS page code ROM 5557, area memory 558, and RAM 559 used as a work area. The EPIB transfers bit map data to the UICB, and transfers commands and status data to and from the same, through a driver 562 and a driver/receiver 563. Through a high speed communication interface 564 and a driver 565, the EPIB transfers X and Y coordinate data to the IPS. Data transfer to and from a memory card 525 is performed through an interface 560. Accordingly, when the EPIB receives the data to designate a closed loop edit area or copy mode data from the edit pad 524 or the memory card 525, the received data is transferred to the UICB through the interface 561 and the driver 562, and to the IPS through the high speed communication interface 564 and the driver 565.

(C) Effective Use of Display Screen

The case use of the display system for the user interface presents a large amount of data of the multi-functioning copying machine. The increased data requires a broad display area, but this is contrary to the concept of a compact machine. If a compact size display is used and all necessary data must be displayed in one display screen, the display density would be unacceptable and further, if it would be realized, the displayed items are illegible to operators.

In the present invention, creations are introduced into the display screen layout and its controls, enabling use of a compact display. The color display can provide various display modes by controlling many attributes of the display, for example, color, brightness, and the like. In this respect, the color display is superior to LEDs and LCDs used in the conventional console panel. By making use of the advantageous features, a legible display is obtained with a compact display unit.

For example, the information to be displayed on the display screen is categorized into a plurality of groups of information. These groups of information are displayed in a plurality of displays. With regard to one display, the detailed information is displayed in a pop-up manner, and is not displayed in the primary display screen. Accordingly, the display is concise and clear with only necessary information. For the display containing different items of information, color and emphatic indications are used so that the operator can readily and distinctly recognize the necessary information on the display screen from among the information.

a. Screen layout

Figure 29A:
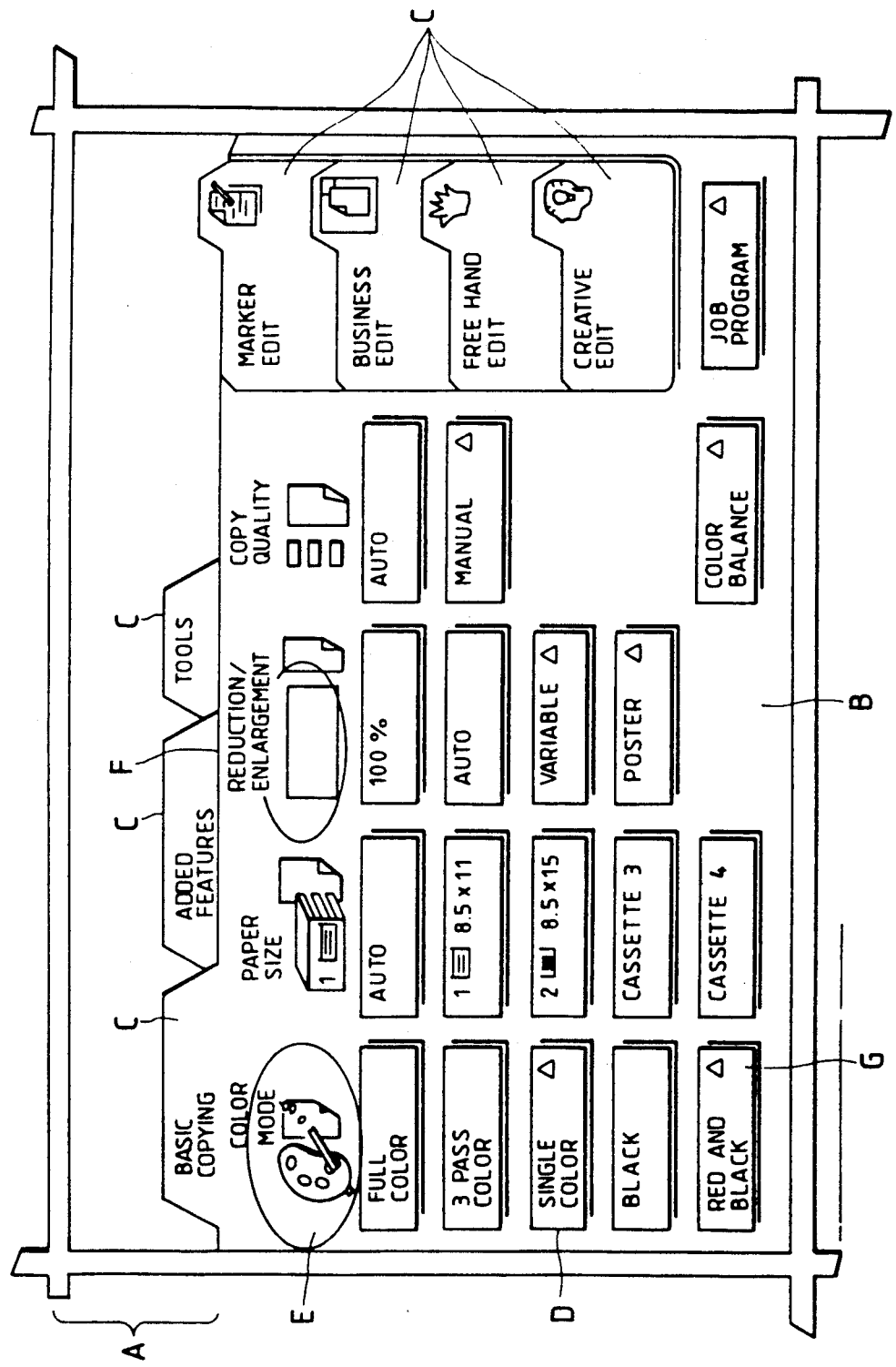
FIGS. 29a-29c illustrate an example of the display screen composition.
Figure 29B:
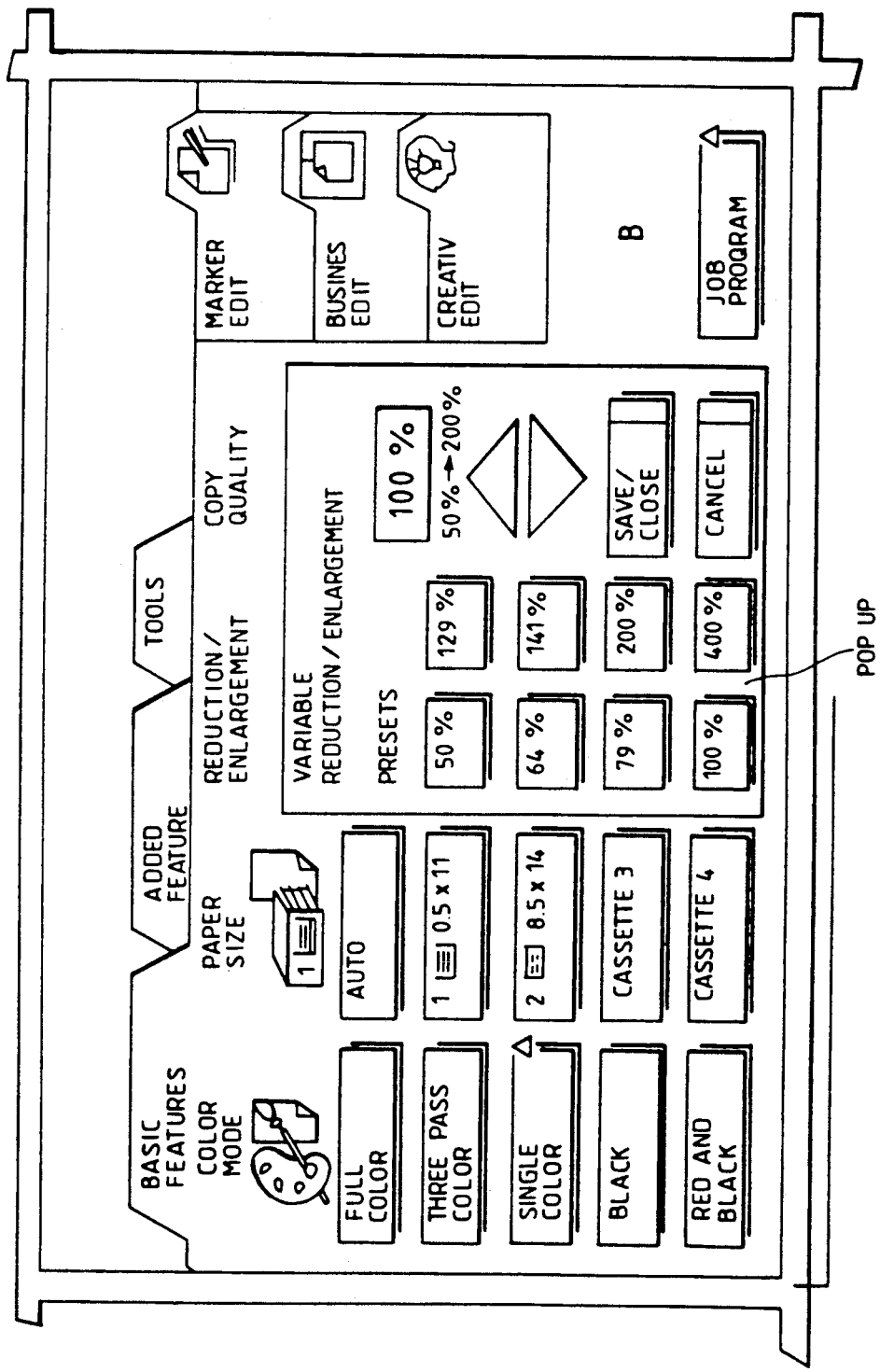
Figure 29C:
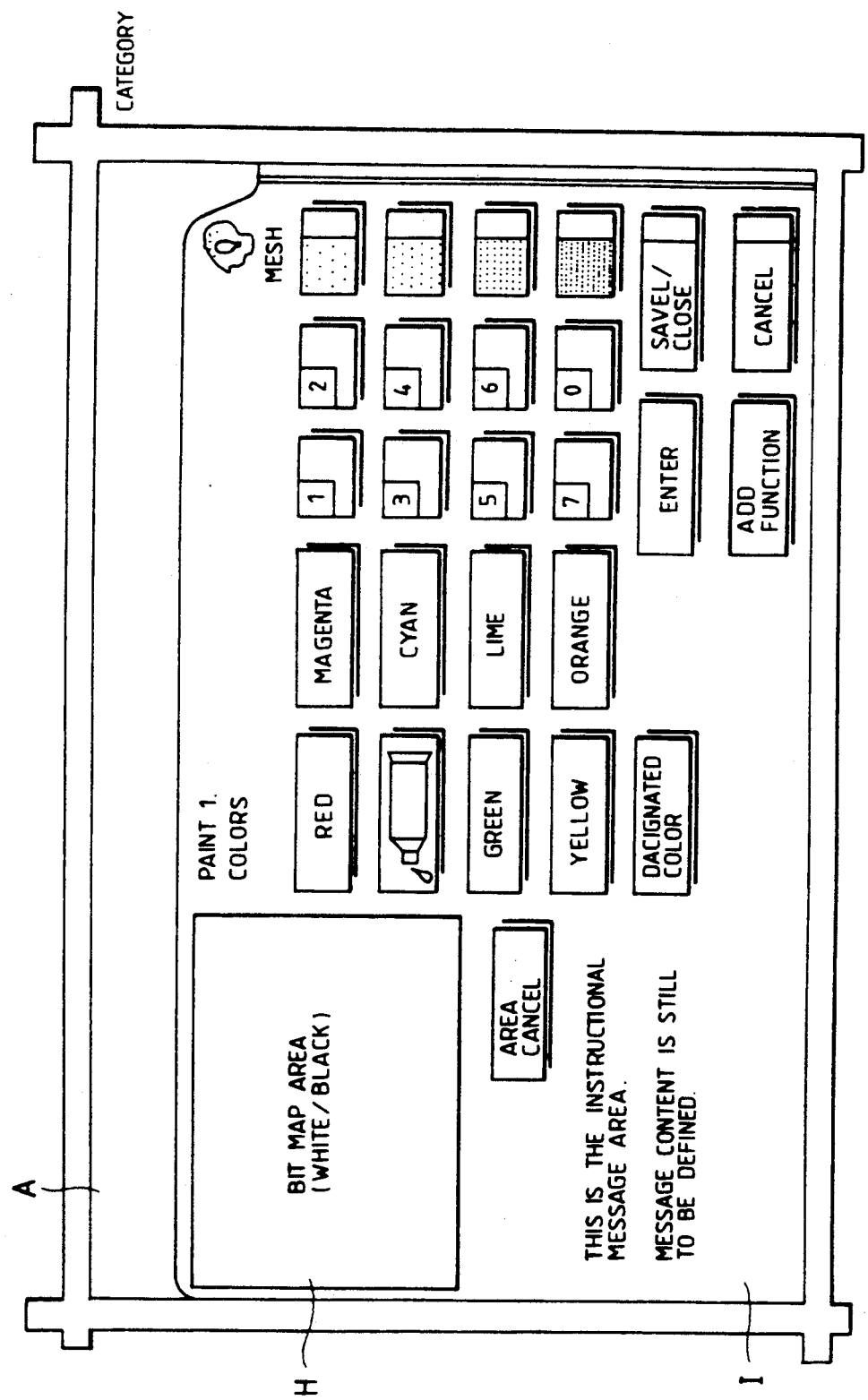

FIG. 29 shows some layouts of display screen. FIG. 29(a) shows a basic copy display. FIG. 29(b) shows a display in which a pop-up display is inserted in the basic copy display. FIG. 29(c) shows a paint 1 display of the creative edit.

In the user interface according to the present invention, an initial display is the basic copy display for setting copy modes as shown in FIG. 29. The display for setting copy modes is divided into two sections, a message area A and a pathway area B, as shown in FIG. 29.

The message area consists of the upper three lines on the screen. The first line is for a statement message. The second and third lines are for various messages, such as a guide message when different functions are contradictively selected, a message showing a fault state of the machine, and an alarm message. The right end portion of the message area is used as an area for displaying the number of copies, such as the number of copies set by a ten key keypad, and the number of copies under copying operation.

The pathway area B is an area for selecting various functions, and contains many pathways of a basic copy, added feature, marker edit, business edit, free hand edit, creative edit, and tool. The pathway tabs C for those pathways are displayed. Each pathway uses a pop-up function for improving operability. The pathway area B further contains soft buttons D as choices for selecting functions by touching it by the finger, an icon (picture) E for indicating the function selected, and an indicator F for indicating magnification percentages. Those soft buttons with the pop-up functions are each marked with a pop-up mark G of delta ($\Delta$). By touching the pathway tab C, the pass-way of the touched tab is opened. By touching the soft button, the function indicated by the touched soft button is selected. For gaining a good operability, the soft buttons D are arrayed so that for function select, those buttons are operated in the order from the left upper button to the right lower button.

The basic copy display and other displays are sorted to maximize a community between it and other devices, and between the soft panel and the hard console panel. Further, the edit displays each consist of a plurality of levels that can be selected in accordance with the degree of skill of the operator. Further, the pop-up function is used. Of those functions displayed, the functions requiring a high level of technique or complicated functions are displayed in a pop-up manner.

The pop-up display has detailed setting items data for a specific function. The display has a pop-up open function. To see detailed setting items data, the pop-up is opened. With this, the display of each pathway is easy to see and is simple. The pop-up display is opened by touching the soft button with the pop-up mark and is closed when a close button or a cancel button or an all-clear button are pushed, or when an auto clear function operates. A display shown in FIG. 29(c) appears when the reduction/enlargement function is selected, the pop-up display is opened by touching a variable reduction/enlargement soft button.

In the basic copy display, when the pathway tab for the creative edit is touched, the display is changed to the screen of the creative edit pathway. The display of paint 1 of those creative edit pathway displays is shown in FIG. 29(c). The display includes a bit map area H and an instructional message area I. The bit map area H is located in the left upper portion in the screen. When an edit area is designated by the edit pad, a single color bit map is displayed in the area. An instructional message area I is located in the lower left portion in the screen. By using this area, instructive messages for edit work are presented to the operator As a matter of course, the message differs with the type of the edit work. In the screen, a work area occupies an area except for the bit map area H, instructional area I, and the message area A in the upper portion of the screen.

b. Basic copy display

As shown in FIG. 29(a), the pathway for the basic copy includes soft buttons (choices) for selecting the color mode, paper select, reduction/enlargement, copy image quality, color balance, and job program, and the pathway tabs for the maker edit, business edit, freehand edit, and creative edit, and the edit feature and tool. This pathway is an initial pathway as is displayed after power on and when an auto clear mode is set up by pushing the all clear button.

The color mode consists of five modes, a full color (4 pass color) mode using four colors Y, M, C, and K for copy, 3-pass color mode using three colors except color K, single color mode using a single color selected from among 12 colors, black mode, and black/red mode. A default automatically selected may be set appropriately.

The single color mode and the black/red mode have detailed setting items Accordingly, these modes are displayed in a pop-up code.

The paper select mode consists of an automatic paper select (APS), tray 1 and tray 2, cassette 3 and cassette 4. The APS functions when a specific magnification is set in the reduction/enlargement mode, and does not function when an auto magnification select (AMS) mode is set up. The default is the APS.

The reduction/enlargement mode has two choices, 100%, an AMS for determining a magnification on the basis of document size and paper size when paper of a specific size is set, and a variable magnification select. In this mode, a set, calculated on auto magnification is indicated by the indicator on the top. In the variable magnification select, a magnification may be set in steps of 1% in the range from 50% to 400%. The magnifications in the vertical and the horizontal directions may independently be set. Accordingly, these detailed items are displayed in the pop-up mode The default is 100%.

In respect to the reduction/enlargement, as described above, the magnification in the vertical scan direction (X direction) is adjusted by controlling the scan speed. The magnification in the main scan direction is adjusted by changing the method of reading data from the line memory in the IPS.

The copy image quality consists of two choices, an auto mode and a manual mode. In the auto mode, an optical density is automatically controlled for a mono color document, and a color balance is automatically controlled for a color document. In the manual mode, the pop-up technique is used for controlling the optical density of the document in seven steps. The control is carried out by the IPS.

The job program is effective only when a memory card is inserted into a slot of the card reader. In this mode, jobs can be written into and read out of the memory card. The memory card used in this instance has 32 K bytes and is capable of storing a maximum of 32 jobs. Accordingly, all other jobs than that of the projector mode can be programmed.

c. Edit feature display

The pathway of the bit feature display includes soft buttons (choices) for selecting a copy output, copy sharpness, copy contrast, copy position, film projector, page programming, job program, and binding margin, and the pathway tabs for the maker edit, business edit, freehand edit, and creative edit, and the basic copy and tool.

The copy output has two choices, a top tray and a sort mode. The default is the top tray, and when no sort mode is used, this item is not indicated.

The copy sharpness has three choices; standard, manual, and photo. In manual mode, the pop-up display is used and control in 7-steps is possible. In the photo mode, the pop-up display is used. It contains items of photo, character, print and photo/character. The control for this is carried out in the IPS.

The copy contrast has a copy contrast control in seven steps. The copy position has a choice of an auto center function in which the center of the copy image is positioned at the center of paper by the default.

The film projector is used for copying images on various kinds of films, and will be described in detail later. The pop-up display is used for selecting any of 35 mm negative and 35 mm positive by the projector, and 35 mm nega. 6 cm×6 cm slide, and 4"×5" slide on the platen.

The page programming has choices of cover mode for applying a cover to copies, insert mode for inserting white or color paper into copied papers, color mode to set color copying for every page of the document, and paper to select a desired tray for every page of the document. This item is not displayed when the ADF is not set up.

In the binding margin mode, the margin may be set in steps of 1 mm in the range of 0 to 30 mm. The binding margin designates one location for one document. The length of the binding margin is from the lead end of the paper to the lead end of an image area. The length of the margin in the main scan direction is adjusted by a shift operation by the line buffer in the IPS. The length of the margin is adjusted by shifting the scan timing of the IIT.

d. Edit display and tool display

The edit display consists of four pathways, the marker edit, business edit, free hand edit, and creative edit.

The marker edit pathway and the free hand pathway have choices of extract, delete, color application (mesh-/line/solid), and color change. Further, it has pathway tabs of a basic copy, edit feature, and tool.

The business edit pathway has choices of extract, delete, color application (mesh/line/solid), color conversion, coloring, logotype insertion, and binding margin. Further, the business edit, like the marker edit pathway, etc., has pathway tabs of a basic copy, edit feature, and tool.

The creative edit pathway has choices of extract, delete, color application (mesh/line/solid), color conversion, coloring, logotype insertion, binding margin, negative/positive inversion, inlay composition, transparency composition, paint, reflected image, repeat, enlargement, continuous projection, partial movement, corner/center movement, manual/auto one-side magnification, color mode, color balance control, page continuous copy, and color composition. Further, the creative edit, like the marker edit pathway, etc., has pathway tabs of a basic copy, edit feature, and tool.

The tool pathway is used by key operators and customer engineers. This pathway is opened by entering a password. Choices of the tool pathway are: an auditron, machine initial value set-up, select of default of the respective functions, color registration, film type registration, fine adjustment of registered color, preset of the respective choices of the machine, setting of a film projector scan area, audio tone (kind of tone and volume), setting of timers for the paper transport system and others (auto clear, etc.), billing meter, setting of dual languages, diag. mode, max. control value, and memory card format.

The default select is directed for the color mode, paper select, copy density, copy sharpness, copy contrast, paper tray for page programming, color of the single color, color and mesh of a color palette for color application, pattern of a logotype, binding margin, and color balance.

e. Other display controls

In the user interface, progress of the copying operation is constantly monitored. When jamming occurs, the user interface displays the jamming occurrence. In respect to the function settings, an information display for presenting the information of the current display is provided, which is ready for display at all times.

The displays except the bit map area are composed of tiles whose width is 3 mm (8 pixels) and height is 6 mm (16 pixels). The width of each display is 80 tiles and the height is 25 tiles. The bit map area is displayed with pixels and its height is 151 pixels and width is 216 pixels.

As described above, the user interface is arranged such that the functions are categorized into different modes such as the basic copy, edit feature, and edit. The displays are assigned to those modes, and accordingly, the display is changed in accordance with the mode used. The display of each mode presents items of function select, setting of conditions for function exercise, and the like. For exercise of a function, a choice is selected by pushing the related soft button. Necessary condition data can be entered while seeing the display. Some of the choices in the menu are displayed in the form of a pop-up display (overlay display or window display). Use of the pop-up display provides a concise and easy-to-see visual presentation, even if the number of selectable functions and conditions settings is large. Accordingly, the operability of the copying machine is improved.

(D) Hardware Control Panel

The hardware control panel, as shown in FIG. 23, is disposed on the right side of the color display panel, and is slightly bent toward the center. The control panel is provided with various buttons of ten keys, ten key clear, all clear, stop, interrupt, start, information, audiotron, and language.

The ten key buttons are used to set the number of copies, to enter codes and data, and to enter a password when the tool is used. These buttons are invalid when a job occurs or it is interrupted.

The all clear button is used to return all of the copy modes to default values, and to return the displays to the basic copy display except when the tool display is opened. When an interrupt job is being set, the copy mode returns to the default, but the interrupt mode is not removed.

The stop button is used to interrupt the job at a proper place to end in the copy during the execution of copying operation, and to stop the machine after the copied paper is delivered outside. In the diag. mode, it is used to stop (interrupt) the input/output check.

The interrupt button is used to set up an interrupt mode during the primary job except when the job is interrupted, and returns control to the primary job when control is being interrupted. When this button is operated during the execution of the primary job, the machine is placed into a reserve mode, and the job is interrupted or ends at the end of delivering the copied paper.

The start button is used to start the job or to restart the interrupted job. In the diag. mode, it is used to enter and save codes and data, and to start the inputting and outputting of the same. When the machine is being preheated, if this button is operated, the machine automatically starts at the end of preheating.

The information button consists of an on button and an off button. These buttons are in a ready state except the progressing of copying operation. When the on button is operated, an information display for the display being currently presented appears. To remove the information display, the off button is operated.

The auditron button is used to enter a password at the start of a job. The language button is used to select a desired language of expressions in the display from among a plurality of languages. The hard control panel is also provided with LEDs for indicating operations of the respective buttons.

(II-5) Film Image Reader

(A) General

The film image reader, as shown in FIG. 2, is composed of a film projector (F/P) 64 and a mirror unit (M/U) 65.

a. File Projector (F/P)

Figure 30:
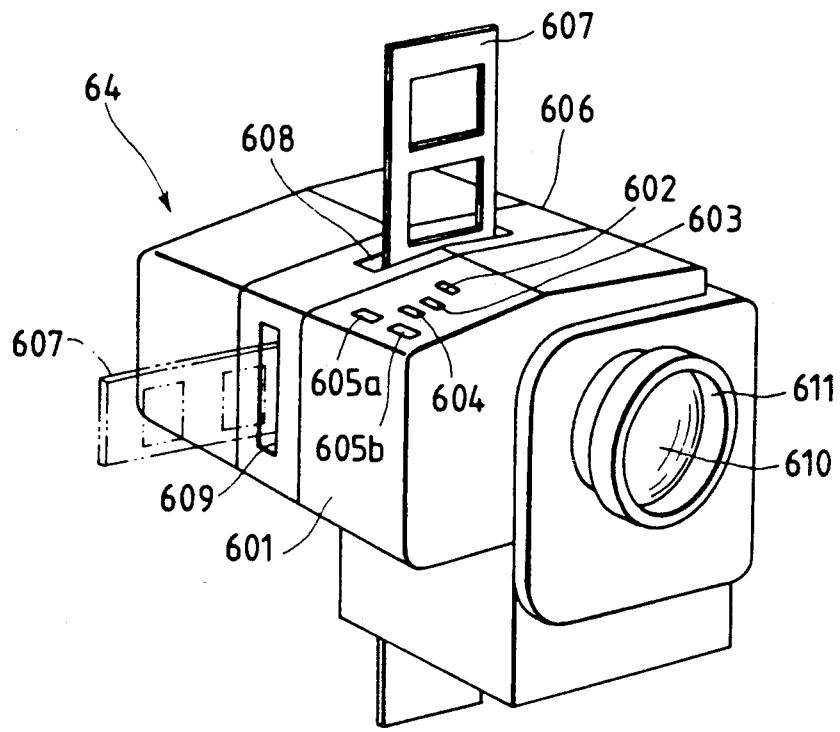
FIG. 30 illustrates a perspective view of the F/P.

As shown in FIG. 30, the F/P is provided with a housing 601. The housing 601 is further provided with an operation check lamp 602, manual lamp switch 603, auto focus/manual focus (AF/MF) select switch 604, and manual focus (M/F) operation switches 605a and 605b. The housing 601 is further provided with an open/close member 606 swingable for opening and closing. Slots 608 and 609 are formed in the upper surface and the sidewall of the open/close member 606. A film holder 607 holding an original film 633 is inserted into the housing 601 through either of these slots. In use, these slots are selectively used in accordance with the orientation of the image recorded in the film 633. Slots (not shown) are additionally formed in the bottom surface and the wall opposite to the above. Through these slots, the film holder 607 may be ejected. The open/close member 606 is hinged to the housing 601 or removably mounted to the housing 601. With provision of the open/close member 606 thus mounted, when foreign material enters the housing 601, an operator opens the member 606, and may remove the material.

In this instance, two types of film holders are used, one for 35 mm negative film, and the other for 35 mm positive film. The F/P 64 accepts these types of films, and further negative films of 6 cm×6 cm and 4"×5". In the case of negative film, it is placed close between the M/U 65 and the platen glass 31.

Figure 33:
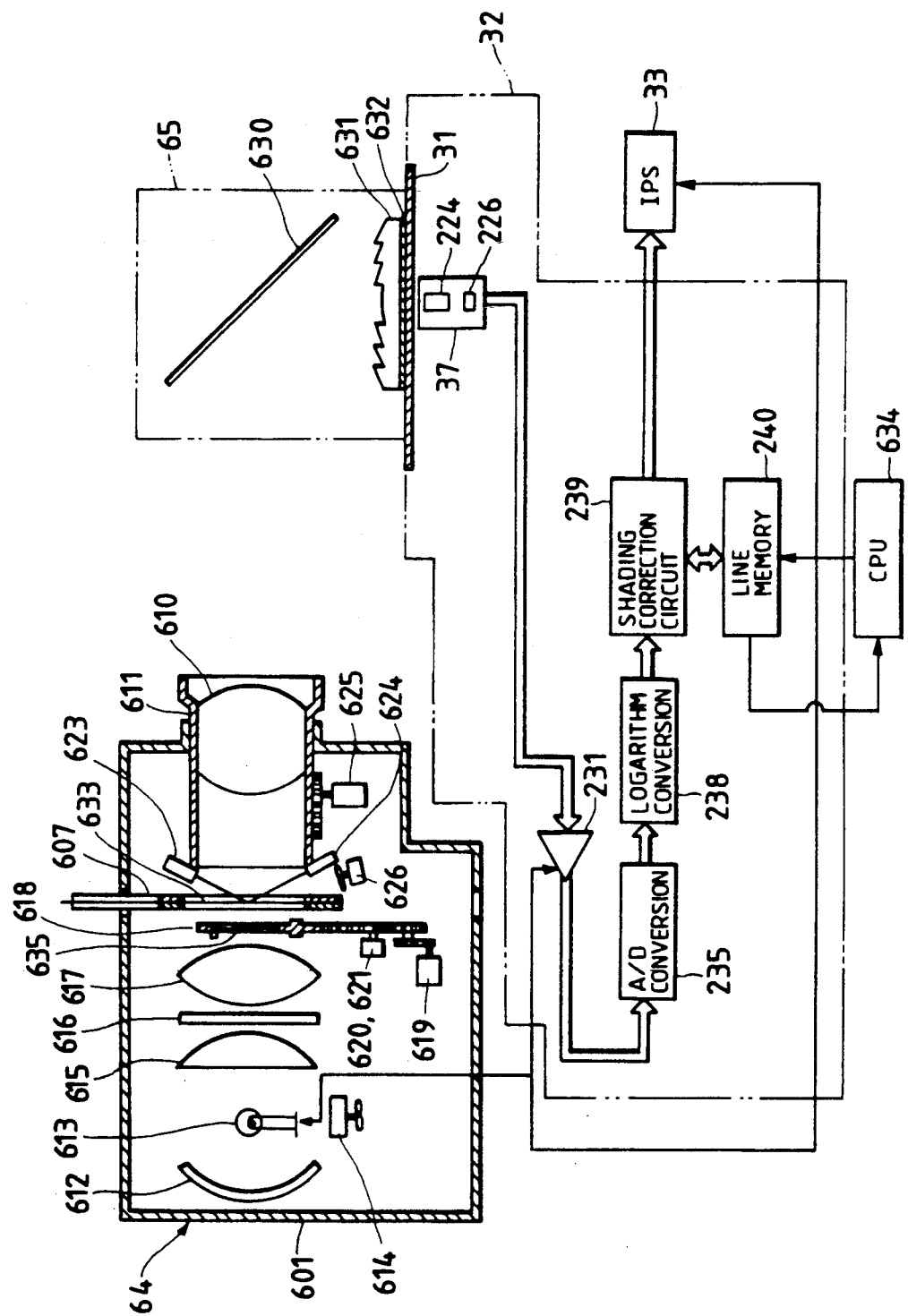
FIG. 33 illustrates a configuration of the F/P and the relationship between the F/P, the M/U and IIT.

As shown in FIG. 33, a lens holder 611 holding projection lens 610 is slidably supported in the right portion of the housing 601 as viewed in the drawing.

Within the housing 601, a reflector 612 and a light source lamp 613 such as a halogen lamp is disposed in alignment with the projection lens 610 with respect to an optical axis. A cooling fan 614 for cooling the lamp 612 is disposed near the lamp 613. An aspheric surface lens 615 for converging rays of light from the lamp 613, heat wave absorbing filter 616 for cutting off the light of a predetermined wave length, and a convex lens 610 are disposed on the right side of the lamp 613 and in alignment with the same with respect to the optical axis.

An auto exchanger for correction filter is installed on the right side of the convex lens 617. The auto filter exchange includes a correction filter holder 618, motor 619, first and second position sensors 620 and 621, and controller (not shown, but is housed in the F/P 64). The filter holder 618 holds a correction filter 635 for correcting the film density of the 35 mm negative film and the positive film. The correction filter illustrated is for one of the two types of films. The motor 619 drives the filter holder 618.

The first and second position sensors 620 and 621 are for detecting angular displacements of the filter holder 618. In use, a correction filter corresponding to the original film 633 is automatically selected from those contained in the filter holder 618, and is aligned with the projection lens 610 and other lenses with respect to the optical axis. The auto filter exchanger 635 may be any other place than the above, if it lies on an optical axis of the projection light, for example between the platen glass 31 and the imaging unit 37.

An auto focus device is further installed, which is composed of a light emitting means 623 such as a photo diode and a photo sensor 624 that operate in connection with the lens holder 611, and a motor 625 for sliding the lens holder 611 of the projection lens 610 with respect to the housing 601. When the film holder 607 is inserted through the slot 608 or 609 into the housing 601, the original film 633 contained in the film holder 607 is positioned between filter holder 618 and the paired photo diode 623 and photo sensor 624. A fan 626 for cooling the original film 633 is located near the place where the original film 635 is set.

A power supply for the F/P 64 is different from that for the base machine 30, but may be installed within the base machine 30.

b. Mirror Unit (M/U)

Figure 31:
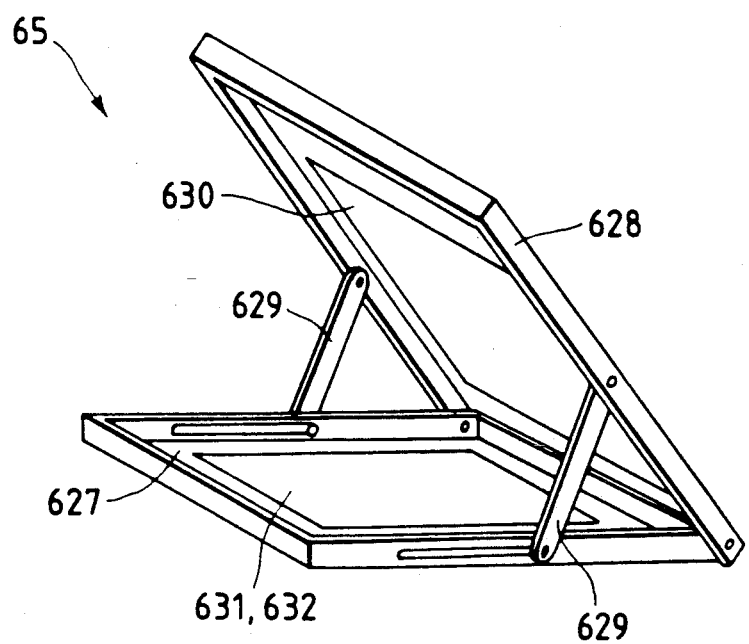
FIG. 31 illustrates a perspective view of the M/U.

As shown in FIG. 31, the mirror unit (M/U) 65 is made up of a bottom plate 627 and a cover 628 swingably mounted at one end of the bottom plate 627. Supports 629 are coupled between the bottom plate 627 and the cover 628. The supports 629 support the cover 628 at 45° with respect to the bottom plate 627 when the bottom plate is fully opened. A mirror 630 is mounted to the rear side of the cover 628. The bottom plate 627 has a large opening which is filled with a fresnel lens 631 and a diffusion plate 632.

As best illustrated in FIG. 33, the fresnel lens 631 and the diffusion plate 632 are formed by a single acrylic plate. The top surface of the acrylic plate constitutes the fresnel lens 631, and the bottom surface constitutes the diffusion plate 632. The fresnel lens 631 converts the light reflected from the mirror 630 that otherwise will spread out, into parallel rays of light to prevent the peripheral portion of an image from being darkened. The diffusion plate 632 slightly diffuses the parallel rays of light to an extent to prevent the line sensor 226 from detecting a shadow of the selfoc lens 224 within the imaging unit 37.

When the color copying using the F/P 64 is not selected, the mirror unit 65 is folded and stored in a given storage place. In use, it is opened and placed at a predetermined location on the platen glass 31 of the base machine 30.

(B) Major Functions a. Auto exchange of correction filter

The halogen lamp as is generally used as the light source lamp 613 of the F/P 64 has a spectral characteristic of more red (R) than blue (B). When, with the light emitted from the halogen lamp, an image on a film is projected, a ratio of red (R), green (G) and blue (B) of the projection light is influenced by the spectral characteristic of the lamp. Therefore, some correction of the spectral characteristic of the halogen lamp must be made.

A variety of the film recording images exist, such as negative films and positive films. The negative and positive films per se each consist of many types of films. These films are featured by their own spectral characteristics, respectively. For example, in the case of the negative film, the transmittance of R is high and the transmittance of B is low. Accordingly, for negative film the spectral characteristic must be corrected to increase the amount of blue light.

The F/P 64 is provided with a correction filter effecting such a correction of the spectral characteristic. In the F/P 64, these correction filters are automatically exchanged by the auto filter exchange as already discussed. More specifically, a microprocessor (CPU) in the system (SYS) issues a 2-bit command signal to set a correction filter corresponding to the original film 633 at a predetermined position. In response, the controller drives the motor 619 so that 2-bit signals derived from the first and second position sensors 620 and 621 coincide with the 2-bit command signal from the CPU. When these signals are coincident, the controller stops the motor 619 and the correction filter corresponding to the original film is automatically set at the predetermined position. In this manner, the correction filter can be exchanged readily and exactly.

b. Original film inserting direction detection

The original film 633 may be inserted into the housing through either of the slots 608 and 609. In other words, in accordance with the orientation of the image of the film, the film may be inserted into the housing vertically or horizontally. In this case, at least one of the slots 608 and 609 is provided with a film detecting switch. In other words, at least one film detect switch is provided. If the slot 608 has the film detect switch, the film holder 607 is inserted through the hole 608, detect the film and to turn on and produce a detect signal. When the detect signal is present, a necessary area of the line sensor 226 is vertical, that is, the scanning direction is set to be coincident with the longitudinal direction of the projection image. When the film holder 607 is inserted through the slot 609, the switch is in off state and no detect signal is produced. When the detect signal is absent, the necessary area is lateral, viz., the main scan direction is set to be in the longitudinal direction of the projection image.

Also, when the film detect switch is provided in the slot 609 alone, or both the slots 608 and 609 have switches, when the film holder 607 is inserted through the slot 608, the necessary area of the line sensor 226 is set so that the vertical scan direction is in the longitudinal direction of the projection image. When the film holder 607 is inserted through the slot 609, the necessary area of the line sensor 226 is set so that the main scan direction is in the longitudinal direction of the projection image. That is, the on and off signals of the film detect switch are set so as to set up the above operations.

c. Auto focus (AF) function

When the film holder 607 is set to the F/P 64, the original film 633 must be positioned with a precision of several tens mm. Therefore, after the original film 633 is set, a focusing operation is required To manually effect the focusing, an image of the original film 633 is projected onto the diffusion plate 632 of the M/U 65, an operator slides the projection lens holder 611 for focusing, while seeing the projection image. In this case, the image projected onto the diffusion plate 632 is hard to see and therefore, it cannot be expected that exact focusing is attained. To cope with this, the F/P 64 is arranged to automatically focus the projection image when it is set to the F/P 64.

The AF function is exercised by the AF in the following way. A related key on the display of the U/I 36 is operated to set up an F/P mode. The photo diode 623 emits light. In FIG. 30, the AF/MF select switch 604 is set to the AF side. The AF is ready for operation. As shown in FIG. 33, when the film holder 607 containing the original film 633 is set, the light from the photo diode 623 reflects at the original film 633. The reflected light is detected by the photo sensor 624 of the two element type, for example, for the AF purposes.

The two elements of the photo sensor 624 produces signals amounting to the amount of the reflected light, and applies it to a CPU 634. The CPU 634 calculates a difference of these signals. When the difference is not 0, the CPU produces a signal and drives the motor 625 in the direction to reduce the difference. With the rotation of the motor, the projection lens holder 611 slides. With the sliding of the lens holder, the photo diode 623 and the photo sensor 624 both move. When the difference between the signals of the sensors is reduced to 0, the image is in focus and the CPU 634 stops the motor 625.

In this way, the AF operation is carried out. As seen from the above, when the film holder containing the original film is loaded into the F/P 64, the focusing is automatically carried out without any assistance of any manual operation. Consequently, the focusing operation is free from trouble due to manual operation and improperly focused copies are avoided.

d. Manual focusing (MF) function

To exercise this function, the AF/MF select switch 604 is set to the MF side, and the lamp 613 automatically lights up for a predetermined period of time, to set up an MF mode. In this mode, an operator operates the switches 605a and 605b while observing the projection image on the diffusion plate 632. Through the MF, the film image is focused at a specific portion.

e. Manual turn-on of light source lamp

When a manual lamp switch 603 is pushed, the lamp 613 is turned on. The switch is not used in normal mode, but is used for back lighting to copy an image recorded on a relatively thick original including paper, films, and the like, to view a projection image for a long period of time in the AF mode, and to check if the lamp is working.

The instant copying machine is so arranged that by setting the paper size by the U/I 36, an optimum paper size is automatically selected Additionally, when the kind of film used is selected by the U/I 36, a copy area is automatically selected in accordance with the kind of film.

f. Automatic changing of magnification and scanning area

The system is designed to automatically set the proper copy magnification with respect to the paper size selected via the U/I 36. Moreover, the system is capable of automatically selecting the proper copy area with respect to the type and size of film selected via the U/I 36.

g. Automatic shading correction

The ROM of the CPU 634 prestores density data of the orange mask of the ASA 100 of each of negative films produced by FUJI (trade mark), KODAK (trade mark) and KONICA (trade mark). When one of these films is selected, the CPU 634 automatically makes the shading correction on the basis of the density data stored in the ROM. In this case, there is no need for loading the base film of that film into the F/O 64. Further, density data of the orange mask of one type of film other than the above three types of films can be recorded. This data is stored into the RAM in the system of the copying machine.

h. Automatic image quality adjustment

Corrections, for example, gamma ($\Gamma$) correction are performed on the basis of various conditions such as the density characteristic of the original film and exposure conditions at the time of film-recording. Density control and color balance adjustments are automatically carried out.

(C) Image Signal Processing a. Need and principle of image signal correction

General, the image density range of a film is broader than that of a document. The density range differs with the type of film. For example, the density range of positive film is broader than that of negative film. Further, the density range of film depends on film-recording conditions such as exposure light amount, density of an object to be photographed, and brightness at the time of photographing. Actually, the density of the object is broadly distributed over the entire density range of the film.

When the image recorded in the film with the above density characteristic is copied by a copying machine using the light reflected from the image on the film, if the same signal processing as that for the ordinary document copying is used, the reproduced image is unsatisfactory in quality. To cope with this, correction is applied to the read image signal so as to have proper densities for major objects.

Figure 32:
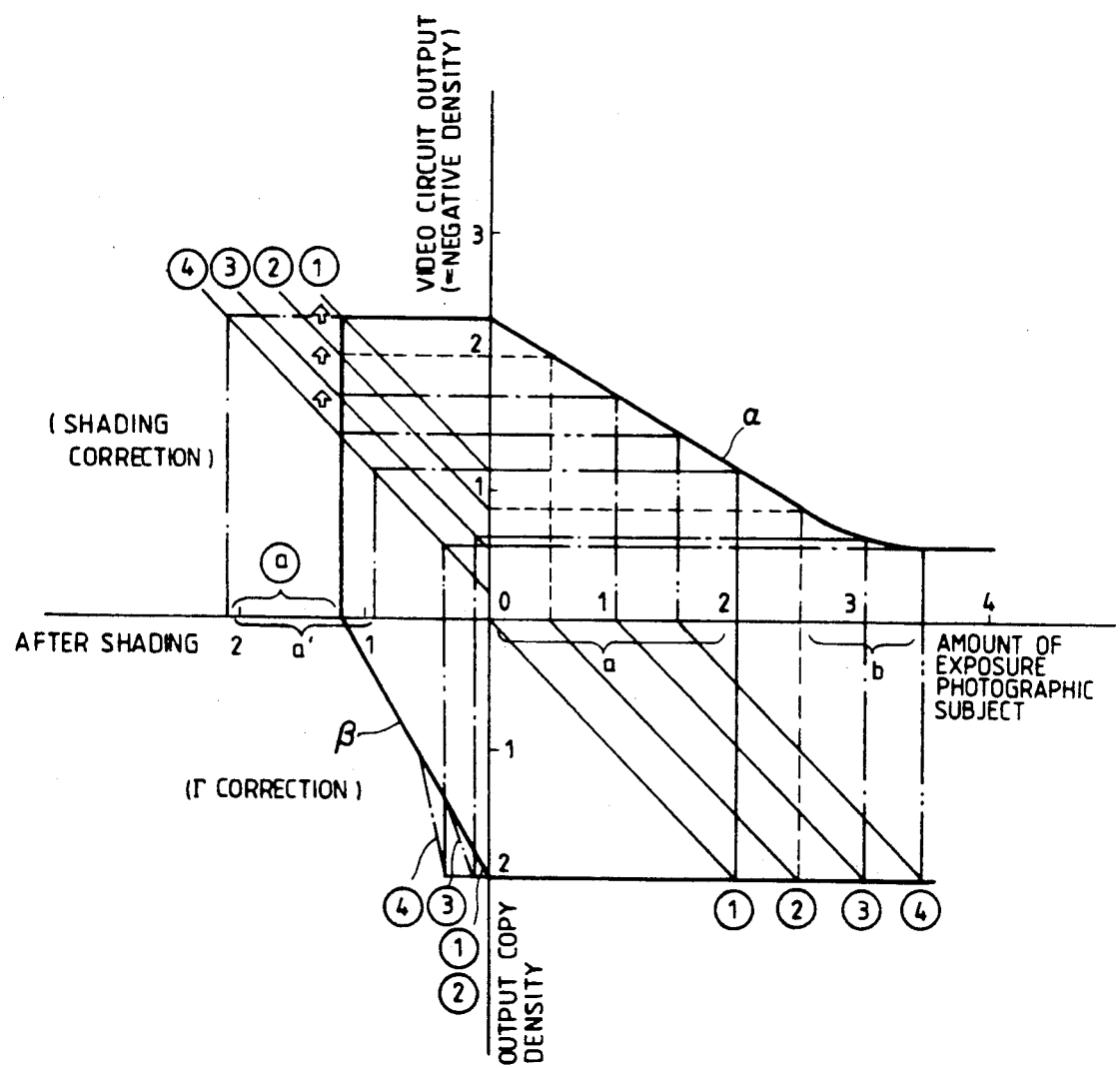
FIG. 32 explains the density characteristics and the principle of correction of a negative film.

FIG. 32 graphically illustrates the density characteristic of negative film and the principle of its density correction. In the figure, the right half of the abscissa represents the amount of exposure light applied to the object (corresponding to a density of the object), and the left half represents density after the shading correction. The upper half of the ordinate shows video circuit output (approximately equal to the density of negative film), and the lower half shows the density of the output copy. Thus, the first quadrant shows a density characteristic of a negative film; the second quadrant, shading correction; the third quadrant, gamma ($\Gamma$) correction; and the fourth quadrant, the relationship of exposure light amount vs. density of an output copy.

The density characteristic of the negative film is represented by a line "a". As shown, when the amount of the exposure light from the object is large, the density of the negative film is large. As the exposure light amount becomes small, the density of the negative film becomes linearly small. When the amount of the exposure light from the object decreases to or below prescribed a value, the linear relationship between the exposure light amount and the density of the negative film is lost. When the exposure light amount is small, contrast problems are created, and, for example, the contrast of the face and hair is lost. Also, when the exposure amount is large, if the inclination of the line "a", viz. the gamma ($\Gamma$) value is less than 1, and correction is not made, the resultant copy is soft. It is for this reason that gamma (Γ) correction is needed.

The principle of gamma (Γ) correction will be described with reference to FIG. 32. As shown, an END curve "B" is present in the third quadrant. An inclination gamma (Γ') of the END curve "B" is selected to be 1/Γ in order that a relationship between the amount of exposure light from an object to be copied and the output copy density is expressed by a straight line inclined at 45°.

It is now assumed that in the region "a" where the exposure light amount is relatively large, a density adjustment value set in the register of the shading correction circuit is expressed by a straight line (4). In this case, the density after shading correction lies in the region "a'." This region "a'" is out of the conversion region by the END curve "B". Therefrom, a portion of the reproduced image corresponding to this region is smeared with white. To avoid this, the straight line (4) representative of the density adjusting value is shifted to the straight line (1) so that the density after the shading correction falls within the conversion range by the END curve. If the density adjusting value is so set, the relationship between the exposure light amount and the output copy density traces a straight line (1) in the fourth quadrant. The copied image has a gradational density. In a region "b" where the exposure light amount is relatively small, the relationship between the exposure light amount and the negative film density loses its linearity. In this case, the density adjusting value of the shading correction circuit is changed to a straight line (4) in the second quadrant. When the exposure light amount lies in the region "b," and an image of a person with black hair and wearing a brown hat is copied, the densities of the hair and the hat are substantially the same, and the resultant copied image has a good contrast between the hair and the hat.

b. Method of Image Signal Processing

As shown in FIG. 33, the line sensor 226 reads a projection light of an image on the document film 633 in the form of the amounts of color lights of R, G, and B, and produces analog signals representative of them. The analog image signals representing the light amounts are amplified by an amplifier 231 up to preset levels. The amplified image signals are digitized by an A/D converter 235. The digital signals indicative of the light amounts are then converted into signals indicative of densities by a log converter 238.

The density image signals are subjected to shading correction by the shading correction circuit 239. Shading correction removes from the image the nonuniform light amount of the selfoc lens, the variance of the sensitivies of the pixels of the line sensor 226, variances of the spectral characteristics and the light amounts of the correction filters and the lamps 613, and the adverse effects due to aging.

Before shading correction, reference data is stored into the line memory 240. To effect this, when a document film is selected from among the three types of films and the registered films, the related correction filter is selected and set to the positive film filter. The copying machine is operated with the original film 633 not being set. Under this condition, the amount of light from the lamp 613 is read, amplified, digitized, and converted into a density signal. The data based on the density signal thus obtained is stored in the line memory 240, as the reference data. More specifically, the imaging unit 37 is step scanned 32 lines for each pixel of R, G and B. The sampled data is transferred through the line memory 240 to the CPU 634. The CPU 634 produces an average density of the sampling data of 32 lines through its calculation. In this way, the shading data is obtained. The averaging of the sampling data eliminates the error for each pixel.

Then, the original film is set, and the image of the original film is read. The CPU 634 calculates a density adjusting value DADj by using the density data of the film as is read out of the ROM, and replaces the DADj value in the register of the LSI in the shading correction circuit 239. Further, the CPU 634 adjusts the amount of light of the lamp 613 and the gain of the amplifier 643 in accordance with the selected film.

The shading correction circuit 239 adds the DADj value to the actual data obtained by reading the original film, and shifts the read value. The shading circuit 239 subtracts the shading data of each pixel from the adjusted data to effect shading correction.

For copying the films that are not stored in the ROM of the CPU 634 and in the RAM of the system, a base film is set to collect the density data of the film, and a DADj value must be calculated on the basis of the collected density data.

After shading correction, the IIT 32 transmits density signals of R, G, and B to the IPS 33.

The CPU 634 selects the END curve on the basis of the actual data of the original film, and produces a correction signal for the gamma (Γ) correction on the basis of the selected curve. The IPS 33 exercises the gamma (Γ) correction to remove the poor contract problem due to the nonlinear characteristic and the fact that the gamma of the original film is not 1.

(D) Operation Procedure and Signal Timing

Figure 34:
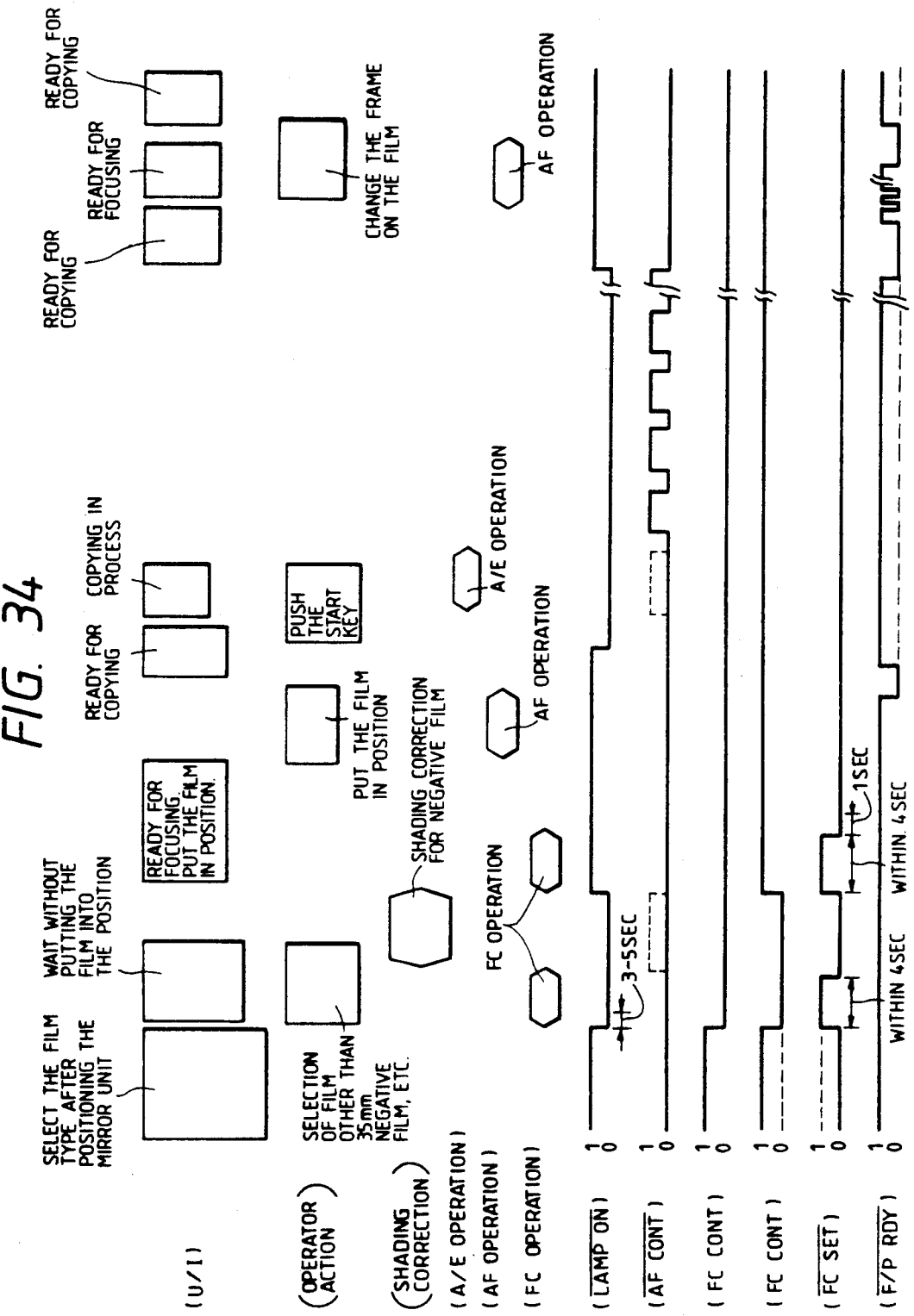
FIG. 34 explains the operating steps and timing.

The operation procedure and signal timing will be described with reference to FIG. 34. In the figure, broken lines indicate signals that may be used.

The operation of the F/P 64 is executed by the U/I 36 of the base machine 30. Specifically, by operating the F/P operation key displayed on the U/I display, the base machine 30 is placed into the F/P mode. It is assumed now that the original film is any of the three types of films and the registered films. As shown in FIG. 34, the display of the U/I 36 presents a message "Place the mirror unit, and select your film". After seeing this, an operator opens the M/U 65, and sets it at a position preset for use on the platen glass 31.

When the film select key is touched, a message "Wait while not placing the film." At the same time, the lamp 613 lights up, and the correction filter control (FC CONT) signal becomes (0, 0), and the FC operation starts. More specifically, the auto filter exchanger operates to set the positive correction filter at a preset position. When the correction filter is set, a correction filter exchange end signal (FC SET) goes LOW.

When the FC SET signal goes LOW and after 3 to 5 seconds have elapsed from the lighting of the lamp 613, the shading data collection starts for shading correction. After the shading data collection ends, the FC SET signal goes (0, 1) in logical state, and the auto filter exchanger starts to operate and set the film correction filter at the preset position. Upon triggering of shading correction, the display presents a message "Set a film for focusing." At this time, the lamp 613 is off. After seeing this message, the operator loads the film holder 607 containing the document film 633 into the F/P 64.

The light from the photo diode 623 is reflected by the film, and the reflected light is received by the photo sensor 624.

When the difference between the amount of light received by the two elements of the photo sensor 624 is not 0, the motor 625 of the AF unit operates for focusing. That is, the AF operation is performed. After the focusing operation, an F/P ready ($\overline{\text{F/P RDY}}$) signal goes LOW.

Following this, the FC SET signal goes LOW, and after one minute, the display presents a message "Ready for copy." When the start key of the U/I 36 is pushed, the display gives a message "Copy progresses". The lamp 613 is on, and after the lamp stabilizes data for the auto density adjustment is collected. Specifically, the imaging unit 37 scans the film one time to read a part or the entire of the projection image, for density adjustment, color balance adjustment, and gamma (Γ) correction.

In the full color mode, the imaging unit scans four times for copying operation. In this case, the shading correction and the density adjustment are carried out on the basis of the shading data and the automatic density adjustment data. When the copy operation ends, the lamp 613 is off and the display displays a message "Ready for Copy." Accordingly, a new copy may be made by operating the start key. To copy another image, another frame of the film is set. When the frame of the film is changed, the $\overline{\text{F/P RDY}}$ signal goes HIGH, and the display gives a message "Adjust the focus." When the new frame is set, the AF operation is performed. At the same time, the signal $\overline{\text{F/P RDY}}$ goes LOW, and a message "Ready for copy" is displayed. Then, the start key may be pushed to again start the copying operation.

(III) Imaging Processing System (IPS)

(III-1) IPS modules

Figure 35:
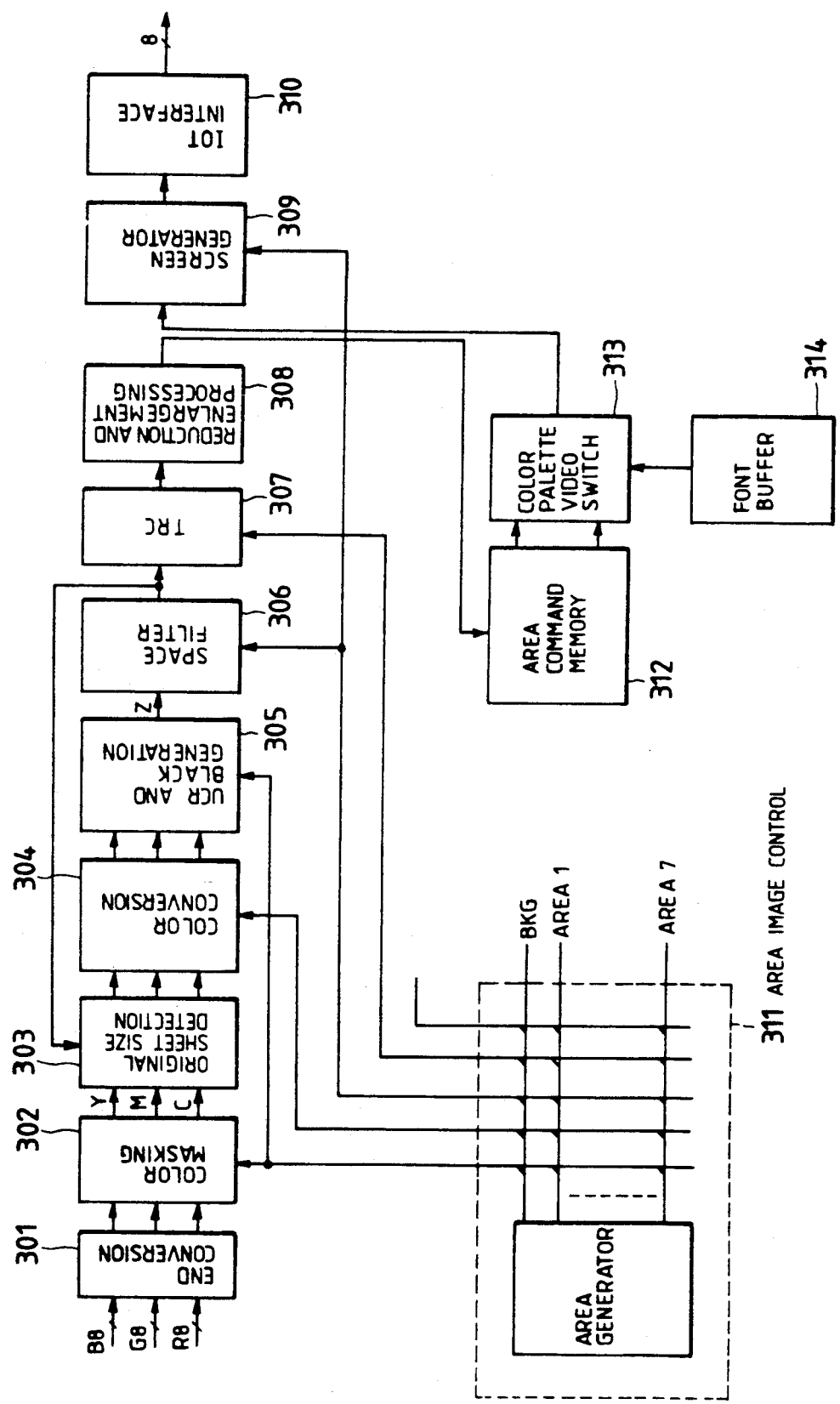
FIG. 35 illustrates an outline of the module construction of the IPS.

FIG. 35 shows an arrangement of IPS modules in the image processing system (IPS). In the color image forming apparatus, the IIT (image input terminal) reads a color image on an original in the form of the primary colors B (blue), G (green), and R (red) by using the CCD image sensor, and converts these signals to primary toner colors of Y (yellow), M (magenta), C (cyan), and K (black or tusche), and the IOT (image output terminal) performs the exposure by the laser beam and development to reproduce the original color image. In this case, the four separated toner images of Y, M, C, and K are used. A copy process (pitch) is performed one time using the process color of Y. Subsequently, the copy processes will be performed for the remaining process colors M, C, and K. A total of four copy cycles are executed. These four images consist of mesh points and are superposed to reproduce a single color image of the full color. Accordingly, when the separated color signals of B, G, and R are converted into toner signals of Y, M, C and K, a problems occurs on how to adjust the color balance, how to reproduce colors in accordance with the read characteristic of the IIT and the output characteristic of the IOT, how to adjust the balance of density and contrast, how to adjust the emphasis and blur of the edge, and how to adjust Moire.

The IPS receives the separated color signals of B, G, and R, processes these signals to improve the reproducibility of colors, tone, and definition, converts the toner signals of the developing process colors into on/off signals, and outputs them to the IOT.

As shown in FIG. 35, the IPS is made up of an END (equivalent neutral density) conversion module 301, color masking module 302, original size detect module 303, color conversion module 304, UCR (under color removal)/black generating module 305, spatial filter 306, TRC (tone reproduction control) module 307, reduction/enlargement processing module 308, screen generator 309, IOT interface module 310, area image control module 311 including an area generator and a switch matrix, and an edit control module including an area command memory 312, color palette video switch circuit 313, and font buffer 314.

In the IPS, the 8-bit data (256 gray levels) on each of the separated color signals B, G and R is applied to the END conversion module 301. The module 301 converts the data into the toner signals of Y, M, C, and K. A process color toner signal X is selected, and is digitized. The digitized signals are transferred, as the on/off data of the process color toner signals, from the IOT interface module 310 to the IOT. Accordingly, in the case of full color copying (4 colors), the prescan is executed to detect an original size, an edit area, and other necessary information of the original. Then, a first copy cycle is executed using Y as the toner signal X of the process color. Then, a second copy cycle is executed using M for the toner signal X. Subsequently, copy cycles will be executed for the remaining process colors. A total of four copy cycles are repeated.

In the IIT, the color components of R, G, and B of the image are read by using the CCD sensor with the size of one pixel of 16 dots/mm. The IIT outputs the read signals as the data of 24 bits (3 colors × 8 bits; 256 gray levels). B, G, and R filters are laid on the upper surface of the CCD sensor with the density of 16 dots/mm and a total length of 300 mm. The CCD sensor makes scans 16 lines/mm at the process speed of 190.5 mm/sec. Accordingly, the sensor produces the read data at the rate of about 15 M pixels/sec for each color. The IIT log converts the analog data of B, G, and R pixels to obtain the density data from the reflectivity data, and then digitizes the density data.

The respective modules will be described in detail. FIGS. 36 [although 36(q)] are explanatory diagrams for explaining the respective modules of the IPS.

(A) END conversion module

Figure 36A:
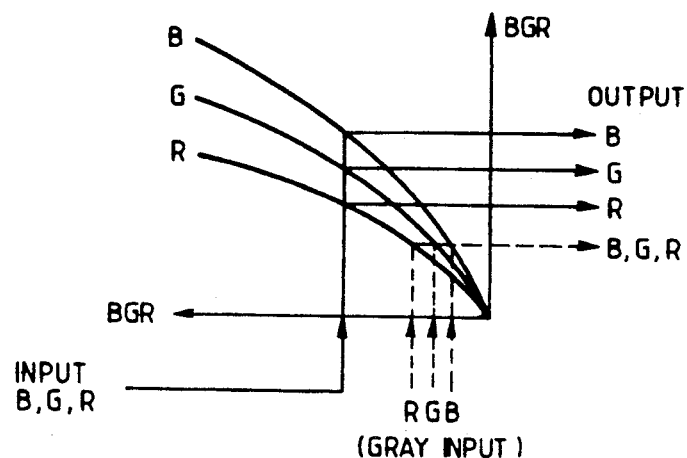
FIGS. 36a-36g explain the individual IPS modules.

The END conversion module 301 adjusts (converts) the optically read signal of the color original obtained by the IIT into a gray balanced color signal. The toners of the color image are equal to one another when the color is gray. The toner amount of gray is used as a reference toner amount. However, the separated color signals of B, G, and R produced from the IIT when it reads a gray document are not equal in value because the spectral characteristics of the light source and the color separation filter are not ideal. The imbalanced color signals are balanced by using a converting table (LUT: look up table) as shown in FIG. 36(a). This balancing work by the LUT is the END conversion. When a gray original is read, the LUT converts the B, G, and R color separated signals into signals of equal gradation in accordance with a level (black→white) of the gray signal. The LUT depends on the characteristics of the IIT and 19 LUTs may be used. Of those LUTs, 16 tables are for the film projectors including negative films. 3 tables are for copy, photograph, and generation copy.

(B) Color Masking Module

The color masking module 302 converts the B, G, and R color signals into signals indicative of toner amounts of Y, M, and C, respectively, through a matrix operation. This conversion is applied to the signals after they are subjected to the gray balance adjustment by the END conversion.

In this instance, the conversion matrix for the color masking is a 3×3 matrix exclusively used for converting the B, G, and R into Y, M and C. A matrix capable of dealing with BG, GR, RB, B2, G2, and R2, in addition to B, G, and R may also be used. Any other suitable matrix may be used, if necessary. Two sets of matrices are used, one for an ordinary color adjustment and the other for emphasis signal generation in the monochromatic color mode.

Thus, when the video signal from the IIT is processed by the IPS, the gray balance adjustment is first conducted. If it follows the color masking process, the gray balance adjustment using the gray original must be made allowing for the characteristics of the color masking. This makes the conversion table more intricate.

(C) Original Size Detection Module

Figure 36B:
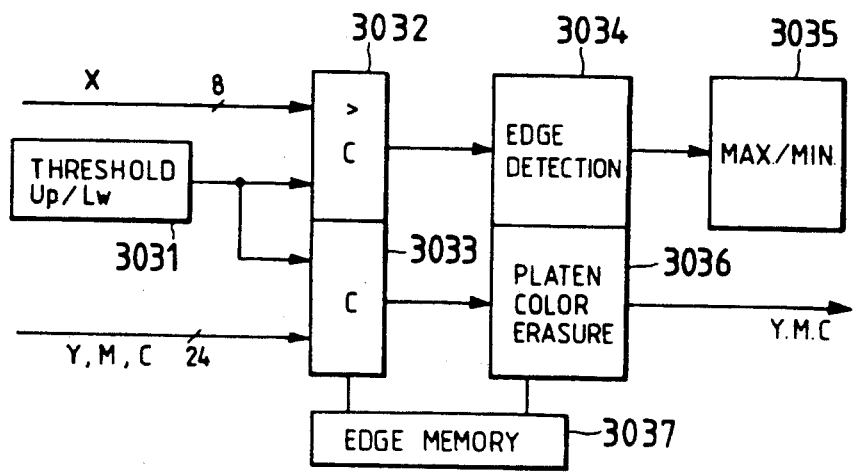

Originals that can be copied include not only standard size documents, but also patched up documents and others. To select paper of a proper size corresponding to the size of an original, it is necessary to detect the original size. In case that the paper size is larger than the original size, if the peripheral region of the original is masked, the resultant copy is excellent. For this reason, the original size detection module 303 detects the original size at the time of scanning and suppresses the platen color (edge suppress) at the time of scanning to read the original image. Accordingly, color, for example, black, that is clearly distinguished from the original is used for the platen color. The upper limit value and lower limit value for platen color discrimination are set in a threshold register 3031, as shown in FIG. 36(b). At the time of prescan, the signal is converted by gamma (Γ) conversion into a signal X representing the data approximate to the reflectivity of the original (by using the spatial filter 306 to be given in detail). The signal X is compared with the upper/lower limit value as is set in the register 3031, by a comparator 3032. An edge detect circuit 3034 detects the edge of the original, and stores the maximum and minimum values of X and Y as coordinates into a max./min. sorter 3035.

As shown in FIG. 39(d), when the original is oblique or nonrectangular, the maximum values and the minimum values (s1, x2, y1, y2) at four points on the outline of the figure are detected and stored. At the time of scanning for reading the original, the comparator 3033 compares the Y, M, and C of the original with the upper/lower limit values in the register 3031. A platen color suppress circuit 3035 suppresses the pictorial information outside the edge, viz., the read signal of the platen, to effect the edge suppressing processing.

(D) Color Conversion Module

Figure 36C:
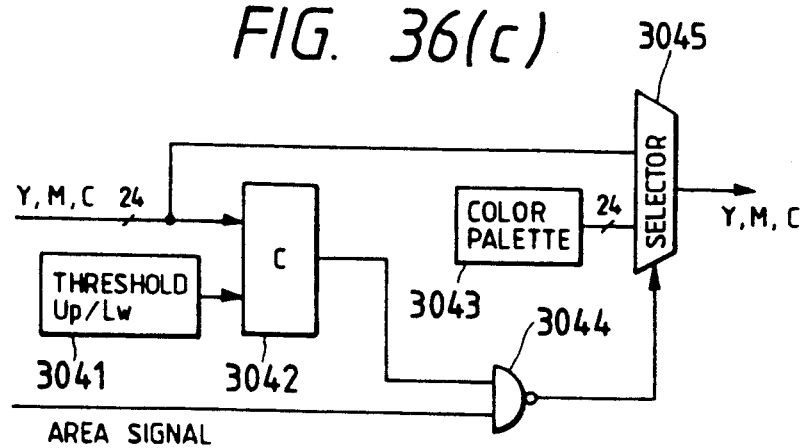
Figure 36D:
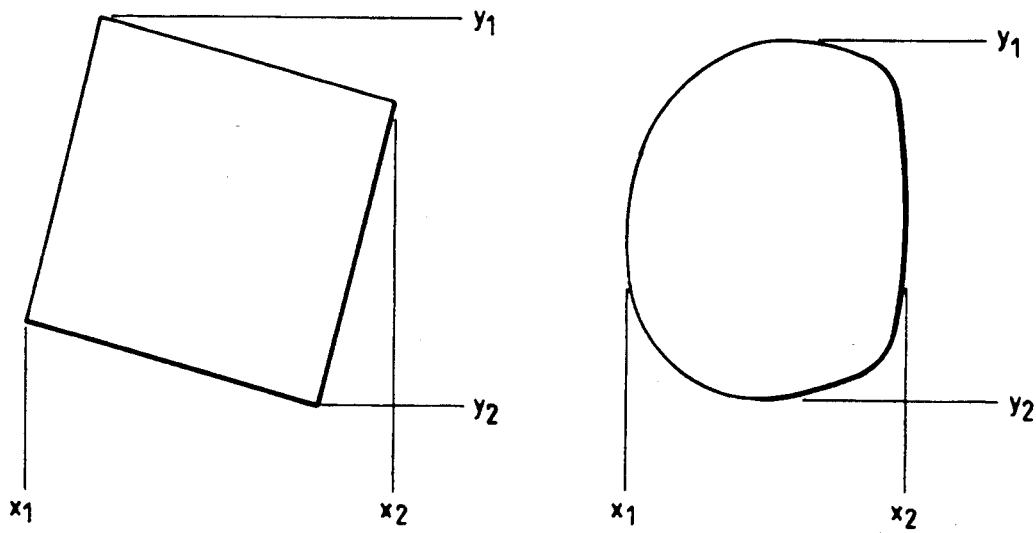

The color change module 305 sets up a condition that a designated color in a specific area on an original is erasable. As shown in FIG. 36(c), this module is made up of a window comparator 3042, threshold register 3041, and color palette 3053. To effect color change, the upper/lower limit values of Y, M, and C of the colors to be changed are set in the threshold register 3041. The upper/lower limit values of Y, M, and C of the converted colors are set in the color palette 3043. According to an area signal applied from the area image control module, the NAND gate 3044 is controlled. When it is not a color change area, the color signals of Y, M, and C of the original are transferred without change from a selector 3045.

When the color change area is reached, and the color signals of Y, M, and C of the original are between the upper limit values and the lower limit values as set in the threshold register 3041, the selector 3045 is switched by the output signal of the window comparator 3042 and it sends the converted color signals of Y, M, and C that are set in the color palette 3043.

As for the designated color, by directly pointing an original by a digitizer, 25 pixels of B, G, and R in the vicinity of the coordinates (as designated at the time of prescan) are averaged and the designated color is recognized on the basis of the average. By the averaging operation, even in the case of an original of 150 lines, the designated color can be recognized with a precision within 5 of color difference. To the B, G, and R density data, the designated coordinates are converted into an address and the density data are read out of the IIT shading correction circuit with that address. In the address conversion, readjustment corresponding to the registration adjustment is needed, as in the case of the original size detection. In the prescan, the IIT operates in the sample scan mode. The B, G, and R density data read out of the shading RAM are subjected to a shading correction by software, and are averaged. Further, the data are subjected to END correction and color masking, and then are set in the window comparator 3042. The registered colors are selected from 1670 colors, and up to eight colors can be simultaneously registered. The reference color prepared include a total of 14 colors, Y, M, C, G, B and R, colors between these colors, and K and W.

(E) UCR/Black Generation Module

When color signals of Y, M, and C having equal quantities are combined, gray is produced. Theoretically, the same color can be obtained by replacing the colors of Y, M, and C of equal quantities with black In this case, however, the color is impure and hence the reproduced color is not fresh. To cope with this problem, the UCR/black generation module 305 generates a proper amount of K to prevent such a color impurity, and equally reduces the toner colors Y, M and C, in accordance with the amount of the generated K (this process is called an under color removal (UCR). More specifically, the maximum and the minimum values of the toner colors Y, M, and C are detected A K is generated by a conversion table in accordance with the difference between the maximum value and the minimum value. Further, the toner colors Y, M, and C are UCR processed in accordance with the generated K.

Figure 36E:
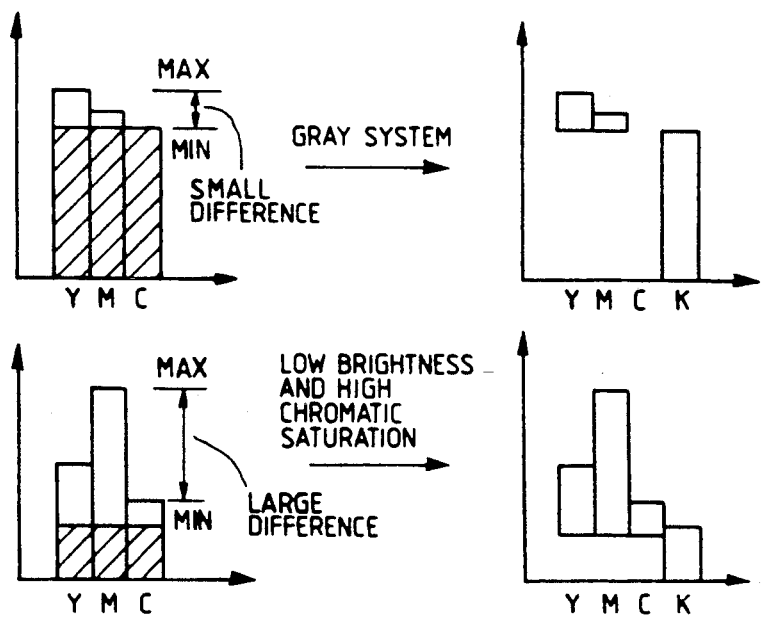

As shown in FIG. 36(e), in the case of a color closer to gray, the difference between the maximum and the minimum values is small. Accordingly, the minimum value or its near value of each color Y, M, and C is removed for generating the color K. When the difference is large, the quantities of the colors Y, M, and C to be removed are set below the minimum values to reduce the quantity of the generated K. In this way, the mixing of tusche into the pure color and the hue degradation of a low gradation, high hue color can be prevented.

Figure 36F:
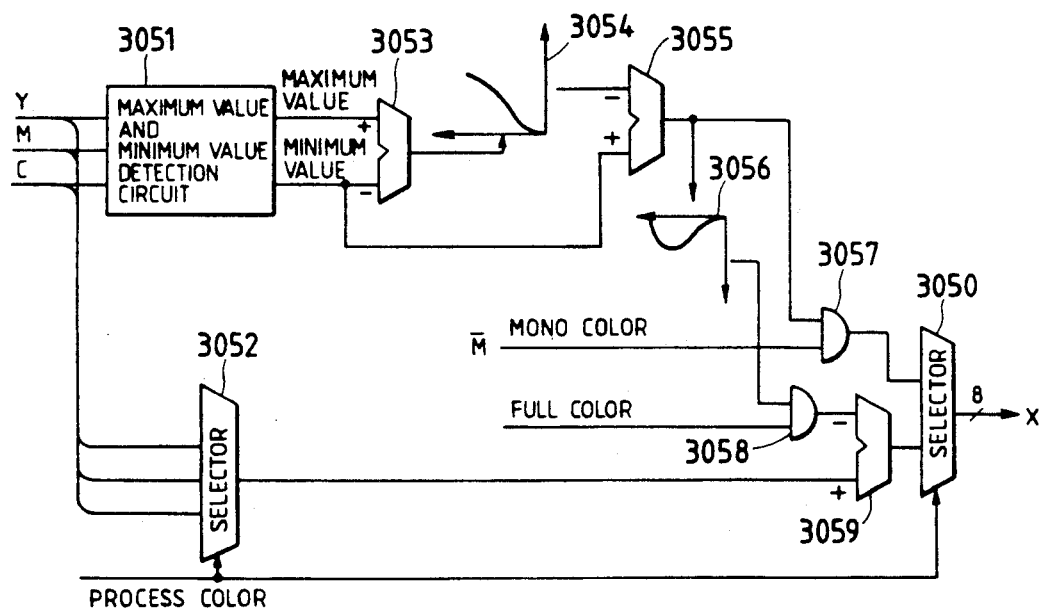

FIG. 36(f) shows a specific circuit arrangement of the UCR/black generation module, a max./min. value detector 3051 detects the maximum and the minimum values of the process colors Y, M, and C. A calculating circuit 3053 calculates the difference between the maximum and the minimum values of each color. A conversion table 3054 and another calculating circuit 3055 cooperate to generate black K. The conversion table 3054 adjusts the value of K.

When the difference between the maximum and the minimum values is small, the output signal of the conversion table is zero. Accordingly, the calculating circuit 3055 produces the minimum value as intact in the form of the value of K. When the difference is large, the output value of the conversion table 3054 is not zero, the calculating circuit 3055 subtracts the difference from the minimum value and produces the result of the subtraction as the value of K. A conversion table 3056 provides the values to be removed from the colors Y, M,, and C in accordance with the K value. In cooperation with the conversion table 3056, an additional calculating circuit 3059 subtracts the values as defined by the k value from the process colors Y, M, and C. AND gates 3057 and 3058 operate for the signal K, and the signals of Y, M, and C after UCR processing in accordance with the signals in the mono color mode and the full color mode. The selectors 3052 and 3050 are used for selecting any of the toner signals Y, M, C, and K by the process color signals. A color is thus reproduced by the mesh points of Y, M, and C. Accordingly, the curves and tables that are empirically formed are used for the removal of Y, M, and C and for determining the generation ratio c.f K.

(F) Spatial Filter Module

In the color image forming apparatus incorporating the present invention, the IIT reads an image of an original while the original image is being scanned by the CCD. When the data is used intact, the resultant data is faded data. The mesh points are used for image reproduction. Accordingly, Moire occurs between the mesh point period of the printed matter and the sampling period of 16 dots/mm. The same phenomenon occurs between the mesh point period generated by the machine and that of the original. The spatial filter module 306 is provided to remove the above fading and the Moire phenomenon. For the Moire removal, a low-pass filter and for edge emphasis, a high-pass filter are used.

Figure 36G:
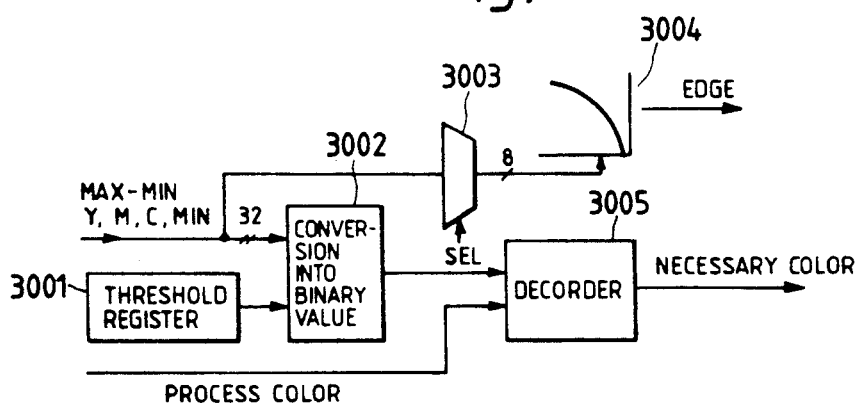

In the spatial filter module 306, as shown in FIG. 36(g), a selector 3003 selects one of the input signals Y, M, Min and Max-Min. A conversion table 3004 converts it into data signals approximately indicative of reflectivity. Use of this type of data makes it easy to pick up the edge data. In this instance, the selected color signal is Y. A threshold register 3001, a 40-bit digitizer 3002, and a decoder 3005 separates the color signals Y, M, C, Min, and Max-Min into eight colors, Y, M, C, K, B, G, R, and W (write), for each pixel. A decoder 3005 recognizes the hue in accordance with the digitized data signal, and produces a 1-bit data indicative of necessary process color or not.

Figure 36H:
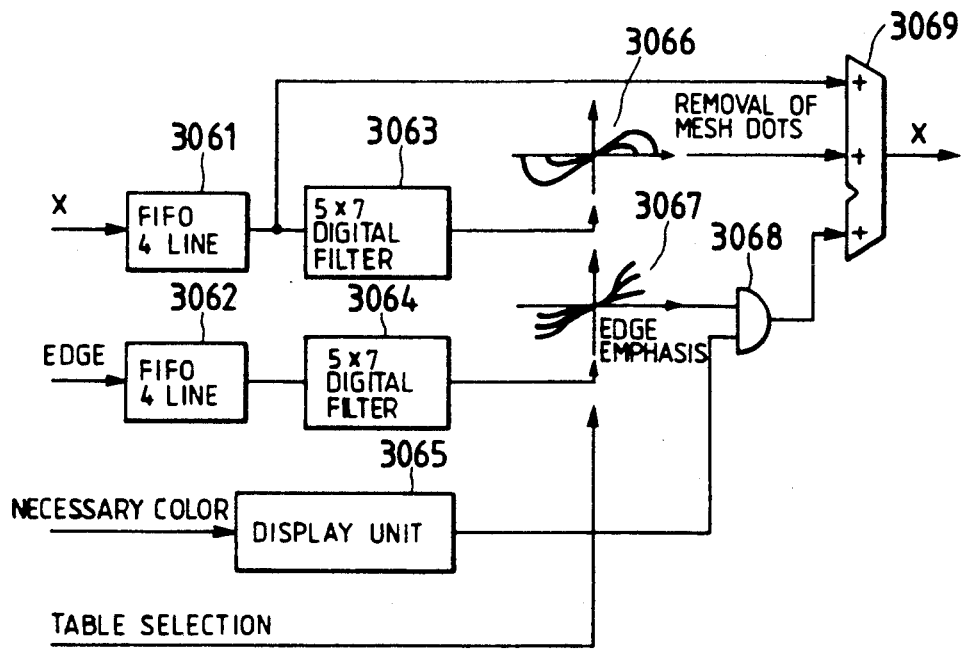

The output signal of the circuit of FIG. 36(g) is applied to a circuit of FIG. 36(h). In the circuit, a FIFO 3061, a 5×7 digital filter 3063, and a modulation table 3066 cooperate to generate the mesh-point removal data. A FIFO 3062, a 5×7 digital filter 3064, a modulation table 3067, and a delay circuit 3065 cooperate to generate edge emphasis data by using the output data of the output circuit of FIG. 36(g). The modulation tables 3066 and 3067 are selectively used in accordance with the selected copy mode, such as photograph copy, character only copy, and photo/character copy.

Figure 36J:
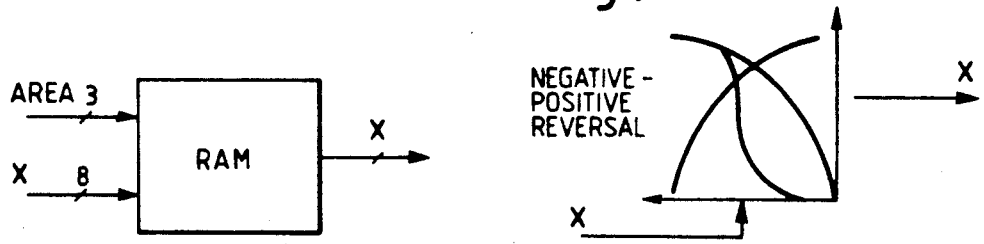
Figure 36K:
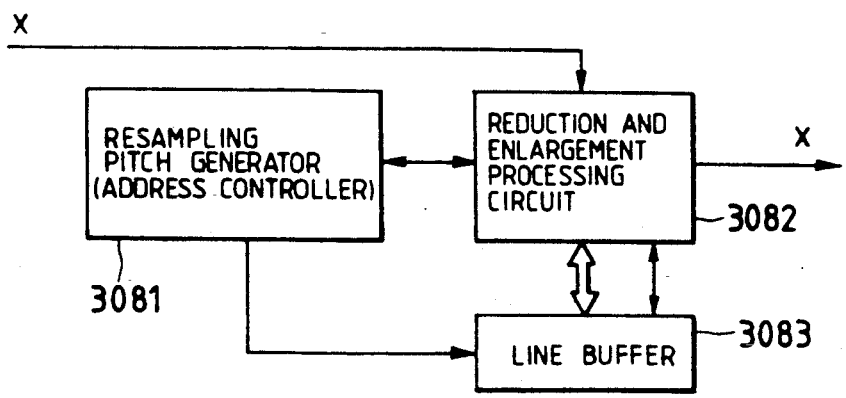
Figure 36I:
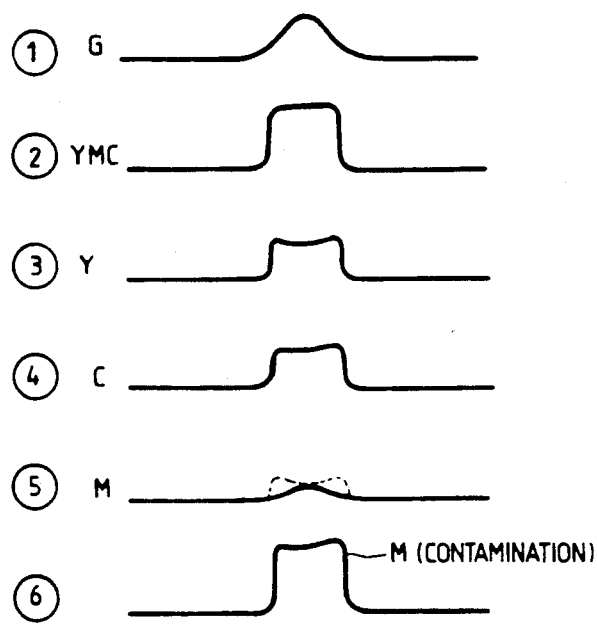

In respect with the edge emphasis, when a green character as shown in FIG. 36(i) (1) is reproduced in the form of a character (2), the colors Y and C are emphasized at the edges as indicated by waveforms (3) and (4), but the color M is not emphasized as indicated by a solid line of waveform (5). The switching for this is carried out by the AND gate 3068. In this case, if waveform (5) indicating the color M is emphasized as indicated by the broken line, M is emphasized at the edges as shown in a waveform (6) and accordingly the color purity is lost (contamination of M). To switch the emphasis by the AND gate 3068 for each process color, the delay circuit 3065 synchronizes the FIFO 3062 with the 5×7 digital filter 3064. When a fresh green character is reproduced by using conventional image processing, the magenta M is emphatically mixed into the green character and the color purity is lost. To solve this, the spatial filter module, when recognizing green, outputs the colors Y and C in an ordinary manner, but outputs the magenta M for edge emphasis.

(G) TRC Conversion Module

The IOT exercises the copy cycles four times using process colors of Y, M, C, and K in accordance with an on/off signal derived from the IPS (in the case of the full color copy). With this, reproduction of a full color original is realized. Actually, however, to exactly reproduce the colors theoretically obtained through the signal processing, delicate and careful adjustment is required to take the characteristics of the IOT into consideration. The TRC conversion module is used to improve the color reproduction. An address conversion table containing various combinations of Y, M, and C which is accessed with 8-bit image data is stored in the RAM, as shown in FIG. 36(j). With use of such a table functions such as density adjustment, contrast adjustment, negative/positive inversion, color balance adjustment, character mode, and transparent composition, may be exercised in accordance with an area signal. The bits 0 to 3 of the area signal are assigned to the upper four bits of the RAM address. In an out-of-area mode, the above functions may be appropriately combined. In this instance, the RAM has a memory capacity of 2 k bytes (256 bytes × 8 planes), and eight conversion tables. During the IIT carriage return, a maximum of 8 conversion tables are stored for every cycle of Y, M, and C. These tables are selectively used in accordance with an area designation and the copy mode used. If the memory capacity of the RAM is increased, there is no need for storing the tables during every cycle.

(H) Reduction/Enlargement Module

Figure 36L:
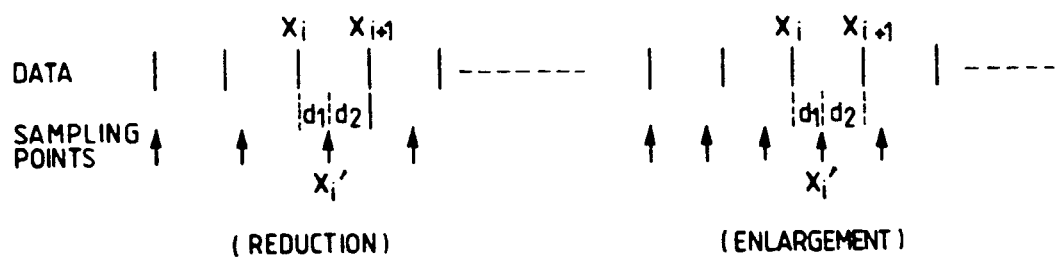

The reduction/enlargement module 308 exercises the reduction/enlargement processing by a reduction/enlargement processor 3082 during the period that data X is temporarily stored in a line buffer 3083 from which it is transferred. A resampling generator/address controller 3081 generates a sampling pitch signal and a read/-write address for the line buffer 3083. The line buffer 3083 serves as a ping-pong buffer of two lines in which line data is read out of one of the lines, while at the same time the next line data is written into the other line. The reduction/enlargement processing in the main scan direction is digitally processed by the reduction/enlargement module 3082. For the reduction/enlargement in the vertical scan direction, the scan speed of the IIT is appropriately varied. The scan speed is varied in the range from 2 times to ¼ time, to vary the magnification from 50% to 400%. In digital processing, when the data is transferred to and from the line buffer 3083, the reduction is based on a thinout interpolation, while the enlargement is based on an additional interpolation. When the data lies between the adjacent sampling points, the interpolation data is obtained by weighing the in-between data in accordance with the distances of that data to the data located on both sides, as shown in FIG. 36(l). If the data is $X_i'$, for example, the following calculation, $$(X_i \times d_2) + (X_{i+1} \times d_1)$$

where $d_1 + d_2 = 1$, and $d_1$ and $d_2$ are distances from a sampling point to the data $X_1$ and $X_{i+1}$ on both sides of the data $X_i'$.

In the reduction processing, data is loaded into the line buffer 3083 while interpolating the data. At the same time, the reduced data in the previous line is read out of the buffer, and sent to the succeeding stage. In enlargement processing, the data is loaded into and temporarily stored in the line buffer, while the data is interpolated for enlargement while reading the previous line data out of the line buffer. When the interpolation for enlargement is conducted at the time of writing, a clock frequency must be increased in accordance with magnification. Such an enlargement process, however, allows the same clock to be used for both the read and write operations. Further, shift image processing in the main scan direction is possible by reading data at a midpoint between one read timing and the next read timing or by delaying the read timing. The repetitive processing is possible by repeatedly reading data. The mirror image processing is also possible when data is read out in the reverse direction.

(I) Screen Generator

A screen generator 309 converts a gradation toner signal of each process color into an on/off or binary toner signal. In the screen generator, the digitizing processing and the error diffusion processing are conducted by comparing a threshold matrix with the gradated data. The IOT receives the binary toner signal, and turns on and off a laser beam to reproduce a halftone image. In this case, the laser beam is elliptically shaped in cross section with its geometry of about 80 μm long and about 60 μm wide. These figures are selected so as to satisfy the recording density of 16 dots/mm.

Figure 36M:
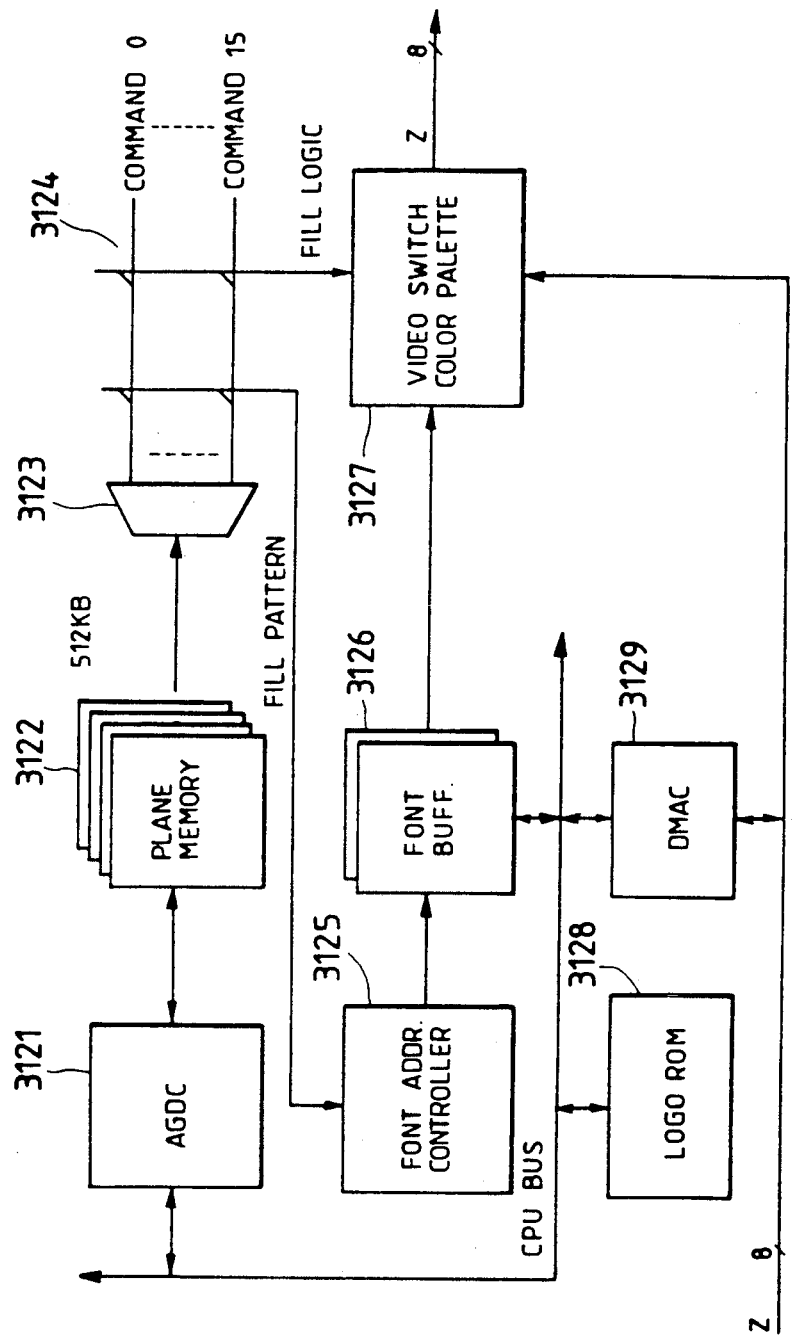
Figure 36N:
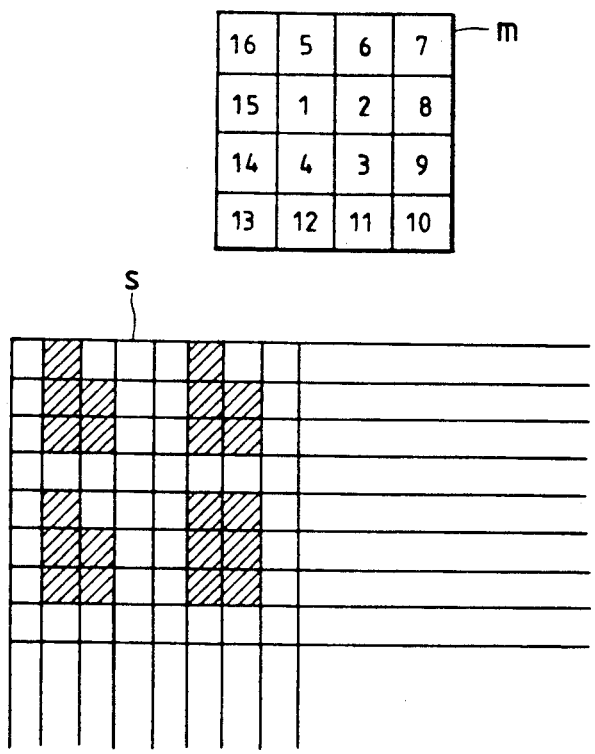

How to express gradation will first be described, and the description to follow is directed to forming halftone cells each of 4×4, for example, as shown in FIG. 36(n). To form the cells, the screen generator sets up a threshold matrix "m" corresponding to such a halftone cell. Then, it compares the matrix with the gradated data. If the value of data is "5," the screen generator generates signals that are turned on in the squares of the matrix "m" whose figures are less than "5."

Figure 36O:
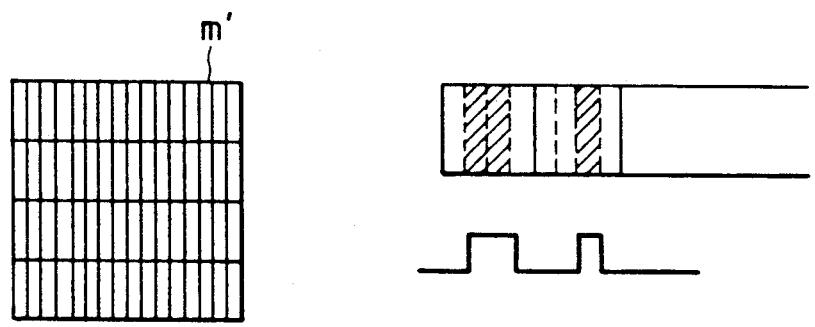

The 4×4 halftone cell of 16 dots/mm is generally called a mesh point of 100 psi and 16 gradations. If an image is depicted by such mesh points, the image reproduction is poor. In the present invention, to increase the gradations, the 16 dots/mm pixel is further divided into four in the vertical direction (main scan direction). Accordingly, the laser beam is turned on and off at distances of ¼ unit, viz., at 4-times the frequency, as shown in FIG. 36(o). The gradation attained is four times that of conventional gradation expressing methods. To this end, a threshold matrix "m," as shown in FIG. 36(o) is set up in the present invention. Further, if a submatrix method is used, the number of lines will effectively be increased.

Figure 36P:
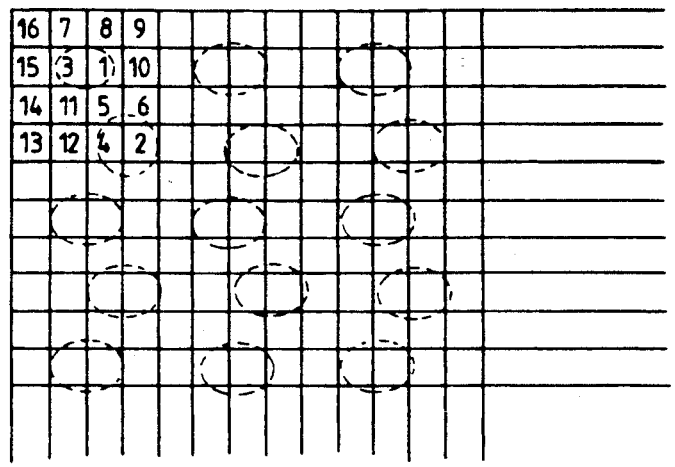
Figure 36Q:
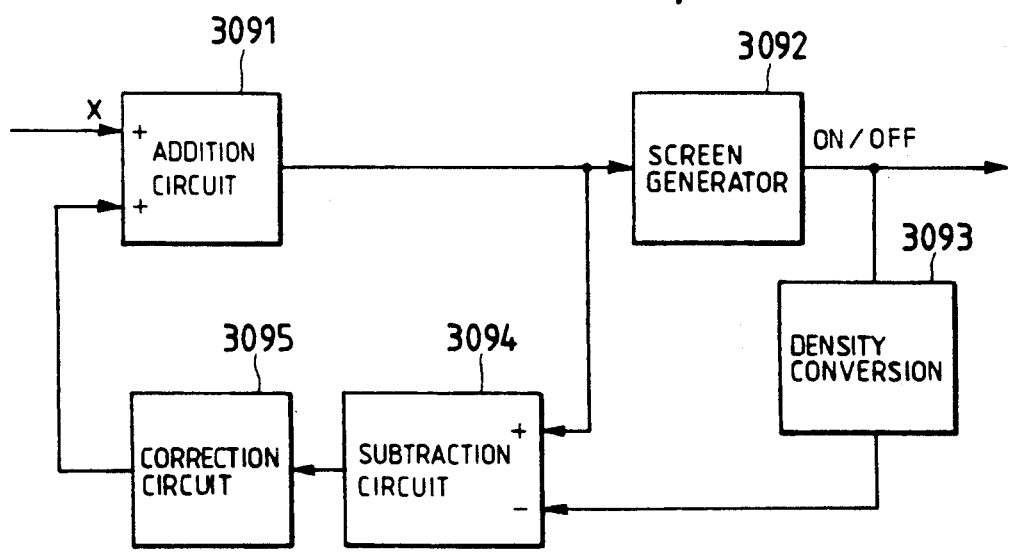

The above instance uses the threshold matrices "m" of the type in which the center portion of each halftone cell is used as a sole growth nucleus. In the submatrix method, a pixel consists of a plurality of unit matrices. Each matrix has two growth nuclei or more, as shown in FIG. 36(p). If such a screen pattern design method is used, the number of lines and the gradation may be changed in accordance with bright or dark portions, in such a way that 141 psi and 64 gradations are used for bright portions, and 200 psi and 128 gradations, for dark portions. Such a pattern may be designed while visually judging smoothness in gradation, definition, graininess, and the like.

When the halftone image is reproduced by using the above dot matrix method, the gradation or gray level and the resolution contradictorily coexist. For example, if the gray level is increased, the resolution becomes poor. On the other hand, if the resolution is increased, the gray level is decreased. If small threshold data matrices are used, the image actually outputted suffers from quantification error. The error diffusion processing is to improve the gradation reproducibility. The quantification errors, the on/off or binary signal generated by a screen generator 3092, and the input gradation signal are detected by a density converting circuit 3095 and adder 3091, and are fed back by using a correction circuit 3095 and an adder 3091. For example, the corresponding position of the previous line and the pixels on both sides of it are convoluted through a digital filter.

The screen generator changes over the threshold error and a feedback coefficient for the error diffusion processing every original or area in accordance with the type of image, such as halftone images and character images. In this way, the reproduction of images of high gradation and high definition is improved.

(J) Area Image Control Module

In the area image control module 311, seven rectangular areas and a priority order can be set in an area generator. Control data relating to the respective areas are set in a switch matrix. The control data includes data of color change and a color mode indicative of monochromatic color or full color, modulation select data of photograph, characters, and the like, select data of TRC, select data of the screen generator, and the like. The control data is used for controlling the color masking module 302, color conversion module 304, UCR module 305, spatial filter 306, and TRC module 307. The switch matrix may be set by software.

(K) Edit Control Module

The edit control module execute outline-drawing processing in which an original bearing a circular figure, such as a circular graph, not a rectangular figure is read, and a specified area of indefinite configuration is painted with specified color. As shown in FIG. 36(m), a CPU bus is clustered with an AGDC (advanced graphic digital controller) 3121, font buffer 3126, logo ROM 3128, and DMAC (DMA controller) 3129. The CPU writes an encoded 4-bit area command into a plane memory 3122 through the AGDC 3121, and the font is loaded into the font buffer 3126. The plane memory 3126 consists of four memory planes. Each point on an original can be set by 4 bits of planes 0 to 3 in such a manner that for "0000," a command 0 is used to output an original. A decoder 3123 decodes the 4-bit data into commands 0 to 15, and a switch matrix 3124 converts the commands 0 to 15 into commands to make jobs of fill pattern, fill logic, and logotype. A font address controller 3125 generates an address of a font buffer 3126 in accordance with a pattern such as mesh point shade and hatching shade, by using a 2-bit fill pattern signal.

A switch circuit 3127 selects one of document data X, font buffer 3126 and color palette in accordance with a fill logic signal of the switch matrix 3124 and the contents of the original data X. The fill logic is used to fill only the background of an original with a color mesh, to change the color in a specific portion of the image to another color, to mask or trim a specific portion of the image, and to fill specific image portions with a color.

As seen from the foregoing description, in the IPS, the read signals from the IIT are subjected to END conversion, and the color masking process. The read signals are further subjected to edge suppress and color change, and the under color removal process. A tusche color is generated. Then, the read signals are converted into the process colors. In the case of the processings, such as spatial filter, color modulation, TRC, and reduction/enlargement, it is better to use the process color data rather than to use the full color data because the amount of processed data is small, and hence the number of the used conversion tables may be reduced to $\frac{1}{4}$. Accordingly, more varieties of the conversion tables may be used to improve the reproducibility of colors, gradation, and definition.

(III-2) IPS Hardware

Figure 37A:
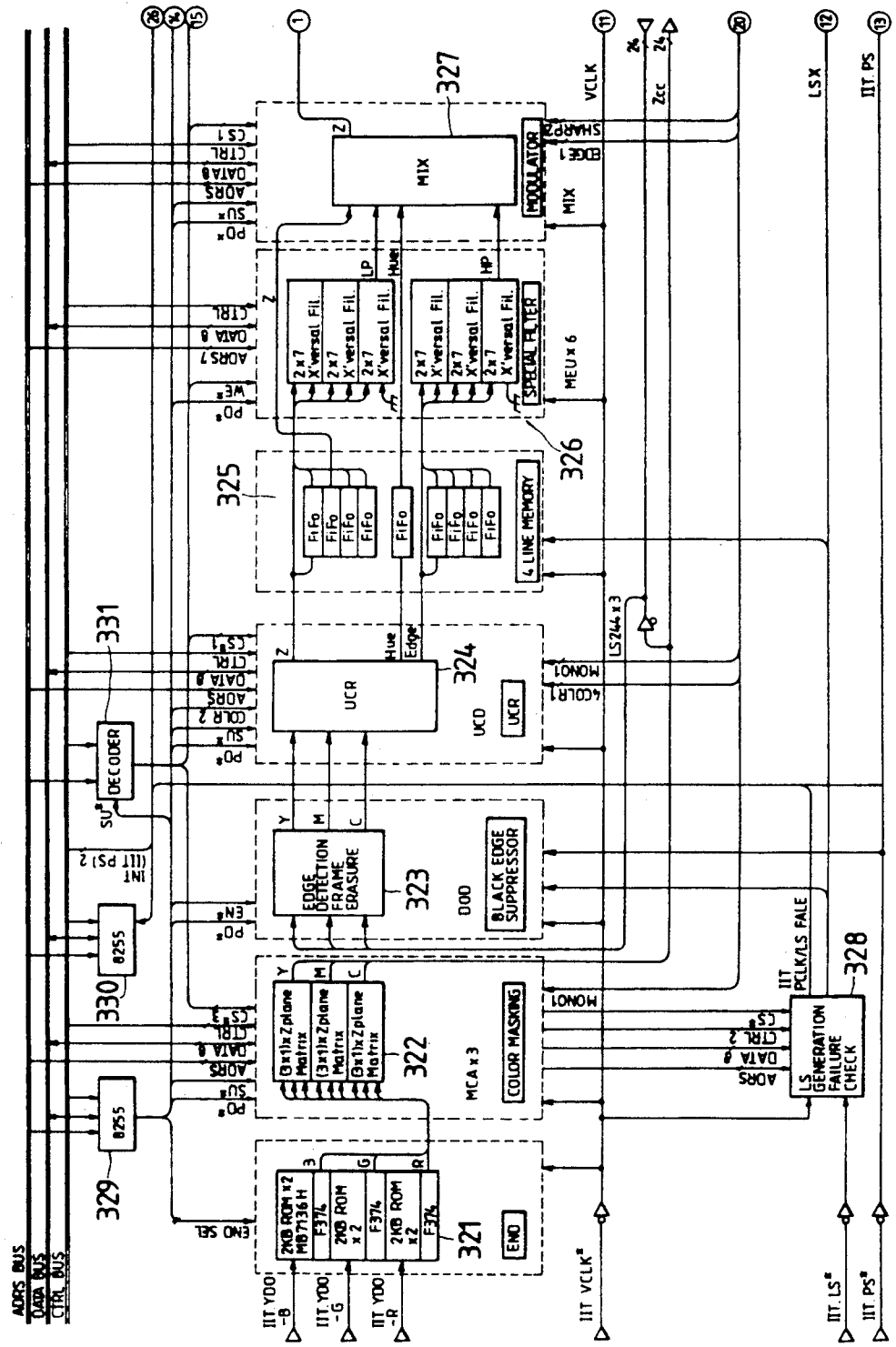
FIGS. 37a-37d explain the hardware construction of the IPS.
Figure 37B:
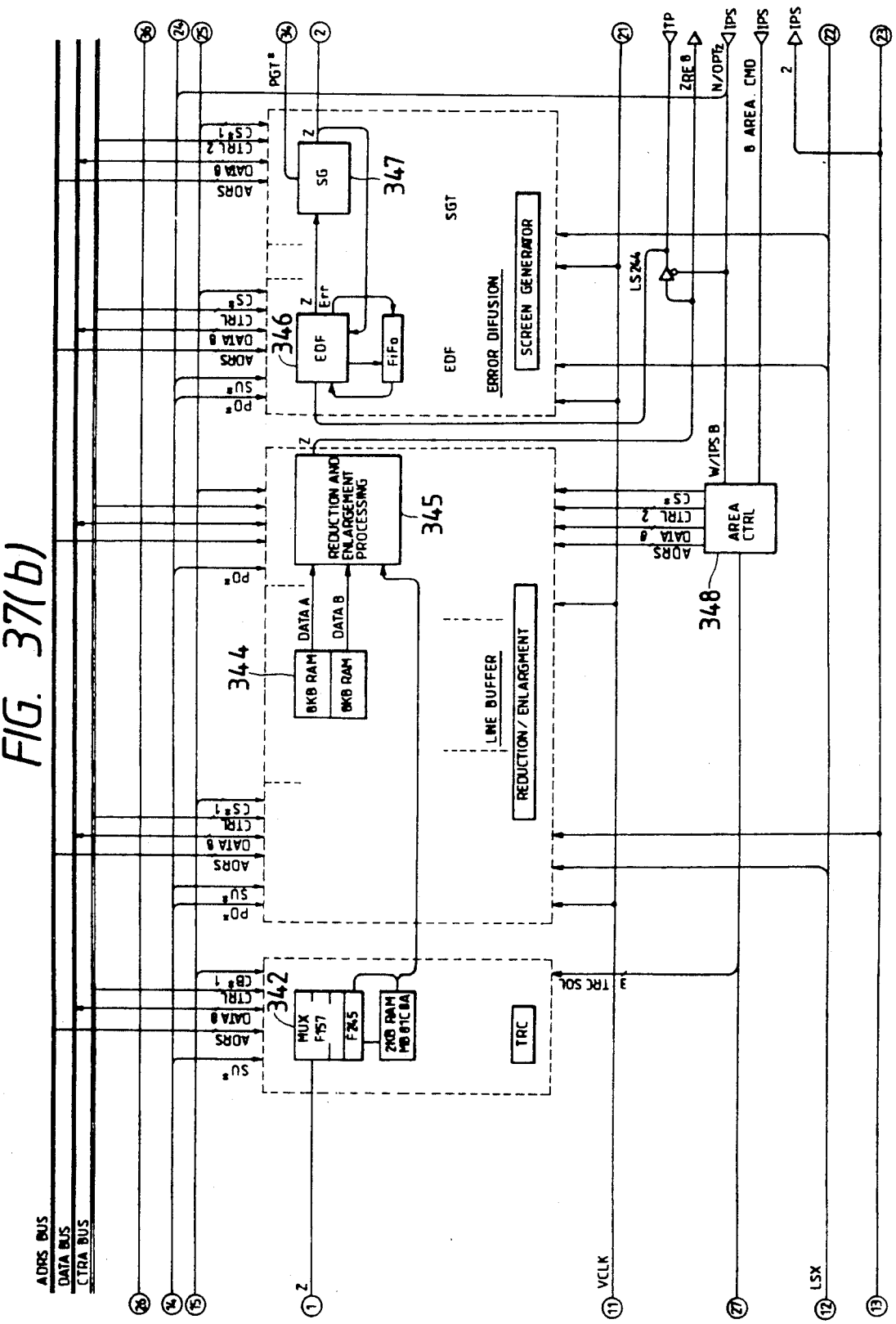
Figure 37C:
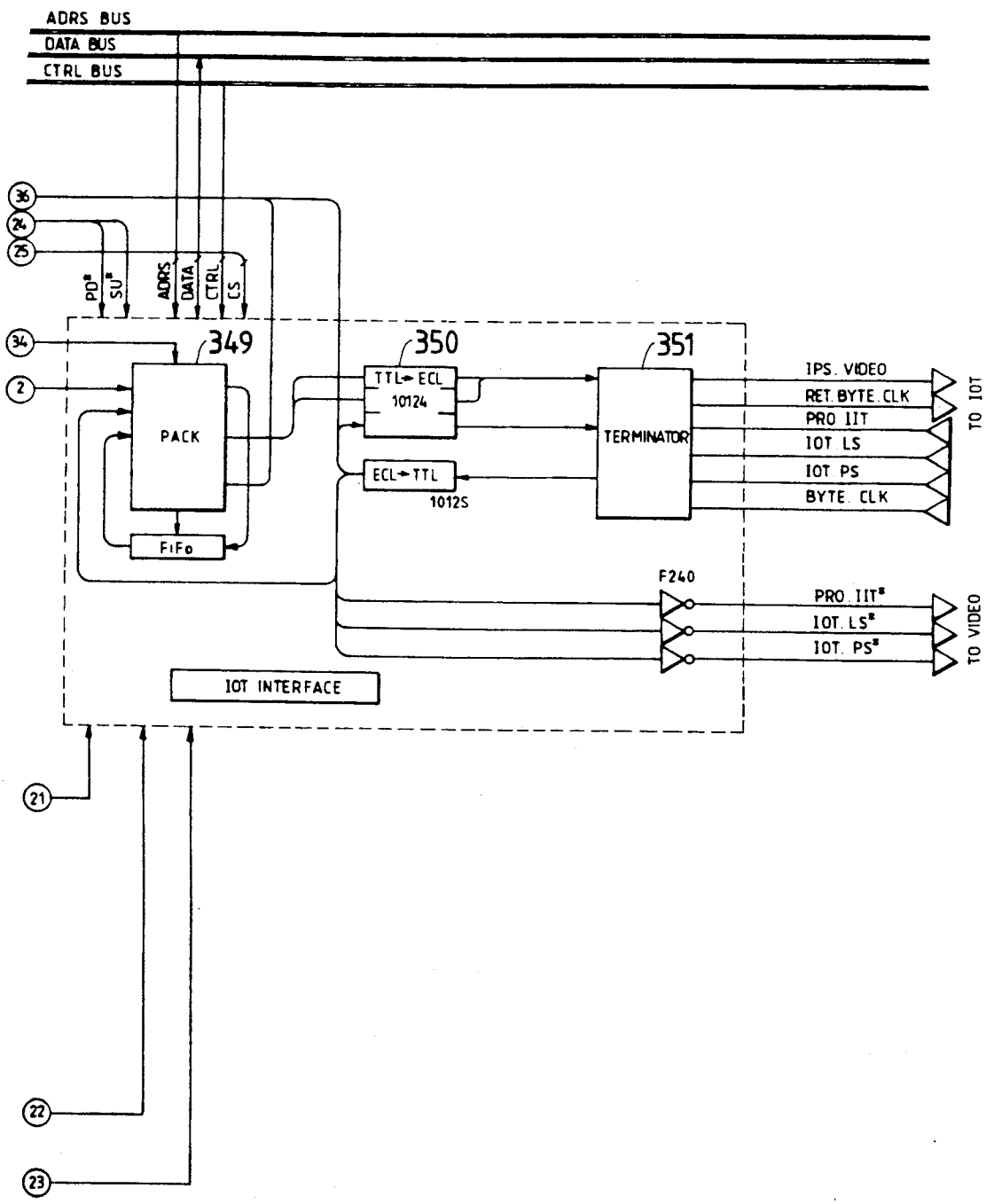
Figure 37D:
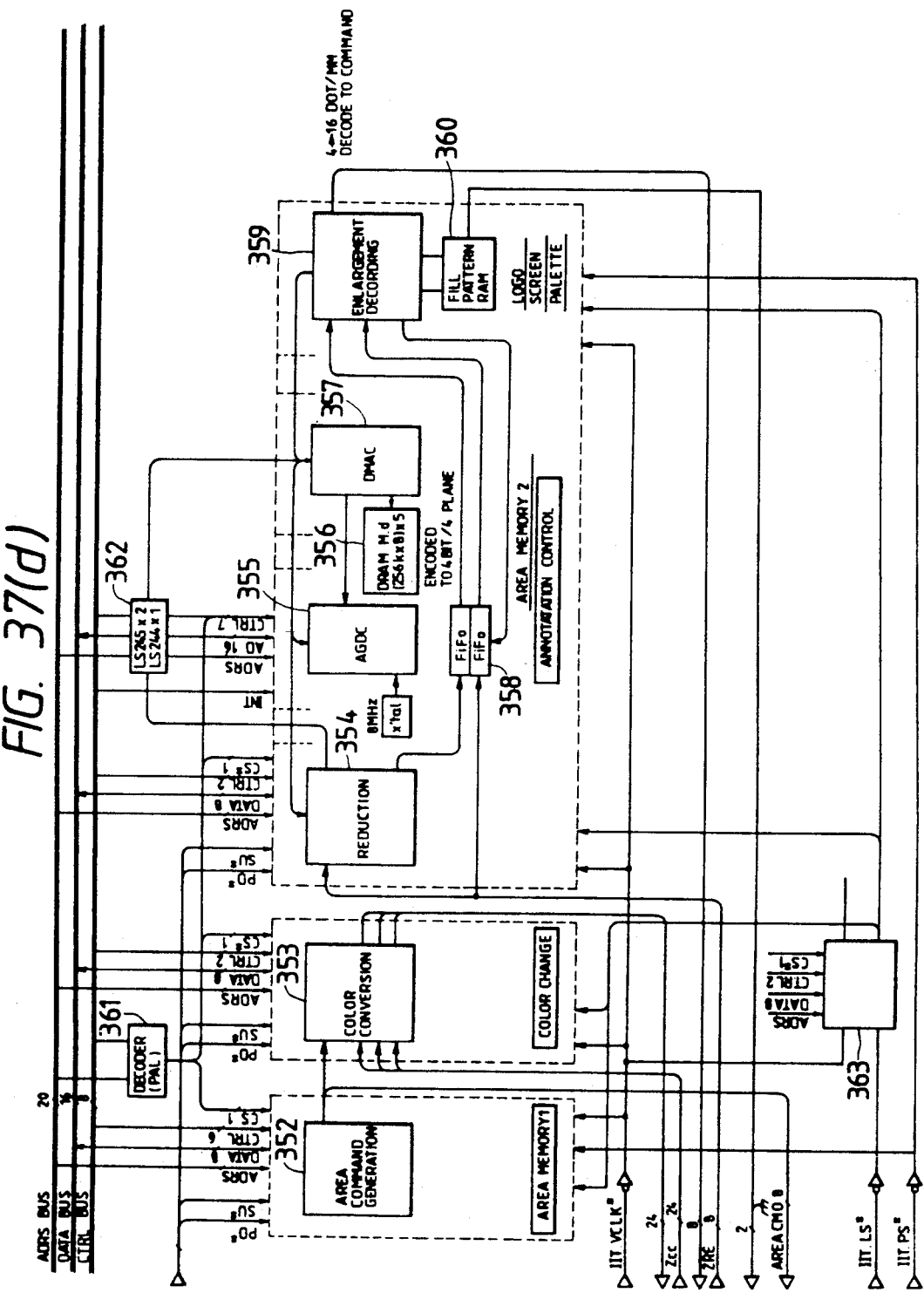

FIGS. 37(a) to 37(d) show a hardware configuration of the IPS. The circuitry of the IPS is divided into two circuit boards IPS-A and IPS-B. The circuit board IPS-A contains circuitry for exercising the basic functions of the color image forming apparatus, such as reproductions of colors, gradation, and definition. The second circuit board ISP-B contains circuitry for exercising applications and professional work, such as edit work. An arrangement of the circuitry contained in the first circuit board IPS-A is as shown in FIGS. 37(a) to 37(c). A circuit arrangement contained in the second circuit board IPS-B is as shown in FIG. 37(d). During the course of using the copier as the color image forming apparatus of the present invention, there will inevitably occur user demands for additional and new applications and professional work. The copier may flexibly cope with such demands by merely modifying and altering only the circuitry of the second circuit board IPS-B, because the basic functions of the copier are secured by the circuitry of the first circuit board.

The IPS board is coupled with CPU buses including an address bus ADRSBUS, data bus DATABUS, and control bus CTRLBUS. The board is also coupled with video data B, G, and R from the IIT, video clock IIT VCLK as a sync signal, line sync signal (the main scan direction and the horizontal sync) IIT IS, and page sync (vertical scan direction, vertical sync) IIT PS.

The video data is pipeline processed in the stage after the END converting unit. Accordingly, the video data is delayed by a delay amounting to the number of clocks required for the respective processing stages in the pipeline processing. A line sync generator/fail check circuit 328 is provided for generating and distributing horizontal sync signals to meet a delay, and for the fail check of the video clock and the line sync signal. Therefore, the line sync signal generator/fail check circuit 328 is coupled with the video clock IIT VCLK and the line sync signal IIT IS. To change the settings of the circuit 328, it is coupled with the CPU buses (ADRSBUS, DATABUS and CTRLBUS), and a chip select signal CS.

The video data B, G, and R from the IIT are inputted to the ROM 321 in the END converting unit. The END conversion table may be loaded into a RAM, for example, under control of the CPU. Actually, however, when use of the copier progresses it is unlikely that the END table must be altered when the image data is being processed. For this reason, two 2K byte ROMs may be used for each of the END conversion tables of B, G, and R. That is, a LUT (look-up table) system using the ROMs and 16 conversion tables may be provided and selectively used by a 4-bit select signal ENDSel.

The END converted data signal outputted from a ROM 321 is coupled with a color masking unit made up of a calculation LSI 322 having several planes of a 3×2 matrix for each color the calculation LSI 322 is coupled with the CPU buses, and the coefficients of the matrices may be set in the calculation LSI 322 from the CPU. The LSI 322 is coupled with a set-up signal SU and a choice select signal CS. These signals are used for connecting the calculation LSI 322 that processed the image signals to the CPU buses so as to allow the CPU to reprogram the settings in the LSI 322. A 1-bit select signal MONO is coupled with the calculation LSI 322 for selection of the matrices. The LSI 322 further receives a power down signal PD. When no scan is made in the IIT, viz., no image processing is performed, the internal video clock is stopped by the power down signal PD.

Those signals of Y, M, and C that have been converted from the color image signals B, G, and R by the LSI 322, are applied to a color change LSI 353 in the second circuit board IPS-B shown in FIG. 37(d). Here, the colors of these signals are changed, and inputted to a DOD LSI 323. The color change LSI 353 contains four color change circuits each including of a threshold register for setting the unchanged colors, color palette for setting changed colors, and a comparator. The DOD LSI 323 contains an original edge detector, black edge suppressor, and the like.

The black edge suppressed data signal outputted from the DOD LSI.323 is applied to an UCR LSI 324. This LSI contains an UCR circuit, black generating circuit, and necessary color generators.

The LSI 324 produces a process color X corresponding to the toner color, necessary colors Hue, and edge signal Edge. Accordingly, this LSI also receives a process color designating signal COLR and color mode signals (4COLR, MONO).

The line memory 325 consists of two types of FIFOs. The first FIFOs are used for storing the data of 4 lines in order to transfer the signals of the process color X, necessary colors Hue, and edge Edge to a 5×7 digital filter 326. The second FIFOs are for adjusting the delays by the first FIFOs. The process color X and edge Edge signals of 4 lines are stored, and a total of five lines of those data signals are transferred to the digital filter 326. The data signal of the necessary color Hue is delayed by the FIFO, to synchronize it with the output data signal of the digital filter 326, and then is transferred to a MIS LSI 327.

The digital filter 326 consists of a couple of 5×7 filters (low-pass filter LP and high-pass filter HP) each consisting of three 2×7 filter LSIs. One of the 5×7 filters is used for processing the process color X, and the other, for processing the edge Edge data signal. The MIS LSI 327 applies the mesh-point removal and the edge emphasis to these output data signals by using the conversion tables, and these processed data signals are mixed into the process color X. The LSI 327 receives an edge EDGE signal and a sharp Sharp signal for switching the conversion tables one to another.

The TRC 342 consists of a RAM of 2 K bytes containing eight conversion tables. The conversion tables may be reprogrammed during the return period of the carriage before each scan. A 3-bit select signal TRSel is used for selecting any of those conversion tables. The data processed by the IRC 342 is transferred to a reduction/enlargement LSI 345 by a transceiver. In the reduction/enlargement unit, RAMs 344 of 8 K bytes constitute a ping-pong buffer (line buffer). The LSI 343 generates resampling pitches, and the addresses for the line buffer.

The output data of the reduction/enlargement unit returns by way of an area memory portion in the second circuit board of FIG. 37(b). An EDF LSI 346 contains a FIFO retaining the data of the previous line, and performs error diffusion processing by using the previous line data. A signal X after error diffusion processing is outputted to an IOT interface by way of an SG LSI 347 in a screen generator unit.

In the IOT interface, the signals outputted from the SG LSI 347 which are received in the form of 1-bit on/off signals are packed into an 8-bit data signal, and sent in parallel to the IOT.

In the second circuit board shown in FIG. 37(d), the data signals actually flowing in the board are for the 16 dots/mm record density. Because of this, a reduction LSI 354 reduces the data into ¼ and digitizes them, and finally stores them into an area memory. An enlargement decode LSI 359 contains a fill pattern RAM 360. When reading the area data out of the area memory to generate a command, the LSI 359 expands the data into 16 dots/mm data. By using the expanded data, it generates a log address, color palette, and filter pattern. A DRAM 356, consisting of four planes, stores coded area data of 4 bits. An AGDC 355 is a controller exclusively used for controlling the area commands.

(III-3) Halftone Image Generating Circuit

Figure 38A:
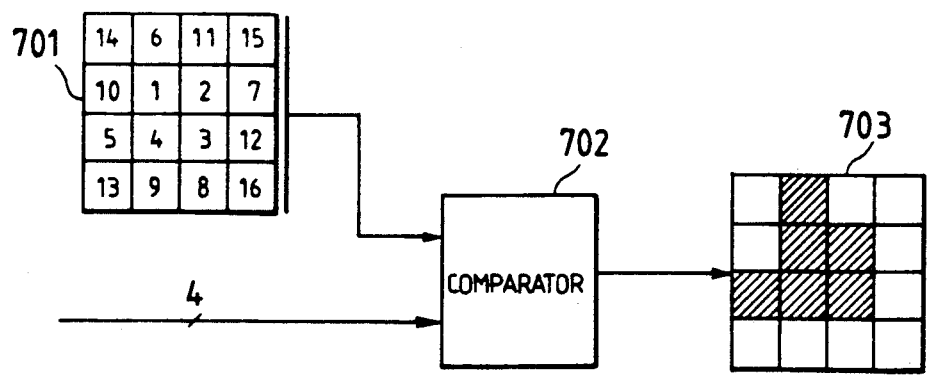
FIGS. 38a-38c illustrate an example of the construction of the tone image generating circuit
Figure 38B:
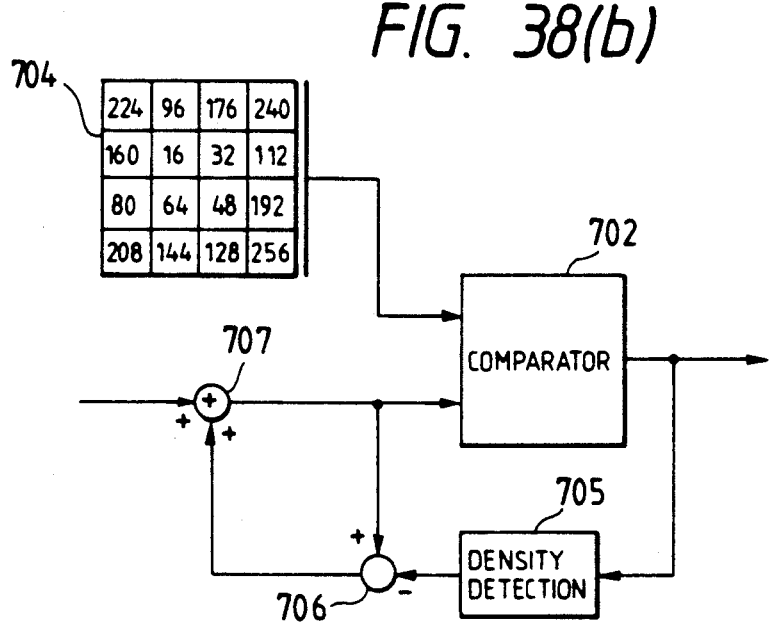
Figure 38C:
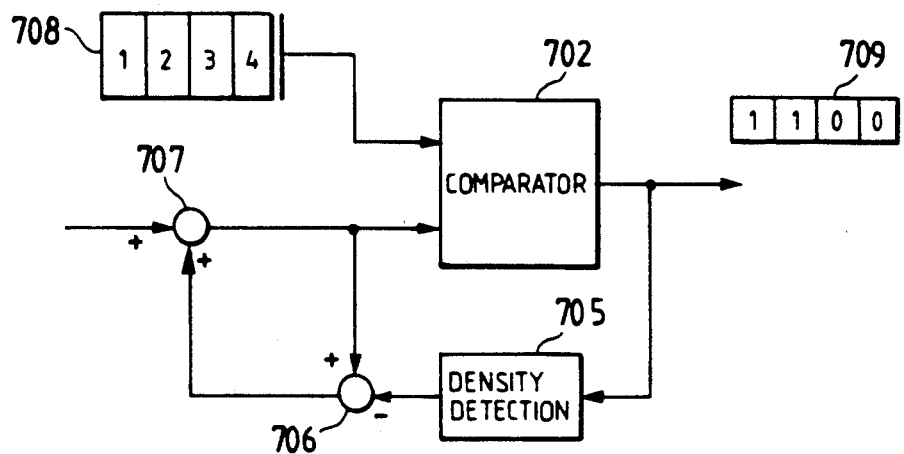

FIGS. 38(a) through 38(c) illustrate embodiments of the halftone image generating circuit of the present invention.

As shown in FIG. 38(a), the basic half-tone image generating circuit comprises a matrix comprising the threshold value data 701 and a comparator 702 which transmits an ON-signal to the IOT when the input image data is larger than the threshold value data. These signals turn ON and OFF a laser beam thereby generating the chromatically graded image 703. The chromatically graded image 703 shown in FIG. 38(a) illustrates an example wherein four bits of input image data "0111" (chromatic grade 7) are transmitted to the comparator 702 representing sixteen chromatic grades.

However, at the completion of the above process, there may be a quantizing error if the matrix comprising the threshold value data is small and if, as in the present invention, an original color sheet is read by the IIT as an eight bit density value of 256 chromatic grades and a resolution of 62.5 μm (400 spi) and reproduced by the dither process. Thus, the desired chromatic gradation characteristics cannot be secured unless the threshold value data matrix is sufficiently large.

If it is desired to reproduce an image comprising 256 chromatic grades and having the same size as the matrix 701 shown in FIG. 38(a), each threshold value of the threshold value data matrix 704 will have to be incremented by 16 at one step, as shown in FIG. 38(b). In the alternative, the threshold value matrix 701 shown in FIG. 38(a) can be used if a conversion circuit, which converts the eight bit density signal of 256 chromatic grades into a four bit density signal of 16 chromatic grades is provided at the comparator input. When the conversion circuit is provided, the input image data, which is assumed, for example, to be 0111 (chromatic grade 7), will be identical to the chromatically graded image 703 shown in FIG. 38(a). However, the following quantizing error will still remain: $119 - 96 = 15$.

In order to improve the chromatic gradation reproduction from a macroscopic standpoint, an error dispersing process is employed whereby the quantizing error is fed back to the input image data as illustrated in FIG. 38(b). This process involves the step of dispersing the quantizing error by feeding the density detected by the density detecting circuit 705 comprising the output side of the comparator 705 back to the input image data, and is based on the number of ON-operations which have been applied to the output data. The subtraction circuit 706, also shown in FIG. 38(b), is used in determine the quantizing error. In the case of the output image represented by chromatic gradation 703 of FIG. 38(a), the number of ON-operations is six and the circuit obtains 15 as the quantizing error value by converting the value into a density value of 96 and then subtracting the density value from 0111, i.e., the number of the chromatic grades found in the input image data previously fed into the comparator. The addition circuit 707 then adds the quantizing error 15 to the subsequent input image data. Therefore, if the next input image data contains 0111 chromatic grades, the quantizing error value 15 is added to it so that 126 chromatic grades are fed into the comparator 702 thereby increasing the number of ON-operations. In other words, the quantizing error is serially dispersed in a forward direction thus improving chromatic gradation reproduction from a macroscopic standpoint.

The above design concept provides a basis for the improvement of the theoretical chromatic gradation reproduction even if the system operates with only a single threshold value. In this case, the system will eventually have 128 threshold values, for example, corresponding to 256 chromatic grades. As a matter of practice, however, the reproduction of dots becomes irregular and unstable causing a noisy state. In other words, although this approach improves the chromatic gradation characteristics, it results in a degeneration of resolution, sharpness, and grain state.

As described so far, when a halftone image is produced by the conventional method, i.e., without applying an error dispersing process, in order to produce a halftone image with favorable chromatic gradation in a short screen pitch via the application of a large threshold matrix, additional contrivances are required in the arrangement having a large threshold value matrix. However, there are still many problems with respect to the breaks and the number of chromatic grades comprising the edges of lines and characters.

Therefore, in order to form a myriad line screen with favorable edge reproduction, one picture element must be divided into smaller segments in the main scanning direction, as illustrated in FIG. 38(c), and an arrangement of threshold values suitable for the formation of a myriad-line screen corresponding to this main scanning direction must be employed. That is to say, it is possible, even with a small threshold data matrix, to achieve favorable edge reproduction of characters and pictures. In addition, it is possible to make improvements on the grain state and the chromatic gradation while making improvements on the problems associated with the dither process which arise when an IOT having a degree of resolution N-times higher than the resolution of the IIT is employed for the main scanning direction in combination with an error dispersing process. Although, in the case, there appears to be a growth nucleus which results in deteriorated resolution to such a extent that disconnections in the character strokes are created. The myriad line process does not result in any such disconnections and therefore attains smoothness in the reproduction of the edges of the lines, characters, and so forth. In addition, this process is capable of producing a screen which will attain dot growth by myriad line units.

(III-4) Screen Generator

(A) General

Figure 39:
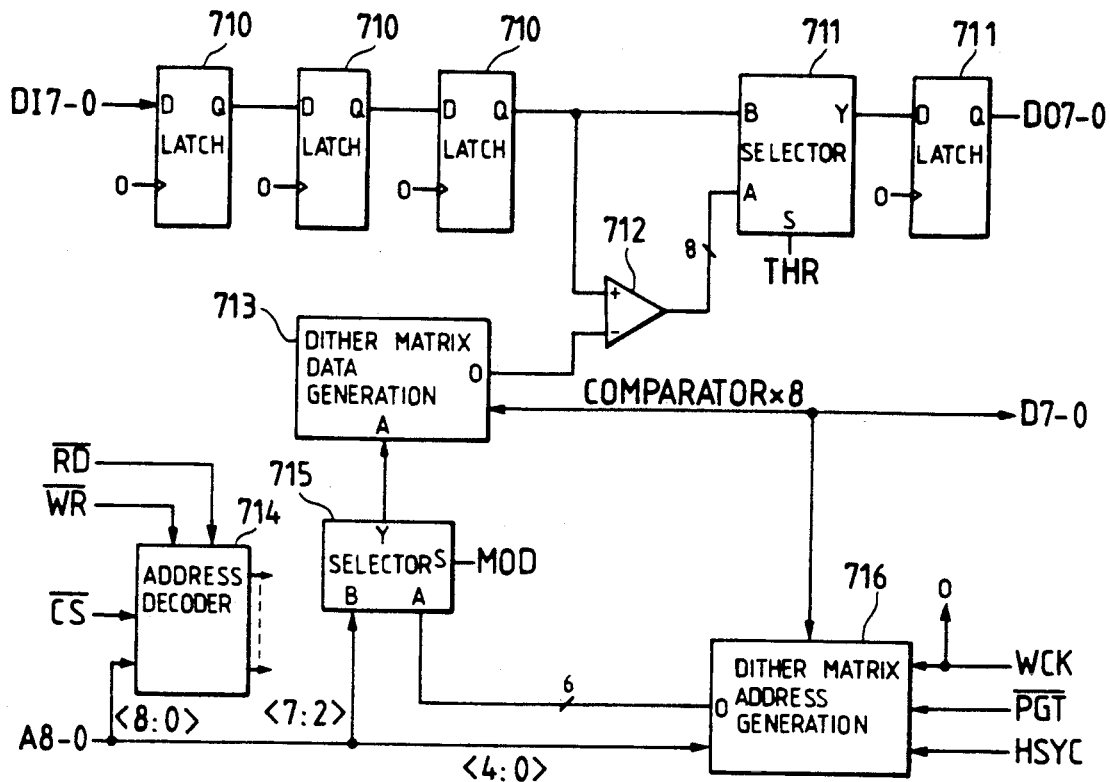
FIG. 39 illustrates an example of the screen generator construction.

FIG. 39 is a chart illustrating an example of the construction of a screen generator.

The screen generator (LSI for SG) applies the dither conversion process to the chromatic gradation data converting the data into eight bits of binary value data. In addition, for every input of an input picture element DI 7-0, a corresponding output picture element DO 7-0 is contemporaneously outputted. The selector 711 selects the changeover between the dither conversion mode and the through mode wherein the data through mode signal THR serves as the changeover signal. In the through mode the input data DI 7-0 is identical to the output data DO 7-0 except an output delay is caused by the four segments on the clock through the latch 710 when the data through mode signal THR is "1." This mode is used, for example, in case an IOT provided with a screen generating means is connected to the system.

The dither matrix data generating section 713 is provided with a RAM which houses the dither matrix. This matrix can vary in size in the range of $2 \times 32$, $4 \times 16$, and $8 \times 8$ in the maximum. The dither matrix address generating section 716 generates the six bit addresses and determines the maximum size of the dither matrix depending on how many bits are occupied by the output of the counter for the subsidiary scanning direction. The data writing mode signal MOD is used for the selection thereof. When the data writing mode signal MOD is "1", the internal RAM address in the dither matrix data generating section 713 corresponds to addresses A7-2 from the outside unit (CPU). At this time, it is possible to write-this data into the RAM via the data bus D7-0 of the CPU. The address decoder 714 decodes the read NRD, the write NWR, the chip select NCS, and the addresses A8-0. The decoded output signals are used to control the overall system.

Figure 40:
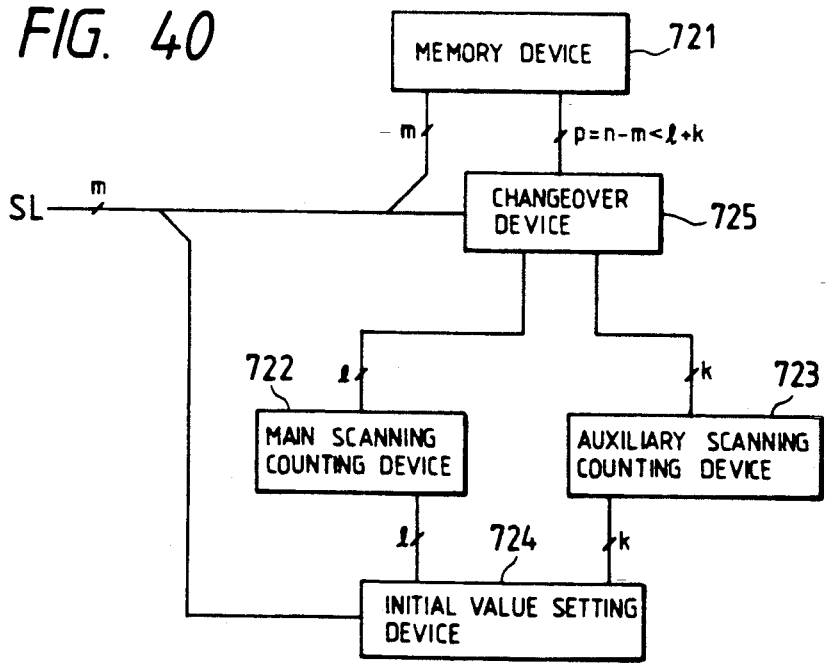
FIG. 40 illustrates the construction of one example of an embodiment of the matrix generating system.

FIG. 40 illustrates an example construction of an embodiment of the matrix generating unit.

In FIG. 40, the outputs from the main scanning counting device 722 and from the subsidiary scanning counting device 723 are fed into the memory device 721 by way of the changeover device 725. The changeover device 725 is fed a matrix changeover signal SL comprising m bits and subsequently outputs a signal comprising p bits comprising the l bits outputted from the main scanning counting device and the k bits outputted from the subsidiary scanning counting device 723. The output signals from the changeover device 725 are used as the addresses in the memory device 721 wherein the equations, $p = n - m$ and $n - m < 1 + k$ should be satisfied.

The initial value residing in the main scanning counting device 722 and the subsidiary scanning counting device 723 are determined by the initial value setting device 724 in accordance with the matrix changeover signal SL. The matrix changeover signal SL is also fed to the memory device 721.

Figure 41:
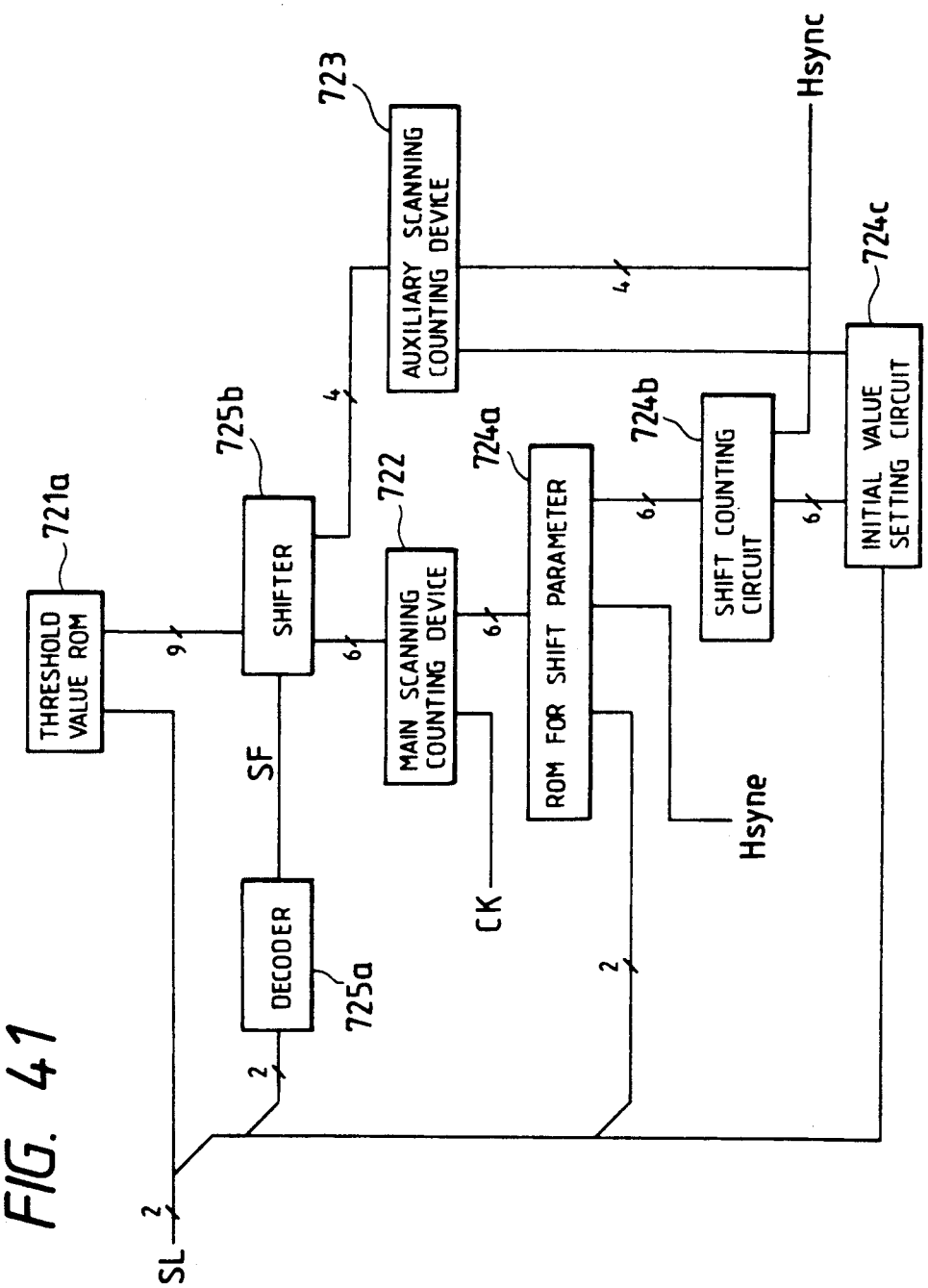
FIG. 41 explains the specific block construction in the threshold value matrix generating system shown in FIG. 40.

FIG. 41 illustrates the construction of the threshold value matrix generating device of FIG. 40.

In FIG. 41, the threshold value ROM 721a accommodates the basic threshold value block and corresponds to the memory device 721 of FIG. 40 while the decoder 725a and the shifter 725b correspond to the changeover device 725 of FIG. 40. The shifter 725b is supplied with the six bit output of the main scanning counting device 722 and the four bit output of the subsidiary scanning counting device 723.

The two bit matrix changeover signal SL is decoded by the decoder 725a and fed as a shift signal SF to the shifter 725b. The shift signal SF controls the changing of the selected state in the shifter 725b.

The shifter 725b selects an arbitrarily selected set of nine consecutive bits from a total output of ten bits from the main scanning counting device 722 and the subsidiary scanning counting device 723 and then outputs the bits to the threshold value ROM 721a comprising, for example, a shift register. The state selected by the shifter 725b is changed over by the shift signal SF. In a certain state, for example, the address signals $A_{21}, \ldots, A_{25}, A_{30}, A_{31}, \ldots, A_{33}$ will be selected from the address signals $A_{20}, A_{21}v, \ldots, A_{25}$, of the main scanning counting device 722 and the address signals $A_{30}, A_{3l}, \ldots, A_{33}$ of the subsidiary scanning counting device 723.

The main scanning counting device 722 is comprised of, for example, a six-bit presettable counter having a counter length and initial value preset by the output from the shift parameter ROM 724a and designed to count up in synchronization with the main scanning clock CK.

The shift parameter ROM 724a is comprised of a look-up table-type ROM and records the initial value as well as the parameters which determine the numeration system and the number of shifts to be employed, depending on the individual colors. The shift parameter ROM 724a is designed to output both the initial value and the parameters adequate for the individual colors in accordance with the matrix changeover signal SL, the line synchronizing signal $H_{syc}$, and the output from the shift counting circuit 724b.

The shift counting circuit 724b determines the pattern corresponding to the change in the number of shifts and is designed to operate as a decimal system counter which counts up by every two lines for Y and C, or as a binary system counter which counts up by every two lines for M and K, for example, on the basis of the six-bit signal outputted from the initial value setting circuit 724c.

The four bit initial value data for subsidiary scanning is supplied from the initial value setting circuit 724c to the subsidiary scanning counting device 723. This data makes the subsidiary scanning counting device 723 operate as a counter for numeration in the binary system, the quarternary system, and the sexternary system for the colors Y, M, C, and K, respectively. Four-bit address signals subsequently generated by the subsidiary scanning counting device 723 are fed to the shifter 725 (b) in synchronization with the line synchronizing signal $H_{syc}$.

As mentioned above, the main scanning counting device 722 is controlled by the main scanning clock CK such that the counting operation is performed repeatedly for the number of the lines L as determined by the initial value setting circuit 724c from the shift position set by the shift parameter ROM 724a for each point set by the main scanning clock CK. During this process, the shift parameter is changed and inputted to the main scanning counting device 722 each time a main scanning cycle is completed, i.e. for each time the line synchronizing signal $H_{syc}$ is generated.

Since it is possible at this time to select, via the shifter 725b, and arbitrarily output selected signals out of the plurality of outputs from the main scanning counting device 722 and the subsidiary scanning counting device 723, it is possible to adequately deal with this even when there are differences among the maximum values of the plurality of basic threshold value matrices in the main scanning counting device 722 and subsidiary scanning counting device 723. For example, when the basic threshold value matrix has a longer line L than a shorter line K, it is sufficient to a greater number of bits from the main scanning counting device 722 than from the subsidiary scanning counting device 723. Similarly, when the line K and the line L are approximately the same in length, it is sufficient to select an approximately equal number of bits from the main scanning counting device 722 as from the subsidiary scanning counting device 723. Because the relationship between the address and the threshold value ROM 721a is flexible, it is possible to allocate the addresses such that the capacity of the memory device 721 is fully utilized. It is therefore not necessary to increase the memory capacity.

(B) Generation of Dither Matrix Address

Figure 42:
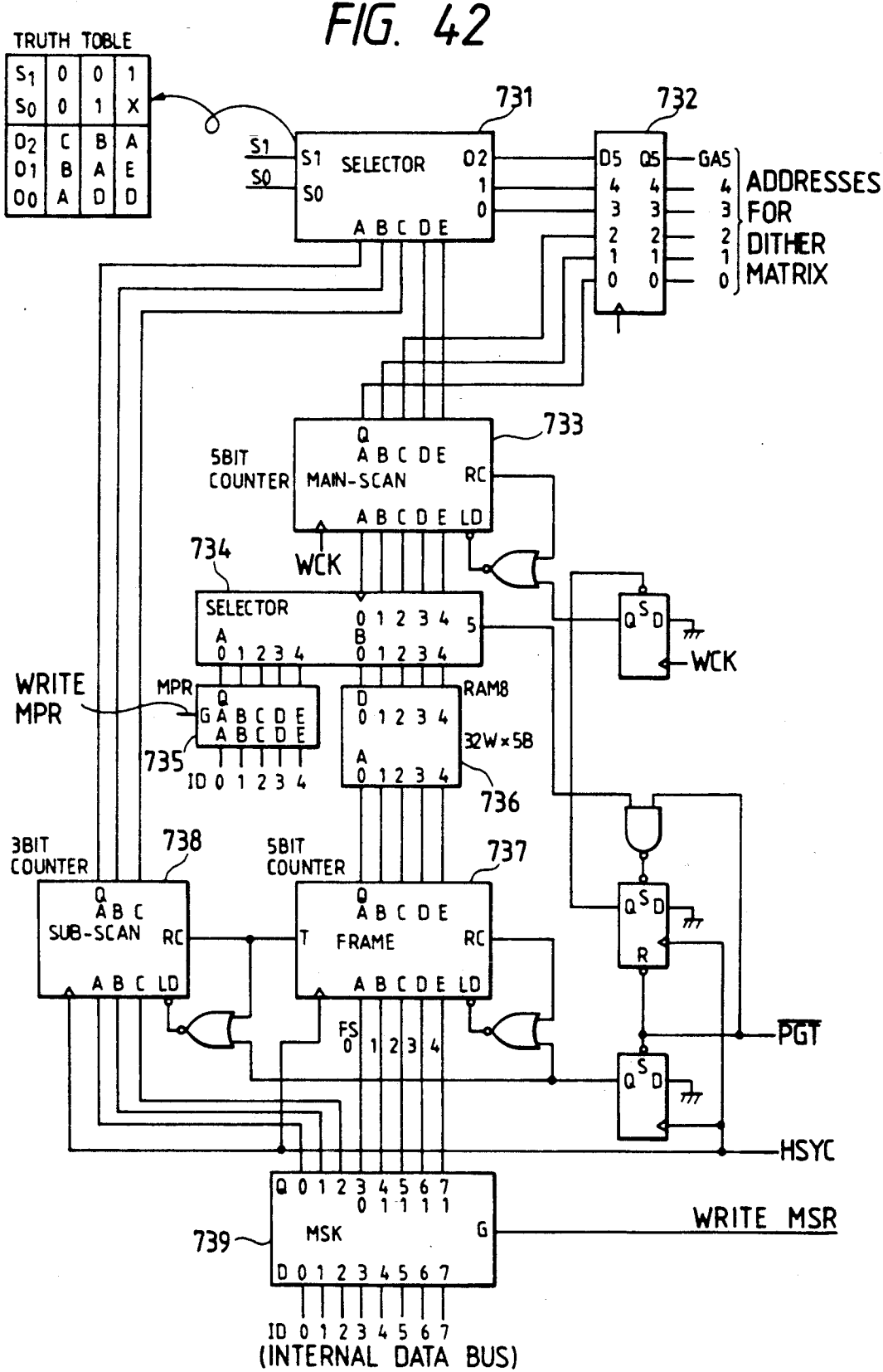
FIG. 42 illustrates the specific construction of the dither matrix address generating section.

FIG. 42 illustrates an example of the specific construction of the dither matrix address generating section.

Figure 59:
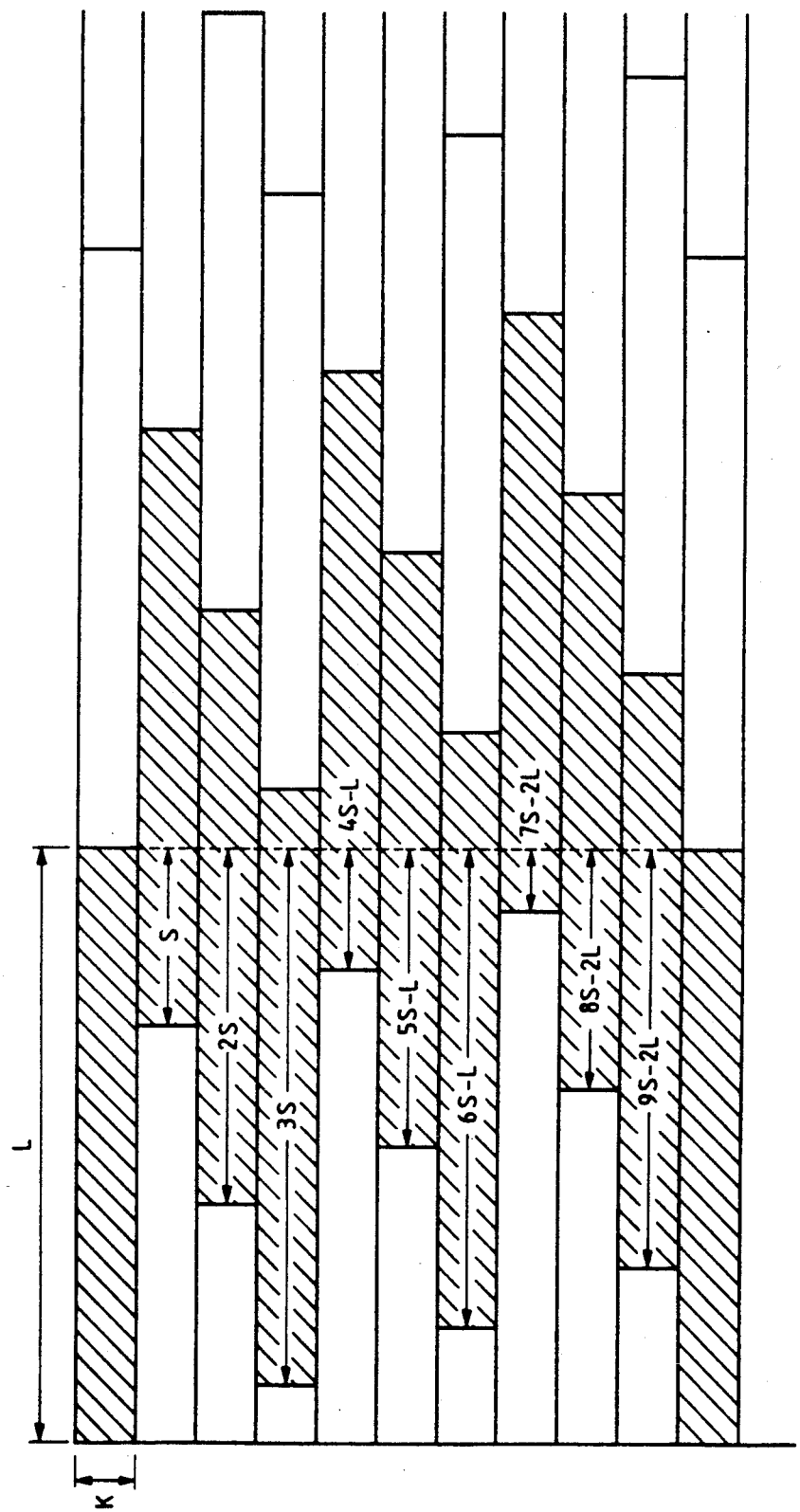
FIG. 59 illustrates an example shift of the threshold value basic block.
Figure 60A:
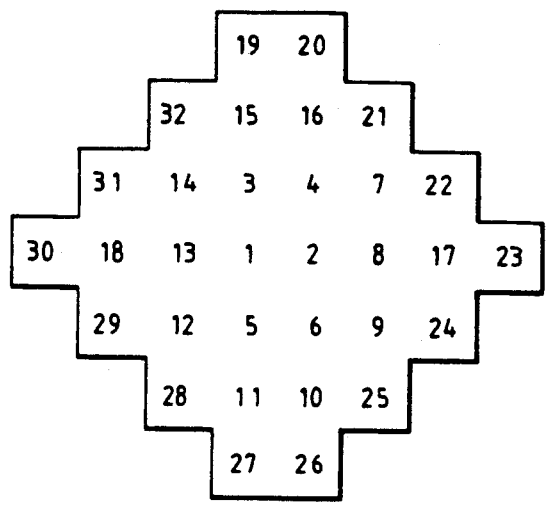
FIGS. 60a-60b illustrate the threshold value matrix and the threshold value basic block when the screen angle is set at 45 degrees.
Figure 60B:
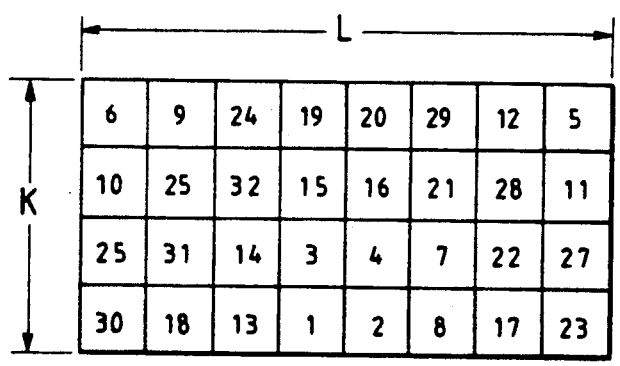
Figure 61A:
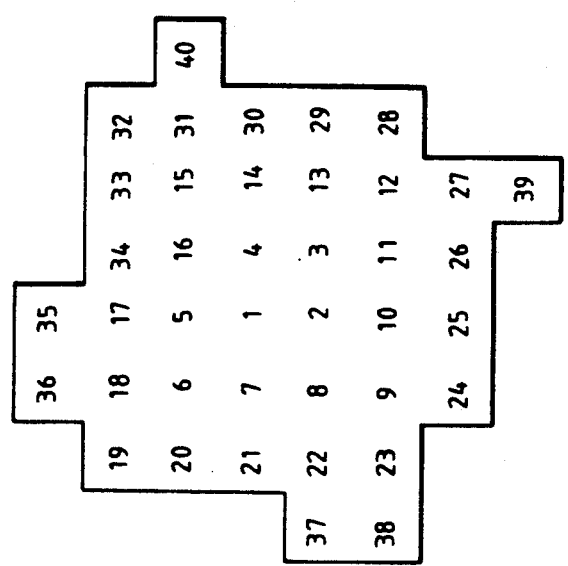
FIGS. 61a-61b illustrate the threshold value matrix and the threshold value basic block when the screen angle is set at 71.5 degrees.
Figure 61B:
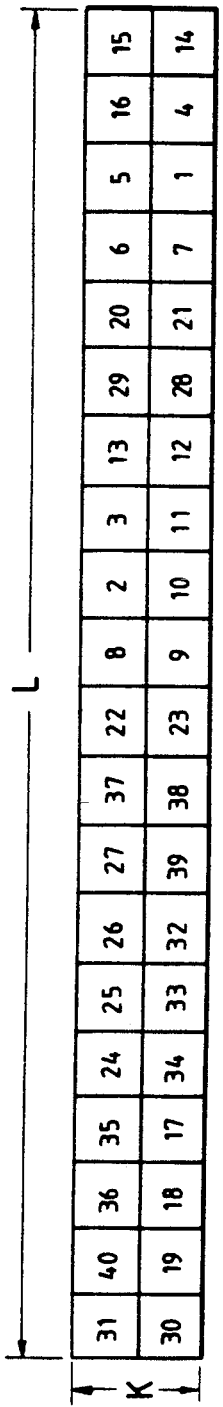
Figures 62, 63:
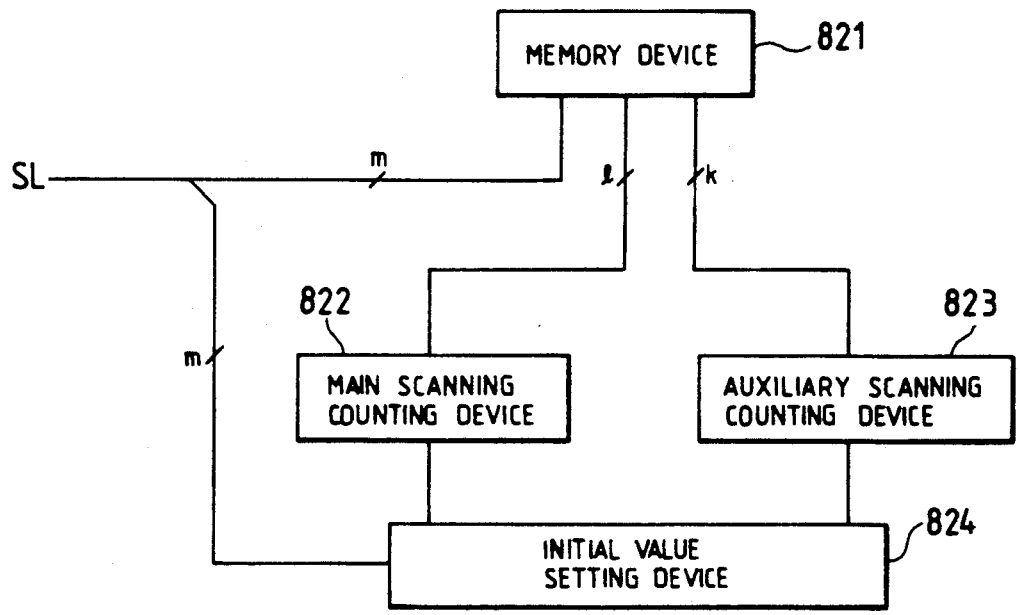
FIG. 62 illustrates the threshold value matrix and the threshold value basic block when the screen angle is set at 0 degrees.
FIG. 63 illustrates an existing example of a conventional value matrix generating system

In FIG. 42, the selector 731 selects the address lines via five inputs and three outputs and is controlled with the selected signals S0 and S1. The main scanning direction counter 733 is a loadable counter with a five bit output. When the counter has counted from the loaded value to "1F", the data is reloaded. The three bits in the lower-order positions are always used while the two bits in the higher-order positions must be selected. For the values to be loaded, the data in the RAM 736 are used for the first matrix in a single line while the values in the register 735 are used for any subsequent matrices. That is to say, the start address corresponding to the number of shifts shown in FIG. 59 is generated with the data in the RAM 736 for the initial matrix in a single line, and the addresses in any subsequent matrices are generated with the register 735 from the beginning of the matrix. Moreover, the beginning of a single line involves raising the line synchronizing signal $H_{syc}$.

Figure 57:
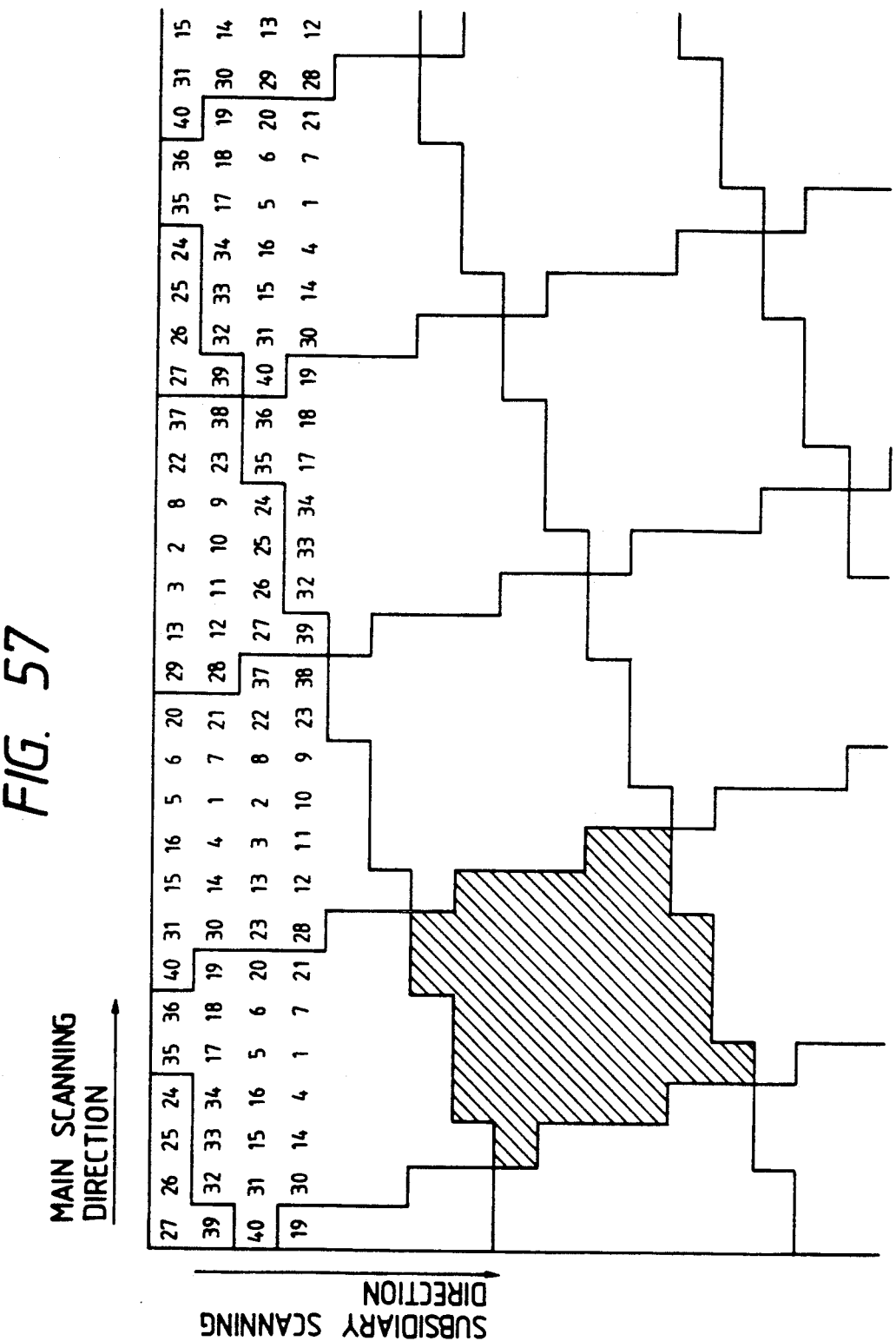
FIG. 57 illustrates an example of the arrangement of the threshold value matrices when the screen angle is set at 18.5 degrees.
Figures 58A, 58B:
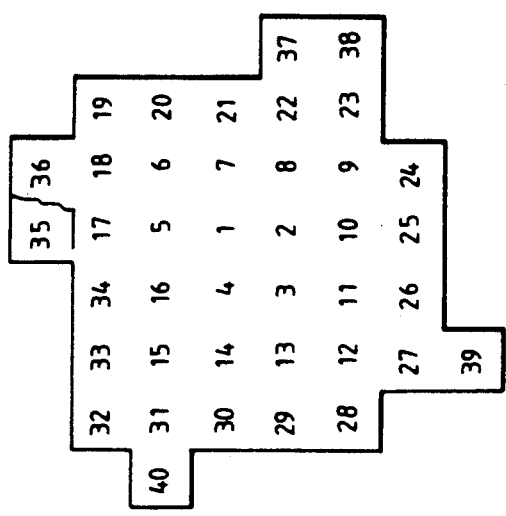
FIGS. 58a-58b illustrate the threshold value matrix and the threshold value basic block at the time when the screen angle is set at 18.5 degrees.

Thus, the address information for starting with the matrix offset in this manner is stored in the RAM 736 while the number of repetitions is stored in the register 735. This feature makes it possible to perform the dither conversion having an angle as illustrated in FIGS. 57 and 59. The input address for the RAM 736 is the output from the five-bit frame counter 737. Therefore it is possible to specify the starting value for the dither matrix by 32 different offsets.

The frame counter 737 counts up each time the subsidiary scanning direction counter 738 overflows, i.e., each time one matrix comes to an end in the subsidiary scanning direction, and the frame counter 737 serially generates the start addresses S, 2S, . . . of 9S−2L has been generated, the number of counts becomes "1F" and the initial value will be loaded again.

The matrix size register 739 specifies the size of the dither matrix in the subsidiary scanning direction in the three lower-order positions while it specifies the number of frame 1 in the dither matrix in the subsidiary scanning direction in the five higher-order positions. For example, if the size of the dither matrix in the subsidiary scanning direction is "3", the register three bits in the lower-order positions and then sets the value "11101" when the three times of 3×4 will lead to a state equivalent to the original state.

The main scanning resetting register 735 specifies the size of the dither matrix in the main scanning direction. The data set therein will be loaded into the counter for the main scanning direction. The counter counts up from that value to the value "1F", and, when the value "1F" is reached, the preset value is reloaded into the counter for the main scanning direction. Accordingly, if the size of the dither matrix is 3×4, for example, the register sets the value "11100".

(C) Memory Control Circuit

Figure 43:
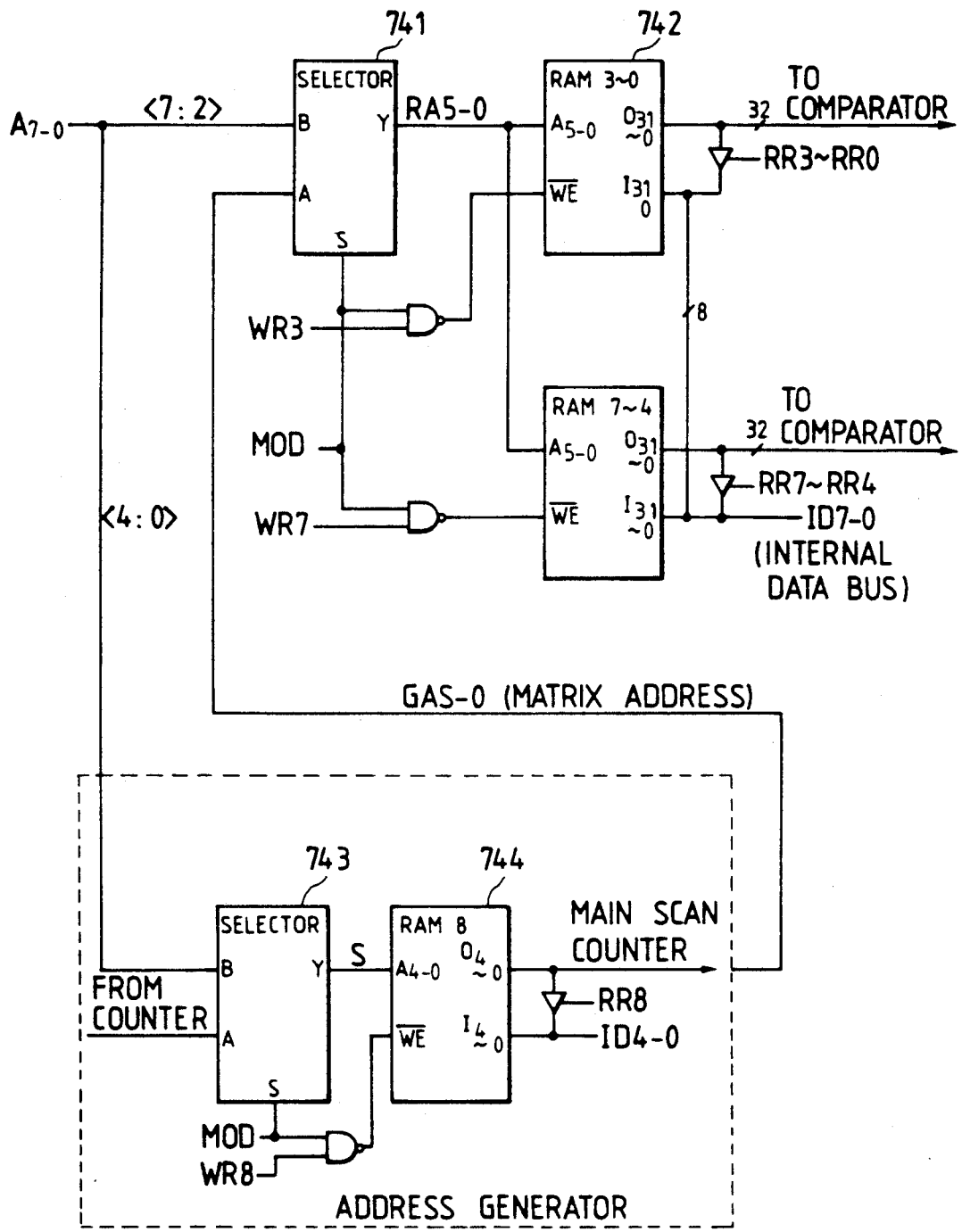
FIG. 43 illustrates an example of the specific construction of the RAM control circuit.
Figure 44:
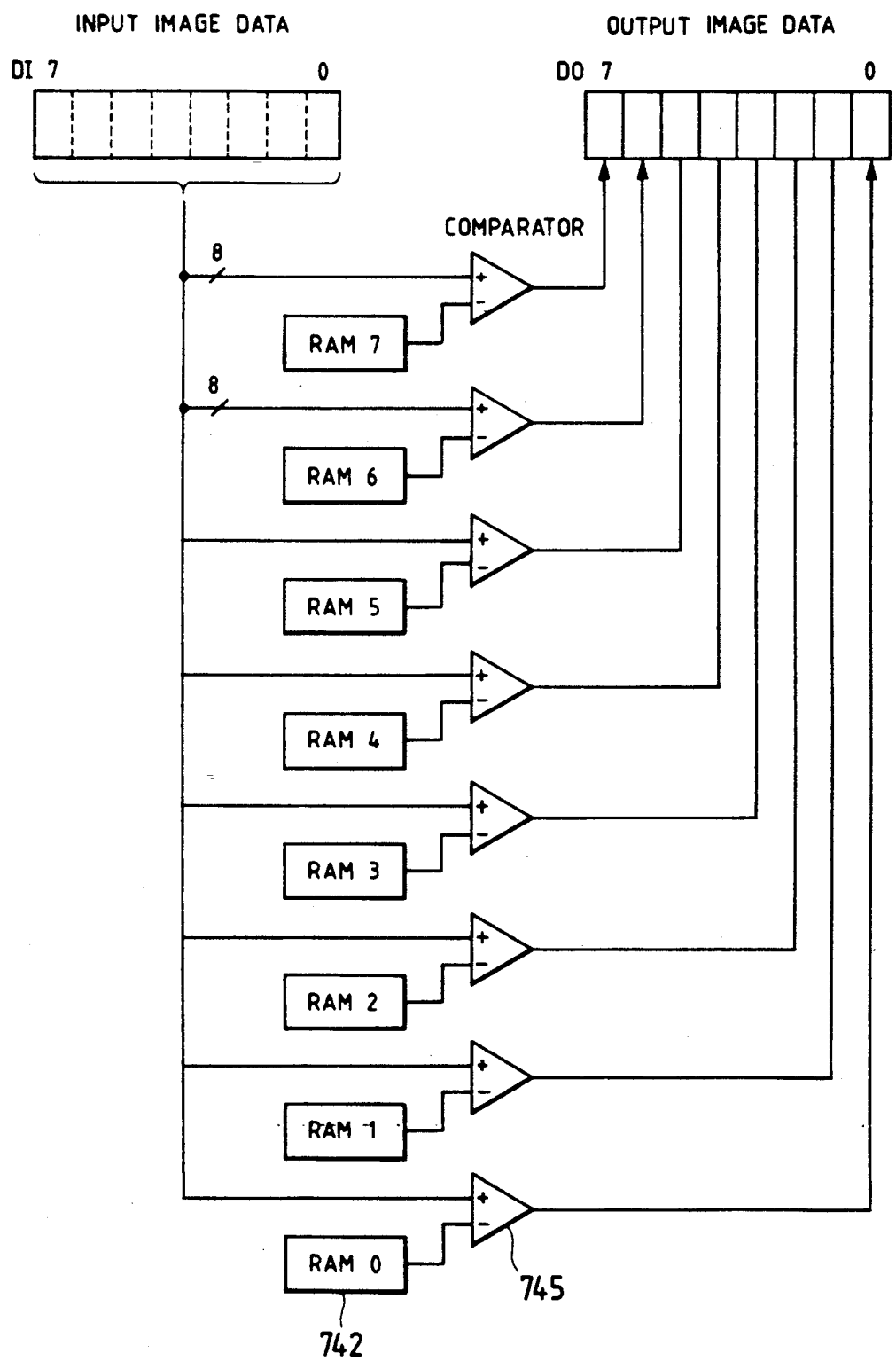
FIG. 44 illustrates an example construction of the dither conversion circuit.
Figure 45:
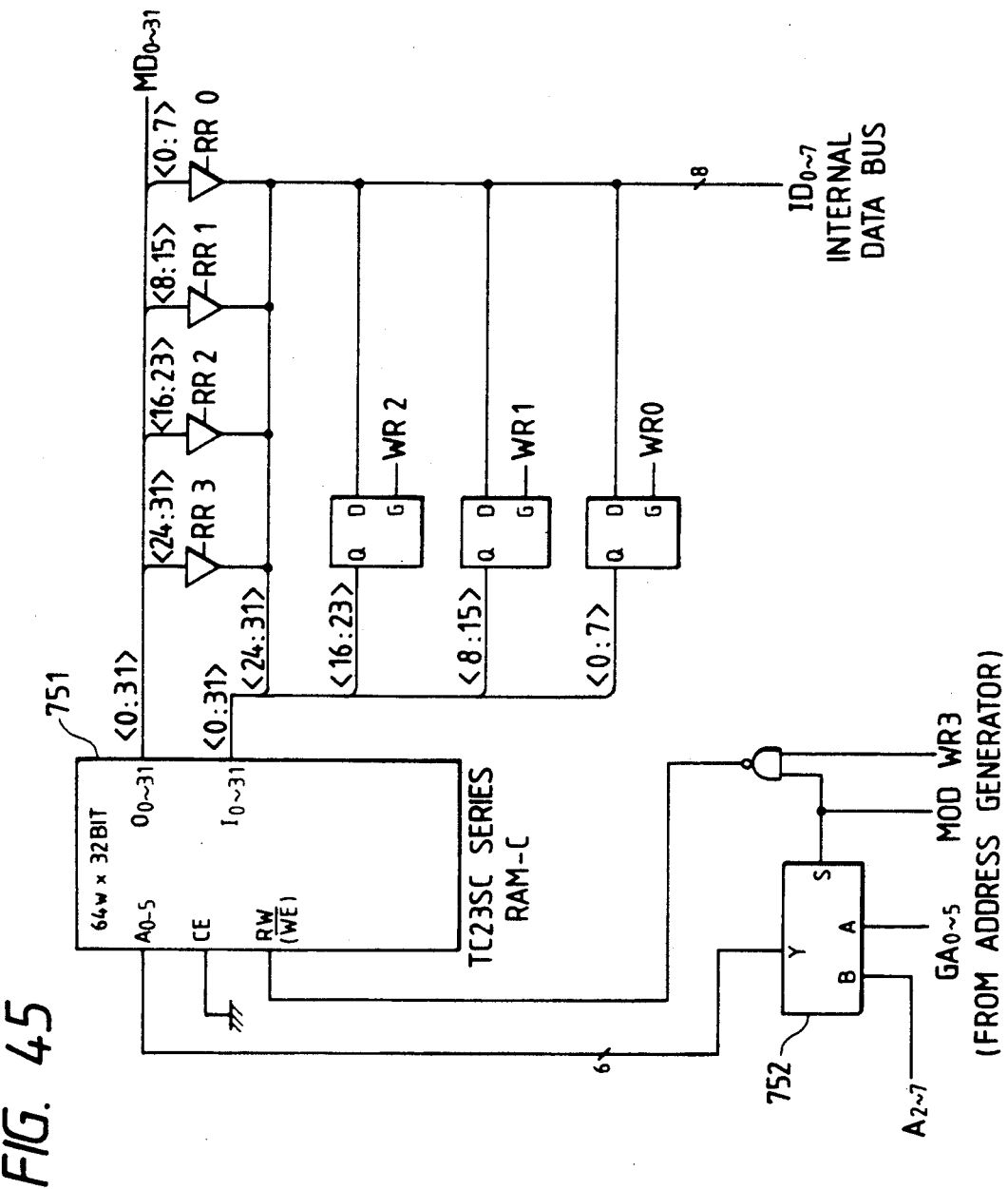
FIG. 45 illustrates an example construction of the dither memory block.

FIG. 43 illustrates an example construction of the RAM control circuit, FIG. 44 illustrates an example construction of the dither conversion circuit, and FIG. 45 illustrates an example construction of the dither memory block.

As shown in FIG. 43, the dither matrix data is stored in the RAM 742 at "7-0". Signals RR 7-0 are for reading out data while signals WR 7-0 are for writing data. As shown in FIG. 44, the values stored in the RAM 742 are compared with the input image data from one input picture element. When the value of the input picture element data exceeds the value stored in any one of the RAM 742 locations, the output bit from that RAM location will be "1". The system is designed so that an output picture element comprising a maximum of eight bits will be generated for each input picture element.

The RAM 742 is comprised of two memory devices each having a width of 32 bits and corresponding to the RAM 742 locations "3-0" and "7-4", respectively. Date will only be written to the RAM when data is written to the RAM 742 locations "3" and "7". Consequently, it is necessary to write data to the RAM location "3" after data is written to the RAM locations "0"-"2". Therefore, if only six output bits are needed for the dither matrix of one input picture element, the RAM location "6" and the RAM location "7" as well as the RAM locations "0"-"3" can be used thus eliminating the need for performing wasteful operations for writing the data into the RAM. The output picture elements, however, will only be effective in bits 0-3 and bits 6 and 7.

The operations described below are for the case in which the matrix is of the size 3×4. As with the example described above, the same state as the original state after three such operations in the subsidiary scanning direction is assumed. In this case, the counter 733 for the main scanning direction counts up in the sequence (11100)→(11101)→(11110)→(11111) while the counter 738 for the subsidiary scanning direction counts up in sequence (101)→(111). Therefore, since the addresses for the RAM locations "0"-"7" is (101100)→(101101)→(101110)→(101111)→(110100)→(110101)...(111100)..., the data $a_0 a_1, ..., a_7$ corresponding to a, is stored in RAM locations "0-7" at the address 101100, the data $b_0, b_1, ..., b_7$ is set at address 101101, and the data $l_0, l_1, ... l_7$ is set at the address 111111, respectively.

Figure 46A:
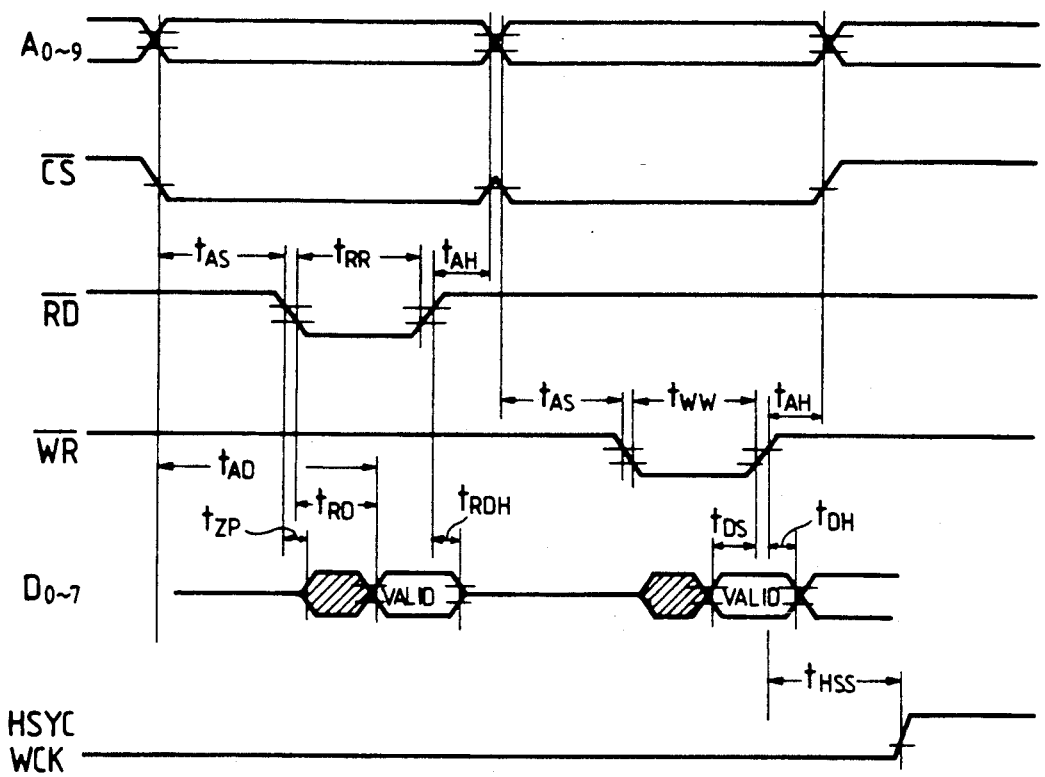
FIGS. 46a-46b illustrate the timing wave-form.
Figure 46B:
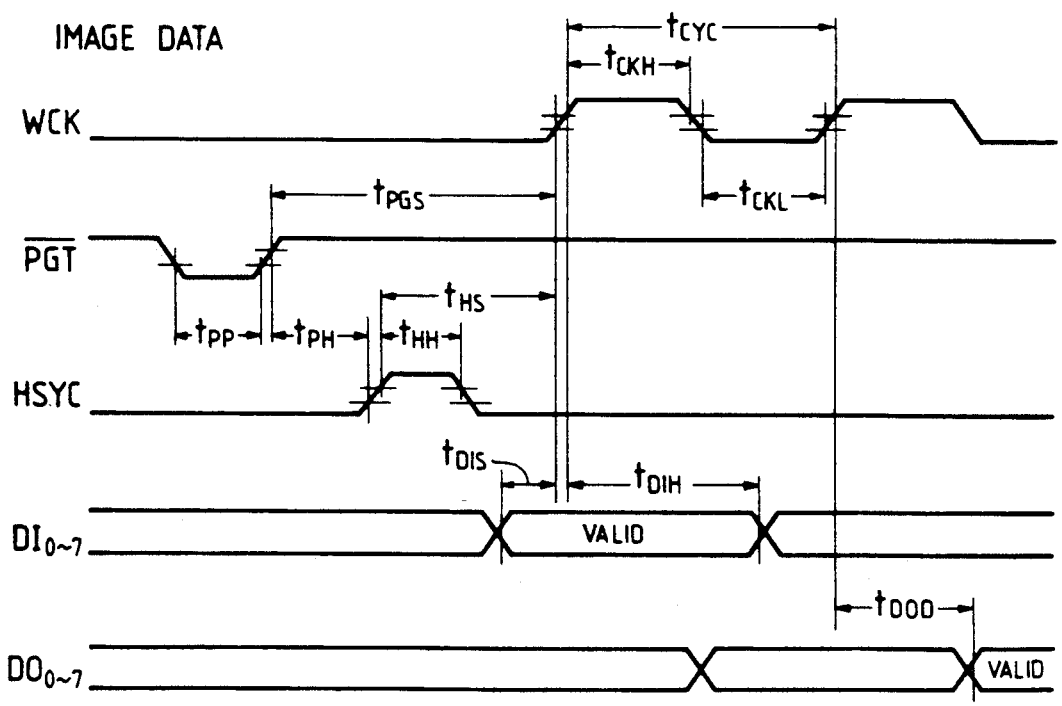

FIG. 46(a) illustrates the timing wave-form for the CPU accesses and FIG. 46(b) illustrates the timing wave-form for the image data timing. In these figures, $t_{AS}$ represents the set-up time, $t_{AR}$ represents the address holding time, $t_{HSS}$ represents the time for the rising of the HSYC or the WCK after the rising up of the NWR, $t_{ZP}$ represents the data bus delay time, $t_{AD}$ represents the address data access time $t_{RD}$ represents the NRD data verification time, $t_{RDH}$ represents the data off time, $t_{DS}$ represents the data set-up time, $t_{DH}$ represents the data holding time, $t_{PGS}$ represents the NPGT set-up time with respect to the WCK, $t_{PH}$ represents the NPGT set-up time with respect to the HCYC, $t_{HS}$ represents the HCYC set-up time, $t_{DIS}$ represents the image data set-up time, $t_{DIH}$ represents the image data holding time, and $t_{DOD}$ represents the image data output delay time.

In order to set up each of the controlling modes mentioned above, a mode register MDR (omitted from the figures) is provided. This register comprises the data through mode bit THR, the data writing mode bit MOD, the RAM changeover bit PAGE, and the selection bits S0-S1.

Because the RAM changeover bit PAGE is limited by the set number of pins comprising the mode register MDR LSI, the RAM address is changed over in such a way that access can be made to RAM locations "4"-"7" when the RAM changeover bit is "1".

The selection bits S1-S0 are used for selecting the number of bits for the screen address counter. By controlling the selector 731 with these two bits, the number of bits occupied by the counter in the subsidiary scanning direction 738 is determined as illustrated in Table 740 below.

TABLE 740

| S | Main | Sub | Size of Matrix |
|---|------|-----|----------------|
| 00 | 3 | 3 | (8 × 1) – (1 × 8) / (8 × 1) – (8 × 8) |
| 01 | 4 | 2 | (1 × 1) – (1 × 16) / (4 × 1) – (4 × 16) |
| 1x | 5 | 1 | (1 × 1) – (1 × 32) / (2 × 1) – (2 × 32) |

The relationships among these two selection bits S1-S0, the number of bits "Main" comprising the counter in the main scanning direction 733, the number of bits "sub" comprising the counter in the subsidiary scanning direction 738, and the size of the dither matrix available for selection are also presented in the above Table 740.

(D) Threshold Data Changeover

Figure 47A:
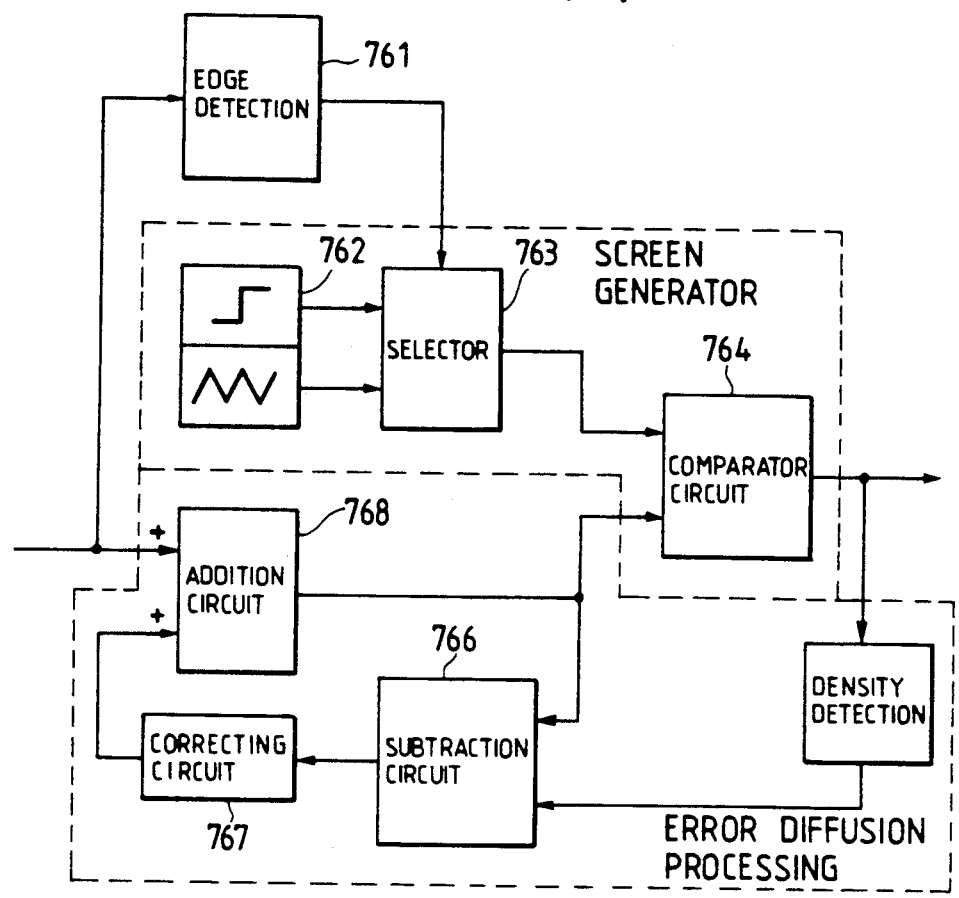
FIGS. 47a-47b illustrate an example construction of the halftone image generating circuit provided with a circuit for the changeover of the threshold value data.
Figure 47B:
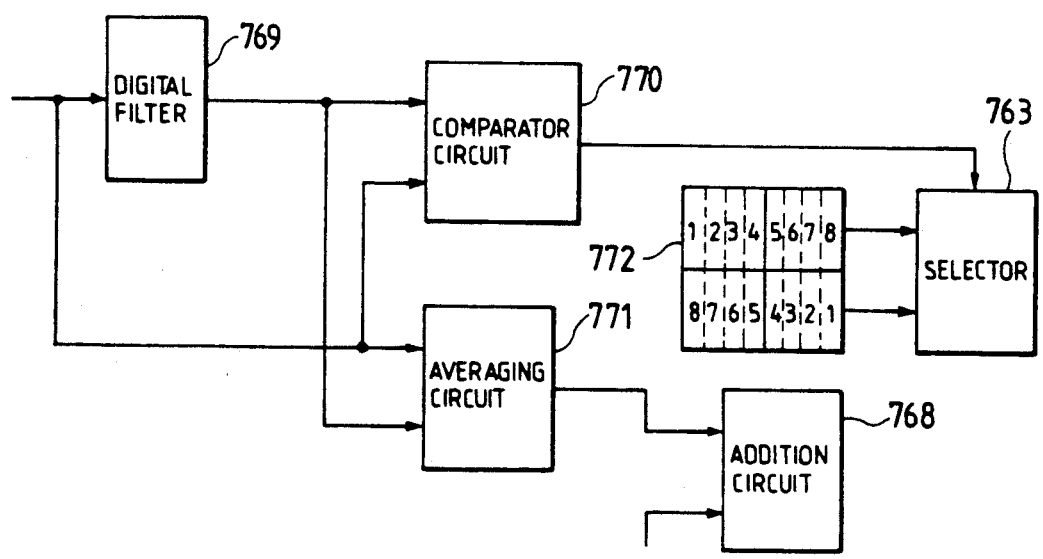

FIGS. 47(a) and 47(b) illustrate an example construction of the circuit for the changeover of the threshold data which comprises the halftone image generating circuit of the present invention.

In FIG. 47(a), the threshold value data 762 has a fixed threshold value and a threshold value for a triangular wave or mesh dots. The selector 763 affects the changeover of these threshold values and supplies one of them to the comparator circuit 764. The edge detecting circuit 761 outputs the changeover signal. The edge detecting circuit 761 detects edges on the basis of the image data in the input, and, once it has detected an edge, the edge detecting circuit 761 selects the fixed threshold value form the threshold value data 762. If the edge detecting circuit 761 does not detect an edge, it signals the selector 763 to select the threshold value for a triangular wave or for mesh dots from the threshold data 762.

The correcting circuit 767 comprises line buffer circuits and circuits for processing the weighting coefficients (error filters). The correcting circuit 767 transmits the data in the proximity of the image data in the input, multiplies the quantizing error by the prescribed coefficient, and transmits the data in the proximity of the image data in the input to the adding circuit 768. Thus, by using a fixed threshold value for detecting the edge and using either the triangular wave or mesh dot threshold value for detecting other parts, it is possible to eliminate much of the noise and physical disorder which tends to be generated in the transition to a character or halftone. Consequently, it is possible to reproduce high quality characters and halftone images.

FIG. 47(b) shows an embodiment of the present invention designed to change the threshold value in accordance with the density gradient of the image data.

The embodiment of FIG. 47(b) overcomes the disadvantages associated with the conventional ED (Error Diffusion) type screen which is susceptible to the occurrence of low-frequency structures, has a view-obstructing pattern at the time when a myriad line screen is formed, and is accompanied by inferior detail reproduction. The comparator circuit 770 and the averaging circuit 771 input the image data $d_1$ and $d_2$ for the two consecutive picture elements, i.e. the image data $d_1$ input through the digital filter 769 and the image data $d_2$ which precedes $d_1$. The comparator circuit 770 controls the selector 763 by comparing the data $d_1$ and $d_2$ to determine the larger of the two, and then appropriately selecting the threshold value data pattern. If the density is increasing, i.e., $d_1 > d_2$, the comparator circuit 770 selects the pattern "1 2 3 4 5 6 7 8". If the density is decreasing, i.e., $d_1 < d_2$, the comparator circuit 770 selects the threshold data in the pattern "8 7 6 5 4 3 2 1". The averaging circuit 771 performs the averaging operation $(d_1 + d_2)/2$ with respect to two consecutive picture elements and inputs this as the image data for the generation of a screen into the adding circuit 768 for the error dispersion process. Thus, by determining the number of dots to be made for the input data as averaged for every two picture elements, and by changing over the pattern of the threshold value data to be adopted in accordance with the gradient of density (the relationship in terms of size) between the two picture elements, it is possible to improve the reproduction of details by reducing the view-obstructing low frequency structure by simple hardware means.

(E) Screen Generator Control and Error Dispersion

Figure 48:
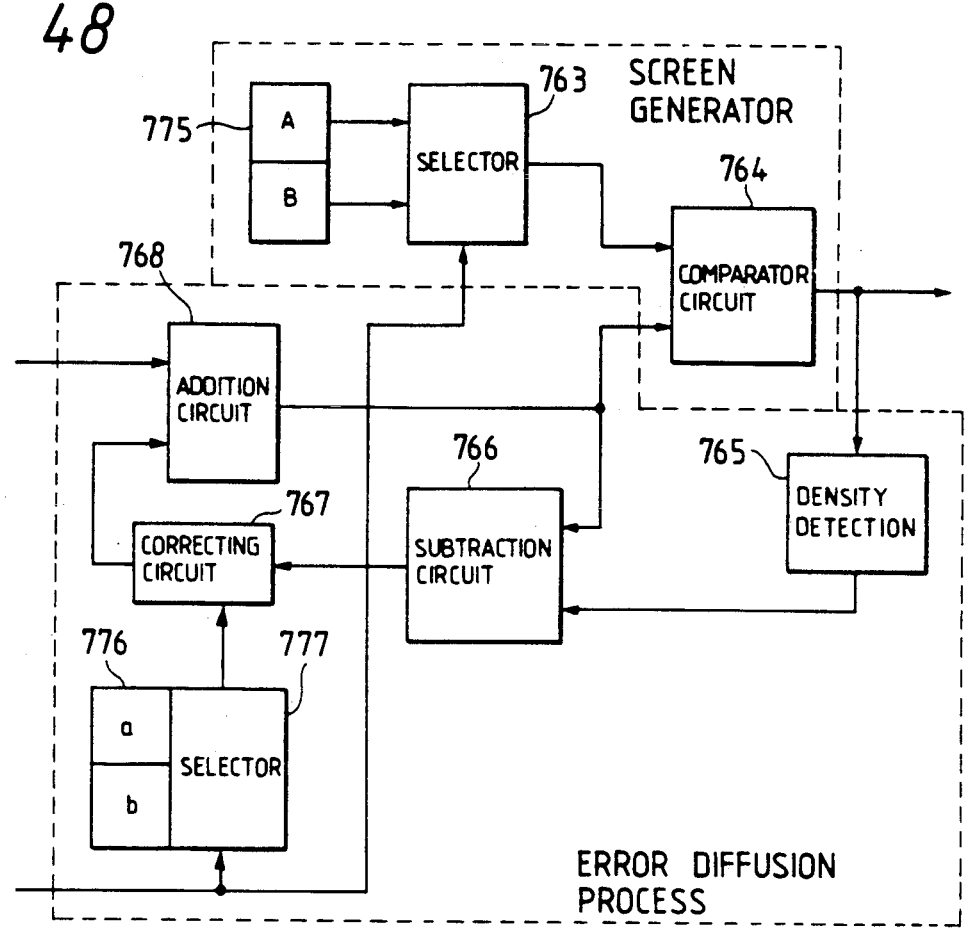
FIG. 48 illustrates an example construction of the circuit for selecting the threshold value matrix and the error dispersing coefficient by the use of the selecting signal.

FIG. 48 illustrates one example of the construction of the circuit that selects the threshold value matrix and the error dispersion coefficient via the select signal.

When a plurality of different types of images such as characters, photographs, and pictures are mixed on one original sheet, a plurality of threshold value matrices and error diffusion coefficients, one suitable for each individual type of image, is needed. Therefore, the system illustrated in FIG. 48 has been designed to select the threshold matrix and the error diffusion coefficient by applying either an area signal as the selecting signal as specified on the original sheet or an image-type signal detected by the pre-scanning process. The system of FIG. 48 comprises two types as the screen generator threshold value matrix 775 and as the error conversion process coefficient 776. These are employed in a construction in which these are selected by their changeover with the selectors 763 and 777 by a one-bit selecting signal. This feature makes it possible, for example, to select A for the threshold value matrix 775 and for the coefficient 776 when the selecting signal is set to "1" and to select B for the threshold value matrix 775 and b for the coefficient 776 when the selecting signal is set to "0". Therefore, it is possible to reproduce original sheets comprising a mixture of characters, photographs, pictures, etc. in a manner suitable for each respective image type.

The error dispersion coefficient is a weighting coefficient and is applied to the quantizing error between the input image data and the output data as detected by the subtracting circuit 776. It is usually designed to multiply the coefficient with the error data on the several picture elements one line ahead and the error data on the immediately preceding picture element, and then add the resulting product to the input picture element data. For example, if four error data items are to be added, the sum total of their weighting coefficients $c_1$, $c_2$, $c_3$, and $c_4$ will be 1.

Figure 49:
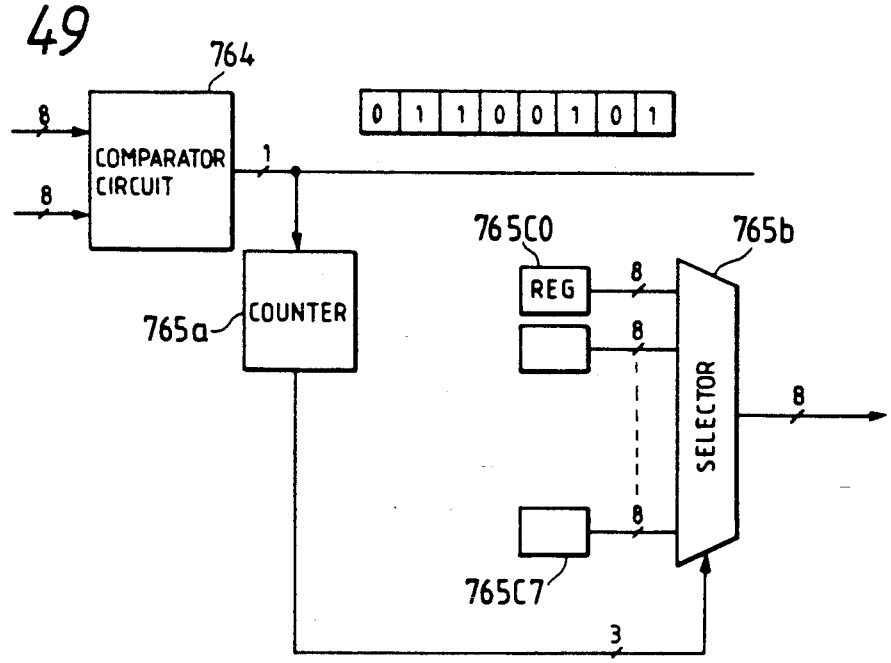
FIG. 49 illustrates an example construction of the density detecting circuit.

FIG. 49 illustrates an example of the construction of the density detecting circuit. The output from the comparator circuit 764, which forms the screen generator, develops into binary serial data wherein a "1" turns on the laser dot of the IOT and a "0" turns off the laser dot on the basis of the comparison of the input image data and the threshold value data. Therefore, in order to detect the quantizing error by setting this in correspondence with the image data in the input, it is necessary to count the number of bits in the "1" (ON) state and then to convert this number into a degree of density. The counter 765a counts the number of bits in the "1" state and the decoder 565b generates the register selecting signal by decoding the number counted value. Then, the registers 765c0–765c7 store the converted density values. The converted density values increase by 32 in terms of chromatic grades each time the count number increases by one, provided that the eight bit image data in the input is in 256 chromatic grades and corresponds with output data comprising eight On/OFF bits. Similarly, if the error dispersing process is performed by the single picture element as the unit, wherein the picture element is divided into four parts in myriad-line patterns, as explained earlier, the eight bit 256 chromatic grades will be expressed by four sets of ON/OFF data bits whereby the converted density value will increase by 64 each time the count number increases by one.

The converted density value for either register 765c0–765c7 is selected and outputted by the decoder 765b, and is subtracted from the image data input into the comparator circuit 764 by means of the subtracting circuit 776 (not shown in FIG. 49).

Figure 50A:
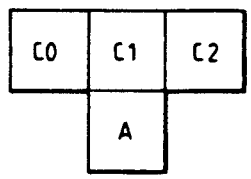
FIGS. 50a-50b illustrate the construction of the correcting circuit for the data to be added onto the highlighted picture element.
Figure 50B:
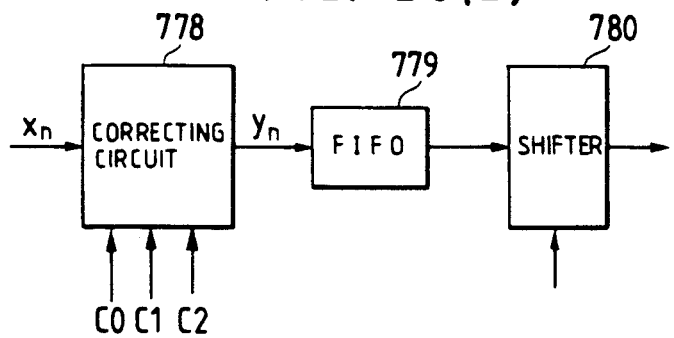

FIGS. 50(a) and 50(b) illustrate the construction of a correcting circuit for the data added into the highlighted picture element.

As shown in FIG. 50(a), the correcting picture elements to be added onto the highlighted picture element A for the purpose of performing the error dispersing process applied thereto are those one line ahead and those preceding and following them. When the respective data is expressed as $X_n$, $X_{n+1}$, and $X_{n+2}$, and when the respective coefficients are expressed as C0, C1, and C2, the data $y_n$ to be added to the picture element is calculation by the following equation:

$$y_n = (C0 \times X_n) + (C1 \times X_{n+1}) + (C2 \times X_{n+2}).$$

The correcting arithmetic operation circuit 778 shown in FIG. 50(b) performs the above arithmetic operation. The FIFO 779 causes a delay in order to add the $y_n$ data to the highlighted picture element which is delayed by one line. The shifter 780 comprises a one-bit register in the error dispersing process circuit, and, in case it is made possible-to effect a changeover in indication with this value as to whether it is in one bit or in two bits that the error data in the circuit represents one chromatic grade, the shifter 780 permits the handling of the error data −256 to 254 or −128 to 127 in eight bits as they are originally.

(III-5) Error Dispersing Process Circuit

(A) Circuit Construction

Figure 51A:
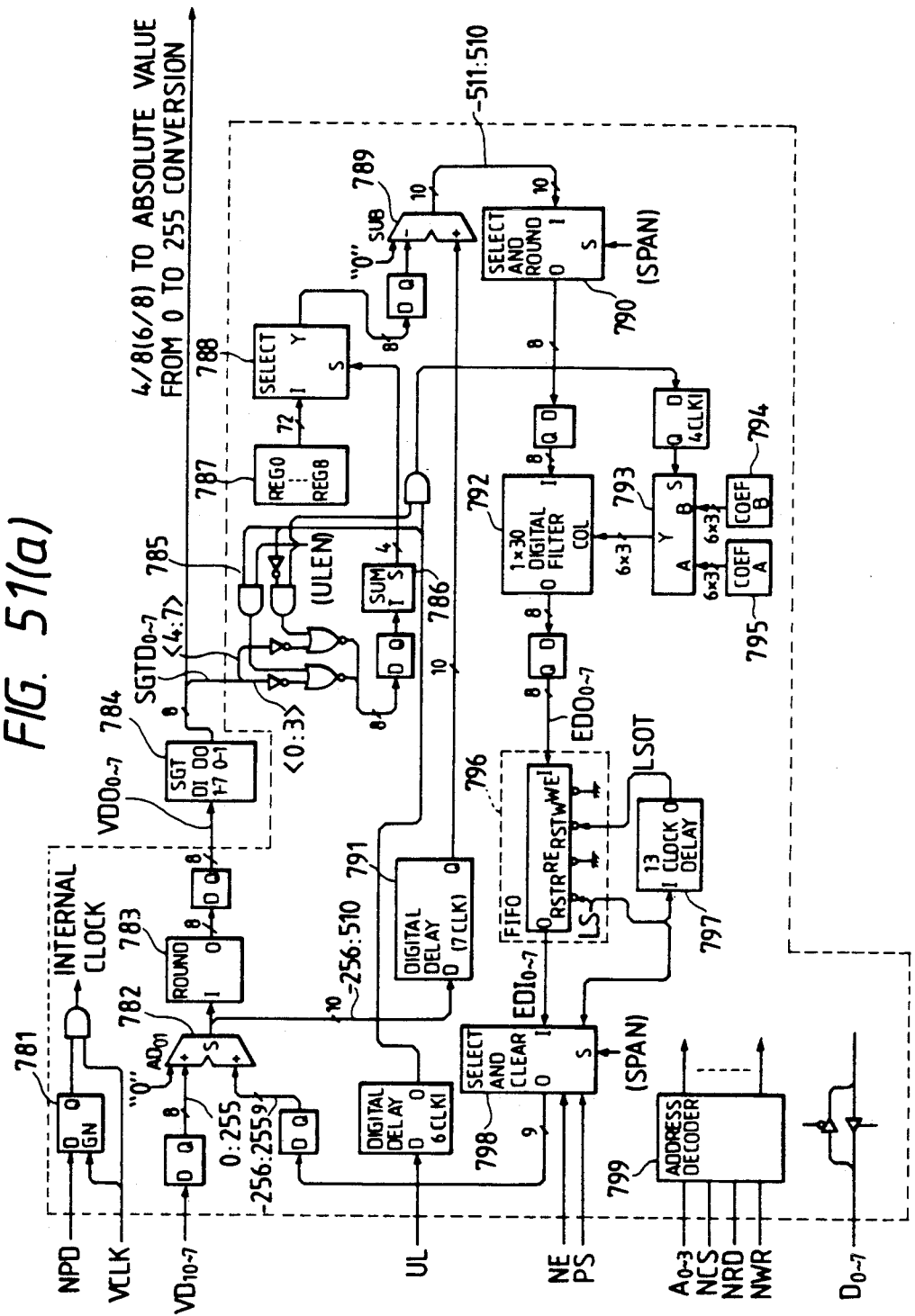
FIG. 51(a) illustrates an example construction of the circuit for generating a screen by performing the error dispersing process on to image data in the input.
Figure 51B:
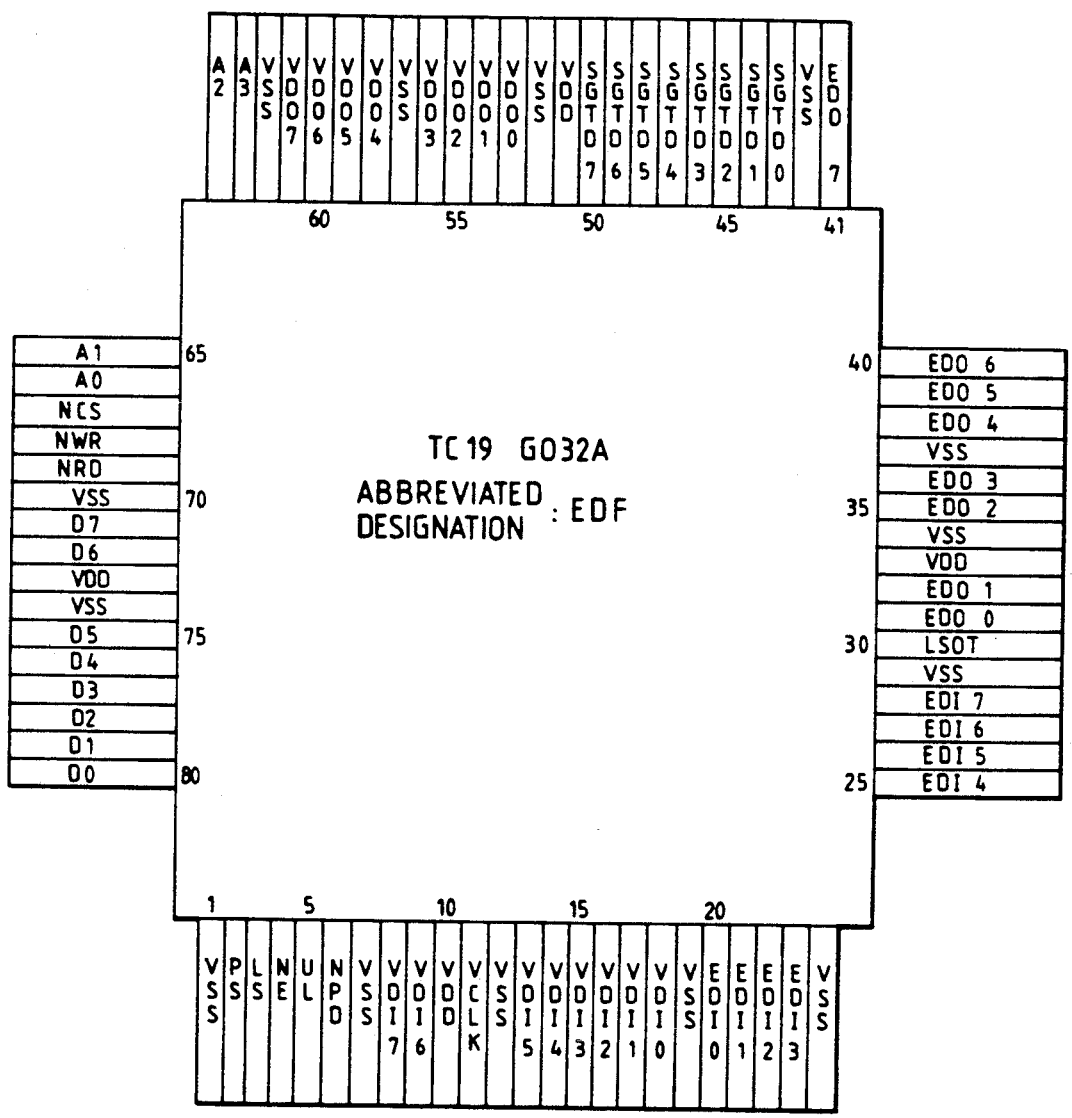
FIG. 51(b) illustrates the arrangement of the pins in the LSI.

FIG. 51(a) illustrates an example construction of the circuit which generates a screen by applying the error dispersing process to the input image data, and FIG. 51(b) illustrates an example arrangement of the pin layout of the LSI comprising the circuit of FIG. 51(b).

The EDF adjusts data by performing an arithmetic operation which includes detecting an error and processing the 1 × 3 filter from the binary-value data output of the SGT 784 (Screen Generator) and then adding the result to the subsequent input image data. The resultant eight-bit image data is then fed to the input of the SGT 784. Next, the output of the SGT 784 is transmitted to the IOT interface and the EDF so that the error dispersing process can be performed.

In order to interface with the CPU, this circuit has individual terminals corresponding to the chip selecting input NCS, address inputs A 0–3, clock NRD for reading data from the chip's RAM and the register clock NWR for writing to the chip's RAM and register, and data bus D0–7. In addition, the circuit has individual terminals corresponding to the power down mode select NPD, page start PS, line start LS, image data transmission clock V CLK, image data input VD I 0–7, image data output VDO 0–7, binary value image data input SGTD 0–7, adjusting data input EDI 0–7, adjusting data output EDO 0–7, SGTD and multiplying factor changeover input UL, LS delay outputs LS OT, and filter processing data enable signal NE.

The circuit comprises a plurality of registers including the range-correcting register 787, which is used for arithmetically finding the difference between the SGT output value and the input chromatic gradation, the coefficient registers 794 and 795, which supply the coefficient for the error dispersing process, and the controlling register. These registers are always kept ready to accept input data from the CPU. The range correcting register 787 stores the absolute value of the correcting data for converting binary values into multiple values, and thus provides chromatic gradation corresponding to the number of dots which are to be set ON. The coefficient registers 794 and 795 are used for expressing all decimal values by a six-bit floating decimal point and as an absolute-value expression. In addition, two pairs of coefficients A and B are provided with respect to the picture element one line ahead of the highlighted picture element and those preceding and following the said picture element. The control register is provided with rounded output data range changeover bit SPAN, a bit ULEN for the selection of SPAM and SGTD, and the set-up bit SU which authorizes the setting of the LSI and controls the rewriting of internal data such as tables. The set-up bit is designed so as to not permit any writing to its internal data unless it is set at "1" by a CPU operation. This feature prevents the re-writing of any internal data by, for example, noises during the copying operation.

The ten bit arithmetic operation data outputted from the subtracting circuit 789 is comprised of a one code bit and nine bits for numerical values. But, because the number of data bits which can be processed by the error filter 792 at the subsequent stage is eight, i.e., one code bit and seven bits for numerical values, the rounding circuit 790 rounds the ten bit arithmetic operation output from the subtracting circuit 789 into eight-bit data. The SPAN bit, i.e., the bit for the changeover of the output data range, is set at "0" when the processing range is from −128 to 127 and set at "1" when the range is from −256 to 254. Therefore, the weight of one bit during this set-up corresponds to two chromatic grades.

The ULEN, which is the SGTD selecting bit, only treats the four higher-order bits or the four lower-order bits of the eight bit SGID data as effective data and is set to "1" in case a filter coefficient suitable to each of these is to be selected and set to "0", when the eight bit SGTD data is treated as is. The gate circuit 785 performs this changeover operation.

The circuit comprised of the range correcting register 787 and the selector 788 selects and outputs one of the registers, depending on the number of bits in the SGT data are turned ON. The integrating circuit 786 adds up the above number of bits and outputs a four-bit output as a selecting signal to the selector 788.

The delaying circuit 791 synchronizes the output from the selector 788 with the input image data to be subjected to subtraction in the subtracting circuit 789. The delaying circuit 791 sets a delay equivalent to seven clock cycles. The error filter 792, which processes the output of the subtracting circuit 789, is a 1×3 product and sum arithmetic operation circuit, which outputs, as the adjusting data for the highlighted picture element in the next line, the data obtained by multiplying the data in the three preceding and following picture element respectively with the coefficients A or B as selected by the selector 793. The FIFO 796 synchronizes the adjusting data such that the data is added to the highlighted picture elements by means of the adding machine 782.

The select and clear circuit 798 is supplied with the page sink signal PS and the error dispersing process enable signal NE and has the adjusting data clearing function. This function is comprised of a one line data clearing function, which is applied after the activation of the page sink signal PS, and a clearing function. The EDF adds the highlighted picture element the adjusting data EDI developed by filtration of the error data one line ahead. Consequently, the adjusting data EDI for the one line immediately following the activation of the page sink signal PS is of no-effect. The one line data clearing function adds "0" by clearing the adjusting data EDI for the initial single line so that the noneffective data just mentioned will not be added to the highlighted picture element. On the other hand, depending on the threshold value matrix of the screen generator, it may or may not be necessary to add the adjusting data EDI. In those cases where it is not necessary to add the adjusting data EDI, the clearing function of the error dispersing process enable signal NE adds "0" by setting the error dispersing process enable signal NE to "1" whereby the adjusting data EDI is cleared.

Within the LSI, the image data is synchronized and subjected to the pipeline process while it is latched by the latching circuits (D Q). The internal clock controls the latching operation and the actions of the individual circuits. The internal clock generating circuit 781 generates the internal clock from the video clock VCLK and is comprised of a flip-flop circuit and an AND gate. It is also designed to stop the internal clock by the power down signal NPD. The control over the running of the internal clock achieves a reduction of power consumption in the LSI while it remains in a stand-by state and controls the generation of heat in the LSI thereby enhancing the LSI's resistance to noise.

(B) Arrangement of Pins In LSI

As illustrated in FIG. 51(*b*), the connecting pins for the LSI are arranged upward, downward, leftward, and rightward making the layout and wiring of the LSI on the printed circuit board easier. In the example shown in FIG. 51(*b*), the pins for the output of the image data are positioned on the upper side of the LSI, the pins for the input of the image data are positioned on the lower side of the LSI, the pins for the CPU interface are positioned on the left side of the LSI, and the pins for the controls are positioned on the right side of the LSI.

The IPS of the present invention features the adoption of LSIs in the circuits as divided among the individual functions, and in the LSIs are arranged along the flow of the image data input form the IIT and output to the IOT as illustrated in FIG. 37. Therefore, the LSI having the pin layout shown in FIG. 51(*b*) is positioned such that the image data flows from the left side of the LSI toward the right side if the bottom side of the Figure, i.e., the side where the input image data pins are arranged, is set on the left-hand side, i.e. if the LSI of FIG. 51(*b*) is rotated 90° clockwise. This arrangement corresponds exactly to the image data flow illustrated in FIG. 37 wherein the LSIs are connected vertically and serially from left to right in the direction of the image data flow which the CPU bus runs in the upper area and the control signal line runs through the lower area. Accordingly, the above pin arrangement of each LSI makes it possible to increase the density of the actual installations and also results in shorter wiring lengths thus reducing noise problems.

(C) Setting of Internal Data in LSI

Figure 52B:
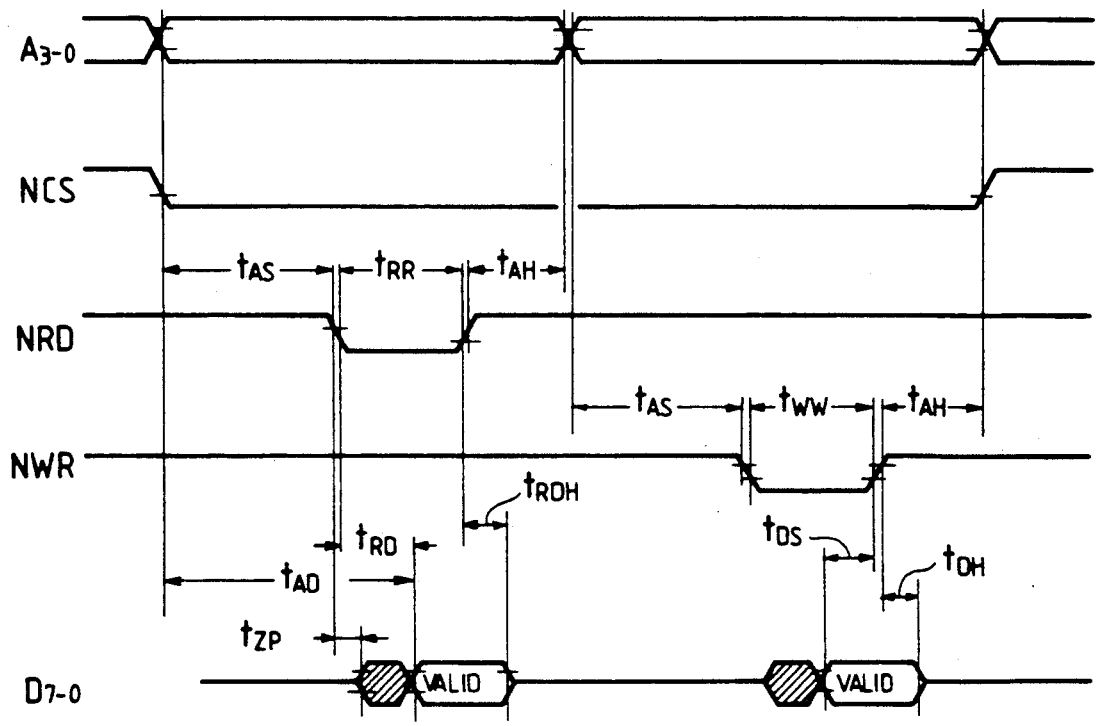
FIGS. 52a-52d explain the actions of the EDF and LSI.
Figure 52A:
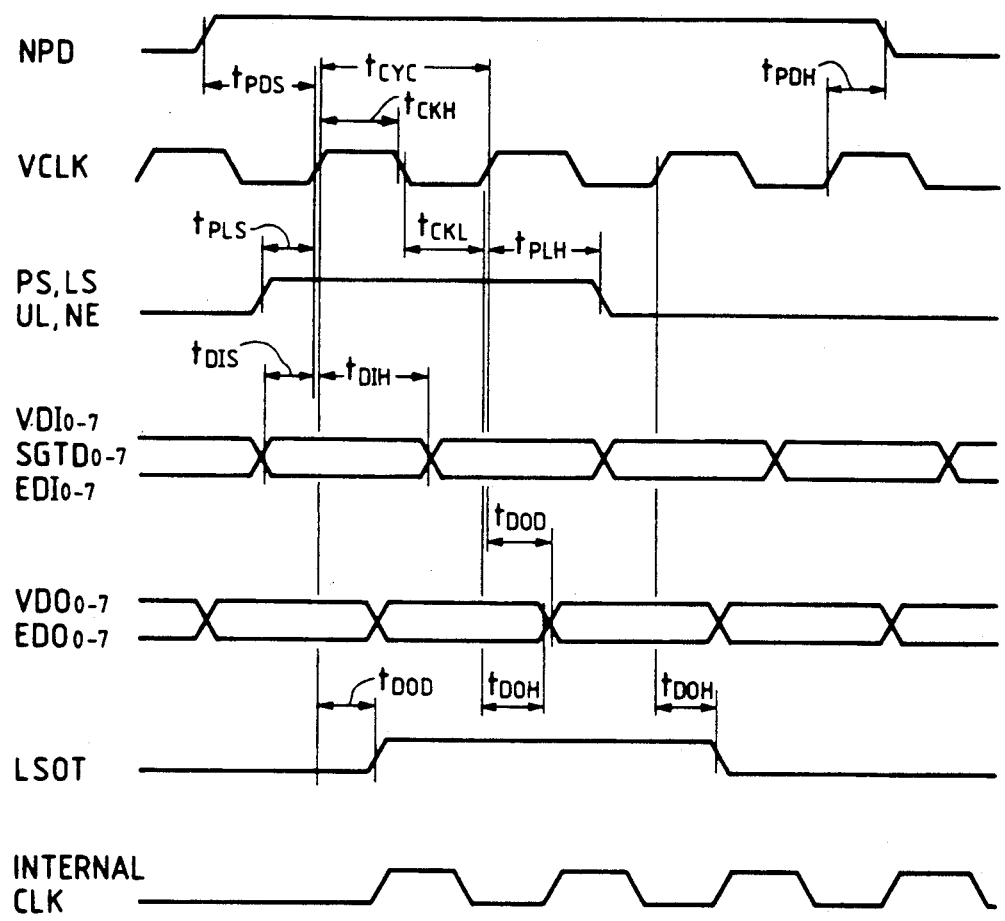
Figure 52A:
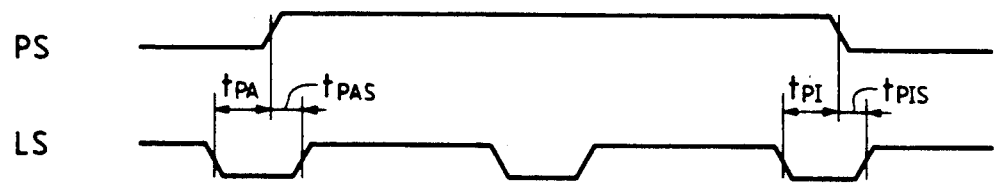

FIGS. 52(a) and 52(b) illustrate timing diagrams for operation of the EDF and the LSI.

The image data processing begins when the power down mode selecting signal NDP rises as illustrated in FIG. 52(a). $t_{PDS}$ represents the NPD set-up time, $t_{CYC}$ represents the VCLK cycle time, $t_{CKH}$ represents the high-level width of the VCLK, and $t_{CKL}$ represents the low-level width of the VCLK. When the image data set-up time $t_{DIS}$ has passed after the input of the data input, the VCLK goes high. The image data holding time $t_{DIH}$ is measured from this point onward. Accordingly, the input data is held from the rising of the VCLK once the NPD has attained a high level. However, the output from the image data VDO 0–7 will be effective after the lapse of the delay time $t_{DOD}$ for the image data output starting from the rising up of the next VCLK cycle.

As shown in FIG. 52(b), with regard to the CPU access, the NCS is set low at the same time as the changeover of the address bus. The read/write signal (NRD/NWR) is set low at the address set-up time $t_{AS}$. During the reading of data, the data bus D 0–7 is made effective after the passage of the data verifying time $t_{RD}$. Moreover, during the writing of data, the data set-up time $t_{DS}$ for the data bus D 0–7 is secured in the low-level width $t_{WW}$. In this regard, $t_{AD}$ corresponds to the time for accessing data from the address while $t_{ZP}$ corresponds to the data bus drive delay time.

(D) Data Setting and Control by VCPU

Figure 52C:
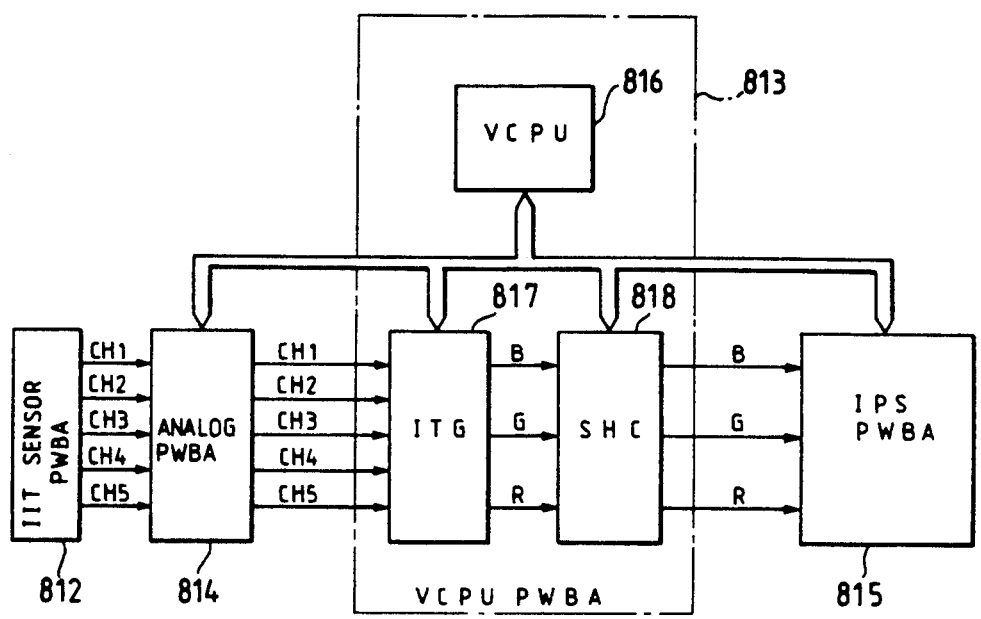

The VCPU controls the IIT and the IPS in a manner consistent with the arrangement illustrated in FIG. 52(c).

At each stage of the image data processing in the IPS, flexibility is achieved in processes such as image data conversion and correction through the effective utilization of conversion tables (LUT) as already mentioned. The use of conversion tables also makes it possible to freely set the data for nonlinear conversion, correction, etc., and, with the values of the results from arithmetic operations set in advance, it is possible to obtain the desired arithmetic operation value without performing an arithmetic operation simply by reading data out of the conversion table. In addition, with a plurality of tables prepared and composed in such a way as to permit the selection therefrom in accordance with a specific type of image, it is possible to perform the conversion, correction, etc. of the image data so as to match the state of the image data, i.e. photographs, characters, prints, and their mixtures. This makes it possible to assure that the reproducing capabilities of the present invention are adequate for the individual types of original sheets. Furthermore, with the use of conversion tables, it is possible to reduce the number of gates and thus capacity of the memory devices comprising processing channels such as those used for conversion and correction, and because it is possible to read desired data from the conversion tables with reference to input data, which corresponds to the addresses of the data in the conversion tables, it is also possible to increase the system processing speed. The VCPU 816 sets and controls the various types of tables in the IPS as just described and also controls the IIT image data processing system.

As shown in FIG. 52(c), the VCPU board (VCPU PWBA) 813 is connected after the analog board (ANALOG PWBA) with respect to the flow of image data and is comprised of the VCPU 816, the individual circuits of the ITG (IIT timing generator) 817 and the SHC (shading correcting circuit) 818. In addition to the above mentioned functions, the VCPU 816 controls the ITG 817, the SHC 818, and the analog board 814. Therefore, the setting of the data in the individual registers and memory devices as well as the setting of the matrices in the screen generator and the setting of the screen angle are all performed by the VCPU 816.

Figure 52D:
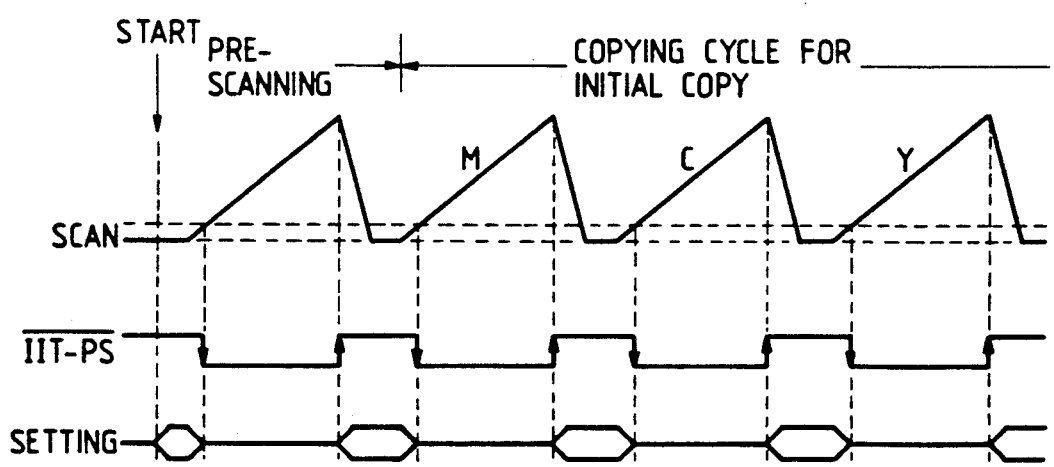

The VCPU 816 is provided with basic parameters with which the writing operations are executed at the start of the copying operation or the carriage return (back scanning) of the IIT, depending upon the conditions set for the execution of the copying modes, etc. For example, as illustrated in FIG. 52(d), prescribed data is written to the individual registers and tables prior to prescanning depending upon the type of copying mode or prescanning, and the prescribed data is written into the individual registers and tables in a manner corresponding to the individual developing colors, M, C, . . . prior to copy scanning. Accordingly, with the screen generator which changes the angle of the screen in accordance with the developing colors, the data is rewritten during every copy scanning operation. Moreover, the VCPU 816 writing process is also executed for color masking, tables such as the UCR and the TRC, and registers. Consequently, the VCPU 816 is designed so as to calculate the data to be written while the scanning operation is being performed so that the writing operations are performed efficiently in the short duration of time taken by the carriage return operation.

The following is a brief description regarding the VCPU 816 control over the IIT.

On the analog board 814, when the color decomposing signals (video signals) for the five-layer elements of the CCD line sensor are inputted from the IIT sensor board 812, these signals are inputted into corresponding A/D converters (235 in FIG. 19) via individual amplifiers. These converters convert the signals into a line of digital data comprising G B R G B R, this analog board 814, the VCPU 816 sets the gains (i.e. the rate of amplification) for the control amplifier and for the offset control amplifier.

The ITG 817 on the VCPU board 813 controls the delay amount setting circuit (236 in FIG. 19), which performs the zigzag correction, and the disintegrating and synthesizing circuit (237 in FIG. 19) while the setting of the registers is performed by the VCPU 816. The delay amount setting circuit 236 corrects the amount of deviation in the installation of the CCD line sensors in five layers in the subsidiary scanning direction. The disintegrating and synthesizing circuit 237 which is provided with a line memory device, separates G B R G B R . . . into individual color signals in each line and holds these signals in the amount for one line in order to perform the color signal synthesis for each line therewith.

The SHC 818 corrects the deviation of picture elements and shading with the picture element data for the individual colors inputted from the ITG 817. The process of correcting the shading involves giving the output representing the difference between the image input data and the basic data written in the SRAM. The basic data represents that data read from the white reference board and corrected for picture element deviation and written to the SRAM prior to the start of scanning. In the case of color detection, the operation of writing to the SRAM is performed in synchronization with the line sink signal IPS-LS of the IPS once 50 mS has elapsed after the IIT carriage is moved to a specified location. With the next line sink signal IPS-LS, the picture element data at the specified location is transferred to the RAM in the VCPU 816. This color detection process is applied to five picture elements from the specified location in the main scanning direction and five picture elements therefrom in the subsidiary scanning direction. Therefore, the picture element data at the specified location and the subsequent five points are written to the VCPU 816 RAM from the picture element data for one line in the main scanning direction as written to the SRAM. Moreover, the process of writing the picture element data to the five locations comprises moving the IIT carriage four times by one pulse. The operations described above correspond to the processes performed when the specified location is one point. When there are a plurality of specified points, the same processes are repeatedly performed to each of the plurality of specified points.

(E) Error Filter

Figure 53:
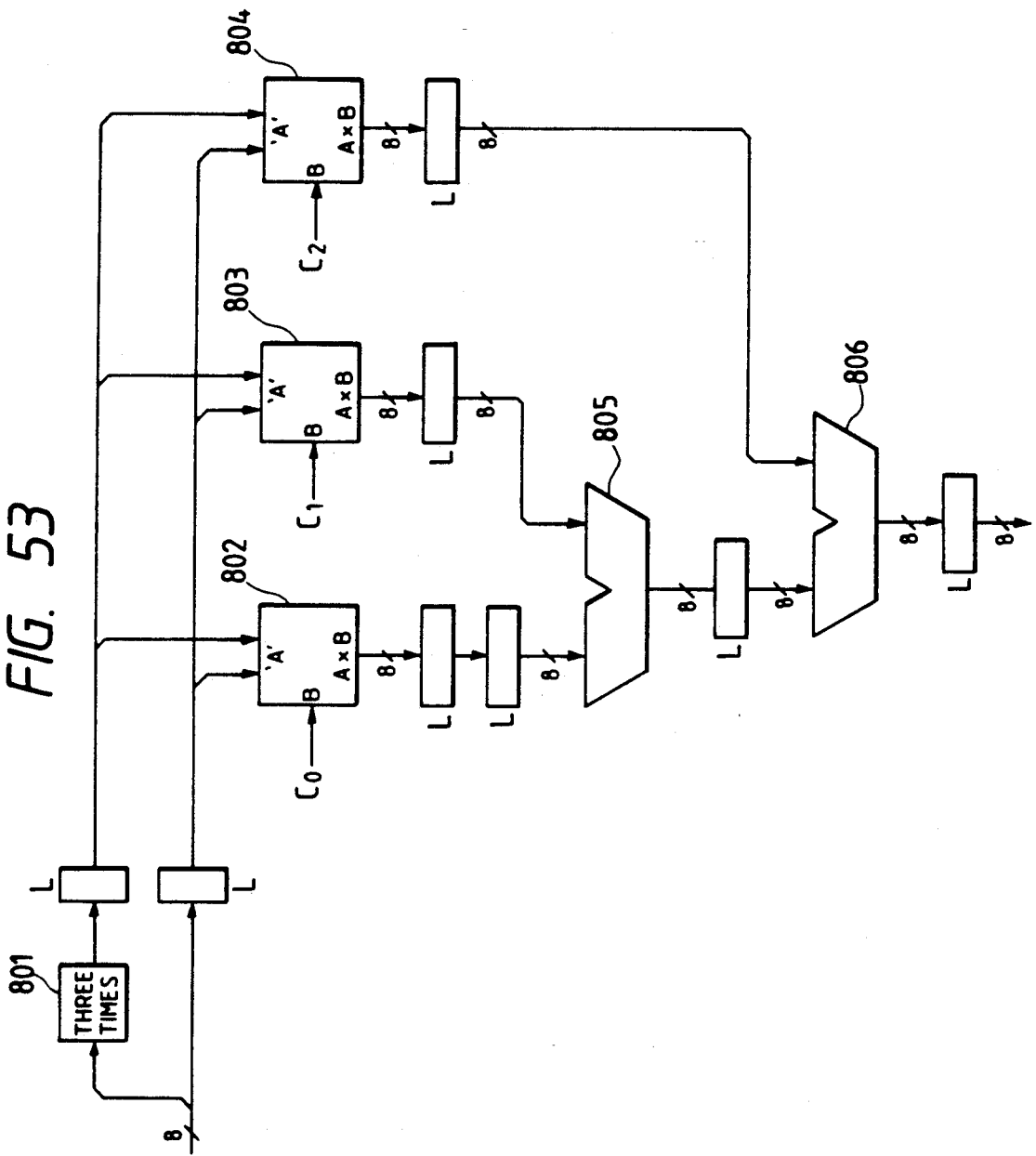
FIG. 53 illustrates an example construction of the error filtering circuit.
Figure 54:
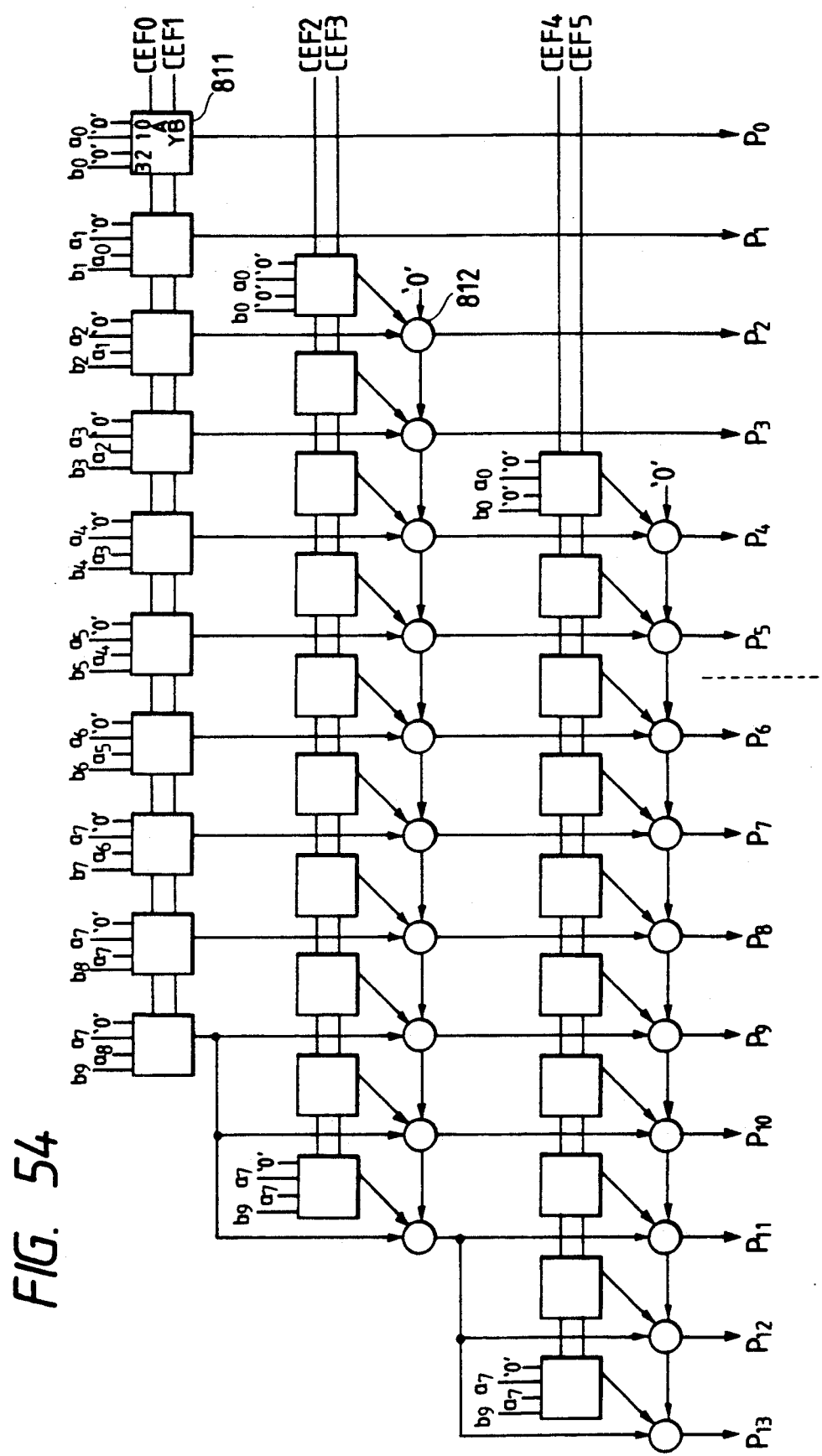
FIG. 54 illustrates the construction of the circuits in the multiplying device.
Figure 55A:
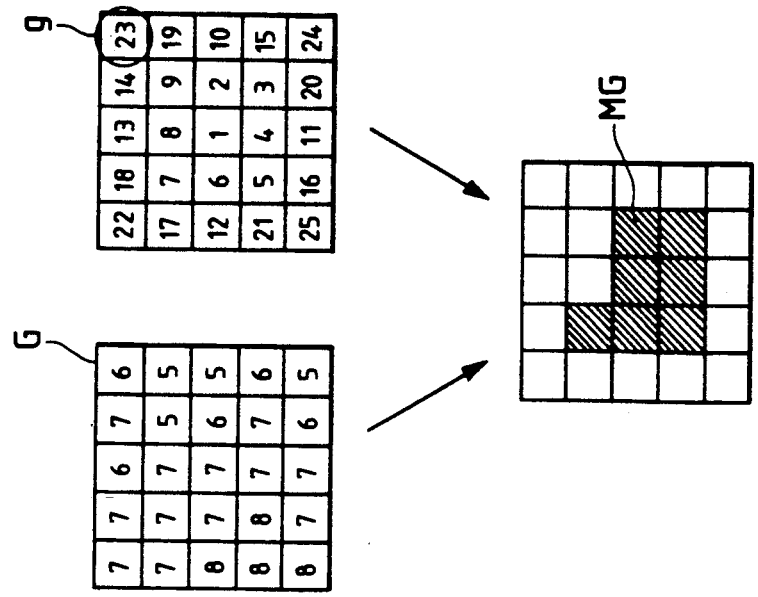
FIGS. 55a-55b illustrate an existing example for the conventional halftone generating process.
Figure 55B:
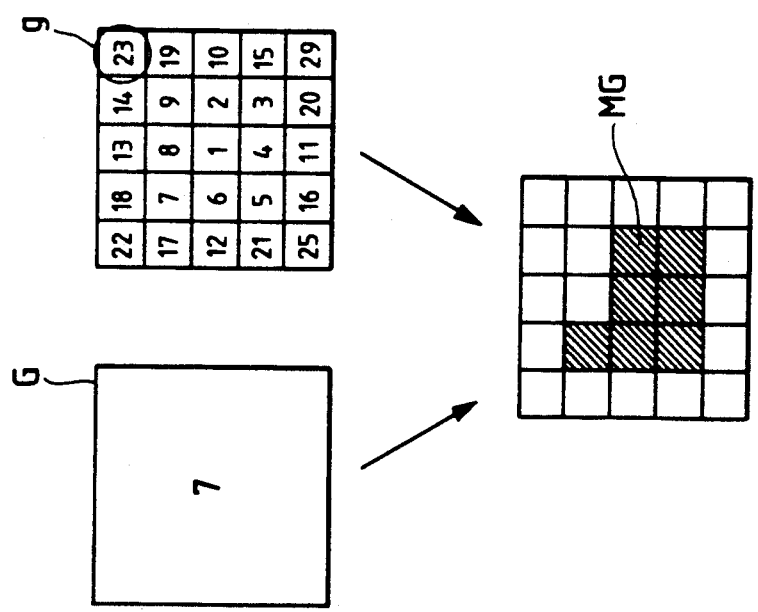
Figure 56A:
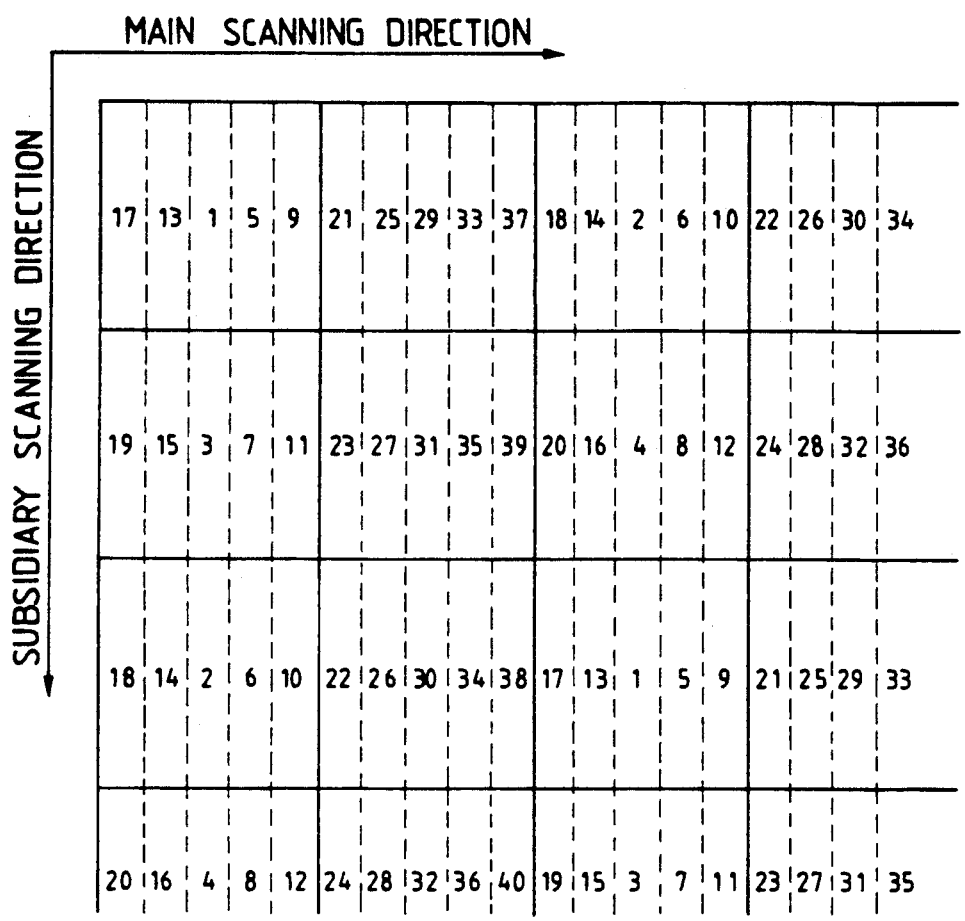
FIGS. 56a-56c illustrate an existing example for the conventional dot reproducing process.
Figure 56B:
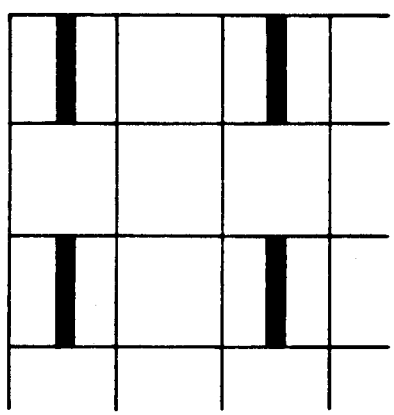
Figure 56C:
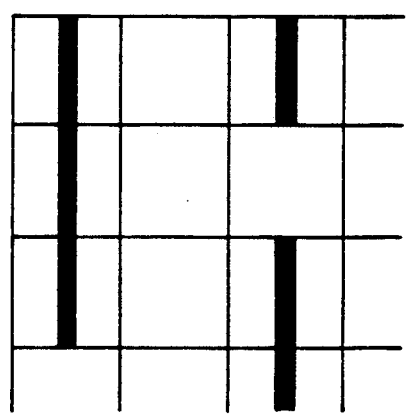

FIG. 53 illustrates an example of the construction of the error filter circuit and FIG. 54 illustrates the construction of the adding machine circuit.

In FIG. 53, the tripling circuit 801 is the arithmetic operation circuit which multiplies the input data $X_n$ by three, and the adding machines 802 through 804 are the arithmetic operation circuits which multiply the input data $X_n$ by $C_0$, $C_1$, and $C_2$. The latching circuit L is used as a delay circuit. With the latching circuit L connected in two stages to the multiplying machine 802 and connected in a single stage to the multiplying machine 803, adding operations are performed by the adding machine 805. The resulting sum is further added to the adding machine 806 while a latching circuit L is connected in a single stage thereto and connected to the multiplying machine 804. Thus, the value $y_n$ described with reference to FIG. 50 is obtained. That is to say, the output $y_n$ from the adding machine 806 is $C_0 \times X_n + C_1 \times X_{n+1} + C_2 \times X_{n+2}$, the output from the adding machine 805 is $(C_0 \times X_{n+1} + C_1 \times X_{n+2})$, and the latching circuits L connected to the multiplying machines 802–804 respectively hold the $(C_0 \times X_{n+2})$, $(C_1 \times X_{n+2})$, $(C_2 \times X_{n+2})$ latched therein. Consequently, when the input data is updated by the clock, the output from the next adding machine 806 changes to $(C_0 \times X_{n+1} + C_1 \times X_{n+2} + C_2 \times X_{n+3})$.

FIG. 54 illustrates an example of the specific construction of the multiplying machines 802 through 804. This circuit comprises the selector 811 and the adding machine 812, and, with the four values (1) ($X_n \times 0$), (2) ($X_n \times 1$), (3) ($X_n \times 2$), and (4) ($X_n \times 3$) and the six coefficient bits (CEF 0–5) as the selecting signals, this circuit selects the output data. In this case, the above arithmetic operations can be performed only if the selecting process is applied to $X_n$ because the arithmetic operations under (1) can be performed with all the bits set to "0", the operations under (2) can be performed with the $X_n$ maintained as it is, and the operations under (3) can be performed with the value $X_n$ shifted to a higher-order bit by one bit and with the lowest-order bit outputted in "0". Because the arithmetic operations under (4) cannot be performed only by the selecting process applied to the value $X_n$, a tripling circuit 801 is provided and its output $b_n$ is employed. Thus, the multiplication of the eight-bit input data by the six-bit coefficient produces the fourteen bit product $P_0$–$P_{13}$. But, because all six bits of the coefficient occupy decimal digits, it is possible to output the eight higher-order bits and discard the six lower-order bits.

Furthermore, the present invention is not limited to the embodiments described hereinabove, but can be embodied in a variety of modified forms. For example, although the concentrated dot type matrix pattern wherein the dots attain their growth in continuum from the center has been presented hereinabove, the present invention may be embodied in a partial dot type matrix pattern wherein the matrix area is divided into a plurality of areas, i.e., two to four equal areas, each having a growth nucleus arranged therein, or in a dispersed type matrix pattern having no growth nucleus. The partial dot type pattern may not only have threshold values dispersed in a predetermined sequence in each growth nucleus, but may also have the same threshold value set therein.

In addition, the matrix pattern may be constructed so that it is capable of generating the threshold data as read out, as though partially cut out, of a large matrix pattern stored in the RAM. If such a matrix pattern is comprised of a single line, it is possible to realize a myriad line screen by repeatedly reading out the matrix data without any shift making it possible to set a screen angle by selecting the size of the line and the particulars of the shift. Likewise, a plurality of shift values may be stored in memory for the generation of the start address whereby the start address can be voluntarily selected from the list.

In the embodiments described above, the picture element one line ahead of the highlighted picture element and the picture elements preceding and following the picture element one line ahead of the highlighted picture element are subjected to the error dispersing process. It is also possible to subject the picture elements preceding and following the highlighted picture element to the error dispersing process. Moreover, although a myriad line screen in which one picture element is divided into four parts has been adopted for the embodiment described herein, a myriad line screen in which one picture element is divided into six parts may be employed. Furthermore, it is also feasible to employ a dither which does not perform an error dispersing process for application to ordinary images and a myriad line screen on which the threshold value changes only in the one-dimensional direction used in combination with an error dispersing process for application to characters, etc. It is also feasible to employ various combinations of the above, for example, by using the changeover of the threshold value patterns in a manner such that a dot type matrix pattern is used for the highlighted area, a myriad line type matrix pattern is used for the intermediate area, and a dispersed type matrix pattern is used for the shadow area.

As it is evident from the description presented hereinabove, the present invention makes it possible to select the number of bits to be used by the main scanning direction counter and the number of bits to be used by the subsidiary scanning direction counter in the matrix address generating section. Therefore, the present invention has made it possible to generate the threshold value data in matrix patterns of a voluntarily selected size that require a small amount of memory capacity to be stored. In addition, the present invention enables the user to freely set up not only concentrated dot type matrix patterns, partial dot type matrix patterns, and dispersed type matrix patterns in a two dimensional cycle, but also allows the user to freely set the screen angle by selecting the shift amount and easily set up the myriad line type screen by eliminating the shift with a pattern composed of a single line. Furthermore, the present invention makes it possible to achieve smooth reproductions of line edges, characters, and so forth by combining the error dispersing process with a myriad line screen on which one picture element is divided vertically thus eliminating noise and sense of incompatibility which are likely to occur in halftone areas and transition areas between characters by virtue of the changeover of various kinds of threshold value patterns. It is therefore possible to achieve high quality reproductions of characters and halftone areas. Finally, the changeover of the threshold data for use makes it possible to improve upon the reproduction of details by enhancing the low-frequency structure and the view-obstructing patterns with a simple hardware construction.

What is claimed is:

1. A halftone image generating apparatus for use in a halftone image generating system for generating threshold value data corresponding to positions in a main scanning direction and a subsidiary scanning direction, comprising:

threshold value data generating means for generating said threshold value data in a matrix pattern having a variable number of lines and rows, and for converting input picture image data into binary value data by comparing said input picture image data to said threshold value data, said input picture image data having chromatic gradations, and said threshold value data generating means having a memory for storing a plurality of start addresses and means for permitting a repeating of said plurality of start addresses in a line initial position every time one matrix unit is finished;

means for forming a scanning mesh dot image corresponding to said input picture image data; and a threshold value matrix pattern and start addresses for setting different screen angles corresponding to individual developed colors.

2. The halftone image generating apparatus of claim 1, further comprising:

register means for specifying a size of said matrix pattern in the subsidiary scanning direction and the number, for a starting frame, of one frame for one full round of said start addresses;

a counter for the subsidiary scanning direction; and a frame counter, wherein data is loaded from said register to the said counter for the subsidiary scanning direction and to said frame counter.

3. The halftone image generating apparatus of claim 2, further comprising means for loading said start addresses, in accordance with said data loaded in said frame counter, into a counter for the main scanning direction only for an initial position of a line.

4. The halftone image generating apparatus of claim 1, further comprising means for permitting a selection of bits, said bits being used for a main scanning direction counter and the subsidiary scanning direction counter, as a function of the number of lines and rows of said matrix pattern.

5. The halftone image generating apparatus of claim 1, further comprising:

a plurality of memory devices for storing said generating threshold value data;

said threshold value data generating means including a plurality of comparators;

and said scanning mesh dot image forming means including means for producing a plurality of sets of output image data corresponding to each set of said input picture image data.

6. The halftone image generating apparatus of claim 1, wherein said threshold value data comprises a one-line matrix pattern.

7. The halftone image generating apparatus of claim 1, wherein said matrix pattern is a two-dimensional cycle and is divided into a plurality of regions, and wherein said threshold value data is arranged to for growth nucleus in each of said regions.

8. The halftone image generating apparatus of claim 1, wherein said matrix pattern includes one or more of the following types:

a concentrated dot type matrix pattern;

a myriad line type matrix pattern; and a dispersed type matrix pattern in a two-dimensional cycle;

and further comprising means for selecting at least one of said types.

9. The halftone image generating apparatus of claim 1, further comprising means for converting the scanning mesh dot image data to a density value and for finding a quantized error between said density value and a density value of said input image data to be processed and electrically fed back to said input image data.

10. The halftone image generating apparatus of claim 9, further comprising means for feeding back said quantized error in a picture element, the picture element one line ahead thereof.

11. The halftone image generating apparatus of claim 10, wherein the means for finding the quantization error includes means for performing an error-dispensing process in accordance with said quantization error.

12. The halftone image generating apparatus of claim 1, further comprising means for storing in memory a plurality of matrix patterns and for generating, by changeover, the threshold value data for different ones of said plurality of matrix patterns.

13. The halftone image generating apparatus of claim 12, wherein the threshold value data includes the following:

a fixed threshold value; and threshold values for a triangular wave or mesh dot pattern;

and the means for generating said threshold value data by changeover comprises means for generating the threshold value data in dependence upon the presence or absence of edge detection.

14. The halftone image generating apparatus according to claim 12 wherein said threshold value data includes threshold value data for a monotonic increase pattern and a monotonic decrease pattern, and further including means for generating, by changeover, said threshold value data in accordance with a density gradient of successive picture elements.

15. The halftone image generating apparatus of claim 14, further comprising means for developing binary values corresponding to a representative value of each of said successive picture elements.

16. A halftone image generating apparatus for use in a color picture image forming system for generating mesh dot halftone picture images by comparing a threshold value matrix pattern having a screen angle to picture image signals, comprising:

a memory device for storing a plurality of basic threshold value blocks, said basic threshold value blocks corresponding to said screen angles;

main scanning direction address specifying means and subsidiary scanning direction address specifying means for generating address signals of said memory device; and, changeover means for selectively transmitting to said memory device said address signals, said address signals comprising a number of bits smaller than the total number of bits of the address signals received from said address specifying means for the main scanning direction and from said address specifying means for the subsidiary scanning direction, in correspondence with the screen angles.

17. A halftone image generating apparatus for use in a halftone image generating system for generating threshold value data corresponding to positions in a main scanning direction and a subsidiary scanning direction, comprising:

threshold value data generating means for generating said threshold value data in a one-line matrix pattern having a variable number of rows, and for converting input picture image data into binary value data by comparing said input picture image data to said threshold value data, said input picture image data having chromatic gradations; and means for forming a scanning mesh dot image corresponding to said input picture image data.

18. A halftone image generating apparatus for use in a halftone image generating system for generating threshold value data corresponding to positions in a main scanning direction and a subsidiary scanning direction, comprising:

threshold value data generating means for generating said threshold value data in a matrix pattern having a variable number of lines and rows, and for converting input picture image data into binary value data by comparing said input picture image data to said threshold value data, said input picture image data having chromatic gradations;

means for forming a scanning mesh dot image corresponding to said input picture image data; and means for converting the scanning mesh dot image data to a density value and for finding a quantized error between said density value and a density value of said input image data to be processed and electrically fed back to said input image data.

19. A halftone image generating apparatus for use in a halftone image generating system for generating threshold value data corresponding to positions in a main scanning direction and a subsidiary scanning direction, comprising:

threshold value data generating means for generating said threshold value data in a matrix pattern having a variable number of lines and rows, and for converting input picture image data into binary value data by comparing said input picture image data to said threshold value data, said input picture image data having chromatic gradations;

means for forming a scanning mesh dot image corresponding to said input picture image data;

means for converting the scanning mesh dot image data to a density value and for finding a quantized error between said density value and a density value of said input image data to be processed and electrically fed back to said input image data; and means for feeding back said quantized error in a picture element, the picture element one line ahead thereof.

20. A halftone image generating apparatus for use in a halftone image generating system for generating threshold value data corresponding to positions in a main scanning direction and a subsidiary scanning direction, comprising:

threshold value data generating means for generating said threshold value data in a matrix pattern having a variable number of lines and rows, and for converting input picture image data into binary value data by comparing said input picture image data to said threshold value data, said input picture image data having chromatic gradations;

means for forming a scanning mesh dot image corresponding to said input picture image data; and means for storing in memory a plurality of matrix patterns and for generating, by changeover, the threshold value data for different ones of said plurality of matrix patterns.

21. A halftone image generating apparatus for use in a halftone image generating system for generating threshold value data corresponding to positions in a main scanning direction and a subsidiary scanning direction, comprising:

threshold value data generating means for generating said threshold value data in a matrix pattern having a variable number of lines and rows, said threshold value data including a fixed threshold value and threshold values for a triangular wave or mesh dot pattern, and for converting input picture image data into binary value data by comparing said input picture image data to said threshold value data, said input picture image data having chromatic gradations;

means for forming a scanning mesh dot image corresponding to said input picture image data; and means for storing in memory a plurality of matrix patterns and for generating, by changeover, the threshold value data for different ones of said plurality of matrix patterns in dependence upon the presence or absence of edge detection.

22. A halftone image generating apparatus for use in a halftone image generating system for generating threshold value data corresponding to positions in a main scanning direction and a subsidiary scanning direction, comprising:

threshold value data generating means for generating said threshold value data in a matrix pattern having a variable number of lines and rows, said threshold value data including threshold value data for a monotonic increase pattern and a monotonic decrease pattern, and for converting input picture image data into binary value data by comparing said input picture image data to said threshold value data, said input picture image data having chromatic gradations;

means for forming a scanning mesh dot image corresponding to said input picture image data;

means for storing in memory a plurality of matrix patterns and generating by changeover the threshold value data for different ones of said matrix patterns; and means for generating, by changeover, said threshold value data in accordance with a density gradient of successive picture elements.

23. A halftone image generating apparatus for use in a halftone image generating system for generating threshold value data corresponding to positions in a main scanning direction and a subsidiary scanning direction, comprising:

threshold value data generating means for generating said threshold value data in a matrix pattern having a variable number of lines and rows, said threshold value data including threshold value data for a monotonic increase pattern and a monotonic decrease pattern, and for converting input picture image data into binary value data by comparing said input picture image data to said threshold value data, said input picture image data having chromatic gradations;

means for forming a scanning mesh dot image corresponding to said input picture image data;

means for storing in memory a plurality of matrix patterns and generating by changeover the threshold value data for different ones of said matrix patterns;

means for generating, by changeover, said threshold value data in accordance with a density gradient of successive picture elements; and means for developing binary values corresponding to a representative value of each of said successive picture elements.

24. A halftone image generating apparatus for use in a halftone image generating system for generating threshold value data corresponding to positions in a main scanning direction and a subsidiary scanning direction, comprising:

threshold value data generating means for generating said threshold value data in a matrix pattern having a variable number of lines and rows, and for converting input picture image data into binary value data by comparing said input picture image data to said threshold value data, said input picture image data having chromatic gradations;

means for forming a scanning mesh dot image corresponding to said input picture image data;

means for converting the scanning mesh dot image data to a density value, for finding a quantized error between said density value and a density value of said input image data to be processed and electrically fed back to said input image data, and for performing an error-dispersing process in accordance with said quantized error; and means for feeding back said quantized error in a picture element, the picture element one line ahead thereof.

* * * * *

UNITED STATES PATENT AND TRADEMARK OFFICE
CERTIFICATE OF CORRECTION

PATENT NO. : 5,101,283

DATED : March 31, 1992

INVENTOR(S) : Masao Seki et al.

It is certified that error appears in the above-identified patent and that said Letters Patent is hereby corrected as shown below:

Title page, Inventors, change "Ebina" to --Kanagawa--.

Claim 1, column 79, line 37, change "line initial" to --line-initial--.

Claim 5, column 79, line 67 and 68, change "generating" to --generated--.

Claim 5, column 79, line 68, change "generating" to --generated--.

Claim 7, column 80, line 13, change "for" to --form a--.

Claim 11, column 80, lline 36, change "error-dispensing" to --error-dispersing--.

UNITED STATES PATENT AND TRADEMARK OFFICE
CERTIFICATE OF CORRECTION

PATENT NO. : 5,101,283
DATED : March 31, 1992
INVENTOR(S) : Masao Seki et al

It is certified that error appears in the above-indentified patent and that said Letters Patent is hereby corrected as shown below:

Claim 11, column 80, line 36, change "error-dispensing" to --error-dispersing--.

Signed and Sealed this

Twelfth Day of October, 1993

Attest:

BRUCE LEHMAN

Attesting Officer       Commissioner of Patents and Trademarks

UNITED STATES PATENT AND TRADEMARK OFFICE
CERTIFICATE OF CORRECTION

PATENT NO. : 5,101,283
DATED : March 31, 1992
INVENTOR(S) : Masao Seki, et al

It is certified that error appears in the above-indentified patent and that said Letters Patent is hereby corrected as shown below:

On the title page, Item [75] Inventors, change "Ebina" to read
--Kanagawa--.

Claim 1, Column 79, line 37, change "line initial" to read
--line-initial--.

Claim 5, Column 79, line 67 & 68, change "generating" to read
--generated--.

Claim 7, column 80, line 13, change "for" to --form a--.

Claim 11, column 80, line 36, change "error-dispensing"
to --error-dispersing--.

Signed and Sealed this

Twenty-third Day of November, 1993

Attest:

BRUCE LEHMAN

*Attesting Officer*     Commissioner of Patents and Trademarks